(12) United States Patent
Palermo et al.

(10) Patent No.: US 12,348,969 B2
(45) Date of Patent: Jul. 1, 2025

(54) SYSTEMS, METHODS, AND APPARATUS FOR WORKLOAD OPTIMIZED CENTRAL PROCESSING UNITS (CPUS)

(71) Applicant: Intel Corporation, Santa Clara, CA (US)

(72) Inventors: Stephen Palermo, Chandler, AZ (US); Srihari Makineni, Portland, OR (US); Shubha Bommalingaiahnapallya, East Brunswick, NJ (US); Rany ElSayed, Folsom, CA (US); Lokpraveen Mosur, Gilbert, AZ (US); Neelam Chandwani, Portland, OR (US); Pinkesh Shah, Chandler, AZ (US); Rajesh Gadiyar, Chandler, AZ (US); Shrikant M. Shah, Chandler, AZ (US); Uzair Qureshi, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 252 days.

(21) Appl. No.: 17/922,280

(22) PCT Filed: Mar. 26, 2021

(86) PCT No.: PCT/US2021/024497
§ 371 (c)(1),
(2) Date: Oct. 28, 2022

(87) PCT Pub. No.: WO2021/242389
PCT Pub. Date: Dec. 2, 2021

(65) Prior Publication Data
US 2023/0217253 A1    Jul. 6, 2023

Related U.S. Application Data

(60) Provisional application No. 63/113,734, filed on Nov. 13, 2020, provisional application No. 63/032,045, filed on May 29, 2020.

(51) Int. Cl.
*G06F 9/50* (2006.01)
*H04W 12/125* (2021.01)

(52) U.S. Cl.
CPC .......... H04W 12/125 (2021.01); G06F 9/505 (2013.01)

(58) Field of Classification Search
CPC .... H04W 12/125; G06F 9/505; G06F 9/5094; G06F 9/5027; G06F 9/45558; G06F 2009/45595; Y02D 10/00
See application file for complete search history.

(56) References Cited

U.S. PATENT DOCUMENTS 9,075,614 B2   7/2015   Fetzer et al.
2007/0033425 A1   2/2007   Clark
(Continued)

FOREIGN PATENT DOCUMENTS

KR   20160085892   7/2016
WO   2021242388 A1   12/2021

OTHER PUBLICATIONS

Patent Cooperation Treaty, "International Preliminary Report on Patentability," issued in connection with International Appl. No. PCT/US2021/024492, dated Nov. 17, 2022, 8 pages.

(Continued)

*Primary Examiner* — Brian F Shaw
(74) *Attorney, Agent, or Firm* — Hanley, Flight & Zimmerman, LLC

(57) ABSTRACT

An example apparatus includes a workload analyzer to determine an application ratio associated with the workload, the application ratio based on an operating frequency to execute the workload, a hardware configurator to configure, before execution of the workload, at least one of (i) one or more cores of the processor circuitry based on the application ratio or (ii) uncore logic of the processor circuitry based (Continued)

on the application ratio, and a hardware controller to initiate the execution of the workload with the at least one of the one or more cores or the uncore logic.

21 Claims, 54 Drawing Sheets

(56) References Cited

U.S. PATENT DOCUMENTS

| | | | |
|---|---|---|---|
| 2013/0232368 A1* | 9/2013 | Fetzer | G06F 1/3296 |
| | | | 713/324 |
| 2014/0068290 A1 | 3/2014 | Bhandaru et al. | |
| 2014/0122689 A1 | 5/2014 | Park et al. | |
| 2015/0268710 A1 | 9/2015 | Bose et al. | |
| 2016/0179163 A1 | 6/2016 | Haider et al. | |
| 2016/0239074 A1* | 8/2016 | Lee | G06F 1/3275 |
| 2017/0206118 A1 | 7/2017 | Therien et al. | |
| 2018/0349168 A1 | 12/2018 | Ahmed | |
| 2019/0012200 A1 | 1/2019 | Wilkerson et al. | |
| 2020/0136906 A1 | 4/2020 | Guim Bernat et al. | |

OTHER PUBLICATIONS

International Searching Authority. "International Preliminary Report on Patentability," issued in connection with International Appl. No. PCT/US2021/024497, mailed Dec. 8, 2022, 8 pages.
European Patent Office, "Extended European Search Report," issued in connection with European Patent Application No. 21812591.2, dated Dec. 11, 2023, 11 pages.
Patent Cooperation Treaty, "International Search Report," issued in connection with International Application No. PCT/US2021/024497, mailed Aug. 18, 2021, 4 pages.
Patent Cooperation Treaty, "Written Opinion," issued in connection with International Application No. PCT/US2021/024497, mailed Aug. 18, 2021, 6 pages.
Patent Cooperation Treaty, "International Search Report," issued in connection with International Application No. PCT/US2021/024492, mailed Jul. 16, 2021, 4 pages.
Patent Cooperation Treaty, "Written Opinion," issued in connection with International Application No. PCT/US2021/024492, mailed Jul. 16, 2021, 7 pages.
European Search Report, "Extended European Search Report," issued in connection with European Patent Application No. 21813700.8, dated Jan. 31, 2024, 11 pages.

* cited by examiner

| CPU CONFIG | SSE P1 FREQ (GHZ) | AVX-512 P1 FREQ (GHZ) | AVX-512 5G-ISA FREQ (GHZ) | TDP (W) | CORE COUNT | THERMAL JUNCTION TEMP (C) | ALL CORE TURBO SSE (GHZ) | ALL CORE TURBO AVX-512 (GHZ) | ALL CORE TURBO AVX-512-ISA (GHZ) | CLM P0 FREQ (GHZ) | CLM P1 FREQ (GHZ) |
|---|---|---|---|---|---|---|---|---|---|---|---|
| 0 | 2.3 | 1.8 | 1.5 | 185 | 26 | 91 | 3.0 | 2.5 | 2.0 | 2.4 | 1.8 |
| 1 | 2.8 | 2.0 | 1.7 | 185 | 20 | 105 | 3.4 | 2.7 | 2.2 | 2.4 | 1.8 |
| 0 | 2.5 | 1.8 | 1.5 | 150 | 20 | 102 | 3.2 | 2.4 | 2.0 | 2.4 | 1.8 |

1200

CPU P STATE CONTROL

CPU P STATE CONTROL

| | | SUPPORT DYNAMIC SST-PP SELECT. |
|---|---|---|
| WFR UNCORE GV RATE REDUCTION | <DISABLE> | NOTE: |
| AVX LICENCE PRE-GRANT OVERRIDE | <DISABLE> | DISABLE: STATIC SST-PP CAN BE DISPLAYED. |
| SPEEDSTEP (PSTATES) | <ENABLE> | |
| AVX P1 | <NORMAL> | |
| DYNAMIC SST-PP | <DISABLE> | |
| INTEL SST-PP | <BASE> | |

| INTEL SST-PP | BASE | CONFIG 1 | CONFIG 2 |
|---|---|---|---|
| CORE COUNT | 16 | 10 | 08 |
| CURRENT PI RATIO [0] | 18 | 19 | 20 |
| PACKAGE TDP (W) | 135 | 120 | 105 |

| =MOVE HIGHLIGHT | F9-RESET TO DEFAULTS<br><ENTER>=SELECT ENTRY | F10=SAVE<br>ESC=EXIT |
|---|---|---|

```
┌─────────────────────────────────────────────────────────────────┐
│                      CPU P STATE CONTROL                        │
├─────────────────────────────────────────────────────────────────┤
│                                                                 │
│                                          SUPPORT DYNAMIC        │
│                                          SST-PP SELECT.         │
│  CPU P STATE CONTROL                     NOTE:                  │
│                                          DISABLE: STATIC        │
│  WFR UNCORE GV RATE         <DISABLE>    SST-PP CAN BE          │
│  REDUCTION                               DISPLAYED              │
│  AVX LICENCE PRE-GRANT      <DISABLE>                           │
│  OVERRIDE                                                       │
│  SPEEDSTEP (PSTATES)        <ENABLE>                            │
│  AVX P1                     <NORMAL>                            │
│  DYNAMIC SST-PP             <ENABLE>                            │
│  ============================================================== │
│                                                                 │
│   INTEL SST-PP            BASE  | CONFIG 1 | CONFIG 2           │
│     CORE COUNT             16   |   10     |   08               │
│     CURRENT P1 RATIO [0]   18   |   19     |   20               │
│     PACKAGE TDP (W)        135  |   120    |   105              │
│     TJMAX                  105  |   097    |   090              │
│                                                                 │
├─────────────────────────────────────────────────────────────────┤
│                       F9=RESET TO DEFAULTS        F10=SAVE      │
│    =MOVE HIGHLIGHT        <ENTER>=SELECT ENTRY    ESC=EXIT      │
└─────────────────────────────────────────────────────────────────┘
```

FIG. 13

| | PERFORMANCE | THROUGHPUT | LATENCY | TDP |
|---|---|---|---|---|
| CONFIGURATION 1 — 1420<br>CORE: 2.1 GHZ<br>UNCORE: 1.8 GHZ | BETTER | BEST | BEST | SAME |
| CONFIGURATION 2 — 1422<br>CORE: 1.8 GHZ<br>UNCORE: 1.5 GHZ | GOOD | GOOD | GOOD | SAME |
| CONFIGURATION 3 — 1424<br>CORE: 2.4 GHZ<br>UNCORE: 1.6 GHZ | BEST | BETTER | BETTER | SAME |
| | N CPUS IN 1 | | | |

1402
CPU
32C/185W

FIG. 14B

| WORKER CORE FUNCTION | APPLICATION 1 P1n STATE | APPLICATION 2 P1n STATE | APPLICATION 3 P1n STATE |
|---|---|---|---|
| USER PLANE FUNCTION (UPF) (UPF, SEPP, N3IWF) KPI = THROUGHPUT (PPS) | X | | |
| CONTROL PLANE FUNCTION (CPF) (AMF, SMF, PCF, NSSF) KPI = SIR/W/$ | | X | |
| DB FUNCTION (UDM, AUSF, NEF, NRF) | | | X |
| | IO AND COMPUTE HEAVY | COMPUTE HEAVY | HEAVY FLOATING POINT (FP) MIN I/O |

FIG. 14D

| | APPLICATION 1<br>P1n STATE | APPLICATION 2<br>P1n STATE | APPLICATION 3<br>P1n STATE |
|---|---|---|---|
| KPI: PERF/W/$ | | | |
| KPI: VNGFW | | X | |
| KPI: NGINX | X | X | |
| KPI: SNORT | | X | |

FIG. 14G

| | NETWORK WORKLOADS (OPTION 1) | NETWORK WORKLOADS (OPTION 2) | NETWORK WORKLOADS (OPTION 3) | NETWORK WORKLOADS (OPTION 4) | GENERAL PURPOSE WORKLOADS | CLOUD WORKLOADS |
|---|---|---|---|---|---|---|
| APPLICATION RATIO | 0.82 | 0.82 | 0.82 | 0.82 | 0.87 | 0.91 |
| UNCORE FREQ THROUGHPUT | 1.3 GHZ 75 GBPS | 1.7 GHZ 225 GBPS | 1.7 GHZ 325 GBPS | 2.1 GHZ 450 GBPS | 1.3 GHZ | 1.3 GHZ |
| SST-PP | 0 | 1 | 2 | 3 | 4 | 5 |
| 56C / 300 W | | 2.0 GHZ | 2.0 GHZ | | 2.1 GHZ | 2.3 GHZ |
| 32C / 185 W | 2.1 GHZ | 2.0 GHZ | 1.9 GHZ | | 1.9 GHZ | 2.2 GHZ |
| 28C / 165 W | 2.2 GHZ | 2.1 GHZ | 2.0 GHZ | | 1.9 GHZ | 2.2 GHZ |
| 24C / 150 W | 2.2 GHZ | 2.1 GHZ | 1.9 GHZ | | 1.9 GHZ | 2.2 GHZ |

FIG. 14H

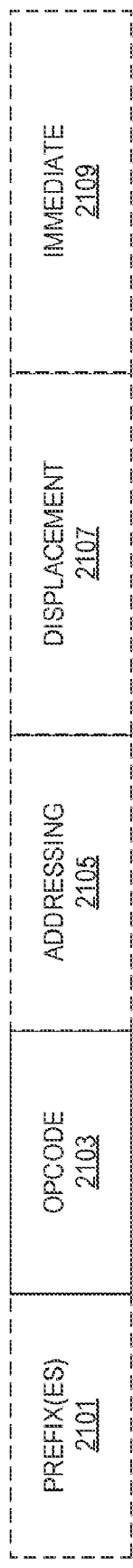
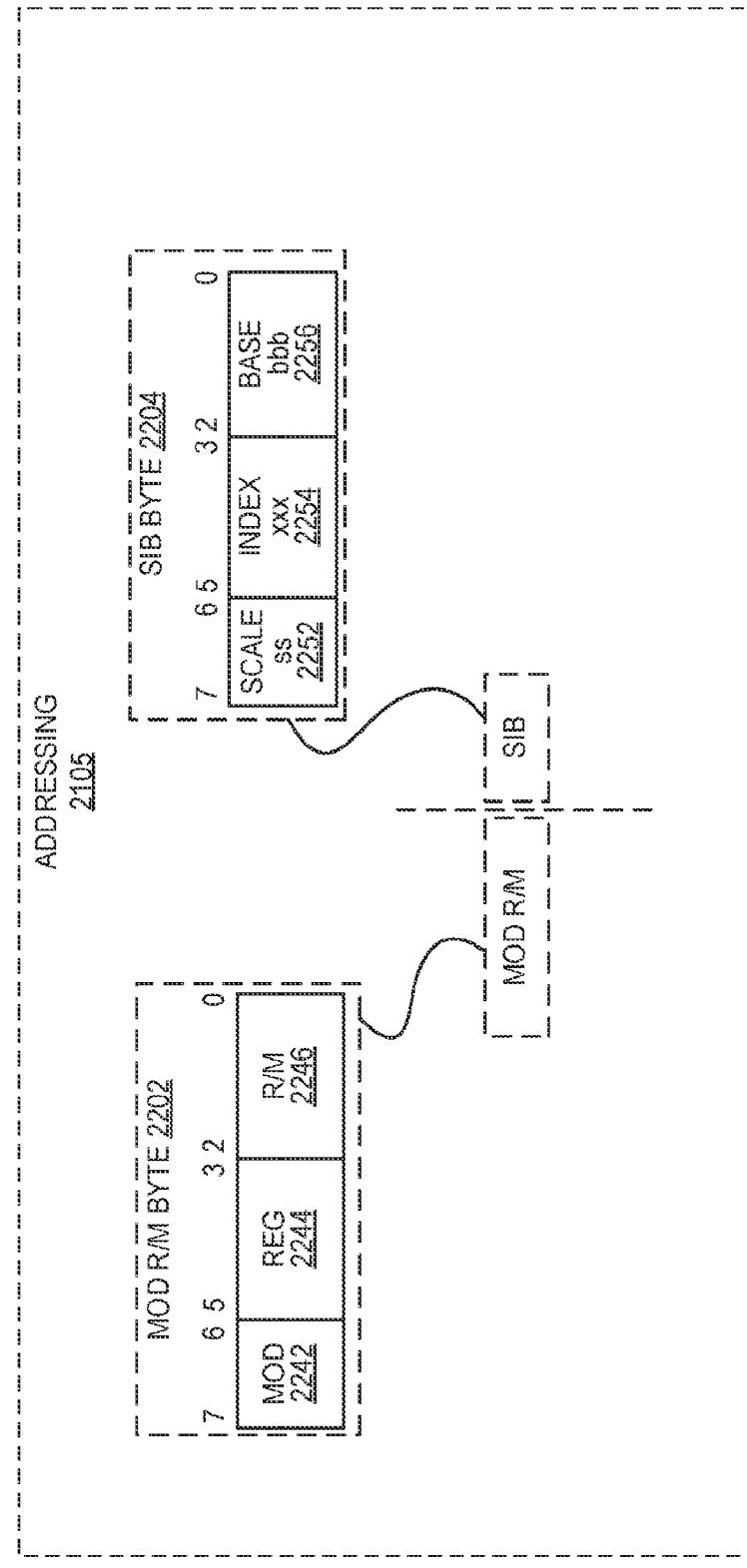
FIG. 21
FIG. 22

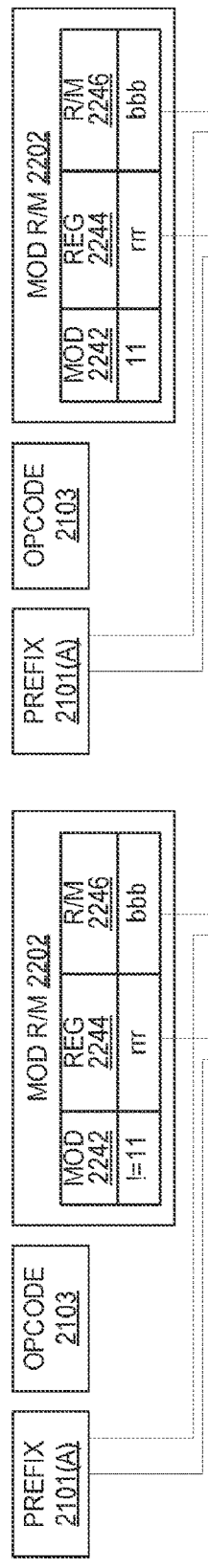
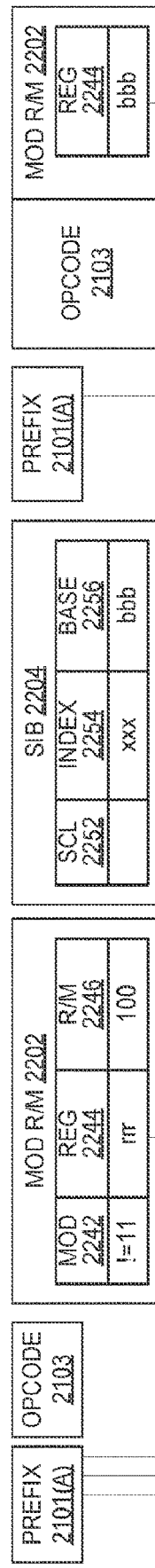
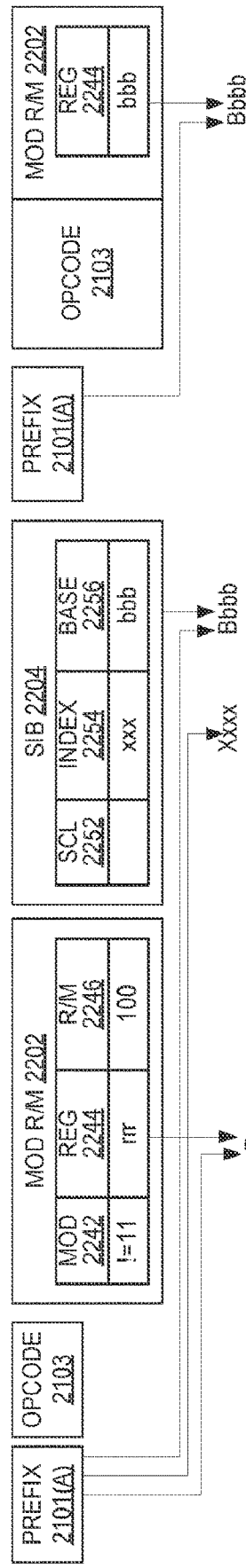

FIG. 25A

SECOND PREFIX 2101(B)

Byte 0 2503: FORMAT 2501 (bit 7)
Byte 1 2505: bits 7-0: R, v, v, v, v, L, p, p

FIG. 25B

SECOND PREFIX 2101(B)

Byte 0 2513: FORMAT 2511 (bit 7)
Byte 1 2515: bits 7-0: R, X, B, m, m, m, m, m
Byte 2 2517: bits 7-0: W, v, v, v, v, L, p, p

SYSTEMS, METHODS, AND APPARATUS FOR WORKLOAD OPTIMIZED CENTRAL PROCESSING UNITS (CPUS)

RELATED APPLICATION

This patent arises from a national stage of International Patent Application No. PCT/US2021/024497, filed on Mar. 26, 2021, which claims the benefit of U.S. Provisional Patent Application No. 63/113,734, filed on Nov. 13, 2020, and U.S. Provisional Patent Application No. 63/032,045, filed on May 29, 2020. International Patent Application No. PCT/US2021/024497, U.S. Provisional Patent Application No. 63/113,734 and U.S. Provisional Patent Application No. 63/032,045 are hereby incorporated herein by reference in their entireties. Priority to International Patent Application No. PCT/US2021/024497, U.S. Provisional Patent Application No. 63/113,734 and U.S. Provisional Patent Application No. 63/032,045 is hereby claimed.

FIELD OF THE DISCLOSURE

This disclosure relates generally to processor circuitry and, more particularly, to systems, methods, and apparatus for workload optimized central processing units (CPUs).

BACKGROUND

Multi-access edge computing (MEC) is a network architecture concept that enables cloud computing capabilities and an infrastructure technology service environment at the edge of a network, such as a cellular network. Using MEC, data center cloud services and applications can be processed closer to an end user or computing device to improve network operation. Such processing can consume a disproportionate amount of bandwidth of processing resources closer to the end user or computing device thereby increasing latency, congestion, and power consumption of the network.

BRIEF DESCRIPTION OF THE DRAWINGS

FIG. 12 is an illustration of an example static configuration of an example workload-adjustable CPU.

FIG. 13 is an illustration of an example dynamic configuration of an example workload-adjustable CPU.

FIGS. 14A-14H are illustrations of example power adjustments to core(s) and uncore(s) of an example workload-adjustable CPU based on example workload(s).

FIG. 21 illustrates an example of an instruction format.

FIG. 22 illustrates an example of an addressing field.

FIG. 23 illustrates an example of a first prefix.

FIGS. 24A-D illustrate example fields of the first prefix of FIG. 22.

FIGS. 25A-B illustrate examples of a second prefix.

DETAILED DESCRIPTION

Figure 1:
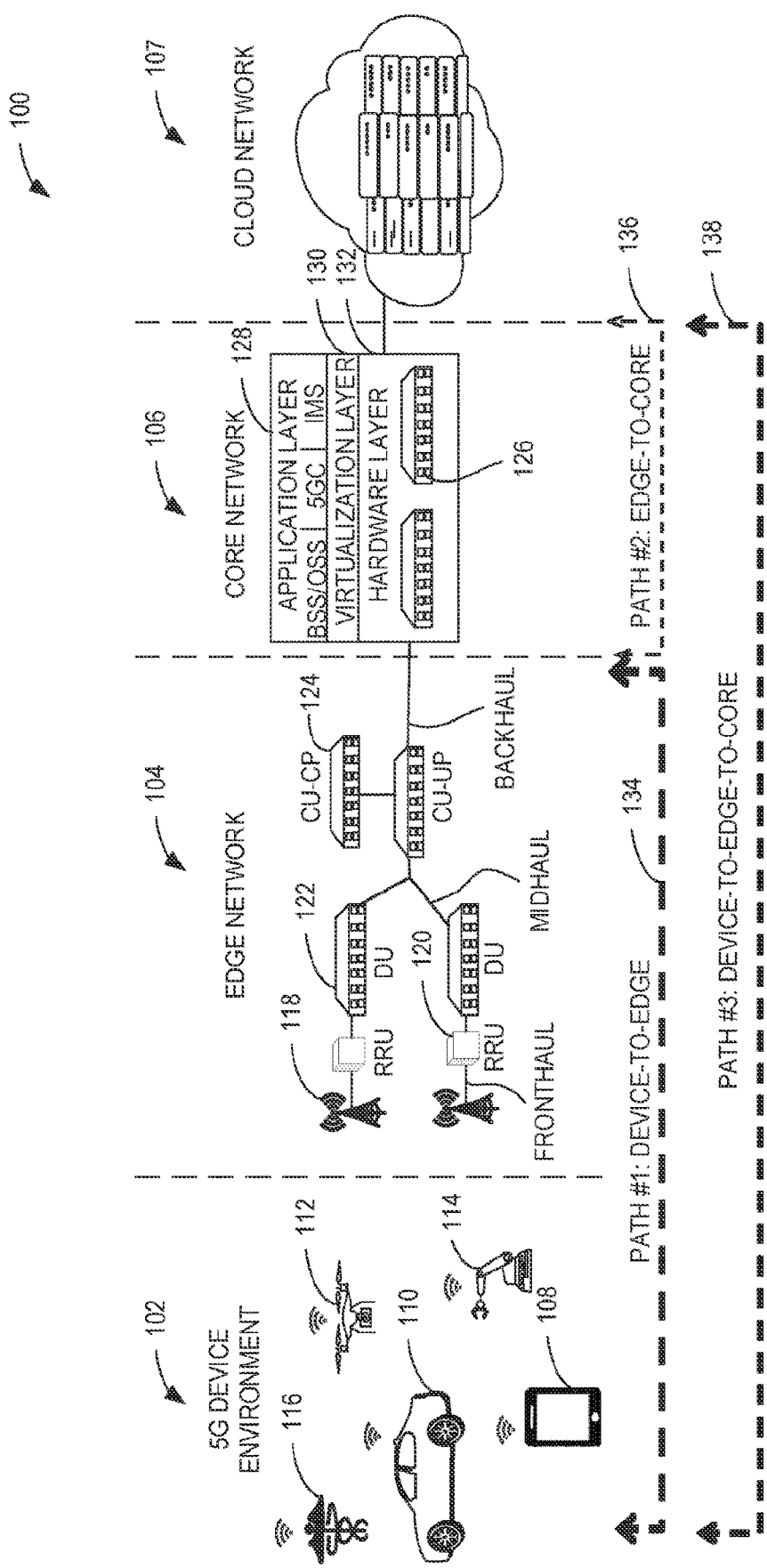
FIG. 1 is an illustration of a first example multi-core computing environment including a first example multi-core computing system.

The figures are not to scale. In general, the same reference numbers will be used throughout the drawing(s) and accompanying written description to refer to the same or like parts. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

Multi-access edge computing (MEC) is a network architecture concept that enables cloud computing capabilities and an infrastructure technology service environment at the edge of a network, such as a cellular network. Using MEC, data center cloud services and applications can be processed closer to an end user or computing device to improve network operation.

While MEC is an important part of the evolution of edge computing, cloud and communication service providers are addressing the need to transform networks of the cloud and communication service providers in preparation for fifth generation cellular network technology (i.e., 5G). To meet the demands of next generation networks supporting 5G, cloud service providers can replace fixed function proprietary hardware with more agile and flexible approaches that rely on the ability to maximize the usage of multi-core edge and data center servers. Next generation server edge and data center networking can include an ability to virtualize and deploy networking functions throughout a data center and up to and including the edge. High packet throughput amplifies the need for better end-to-end latency, Quality of Service (QoS), and traffic management. Such needs in turn drive requirements for efficient data movement and data sharing between various stages of a data plane pipeline across a network.

In some prior approaches, a processor guaranteed operating frequency (e.g., a deterministic frequency) was set to be consistent regardless of the type of workloads expected to be encountered. For example, central processing unit (CPU) cores in an Intel® x86 architecture may be set to a lower processor performance state (P-state) (e.g., lowered from a P0n state to a P1n state) frequency at boot time (e.g., by BIOS) than supported by the architecture to avoid frequency scaling latencies. Thus, x86 CPUs may operate with deterministic P-state frequencies, and as a result, all CPU cores utilize lower base frequencies to mitigate latencies. However, power consumption of a CPU core varies by workload when operating at the same frequency. Thus, there is an opportunity to increase the deterministic frequency of the CPU core if the workload is not power hungry within the core itself, or, the workload is less power hungry as compared with other types of workloads.

Compute-bound workloads, which may be implemented by high-intensity calculations (e.g., graphics rendering workloads), may rely disproportionately on compute utilization in a processor core rather than memory utilization and/or input/output (I/O) utilization. I/O bound workloads, such as communication workloads, network workloads, etc., use a combination of compute, memory, and/or I/O. Such I/O bound workloads do not rely on pure compute utilization in a processor core as would be observed with compute-bound workloads. For example, a communication workload, a network workload, etc., can refer to one or more computing tasks executed by one or more processors to effectuate the processing of data associated with a computing network (e.g., a terrestrial or non-terrestrial telecommunications network, an enterprise network, an Internet-based network, etc.). Thus, an adjustment in frequencies of at least one of one of the processor core or the processor uncore based on a type of workload may be used as an operational or design parameter of the processor core. Such adjustment(s) may enable a processor to increase processing frequency and workload throughput while still avoiding frequency scaling latencies from throttling of the processor core.

The use of power within a processor architecture may extend to a number of areas, and thus multiple areas of the processor may also be considered for optimization based on an application ratio. In some disclosed examples, an application ratio provides a measure of activity that a workload creates with respect to maximum activity. The application ratio may directly affect the processing rate and power undertaken by one or multiple cores and the other components of the processor. A decrease in the application ratio may result in an increase in guaranteed operating frequency (and thus, increased clock speed and performance) for network workloads that are less power hungry than general purpose computing workloads. In such disclosed examples, the power behavior of other types of workloads may be calculated, evaluated, and implemented for the specification and optimization of CPUs using application ratio values.

A core (e.g., a processor core), interconnect/mesh, I/O (e.g., Ultra Path Interconnect (UPI), Peripheral Component Interconnect Express (PCIe), memory, etc.), voltage regulator (e.g., a Fully Integrated Voltage Regulator), and chassis all consume power, and in each of these processor areas, the determination and/or application of application ratio associated with these processor areas as disclosed herein is different than utilization associated with these processor areas, because the application ratio provides a measure of activity that a workload creates with respect to maximum activity, whereas utilization provides a measure of activity versus inactivity (e.g., idling). Thus, application ratio provides a measurement of dynamic power for the actual workload, and not a theoretical value that is encountered; adjustment and design of the processor power and frequency settings based on the application ratio may provide a number of real-world benefits. Modifying a processor to optimize performance for a reduced application ratio within the CPU core is intended to be encompassed in the "network workload optimization" discussed herein. Alternatively, modifying a processor to optimize performance for an increased application ratio within the CPU core may be intended to be encompassed in other optimizations to effectuate compute-bound workloads. However, in some disclosed examples, the optimization or settings within such optimization may extend to other ratios, settings, and features (including in uncore areas of processor).

In some disclosed examples, an adjustment in operating frequency of the processor core and/or a corresponding uncore or uncore logic (e.g., uncore logic circuitry) may be based on the application ratio. In some disclosed examples, the application ratio may refer to a ratio of the power consumed by the highest power consumption application such as the power virus (PV), which may be based on the following construct:

$$\text{Application Ratio } (AR) = \frac{\text{Application Activity } C_{dyn}}{\text{Power Virus } C_{dyn}}$$

The example construct above is based on total power associated with a processor being composed of static power consumption and dynamic power consumption, with at least the latter changing based on a processor workload. For example, the term Application Activity $C_{dyn}$ can refer to dynamic power consumption of a processor core and/or, more generally, a processor, when executing a workload (e.g., a compute-bound workload, an I/O-bound workload, etc.). In such examples, the term Application Activity $C_{dyn}$ can refer to the dynamic power consumption of a single processor core, two processor cores, or an entirety of the processor cores of the processor. In some examples, Application Activity $C_{dyn}$ can be determined at runtime. Additionally or alternatively, the term Application Activity $C_{dyn}$ may refer to dynamic power consumption of an uncore region, uncore logic (e.g., uncore logic circuitry), etc.

In the above example construct, the term Power Virus $C_{dyn}$ can refer to dynamic power consumption of a processor core and/or, more generally, a processor, when consuming maximum dynamic power. For example, Power Virus $C_{dyn}$ can be determined by measuring the power of a processor core when the processor core executes an application (e.g., a power virus application) that causes the processor core to consume maximum dynamic power. In some examples, the power virus application can be representative of a synthetic workload that causes the processor core to consume maximum power (e.g., by switching on and/or otherwise enabling a maximum number of transistors of the processor core). In such examples, the maximum dynamic power can be greater than the thermal design profile (TDP) of the processor core. In some examples, Power Virus $C_{dyn}$ is a pre-determined value. Additionally or alternatively, the term Power Virus $C_{dyn}$ may refer to maximum dynamic power consumption of uncore logic, such that memory, I/O, etc., of the uncore logic may operate at maximum dynamic power.

By way of example, a processor core having an application ratio of 0.8 can correspond to the processor core operating at 80% of Power Virus $C_{dyn}$. For example, the processor core can be operated at a base operating frequency, an increased or turbo operating frequency, etc., insomuch as the processor core does not exceed 80% of the Power Virus $C_{dyn}$. By way of another example, uncore logic having an application ratio of 0.75 can correspond to memory, I/O, etc., of the uncore logic operating at 75% of Power Virus $C_{dyn}$. For example, the uncore logic can be operated at a base operating frequency, an increased or turbo operating frequency, etc., insomuch as the uncore logic does not exceed 75% of the Power Virus $C_{dyn}$.

In some disclosed examples, an application ratio for a particular hardware unit (e.g., a core or portion thereof, an uncore or portion thereof, etc.) may be calculated and/or otherwise determined based on one or more equations or formulas, based on the following construct:

$$\text{Application Ratio }(AR) = \text{SLOPE} * \left(\frac{1}{\text{UNIT COUNT}}\right) + \text{INTERCEPT}$$

Where SLOPE is proportional to the instructions per cycle for the hardware unit (e.g., a core or portion thereof, an uncore or portion thereof, etc.), scaled by the sensitivity of the application ratio to the utilization of the hardware unit (e.g., a core or portion thereof, an uncore or portion thereof, etc.), UNIT COUNT represents the number of hardware units (e.g., a number of the cores or portions thereof, a number of the uncores or portions thereof, etc.), and INTERCEPT represents the application ratio of the hardware unit (e.g., a core or portion thereof, an uncore or portion thereof, etc.) when it is at zero utilization (e.g., no traffic). The same equation or formula definition also applies to other hardware units, such as to a last-level cache (LLC).

In some disclosed examples, a core of a processor can be configured to operate at different operating frequencies based on an application ratio of the processor. For example, the core may operate at a first operating frequency, such as a P1n operating frequency of 2.0 GHz, based on the processor being configured for a first application ratio, which may be representative of a baseline or default application ratio. In some examples, the core may operate at a different operating frequency based on the example of Equation (1) below:

$$\text{Core Operating Frequency (GHz)} = \left(P1n * \frac{1}{\text{UNIT COUNT}}\right) + \text{INTERCEPT}, \quad \text{Equation (1)}$$

In the example of Equation (1) above, P1n represents the P1n operating frequency of the core, UNIT COUNT represents the number of hardware units (e.g., a number of the cores or portions thereof), and INTERCEPT represents the application ratio of the hardware unit (e.g., a core or portion thereof) when it is at zero utilization (e.g., no traffic). Accordingly, the core may be configured with a different operating frequency based on the application ratio as described below in Equation (2) and/or Equation (3).

$$\text{Core Operating Frequency (GHz)}=(P1n*0.6)+0.7, \quad \text{Equation (2)}$$

$$\text{Core Operating Frequency (GHz)}=(P1n*0.5)+0.5, \quad \text{Equation (3)}$$

In some disclosed examples, Equation (2) above can correspond to a core, and/or, more generally, a processor, being configured based on a second application ratio. In some examples, Equation (3) above can correspond to a core, and/or, more generally, a processor, being configured based on a third application ratio. Advantageously, an operating frequency of a core may be adjusted based on the application ratio.

In some disclosed examples, uncore logic may operate at a different operating frequency based on the example of Equation (4) below:

$$\text{Uncore Operating Frequency (GHz)} = \left(P1n * \frac{1}{\text{UNIT COUNT}}\right) + \text{INTERCEPT}, \quad \text{Equation (4)}$$

In the example of Equation (4) above, P1n represents the P1n operating frequency of the uncore logic, UNIT COUNT represents the number of hardware units (e.g., a number of instances of the uncore logic or portions thereof), and INTERCEPT represents the application ratio of the hardware unit (e.g., an uncore or portion thereof, etc.) when it is at zero utilization (e.g., no traffic). Accordingly, the uncore logic may be configured with a different operating frequency based on the application ratio as described below in Equation (5) and/or Equation (6).

$$\text{Uncore Operating Frequency (GHz)}=(P1n*0.5)+0.6, \quad \text{Equation (5)}$$

$$\text{Unore Operating Frequency (GHz)}=(P1n*0.7)+0.4, \quad \text{Equation (6)}$$

In some disclosed examples, Equation (5) above can correspond to uncore logic, and/or, more generally, a processor, being configured based on the second application ratio. In some examples, Equation (6) above can correspond to uncore logic, and/or, more generally, a processor, being configured based on the third application ratio. Advantageously, an operating frequency of the uncore logic may be adjusted based on the application ratio.

In some disclosed examples, an application ratio of a processor core and/or, more generally, a processor, may be adjusted based on a workload. In some disclosed examples, the application ratio of one or more processor cores may be increased (e.g., from 0.7 to 0.8, from 0.75 to 0.9, etc.) in response to processing a compute-bound workload. For example, in response to increasing the application ratio, the one or more processor cores can be operated at a higher operating frequency which, in turn, increases the dynamic power consumption of the one or more processor cores. In such examples, an operating frequency of corresponding one(s) of uncore logic can be decreased to enable the one or more processor cores to operate at the higher operating frequency. Alternatively, an operating frequency of corresponding one(s) of the uncore logic may be increased to increase throughput of such compute-bound workloads.

In some disclosed examples, the application ratio of one or more processor cores may be decreased (e.g., from 0.8 to 0.75, from 0.95 to 0.75, etc.) in response to processing an I/O-bound workload. For example, in response to decreasing the application ratio, the one or more processor cores can be operated at a lower operating frequency which, in turn, decreases the dynamic power consumption of the one or more processor cores. In such examples, an operating frequency of corresponding one(s) of uncore logic can be increased to increase throughput and reduce latency of such I/O bound workloads.

In some disclosed examples, the use of an application ratio on a per-core basis enables acceleration assignments to be implemented only for those cores that are capable of fully supporting increased performance (e.g., increased frequency) for a reduced application ratio. In some disclosed examples, implementing per-core acceleration assignments and frequency changes allow for different core configurations in the same-socket; thus, many combinations and configurations of optimized cores (e.g., one, two, or n cores) for one or multiple types of workloads may also be possible.

Examples disclosed herein provide configurations of processing hardware, such as a processor (e.g., a CPU or any other processor circuitry), to be capable of computing for general purpose and specialized purpose workloads. In some disclosed examples, the configurations described herein provide a processing architecture (e.g., a CPU architecture or any other processing architecture) that may be configured at manufacturing (e.g., configured by a hardware manufacturer) into a "hard" stock-keeping unit (SKU), or may be configured at a later time with software-defined changes into a "soft" SKU, to optimize performance for specialized computing workloads and applications, such as network-specific workloads and applications. For example, the applicable processor configurations may be applied or enabled at manufacturing to enable multiple processor variants (and SKUs) to be generated from the same processor architecture and fabrication design. Individual cores of a processor may be evaluated in high-volume manufacturing (HVM) during a binning process to determine which cores of the processor support the reduced application ratio and increased clock speed for a workload of interest to be executed.

In some disclosed examples, example workload-adjustable CPUs as disclosed herein may execute, implement, and/or otherwise effectuate example workloads, such as artificial intelligence and/or machine learning model executions and/or computations, Internet-of-Things service workloads, network workloads (e.g., edge network, core network, cloud network, etc., workloads), autonomous driving computations, vehicle-to-everything (V2X) workloads, video surveillance monitoring, and real time data analytics. Additional examples of workloads include delivering and/or encoding media streams, measuring advertisement impression rates, object detection in media streams, speech analytics, asset and/or inventory management, virtual reality, and/or augmented reality processing.

Software-defined or software-enabled silicon features allow changes to a processor feature set to be made after manufacturing time. For example, software-defined or software-enabled silicon feature can be used to toggle manufacturing settings that unlock and enable capabilities upon payment or licensing. Advantageously, such soft-SKU capabilities further provide significant benefits to manufacturers, as the same chip may be deployed to multiple locations and dynamically changed depending on the characteristics of the location.

Advantageously, either a hard- or soft-SKU implementation provides significant benefits for end customers such as telecommunication providers that intend to deploy the same hardware arrangement and CPU design for their enterprise (e.g., servers running conventional workloads) and for data plane network function virtualization (NFV) apps (e.g., servers running network workloads). Advantageously, the use of the same CPU fabrication greatly simplifies the cost and design considerations.

In some disclosed examples, the configurations described herein may be applicable to a variety of microprocessor types and architectures. These include, but are not limited to: processors designed for one-socket (1S) and two-socket (2S) servers (e.g., a rack-mounted server with two slots for CPUs), processors with a number of cores (e.g., a multi-core processor), processors adapted for connection with various types of interconnects and fabrics, and processors with x86 or OpenPOWER instruction sets. Examples of processor architectures that embody such types and configurations include the Intel® Xeon processor architecture, the AMD® EPYC processor architecture, or the IBM® POWER processor architecture. However, the implementations disclosed herein are not limited to such architectures or processor designs.

In some disclosed examples, customer requirements (e.g., latency, power requirements (e.g., power consumption requirements), and/or throughput requirements) and/or machine readable code may be obtained from a customer, an end-user, etc., that is representative of the workload of interest to be executed when the processor is to be deployed to an MEC environment. In some such examples, the processor may execute the machine readable code to verify that the processor is capable of executing the machine readable code to satisfy the latency requirements, throughput requirements, and/or power requirements associated with an optimized and/or otherwise improved execution of the workload of interest. Thus, a processor instance of a particular design that has at least n cores that support the network workload can be distributed with a first SKU indicative of supporting enhanced network operations, whereas another processor instance of the particular design which has less than n cores that support the network workload can be distributed with a second SKU. Advantageously, consideration of these techniques at design, manufacturing, and distribution time will enable multiple processor SKUs to be generated from the same processor fabrication packaging.

In some disclosed examples, the optimized performance for such network-specific workloads and applications are applicable to processor deployments located at Edge, Core Network, and Cloud Data Center environments that have intensive network traffic workloads, such as provided by NFV and its accompanying network virtual functions (NFVs) and applications. Additionally or alternatively, processor deployments as described herein may be optimized for other types of workloads, such as compute-bound workloads.

In some disclosed examples, workload analysis is performed prior to semiconductor manufacturing (e.g., silicon manufacturing) to identify and establish specific settings and/or configurations of the processor that are relevant to improved handling of network workloads. For example, the settings and/or configurations may be representative of application ratio parameters including process parameters, a number of cores, and per-rail (e.g., per-core) application ratio. In some disclosed examples, the calculation of the application ratio of the processor may be determined based on the application ratio parameters including a network node location (e.g., the fronthaul, midhaul, or backhaul of a terrestrial or non-terrestrial telecommunications network), latency requirements, throughput requirements, and/or power requirements. From this, a deterministic frequency may be produced, which can be tested, verified, and incorporated into manufacturing of the chip package. Different blocks of the processor package may be evaluated depending on the particular workload and the desired performance to be obtained.

In some disclosed examples, in HVM during class testing, each processor is tested for guaranteed operating frequency at different temperature set points. These temperature and frequency pairs may be stored persistently (e.g., within the processor), to be accessed during operation. That is, in operation this configuration information may be used to form the basis of providing different guaranteed operating frequency levels at different levels of cooling, processor utilization, workload demand, user control, etc., and/or a combination thereof. In addition, at lower thermal operating points, the processor may operate with lower leakage levels.

For example, if a maximum operating temperature (e.g., a maximum junction temperature) (Tjmax)) for a given processor is 95° Celsius (C), a guaranteed operating frequency may also be determined at higher (e.g., 105° C.) and lower (e.g., 85° C., 70° C., etc.) temperature set points as well. For every processor, temperature and frequency pairs may be stored in the processor as model specific register (MSR) values or as fuses that a power controller (e.g., a power control unit (PCU)) can access.

In some disclosed examples, the configuration information may include a plurality of configurations (e.g., application, processor, power, or workload configurations), personas (e.g., application, processor, power, or workload personas), profiles (e.g., application, processor, power, or workload profiles), etc., in which each configuration may be associated with a configuration identifier, a maximum current level (ICCmax), a maximum operating temperature (in terms of degrees Celsius), a guaranteed operating frequency (in terms of Gigahertz (GHz)), a maximum power level, namely a TDP level (in terms of Watts (W)), a maximum case temperature (in terms of degrees Celsius), a core count, and/or a design life (in terms of years, such as 3 years, 5 years, etc.). In such disclosed examples, by way of these different configurations, when a processor is specified to operate at lower temperature levels, a higher configuration can be selected (and thus higher guaranteed operating frequency). In such disclosed examples, one or more of the configurations may be stored in the processor, such as in non-volatile memory (NVM), read-only memory (ROM), etc., of the processor or may be stored in NVM, ROM, etc., that may be accessible by the processor via an electrical bus or communication pathway.

In some disclosed examples, the configurations may include settings, values, etc., to adjust and allocate power among compute cores (e.g., CPU cores, processor cores, etc.) and related components (e.g., in the "un-core" or "uncore" I/O mesh interconnect regions of the processor). These settings may have a significant effect on performance due to the different type of processor activity that occurs with network workloads (e.g., workloads causing higher power consumption in memory, caches, and interconnects between the processor and other circuitry) versus general purpose workloads (e.g., workloads causing higher power consumption in the cores of the processor).

In some disclosed examples, a processor may include cores (e.g., compute cores, processor cores, etc.), memory, mesh, and I/O (e.g., I/O peripheral(s)). For example, each of the cores may be implemented as a core tile that incorporates a core of a multi-core processor that includes an execution unit, one or more power gates, and cache memory (e.g., mid-level cache (MLC) that may also be referred to as level two (L2) cache). In such examples, caching/home agent (CHA) (that may also be referred to as a core cache home agent) that maintains the cache coherency between core tiles. In some disclosed examples, the CHA may maintain the cache coherency by utilizing a converged/common mesh stop (CMS) that implements a mesh stop station, which may facilitate an interface between the core tile (e.g., the CHA of the corresponding core tile) and the mesh. The memory may be implemented as a memory tile that incorporates memory of the multi-core processor, such as cache memory (e.g., LLC memory). The mesh may be implemented as a fabric that incorporates a multi-dimensional array of half rings that form a system-wide interconnect grid. In some disclosed examples, at least one of the CHA, the LLC, or the mesh may implement a CLM (e.g., CLM=CHA (C), LLC (L), and mesh (M)). For example, each of the cores may have an associated CLM.

In some disclosed examples, the cores of the multi-core processor have corresponding uncores. For example, a first uncore can correspond to a first core of the multi-core processor. In such examples, the first uncore can include a CMS, a mesh interface, and/or I/O. In some disclosed examples, a frequency of the first core may be decreased while a frequency of the first uncore is increased. For example, a frequency of the CMS, the mesh interface, the I/O, etc., and/or a combination thereof, may be increased to execute network workloads at higher frequencies and/or reduced latencies. Advantageously, increasing the frequency of the first uncore may improve the execution of network workloads because computations to process such network workloads are I/O bound due to throughput constraints. Alternatively, the frequency of the first core may be increased while the frequency of the first uncore is decreased. Advantageously, increasing the frequency of the first core may improve the execution of computationally intensive applications, such as video rendering, Machine Learning/Artificial Intelligence (ML/AI) applications, etc., because such applications are compute bound and may not require communication with different core(s) of the processor for completion of an associated workload.

Examples disclosed herein include techniques for processing a network workload with network workload optimized settings based on an application ratio. In some disclosed examples, an evaluation is made to determine whether the individual processor core supports network optimized workloads with a modified processor feature. For example, a non-optimized processor may be configured for operation with an application ratio of 1.0 in a core for compute-intensive workloads; an optimized processor may be configured for operation with an application ratio of less than 1.0 in a core for network-intensive workloads. In some disclosed examples, other components of the processor (such as the uncore or portion(s) thereof) may be evaluated to utilize an application ratio greater than 1.0 for network intensive workloads.

In some disclosed examples, if core support for the network optimized workloads is not provided or available by a modified processor feature, then the processor core can be operated in its regular mode, based on an application ratio of 1.0. In some disclosed examples, if core support is provided and available by the modified processor feature, a processor feature (e.g., frequency, power usage, throttling, etc.) can be enabled to consider and model a particular workload scenario. In some disclosed examples, this particular workload scenario may be a network workload scenario involving a power and frequency setting adjusted based on a change in application ratio.

In some disclosed examples, one or more network workload optimizations may be implemented within the supported core(s) with a reduced application ratio. This may include a modified P-state, modified frequency values, enabling or utilization of instruction set extensions relevant to the workload, among other changes. The resulting outcome of the implementation may include operating the core in an increased performance state (e.g., higher deterministic frequency), or optionally enabling one or more instruction set features for use by the core.

In some disclosed examples, one or more optimizations may be applied within a processor design depending on its desired operational use case. This may involve throttling between standard and network workload-optimized features or optimizations (e.g., workload optimizations, network workload optimizations, etc.), depending on intended deployments, licenses, processing features of the workload, usage terms and activation agreement, etc.

In some disclosed examples, the optimized features are enabled in the form of power- and performance-based network workload optimizations, to change a processor's throughput in handling specific types of workloads at a customer deployment. For example, with the adjustment of the application ratio settings described below, processors within servers (e.g., computing servers) can be optimized for low-latency delivery of communications (e.g., 5G or NFV data) and/or content (e.g., audio, video, text, etc., data), such as from a multi-access edge computing scenario. Advantageously, such network enhancements may establish workload optimized processor performance for wireless network workloads associated with the mobile edge, core, and cloud, and other areas of mobile edge computing including data plane packet core, cloud radio access network (RAN), and backhaul processing. Advantageously, such network enhancements may also establish workload optimized processor performance for wired network workloads, including with virtual content, virtual broadband network gateways, and virtual cable modem termination systems (CMTS).

In some disclosed examples, one or more workload optimized CPUs implement aspects of a multi-core computing system, such as a terrestrial and/or non-terrestrial telecommunications network. For example, one or more workload optimized processors, such as workload optimized CPUs, having the same processor fabrication packaging can implement a virtual radio access network (vRAN) centralized unit (CU), a vRAN distributed unit (DU), a core server, etc., and/or a combination thereof. In such examples, a first workload optimized CPU can implement the vRAN CU by executing a first set of instructions that correspond to a first set of network functions or workloads based on a first set of cores of the first workload optimized CPU having a first application ratio. In some such examples, the first workload optimized CPU can implement the vRAN DU by executing a second set of instructions that correspond to a second set of network functions or workloads based on a second set of cores of the first workload optimized CPU having a second application ratio. In some such examples, the first workload optimized CPU can implement the core server by executing a third set of instructions that correspond to a third set of network functions or workloads based on a third set of cores of the first workload optimized CPU having a third application ratio. Advantageously, the first workload optimized CPU can execute different network workloads by adjusting settings of the CPU cores on a per-core basis to operate with increased performance.

In some disclosed examples, the same multi-core processor (such as a multi-core CPU) may have a plurality of SKUs and, thus, may be implement a multi-SKU processor. For example, a first workload optimized CPU may have a first SKU when configured to implement the vRAN CU, a second SKU when configured to implement the vRAN DU, a third SKU when configured to implement the core server, etc. In such examples, an external entity (e.g., a computing device, an infrastructure technology (IT) administrator, a user, a manufacturer enterprise system, etc.) may invoke software-defined or software-enabled silicon features of the first workload optimized CPU to allow changes to processor feature(s) thereof after manufacturing time (e.g., when deployed to and/or otherwise operating in a computing environment). For example, software-defined or software-enabled silicon feature(s) of the first workload-optimized CPU may be invoked to toggle manufacturing settings that unlock and enable capabilities upon payment or licensing to dynamically transition between SKUs.

FIG. 1 is an illustration of a first example multi-core computing environment 100. The first multi-core computing environment 100 includes an example device environment 102, an example edge network 104, an example core network 106, and an example cloud network 107. In this example, the device environment 102 is a 5G device environment that facilitates the execution of computing tasks using a wireless network, such as a wireless network based on 5G (e.g., a 5G cellular network).

The device environment 102 includes example devices (e.g., computing devices) 108, 110, 112, 114, 116. The devices 108, 110, 112, 114, 116 include a first example device 108, a second example device 110, a third example device 112, a fourth example device 114, and a fifth example device 116. The first device 108 is a 5G Internet-enabled smartphone. Alternatively, the first device 108 may be a tablet computer (e.g., a 5G Internet-enabled tablet computer), a laptop (e.g., a 5G Internet-enabled laptop), etc. The second device 110 is a vehicle (e.g., an automobile, a combustion engine vehicle, an electric vehicle, a hybrid-electric vehicle, an autonomous or autonomous capable vehicle, etc.). For example, the second device 110 can be an electronic control unit or other hardware included the vehicle, which, in some examples, can be a self-driving, autonomous, or computer-assisted driving vehicle.

The third device 112 is an aerial vehicle. For example, the third device 112 can be a processor or other type of hardware included in an unmanned aerial vehicle (UAV) (e.g., an autonomous UAV, a human or user-controlled UAV, etc.), such as a drone. The fourth device 114 is a robot. For example, the fourth device 114 can be a collaborative robot, a robot arm, or other type of machinery used in assembly, lifting, manufacturing, etc., types of tasks.

The fifth device 116 is a healthcare associated device. For example, the fifth device 116 can be a computer server that stores, analyzes, and/or otherwise processes health care records. In other examples, the fifth device 116 can be a medical device, such as an infusion pump, magnetic resonance imaging (MRI) machine, a surgical robot, a vital sign monitoring device, etc. In some examples, one or more of the devices 108, 110, 112, 114, 116 may be a different type of computing device, such as a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a compact disk (CD) player, a digital video recorder, a Blu-ray player, a gaming console, a personal video recorder, a set top box, a headset or other wearable device, or any other type of computing device. In some examples, there may be fewer or more devices than depicted in FIG. 1.

The devices 108, 110, 112, 114, 116 and/or, more generally, the device environment 102, are in communication with the edge network 104 via first example networks 118. The first networks 118 are cellular networks (e.g., 5G cellular networks). For example, the first networks 118 can be implemented by and/or otherwise facilitated by antennas, radio towers, etc., and/or a combination thereof. Additionally or alternatively, one or more of the first networks 118 may be an Ethernet connection, a digital subscriber line (DSL) connection, a telephone line connection, a coaxial cable system, a satellite system, a line-of-site wireless system, a cellular telephone system, a terrestrial network, a non-terrestrial network, etc., and/or a combination thereof.

In the illustrated example of FIG. 1, the edge network 104 includes the first networks 118, example remote radio units (RRUs) 120, example distributed units (DUs) 122, and example centralized units (CUs) 124. In this example, the DUs 122 and/or the CUs 124 are multi-core computing systems. For example, one or more of the DUs 122 and the CUs 124 can include a plurality of processors (e.g., multi-core processors) that each include a plurality of cores (e.g., compute cores, processor cores, etc.). In such examples, the DUs 122 and/or the CUs 124 are edge servers (e.g., 5G edge servers), such as multi-core edge servers, that can effectuate the distribution of data flows (e.g., communication flows, packet flows, a flow of one or more data packets, etc.) through the edge network 104 to a different destination (e.g., the 5G device environment 102, the core network 106, etc.). In some examples, fewer or more of the first networks 118, the RRUs 120, the DUs 122, and/or the CUs 124 may be used than depicted in FIG. 1.

In this example, the RRUs 120 are radio transceivers (e.g., remote radio transceivers, also referred to as remote radio heads (RRHs)) in a radio base station. For example, the RRUs 120 are hardware that can include radio-frequency (RF) circuitry, analog-to-digital/digital-to-analog converters, and/or up/down power converters that connects to a network of an operator (e.g., a cellular operator or provider). In such examples, the RRUs 120 can convert a digital signal to RF, amplify the RF signal to a desired power level, and radiate the amplified RF signal in air via an antenna. In some examples, the RRUs 120 can receive a desired band of signal from the air via the antenna and amplify the received signal. The RRUs 120 are termed as remote because the RRUs 120 are typically installed on a mast-top, or tower-top location that is physically distant from base station hardware, which is often mounted in an indoor rack-mounted location or installation.

In the illustrated example of FIG. 1, the RRUs 120 are coupled to and/or otherwise in communication with a respective one of the DUs 122. In this example, the DUs 122 include hardware that implement real time Layer 1 (L1) scheduling functions (e.g., physical layer control) and/or Layer 2 (L2) scheduling functions (e.g., radio link control (RLC), medium access control (MAC), etc.). In this example, the CU 124 includes hardware that implements Layer 3 scheduling functions, such as packet data convergence control (PDCP) and/or radio resource control (RRC) functions. In this example, a first one of the CUs 124 is a centralized unit control plane (CU-CP) and a second one of the CUs 124 is a centralized unit user plane (CU-UP).

In this example, at least one of one or more of the DUs 122 and/or one or more of the CUs 124 implement a vRAN. For example, one or more of the DUs 122 or portion(s) thereof may be virtualized to implement one or more vRAN DUs, one or more of the CUs 124 or portion(s) thereof may be virtualized to implement one or more vRAN CUs, etc. In some examples, one or more of the DUs 122 and/or one or more of the CUs 124 execute, run, and/or otherwise implement virtualized baseband functions on vendor-agnostic hardware (e.g., commodity server hardware) based on the principles of NFV. NFV is a network architecture concept that uses the technologies of IT virtualization to virtualize entire classes of network node functions into building blocks that may be connected, or chained together, to create communication services.

In the illustrated example of FIG. 1, first connection(s) or communication link(s) between the first networks 118 and the RRUs 120 implement(s) the fronthaul of the edge network 104. Second connection(s) or communication link(s) between the DUs 122 and the CUs 124 implement(s) the midhaul of the edge network 104. Third connection(s) or third communication link(s) between the CUs 124 and the core network 106 implement(s) the backhaul of the edge network 104.

In the illustrated example of FIG. 1, the core network 106 includes example core devices 126. In this example, the core devices 126 are multi-core computing systems. For example, one or more of the core devices 126 can include a plurality of processors (e.g., multi-core processors) that each include a plurality of cores (e.g., compute cores, processor cores, etc.). For example, one or more of the core devices 126 can be servers (e.g., physical servers, virtual or virtualized servers, etc., and/or a combination thereof). In such examples, one or more of the core devices 126 can be implemented with the same hardware as the DUs 122, the CUs 124, etc. In some examples, one or more of the core devices 126 may be any other type of computing device.

The core network 106 is implemented by different logical layers including an example application layer 128, an example virtualization layer 130, and an example hardware layer 132. In some examples, the core devices 126 implement core servers. In some examples, the application layer 128 or portion(s) thereof, the virtualization layer 130 or portion(s) thereof, and/or the hardware layer 132 or portion(s) thereof implement one or more core servers. For example, a core server can be implemented by the application layer 128, the virtualization layer 130, and/or the hardware layer 132 associated with a first one of the core devices 126, a second one of the cores devices 126, etc., and/or a combination thereof.

In this example, the application layer 128 can implement business support systems (BSS), operations supports systems (OSS), 5G core (5GC) systems, Internet Protocol (IP) multimedia core network subsystems (IMS), etc., in connection with operation of a telecommunications network, such as the first multi-core computing environment 100 of FIG. 1. In this example, the virtualization layer 130 can be representative of virtualizations of the physical hardware resources of the core devices 126, such as virtualizations of processing resources (e.g., CPUs, graphics processing units (GPUs), etc.), memory resources (e.g., non-volatile memory, volatile memory, etc.), storage resources (e.g., hard-disk drives, solid-state disk drives, etc.), network resources (e.g., network interface cards (NICs), gateways, routers, etc.), etc. In this example, the virtualization layer 130 can control and/or otherwise manage the virtualizations of the physical hardware resources with a hypervisor that can run one or more virtual machines (VMs) built and/or otherwise composed of the virtualizations of the physical hardware resources.

The core network 106 is in communication with the cloud network 107. In this example, the cloud network 107 can be a private or public cloud services provider. For example, the cloud network 107 can be implemented using virtual and/or physical hardware, software, and/or firmware resources to execute computing tasks. In some examples, the cloud network 107 may implement and/or otherwise effectuate Function-as-a-Service (Faas), Infrastructure-as-a-Service (Iaas), Software-as-a-Service (Saas), etc., systems.

In the illustrated example of FIG. 1, multiple example communication paths 134, 136, 138 are depicted including a first example communication path 134, a second example communication path 136, and a third example communication path 138. In this example, the first communication path 134 is a device-to-edge communication path that corresponds to communication between one(s) of the devices 108, 110, 112, 114, 116 of the 5G device environment 102 and one(s) of the first networks 118, RRUs 120, DUs 122, and/or CUs 124 of the edge network 104. The second communication path 136 is an edge-to-core communication path that corresponds to communication between one(s) of the first networks 118, RRUs 120, DUs 122, and/or CUs 124 of the edge network 104 and one(s) of the core devices 126 of the core network 106. The third communication path 138 is a device-to-edge-to-core communication path that corresponds to communication between one(s) of the devices 108, 110, 112, 114, 116 and one(s) of the core devices 126 via one(s) of the first networks 118, RRUs 120, DUs 122, and/or CUs 124 of the edge network 104.

In some examples, one(s) of the DUs 122, the CUs 124, the core servers 126, etc., of the first multi-core computing environment 100 include workload configurable or workload adjustable hardware, such as workload configurable or adjustable CPUs, GPUs, etc., or any other type of processor. For example, the workload adjustable hardware can be multi-SKU CPUs, such as network-optimized CPUs, that include cores that can be adjusted, configured, and/or otherwise modified on a per-core and/or per-uncore basis to effectuate completion of network workloads with increased performance. Additionally or alternatively, in some disclosed examples, the workload adjustable hardware may execute, implement, and/or otherwise effectuate example workloads, such as artificial intelligence and/or machine learning model executions and/or computations, Internet-of-Things service workloads, autonomous driving computations, vehicle-to-everything (V2X) workloads, video surveillance monitoring, real time data analytics, delivering and/or encoding media streams, measuring advertisement impression rates, object detection in media streams, speech analytics, asset and/or inventory management, virtual reality, and/or augmented reality processing with increased performance and/or reduce latency.

In some examples, the network-optimized CPUs include a first set of one or more cores that can execute first network workloads based on and/or otherwise assuming a first application ratio (and a first operating frequency) and a first set of instructions (e.g., machine readable instructions, 256-bit Streaming Single Instruction, Multiple Data (SIMD) Extensions (SSE) instructions, etc.). In such examples, the network-optimized CPUs can include a second set of one or more cores that can execute second network workloads based on and/or otherwise assuming a second application ratio (and a second operating frequency) and a second set of instructions (e.g., Advanced Vector Extensions (AVX) 512-bit instructions also referred to as AVX-512 instructions). In some examples, the network-optimized CPUs can include a third set of one or more cores that can execute third network workloads based on and/or otherwise assuming a third application ratio (and a third operating frequency) and a third set of instructions (e.g., an Instruction Set Architecture (ISA) tailored to and/or otherwise developed to improve and/or otherwise optimize 5G processing tasks that may also be referred to herein as 5G-ISA instructions).

In some examples, the first application ratio can correspond to a regular or baseline operating mode having a first operating frequency. In some examples, the second application ratio can correspond to a first enhanced or increased performance mode having a second operating frequency greater than the first operating frequency, and thereby the second application ratio is less than the first application ratio. In some examples, the third application ratio can correspond to a second enhanced or increased performance mode having a third operating frequency greater than the first operating frequency and/or the second operating frequency, and thereby the third application ratio is less than the first application ratio and/or the second application ratio. In such examples, changing between application ratios can invoke a change in guaranteed operating frequency of at least one of one or more cores or one or more corresponding uncores (e.g., one or more I/O, one or more memories, or one or more mesh interconnect(s) (or more generally one or more mesh fabrics), etc.).

In some examples, the second set of cores can execute the second network workloads with increased performance compared to the performance of the first set of cores. In some such examples, one(s) of the first set of cores and/or one(s) of the second set of cores can dynamically transition to different modes based on an instruction to be loaded to a core, an available power budget of the network-optimized CPU, etc., and/or a combination thereof. In some examples, one(s) of the first set of cores and/or one(s) of the second set of cores can dynamically transition to different modes in response to a machine-learning model analyzing past or instantaneous workloads and determining change(s) in operating modes based on the analysis. Advantageously, one(s) of the cores of the network-optimized CPU can be configured at boot (e.g., BIOS) or runtime.

Figure 2:
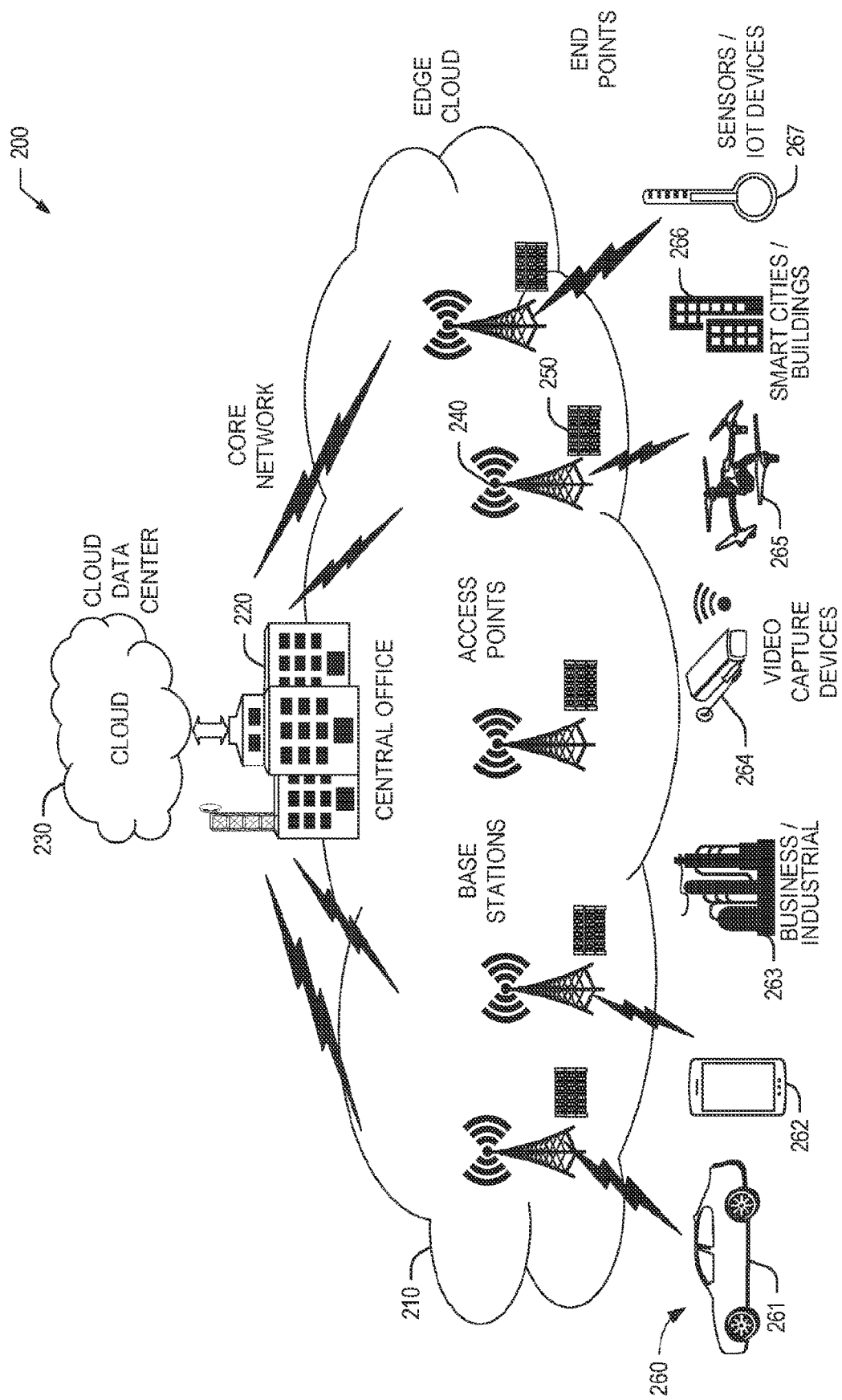
FIG. 2 illustrates an overview of an example edge cloud configuration for edge computing that may implement the examples disclosed herein.

FIG. 2 is a block diagram 200 showing an overview of a configuration for edge computing, which includes a layer of processing referred to in many of the following examples as an "edge cloud". For example, the block diagram 200 of FIG. 2 may implement the first multi-core computing environment 100 of FIG. 1 or portion(s) thereof. As shown, the edge cloud 210 is co-located at an edge location, such as an access point or base station 240, a local processing hub 250, or a central office 220, and thus may include multiple entities, devices, and equipment instances. The edge cloud 210 is located much closer to the endpoint (consumer and producer) data sources 260 (e.g., autonomous vehicles 261, user equipment 262, business and industrial equipment 263, video capture devices 264, drones 265, smart cities and building devices 266, sensors and Internet-of-Things (IoT) devices 267, etc.) than the cloud data center 230. Compute, memory, and storage resources that are offered at the edges in the edge cloud 210 are critical to providing ultra-low latency response times for services and functions used by the endpoint data sources 260 as well as reduce network backhaul traffic from the edge cloud 210 toward cloud data center 230 thus improving energy consumption and overall network usages among other benefits.

Compute, memory, and storage are scarce resources, and generally decrease depending on the edge location (e.g., fewer processing resources being available at consumer endpoint devices, than at a base station, than at a central office). However, the closer that the edge location is to the endpoint (e.g., user equipment (UE)), the more that space and power is often constrained. Thus, edge computing attempts to reduce the amount of resources needed for network services, through the distribution of more resources which are located closer both geographically and in network access time. In this manner, edge computing attempts to bring the compute resources to the workload data where appropriate, or bring the workload data to the compute resources.

The following describes aspects of an edge cloud architecture that covers multiple potential deployments and addresses restrictions that some network operators or service providers may have in their own infrastructures. These include, variation of configurations based on the edge location (because edges at a base station level, for instance, may have more constrained performance and capabilities in a multi-tenant scenario); configurations based on the type of compute, memory, storage, fabric, acceleration, or like resources available to edge locations, tiers of locations, or groups of locations; the service, security, and management and orchestration capabilities; and related objectives to achieve usability and performance of end services. These deployments may accomplish processing in network layers that may be considered as "near edge", "close edge", "local edge", "middle edge", or "far edge" layers, depending on latency, distance, and timing characteristics.

Edge computing is a developing paradigm where computing is performed at or closer to the "edge" of a network, typically through the use of a compute platform (e.g., x86 or ARM compute hardware architecture) implemented at base stations, gateways, network routers, or other devices which are much closer to endpoint devices producing and consuming the data. For example, edge gateway servers may be equipped with pools of memory and storage resources to perform computation in real-time for low latency use-cases (e.g., autonomous driving or video surveillance) for connected client devices. Or as an example, base stations may be augmented with compute and acceleration resources to directly process service workloads for connected user equipment, without further communicating data via backhaul networks. Or as another example, central office network management hardware may be replaced with standardized compute hardware that performs virtualized network functions and offers compute resources for the execution of services and consumer functions for connected devices. Within edge computing networks, there may be scenarios in services which the compute resource will be "moved" to the data, as well as scenarios in which the data will be "moved" to the compute resource. Or as an example, base station compute, acceleration and network resources can provide services in order to scale to workload demands on an as needed basis by activating dormant capacity (subscription, capacity on demand) in order to manage corner cases, emergencies or to provide longevity for deployed resources over a significantly longer implemented lifecycle.

In contrast to the network architecture of FIG. 2, traditional endpoint (e.g., UE, vehicle-to-vehicle (V2V), vehicle-to-everything (V2X), etc.) applications are reliant on local device or remote cloud data storage and processing to exchange and coordinate information. A cloud data arrangement allows for long-term data collection and storage, but is not optimal for highly time varying data, such as a collision, traffic light change, etc. and may fail in attempting to meet latency challenges.

Depending on the real-time requirements in a communications context, a hierarchical structure of data processing and storage nodes may be defined in an edge computing deployment. For example, such a deployment may include local ultra-low-latency processing, regional storage and processing as well as remote cloud data-center based storage and processing. Key performance indicators (KPIs) may be used to identify where sensor data is best transferred and where it is processed or stored. This typically depends on the ISO layer dependency of the data. For example, lower layer (PHY, MAC, routing, etc.) data typically changes quickly and is better handled locally in order to meet latency requirements. Higher layer data such as Application Layer data is typically less time critical and may be stored and processed in a remote cloud data-center. At a more generic level, an edge computing system may be described to encompass any number of deployments operating in the edge cloud 210, which provide coordination from client and distributed computing devices.

Figure 3:
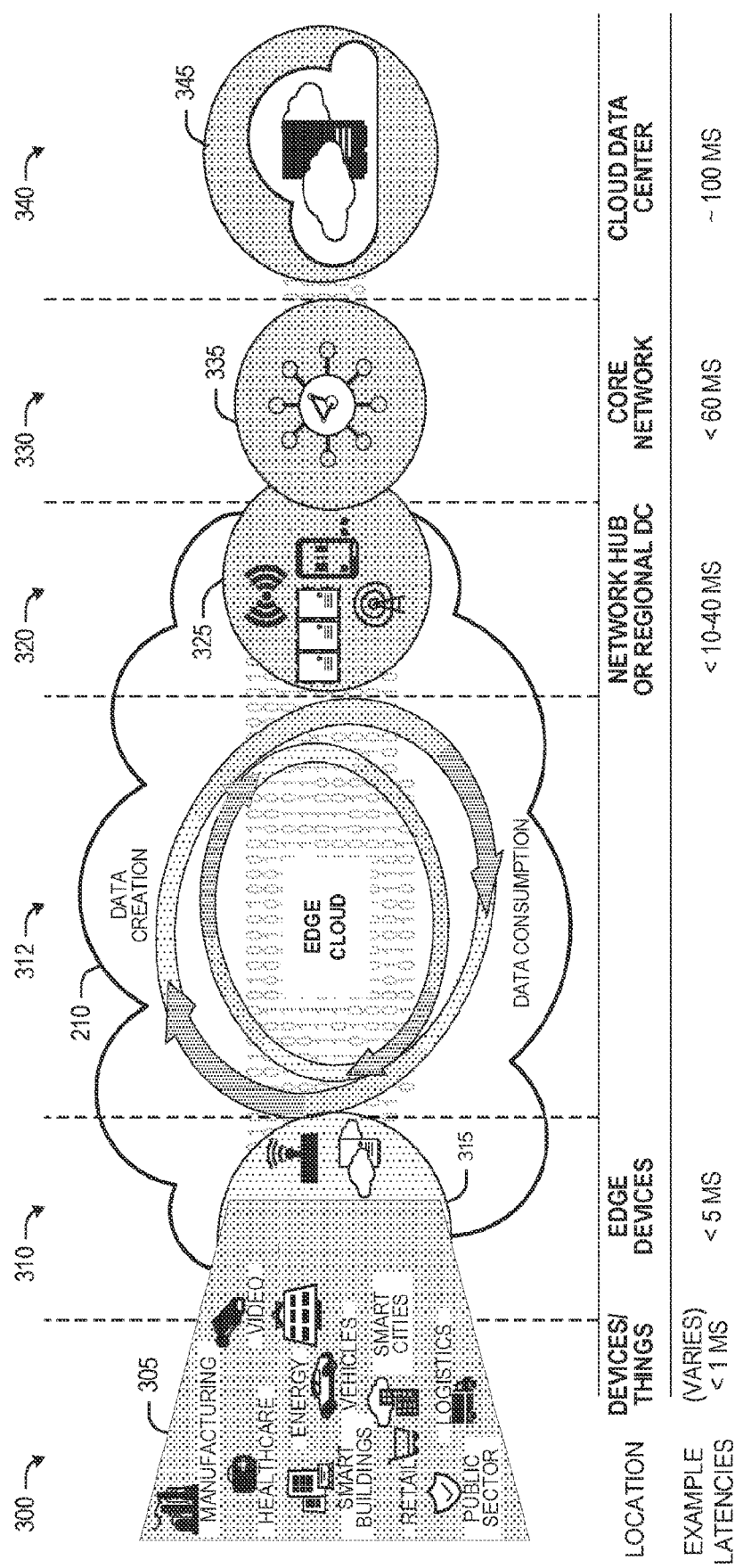
FIG. 3 illustrates operational layers among example endpoints, an example edge cloud, and example cloud computing environments that may implement the examples disclosed herein.

FIG. 3 illustrates operational layers among endpoints, an edge cloud, and cloud computing environments. Specifically, FIG. 3 depicts examples of computational use cases 305, utilizing the edge cloud 210 of FIG. 2 among multiple illustrative layers of network computing. The layers begin at an endpoint (devices and things) layer 300, which accesses the edge cloud 210 to conduct data creation, analysis, and data consumption activities. For example, the endpoint layer 300 may implement the 5G device environment 102 of FIG. 1. The edge cloud 210 may span multiple network layers, such as an edge devices layer 310 having gateways, on-premise servers, or network equipment (nodes 315) located in physically proximate edge systems; a network access layer 320, encompassing base stations, radio processing units, network hubs, regional data centers (DC), or local network equipment (equipment 325); and any equipment, devices, or nodes located therebetween (in layer 312, not illustrated in detail). For example, the layer 312 and/or the network access layer 320, and/or, more generally, the edge cloud 210, may implement the edge network 104 of FIG. 1. The network communications within the edge cloud 210 and among the various layers may occur via any number of wired or wireless mediums, including via connectivity architectures and technologies not depicted. In some examples, the core network 330 may implement the core network 106 of FIG. 1.

Examples of latency, resulting from network communication distance and processing time constraints, may range from less than a millisecond (ms) when among the endpoint layer 300, under 5 ms at the edge devices layer 310, to even between 10 to 40 ms when communicating with nodes at the network access layer 320. Beyond the edge cloud 210 are core network 330 and cloud data center 332 layers, each with increasing latency (e.g., between 50-60 ms at the core network layer 330, to 100 or more ms at the cloud data center layer 340). As a result, operations at a core network data center 335 or a cloud data center 345, with latencies of at least 50 to 100 ms or more, will not be able to accomplish many time-critical functions of the use cases 305. Each of these latency values are provided for purposes of illustration and contrast; it will be understood that the use of other access network mediums and technologies may further reduce the latencies. In some examples, the cloud data center layer 340 may implement the cloud network 107 of FIG. 1. In some examples, respective portions of the network may be categorized as "close edge", "local edge", "near edge", "middle edge", or "far edge" layers, relative to a network source and destination. For instance, from the perspective of the core network data center 335 or a cloud data center 345, a central office or content data network may be considered as being located within a "near edge" layer ("near" to the cloud, having high latency values when communicating with the devices and endpoints of the use cases 305), whereas an access point, base station, on-premise server, or network gateway may be considered as located within a "far edge" layer ("far" from the cloud, having low latency values when communicating with the devices and endpoints of the use cases 305). It will be understood that other categorizations of a particular network layer as constituting a "close", "local", "near", "middle", or "far" edge may be based on latency, distance, number of network hops, or other measurable characteristics, as measured from a source in any of the network layers 300-340.

The various use cases 305 may access resources under usage pressure from incoming streams, due to multiple services utilizing the edge cloud. To achieve results with low latency, the services executed within the edge cloud 210 balance varying requirements in terms of: (a) Priority (throughput or latency) and Quality of Service (QoS) (e.g., traffic for an autonomous car may have higher priority than a temperature sensor in terms of response time requirement; or, a performance sensitivity/bottleneck may exist at a compute/accelerator, memory, storage, or network resource, depending on the application); (b) Reliability and Resiliency (e.g., some input streams need to be acted upon and the traffic routed with mission-critical reliability, where as some other input streams may be tolerate an occasional failure, depending on the application); and (c) Physical constraints (e.g., power, cooling and form-factor).

The end-to-end service view for these use cases involves the concept of a service-flow and is associated with a transaction. The transaction details the overall service requirement for the entity consuming the service, as well as the associated services for the resources, workloads, workflows, and business functional and business level requirements. The services executed with the "terms" described may be managed at each layer in a way to assure real time, and runtime contractual compliance for the transaction during the lifecycle of the service. When a component in the transaction is missing its agreed to service level agreement (SLA), the system as a whole (components in the transaction) may provide the ability to (1) understand the impact of the SLA violation, and (2) augment other components in the system to resume overall transaction SLA, and (3) implement steps to remediate.

Thus, with these variations and service features in mind, edge computing within the edge cloud 210 may provide the ability to serve and respond to multiple applications of the use cases 305 (e.g., object tracking, video surveillance, connected cars, etc.) in real-time or near real-time, and meet ultra-low latency requirements for these multiple applications. These advantages enable a whole new class of applications (VNFs), FaaS, Edge-as-a-Service (EaaS), standard processes, etc.), which cannot leverage conventional cloud computing due to latency or other limitations.

However, with the advantages of edge computing comes the following caveats. The devices located at the edge are often resource constrained and therefore there is pressure on usage of edge resources. Typically, this is addressed through the pooling of memory and storage resources for use by multiple users (tenants) and devices. The edge may be power and cooling constrained and therefore the power usage needs to be accounted for by the applications that are consuming the most power. There may be inherent power-performance tradeoffs in these pooled memory resources, as many of them are likely to use emerging memory technologies, where more power requires greater memory bandwidth. Likewise, improved security of hardware and root of trust trusted functions are also required, because edge locations may be unmanned and may even need permissioned access (e.g., when housed in a third-party location). Such issues are magnified in the edge cloud 210 in a multi-tenant, multi-owner, or multi-access setting, where services and applications are requested by many users, especially as network usage dynamically fluctuates and the composition of the multiple stakeholders, use cases, and services changes.

At a more generic level, an edge computing system may be described to encompass any number of deployments at the previously discussed layers operating in the edge cloud 210 (network layers 310-330), which provide coordination from client and distributed computing devices. One or more edge gateway nodes, one or more edge aggregation nodes, and one or more core data centers may be distributed across layers of the network to provide an implementation of the edge computing system by or on behalf of a telecommunication service provider ("telco", or "TSP"), internet-of-things service provider, cloud service provider (CSP), enterprise entity, or any other number of entities. Various implementations and configurations of the edge computing system may be provided dynamically, such as when orchestrated to meet service objectives.

Consistent with the examples provided herein, a client compute node may be embodied as any type of endpoint component, device, appliance, or other thing capable of communicating as a producer or consumer of data. Further, the label "node" or "device" as used in the edge computing system does not necessarily mean that such node or device operates in a client or agent/minion/follower role; rather, any of the nodes or devices in the edge computing system refer to individual entities, nodes, or subsystems which include discrete or connected hardware or software configurations to facilitate or use the edge cloud 210.

As such, the edge cloud 210 is formed from network components and functional features operated by and within edge gateway nodes, edge aggregation nodes, or other edge compute nodes among network layers 310-330. The edge cloud 210 thus may be embodied as any type of network that provides edge computing and/or storage resources which are proximately located to RAN capable endpoint devices (e.g., mobile computing devices, IoT devices, smart devices, etc.), which are discussed herein. In other words, the edge cloud 210 may be envisioned as an "edge" which connects the endpoint devices and traditional network access points that serve as an ingress point into service provider core networks, including mobile carrier networks (e.g., Global System for Mobile Communications (GSM) networks, Long-Term Evolution (LTE) networks, 5G/6G networks, etc.), while also providing storage and/or compute capabilities. Other types and forms of network access (e.g., Wi-Fi, long-range wireless, wired networks including optical networks) may also be utilized in place of or in combination with such 3GPP carrier networks.

The network components of the edge cloud 210 may be servers, multi-tenant servers, appliance computing devices, and/or any other type of computing devices. For example, the edge cloud 210 may include an appliance computing device that is a self-contained electronic device including a housing, a chassis, a case or a shell. In some circumstances, the housing may be dimensioned for portability such that it can be carried by a human and/or shipped. Example housings may include materials that form one or more exterior surfaces that partially or fully protect contents of the appliance, in which protection may include weather protection, hazardous environment protection (e.g., EMI, vibration, extreme temperatures), and/or enable submergibility. Example housings may include power circuitry to provide power for stationary and/or portable implementations, such as AC power inputs, DC power inputs, AC/DC or DC/AC converter(s), power regulators, transformers, charging circuitry, batteries, wired inputs and/or wireless power inputs. Example housings and/or surfaces thereof may include or connect to mounting hardware to enable attachment to structures such as buildings, telecommunication structures (e.g., poles, antenna structures, etc.) and/or racks (e.g., server racks, blade mounts, etc.). Example housings and/or surfaces thereof may support one or more sensors (e.g., temperature sensors, vibration sensors, light sensors, acoustic sensors, capacitive sensors, proximity sensors, etc.). One or more such sensors may be contained in, carried by, or otherwise embedded in the surface and/or mounted to the surface of the appliance. Example housings and/or surfaces thereof may support mechanical connectivity, such as propulsion hardware (e.g., wheels, propellers, etc.) and/or articulating hardware (e.g., robot arms, pivotable appendages, etc.). In some circumstances, the sensors may include any type of input devices such as user interface hardware (e.g., buttons, switches, dials, sliders, etc.). In some circumstances, example housings include output devices contained in, carried by, embedded therein and/or attached thereto. Output devices may include displays, touchscreens, lights, light emitting diodes (LEDs), speakers, I/O ports (e.g., universal serial bus (USB)), etc. In some circumstances, edge devices are devices presented in the network for a specific purpose (e.g., a traffic light), but may have processing and/or other capacities that may be utilized for other purposes. Such edge devices may be independent from other networked devices and may be provided with a housing having a form factor suitable for its primary purpose; yet be available for other compute tasks that do not interfere with its primary task. Edge devices include IoT devices. The appliance computing device may include hardware and software components to manage local issues such as device temperature, vibration, resource utilization, updates, power issues, physical and network security, etc. The example processor systems of at least FIGS. 44, 45, 46, and/or 47 illustrate example hardware for implementing an appliance computing device. The edge cloud 210 may also include one or more servers and/or one or more multi-tenant servers. Such a server may include an operating system and a virtual computing environment. A virtual computing environment may include a hypervisor managing (spawning, deploying, destroying, etc.) one or more virtual machines, one or more containers, etc. Such virtual computing environments provide an execution environment in which one or more applications and/or other software, code or scripts may execute while being isolated from one or more other applications, software, code or scripts.

Figure 4:
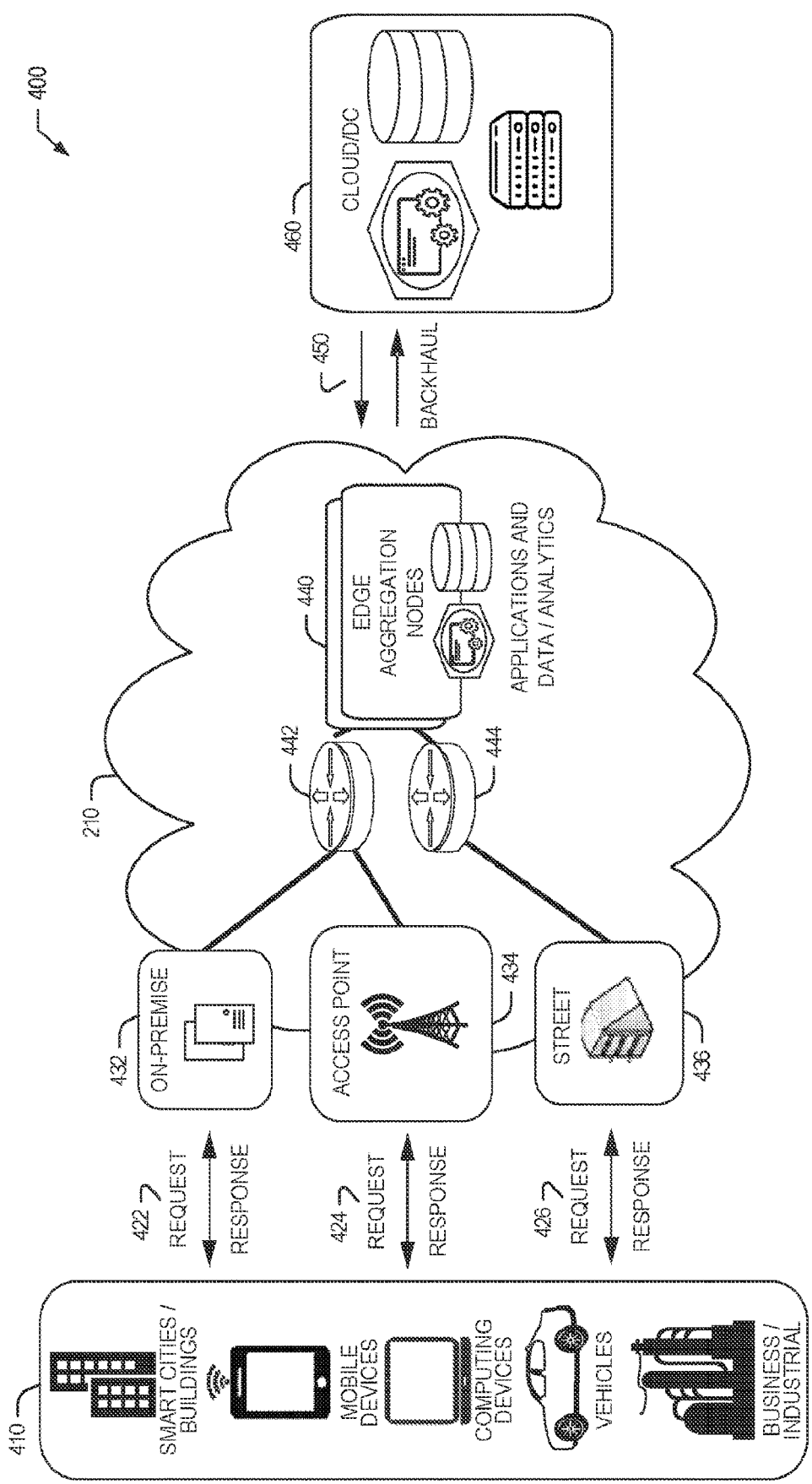
FIG. 4 illustrates an example approach for networking and services in an edge computing system that may implement the examples disclosed herein.

In FIG. 4, various client endpoints 410 (in the form of mobile devices, computers, autonomous vehicles, business computing equipment, industrial processing equipment) exchange requests and responses that are specific to the type of endpoint network aggregation. For instance, client endpoints 410 may obtain network access via a wired broadband network, by exchanging requests and responses 422 through an on-premise network system 432. Some client endpoints 410, such as mobile computing devices, may obtain network access via a wireless broadband network, by exchanging requests and responses 424 through an access point (e.g., cellular network tower) 434. Some client endpoints 410, such as autonomous vehicles may obtain network access for requests and responses 426 via a wireless vehicular network through a street-located network system 436. However, regardless of the type of network access, the TSP may deploy aggregation points 442, 444 within the edge cloud 210 of FIG. 2 to aggregate traffic and requests. Thus, within the edge cloud 210, the TSP may deploy various compute and storage resources, such as at edge aggregation nodes 440, to provide requested content. The edge aggregation nodes 440 and other systems of the edge cloud 210 are connected to a cloud or data center (DC) 460, which uses a backhaul network 450 to fulfill higher-latency requests from a cloud/data center for websites, applications, database servers, etc. Additional or consolidated instances of the edge aggregation nodes 440 and the aggregation points 442, 444, including those deployed on a single server framework, may also be present within the edge cloud 210 or other areas of the TSP infrastructure.

Figure 5:
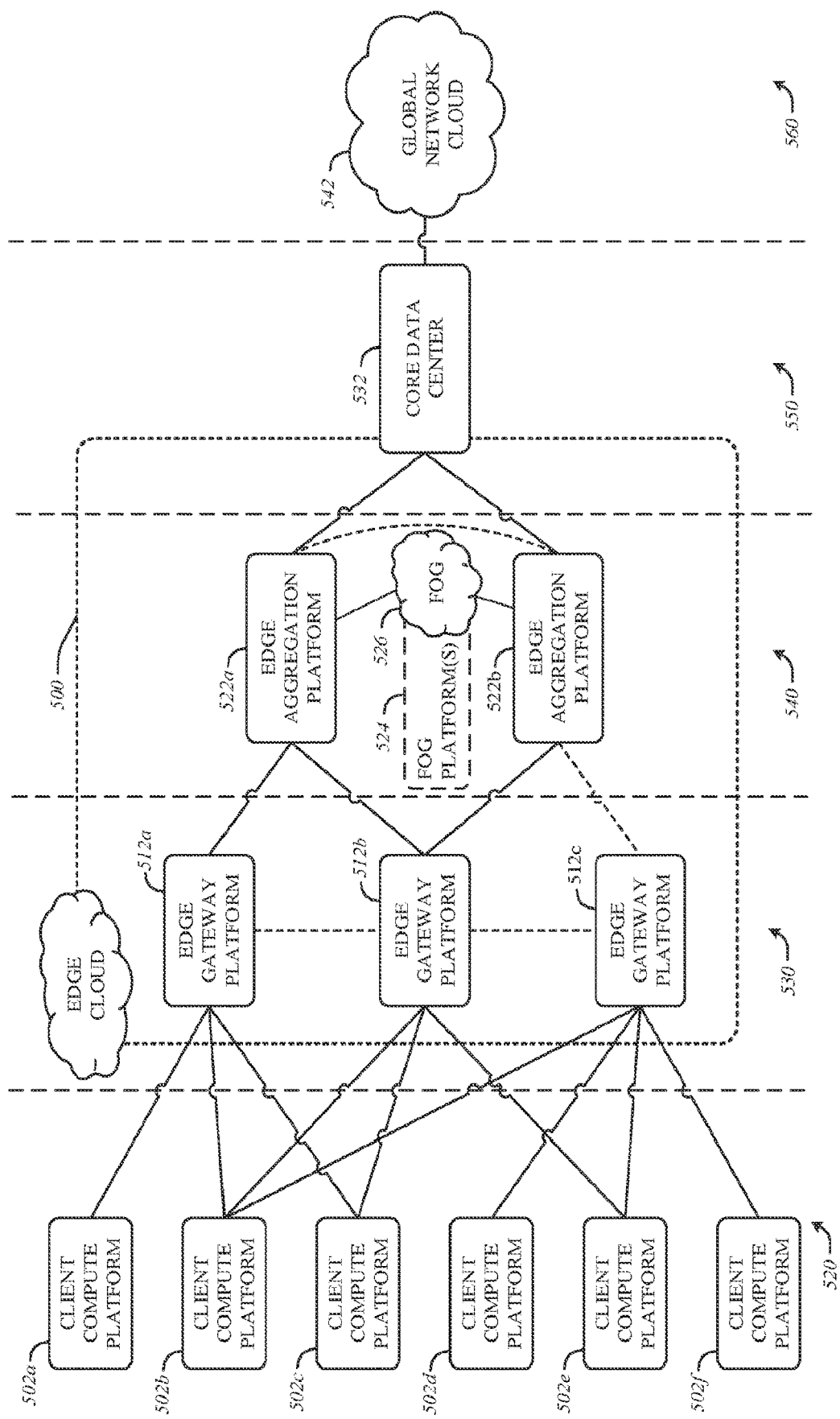
FIG. 5 depicts an example edge computing system for providing edge services and applications to multi-stakeholder entities, as distributed among one or more client compute platforms, one or more edge gateway platforms, one or more edge aggregation platforms, one or more core data centers, and a global network cloud, as distributed across layers of the edge computing system.

FIG. 5 depicts an example edge computing system 500 for providing edge services and applications to multi-stakeholder entities, as distributed among one or more client compute platforms 502, one or more edge gateway platforms 512, one or more edge aggregation platforms 522, one or more core data centers 532, and a global network cloud 542, as distributed across layers of the edge computing system 500. The implementation of the edge computing system 500 may be provided at or on behalf of a telecommunication service provider ("telco", or "TSP"), internet-of-things service provider, cloud service provider (CSP), enterprise entity, or any other number of entities. Various implementations and configurations of the edge computing system 500 may be provided dynamically, such as when orchestrated to meet service objectives.

Individual platforms or devices of the edge computing system 500 are located at a particular layer corresponding to layers 520, 530, 540, 550, and 560. For example, the client compute platforms 502*a*, 502*b*, 502*c*, 502*d*, 502*e*, 502*f* are located at an endpoint layer 520, while the edge gateway platforms 512*a*, 512*b*, 512*c* are located at an edge devices layer 530 (local level) of the edge computing system 500. Additionally, the edge aggregation platforms 522*a*, 522*b* (and/or fog platform(s) 524, if arranged or operated with or among a fog networking configuration 526) are located at a network access layer 540 (an intermediate level). Fog computing (or "fogging") generally refers to extensions of cloud computing to the edge of an enterprise's network or to the ability to manage transactions across the cloud/edge landscape, typically in a coordinated distributed or multi-node network. Some forms of fog computing provide the deployment of compute, storage, and networking services between end devices and cloud computing data centers, on behalf of the cloud computing locations. Some forms of fog computing also provide the ability to manage the workload/workflow level services, in terms of the overall transaction, by pushing certain workloads to the edge or to the cloud based on the ability to fulfill the overall service level agreement.

Fog computing in many scenarios provides a decentralized architecture and serves as an extension to cloud computing by collaborating with one or more edge node devices, providing the subsequent amount of localized control, configuration and management, and much more for end devices. Furthermore, fog computing provides the ability for edge resources to identify similar resources and collaborate to create an edge-local cloud which can be used solely or in conjunction with cloud computing to complete computing, storage or connectivity related services. Fog computing may also allow the cloud-based services to expand their reach to the edge of a network of devices to offer local and quicker accessibility to edge devices. Thus, some forms of fog computing provide operations that are consistent with edge computing as discussed herein; the edge computing aspects discussed herein are also applicable to fog networks, fogging, and fog configurations. Further, aspects of the edge computing systems discussed herein may be configured as a fog, or aspects of a fog may be integrated into an edge computing architecture.

The core data center 532 is located at a core network layer 550 (a regional or geographically central level), while the global network cloud 542 is located at a cloud data center layer 560 (a national or world-wide layer). The use of "core" is provided as a term for a centralized network location—deeper in the network—which is accessible by multiple edge platforms or components; however, a "core" does not necessarily designate the "center" or the deepest location of the network. Accordingly, the core data center 532 may be located within, at, or near the edge cloud 510. Although an illustrative number of client compute platforms 502a, 502b, 502c, 502d, 502e, 502f; edge gateway platforms 512a, 512b, 512c; edge aggregation platforms 522a, 522b; edge core data centers 532; and global network clouds 542 are shown in FIG. 5, it should be appreciated that the edge computing system 500 may include any number of devices and/or systems at each layer. Devices at any layer can be configured as peer nodes and/or peer platforms to each other and, accordingly, act in a collaborative manner to meet service objectives. For example, in additional or alternative examples, the edge gateway platforms 512a, 512b, 512c can be configured as an edge of edges such that the edge gateway platforms 512a, 512b, 512c communicate via peer to peer connections. In some examples, the edge aggregation platforms 522a, 522b and/or the fog platform(s) 524 can be configured as an edge of edges such that the edge aggregation platforms 522a, 522b and/or the fog platform(s) communicate via peer to peer connections. Additionally, as shown in FIG. 5, the number of components of respective layers 520, 530, 540, 550, and 560 generally increases at each lower level (e.g., when moving closer to endpoints (e.g., client compute platforms 502a, 502b, 502c, 502d, 502e, 502f)). As such, one edge gateway platforms 512a, 512b, 512c may service multiple ones of the client compute platforms 502a, 502b, 502c, 502d, 502e, 502f, and one edge aggregation platform (e.g., one of the edge aggregation platforms 522a, 522b) may service multiple ones of the edge gateway platforms 512a, 512b, 512c.

Consistent with the examples provided herein, a client compute platform (e.g., one of the client compute platforms 502a, 502b, 502c, 502d, 502e, 502f) may be implemented as any type of endpoint component, device, appliance, or other thing capable of communicating as a producer or consumer of data. For example, a client compute platform can include a mobile phone, a laptop computer, a desktop computer, a processor platform in an autonomous vehicle, etc. In additional or alternative examples, a client compute platform can include a camera, a sensor, etc. Further, the label "platform," "node," and/or "device" as used in the edge computing system 500 does not necessarily mean that such platform, node, and/or device operates in a client or slave role; rather, any of the platforms, nodes, and/or devices in the edge computing system 500 refer to individual entities, platforms, nodes, devices, and/or subsystems which include discrete and/or connected hardware and/or software configurations to facilitate and/or use the edge cloud 510.

As such, the edge cloud 510 is formed from network components and functional features operated by and within the edge gateway platforms 512a, 512b, 512c and the edge aggregation platforms 522a, 522b of layers 530, 540, respectively. The edge cloud 510 may be implemented as any type of network that provides edge computing and/or storage resources which are proximately located to radio access network (RAN) capable endpoint devices (e.g., mobile computing devices, IoT devices, smart devices, etc.), which are shown in FIG. 5 as the client compute platforms 502a, 502b, 502c, 502d, 502e, 502f In other words, the edge cloud 510 may be envisioned as an "edge" which connects the endpoint devices and traditional network access points that serves as an ingress point into service provider core networks, including mobile carrier networks (e.g., Global System for Mobile Communications (GSM) networks, Long-Term Evolution (LTE) networks, 5G/6G networks, etc.), while also providing storage and/or compute capabilities. Other types and forms of network access (e.g., Wi-Fi, long-range wireless, wired networks including optical networks) may also be utilized in place of or in combination with such 3GPP carrier networks.

In some examples, the edge cloud 510 may form a portion of, or otherwise provide, an ingress point into or across a fog networking configuration 526 (e.g., a network of fog platform(s) 524, not shown in detail), which may be implemented as a system-level horizontal and distributed architecture that distributes resources and services to perform a specific function. For instance, a coordinated and distributed network of fog platform(s) 524 may perform computing, storage, control, or networking aspects in the context of an IoT system arrangement. Other networked, aggregated, and distributed functions may exist in the edge cloud 510 between the core data center 532 and the client endpoints (e.g., client compute platforms 502a, 502b, 502c, 502d, 502e, 502f). Some of these are discussed in the following sections in the context of network functions or service virtualization, including the use of virtual edges and virtual services which are orchestrated for multiple tenants.

As discussed in more detail below, the edge gateway platforms 512a, 512b, 512c and the edge aggregation platforms 522a, 522b cooperate to provide various edge services and security to the client compute platforms 502a, 502b, 502c, 502d, 502e, 502f Furthermore, because a client compute platforms (e.g., one of the client compute platforms 502a, 502b, 502c, 502d, 502e, 502f) may be stationary or mobile, a respective edge gateway platform 512a, 512b, 512c may cooperate with other edge gateway platforms to propagate presently provided edge services, relevant service data, and security as the corresponding client compute platforms 502a, 502b, 502c, 502d, 502e, 502f moves about a region. To do so, the edge gateway platforms 512a, 512b, 512c and/or edge aggregation platforms 522a, 522b may support multiple tenancy and multiple tenant configurations, in which services from (or hosted for) multiple service providers, owners, and multiple consumers may be supported and coordinated across a single or multiple compute devices.

In examples disclosed herein, edge platforms in the edge computing system 500 includes meta-orchestration functionality. For example, edge platforms at the far-edge (e.g., edge platforms closer to edge users, the edge devices layer 530, etc.) can reduce the performance or power consumption of orchestration tasks associated with far-edge platforms so that the execution of orchestration components at far-edge platforms consumes a small fraction of the power and performance available at far-edge platforms.

The orchestrators at various far-edge platforms participate in an end-to-end orchestration architecture. Examples disclosed herein anticipate that the comprehensive operating software framework (such as, open network automation platform (ONAP) or similar platform) will be expanded, or options created within it, so that examples disclosed herein can be compatible with those frameworks. For example, orchestrators at edge platforms implementing examples disclosed herein can interface with ONAP orchestration flows and facilitate edge platform orchestration and telemetry activities. Orchestrators implementing examples disclosed herein act to regulate the orchestration and telemetry activities that are performed at edge platforms, including increasing or decreasing the power and/or resources expended by the local orchestration and telemetry components, delegating orchestration and telemetry processes to a remote computer and/or retrieving orchestration and telemetry processes from the remote computer when power and/or resources are available.

The remote devices described above are situated at alternative locations with respect to those edge platforms that are offloading telemetry and orchestration processes. For example, the remote devices described above can be situated, by contrast, at a near-edge platforms (e.g., the network access layer 540, the core network layer 550, a central office, a mini-datacenter, etc.). By offloading telemetry and/or orchestration processes at a near edge platforms, an orchestrator at a near-edge platform is assured of (comparatively) stable power supply, and sufficient computational resources to facilitate execution of telemetry and/or orchestration processes. An orchestrator (e.g., operating according to a global loop) at a near-edge platform can take delegated telemetry and/or orchestration processes from an orchestrator (e.g., operating according to a local loop) at a far-edge platform. For example, if an orchestrator at a near-edge platform takes delegated telemetry and/or orchestration processes, then at some later time, the orchestrator at the near-edge platform can return the delegated telemetry and/or orchestration processes to an orchestrator at a far-edge platform as conditions change at the far-edge platform (e.g., as power and computational resources at a far-edge platform satisfy a threshold level, as higher levels of power and/or computational resources become available at a far-edge platform, etc.).

A variety of security approaches may be utilized within the architecture of the edge cloud 510. In a multi-stakeholder environment, there can be multiple loadable security modules (LSMs) used to provision policies that enforce the stakeholder's interests including those of tenants. In some examples, other operators, service providers, etc. may have security interests that compete with the tenant's interests. For example, tenants may prefer to receive full services (e.g., provided by an edge platform) for free while service providers would like to get full payment for performing little work or incurring little costs. Enforcement point environments could support multiple LSMs that apply the combination of loaded LSM policies (e.g., where the most constrained effective policy is applied, such as where if any of A, B or C stakeholders restricts access then access is restricted). Within the edge cloud 510, each edge entity can provision LSMs that enforce the Edge entity interests. The cloud entity can provision LSMs that enforce the cloud entity interests. Likewise, the various fog and IoT network entities can provision LSMs that enforce the fog entity's interests.

In these examples, services may be considered from the perspective of a transaction, performed against a set of contracts or ingredients, whether considered at an ingredient level or a human-perceivable level. Thus, a user who has a service agreement with a service provider, expects the service to be delivered under terms of the SLA. Although not discussed in detail, the use of the edge computing techniques discussed herein may play roles during the negotiation of the agreement and the measurement of the fulfillment of the agreement (e.g., to identify what elements are required by the system to conduct a service, how the system responds to service conditions and changes, and the like).

Additionally, in examples disclosed herein, edge platforms and/or orchestration components thereof may consider several factors when orchestrating services and/or applications in an edge environment. These factors can include next-generation central office smart network functions virtualization and service management, improving performance per watt at an edge platform and/or of orchestration components to overcome the limitation of power at edge platforms, reducing power consumption of orchestration components and/or an edge platform, improving hardware utilization to increase management and orchestration efficiency, providing physical and/or end to end security, providing individual tenant quality of service and/or service level agreement satisfaction, improving network equipment-building system compliance level for each use case and tenant business model, pooling acceleration components, and billing and metering policies to improve an edge environment.

A "service" is a broad term often applied to various contexts, but in general, it refers to a relationship between two entities where one entity offers and performs work for the benefit of another. However, the services delivered from one entity to another must be performed with certain guidelines, which ensure trust between the entities and manage the transaction according to the contract terms and conditions set forth at the beginning, during, and end of the service.

An example relationship among services for use in an edge computing system is described below. In scenarios of edge computing, there are several services, and transaction layers in operation and dependent on each other—these services create a "service chain". At the lowest level, ingredients compose systems. These systems and/or resources communicate and collaborate with each other in order to provide a multitude of services to each other as well as other permanent or transient entities around them. In turn, these entities may provide human-consumable services. With this hierarchy, services offered at each tier must be transactionally connected to ensure that the individual component (or sub-entity) providing a service adheres to the contractually agreed to objectives and specifications. Deviations at each layer could result in overall impact to the entire service chain.

One type of service that may be offered in an edge environment hierarchy is Silicon Level Services. For instance, Software Defined Silicon (SDSi)-type hardware provides the ability to ensure low level adherence to transactions, through the ability to intra-scale, manage and assure the delivery of operational service level agreements. Use of SDSi and similar hardware controls provide the capability to associate features and resources within a system to a specific tenant and manage the individual title (rights) to those resources. Use of such features is among one way to dynamically "bring" the compute resources to the workload.

For example, an operational level agreement and/or service level agreement could define "transactional throughput" or "timeliness"—in case of SDSi, the system and/or resource can sign up to guarantee specific service level specifications (SLS) and objectives (SLO) of a service level agreement (SLA). For example, SLOs can correspond to particular key performance indicators (KPIs) (e.g., frames per second, floating point operations per second, latency goals, etc.) of an application (e.g., service, workload, etc.) and an SLA can correspond to a platform level agreement to satisfy a particular SLO (e.g., one gigabyte of memory for 10 frames per second). SDSi hardware also provides the ability for the infrastructure and resource owner to empower the silicon component (e.g., components of a composed system that produce metric telemetry) to access and manage (add/remove) product features and freely scale hardware capabilities and utilization up and down. Furthermore, it provides the ability to provide deterministic feature assignments on a per-tenant basis. It also provides the capability to tie deterministic orchestration and service management to the dynamic (or subscription based) activation of features without the need to interrupt running services, client operations or by resetting or rebooting the system.

At the lowest layer, SDSi can provide services and guarantees to systems to ensure active adherence to contractually agreed-to service level specifications that a single resource has to provide within the system. Additionally, SDSi provides the ability to manage the contractual rights (title), usage and associated financials of one or more tenants on a per component, or even silicon level feature (e.g., SKU features). Silicon level features may be associated with compute, storage or network capabilities, performance, determinism or even features for security, encryption, acceleration, etc. These capabilities ensure not only that the tenant can achieve a specific service level agreement, but also assist with management and data collection, and assure the transaction and the contractual agreement at the lowest manageable component level.

At a higher layer in the services hierarchy, Resource Level Services, includes systems and/or resources which provide (in complete or through composition) the ability to meet workload demands by either acquiring and enabling system level features via SDSi, or through the composition of individually addressable resources (compute, storage and network). At yet a higher layer of the services hierarchy, Workflow Level Services, is horizontal, since service-chains may have workflow level requirements. Workflows describe dependencies between workloads in order to deliver specific service level objectives and requirements to the end-to-end service. These services may include features and functions like high-availability, redundancy, recovery, fault tolerance or load-leveling (we can include lots more in this). Workflow services define dependencies and relationships between resources and systems, describe requirements on associated networks and storage, as well as describe transaction level requirements and associated contracts in order to assure the end-to-end service. Workflow Level Services are usually measured in Service Level Objectives and have mandatory and expected service requirements.

At yet a higher layer of the services hierarchy, Business Functional Services (BFS) are operable, and these services are the different elements of the service which have relationships to each other and provide specific functions for the customer. In the case of Edge computing and within the example of Autonomous Driving, business functions may be composing the service, for instance, of a "timely arrival to an event"—this service would require several business functions to work together and in concert to achieve the goal of the user entity: GPS guidance, RSU (Road Side Unit) awareness of local traffic conditions, Payment history of user entity, Authorization of user entity of resource(s), etc. Furthermore, as these BFS(s) provide services to multiple entities, each BFS manages its own SLA and is aware of its ability to deal with the demand on its own resources (Workload and Workflow). As requirements and demand increases, it communicates the service change requirements to Workflow and resource level service entities, so they can, in-turn provide insights to their ability to fulfill. This step assists the overall transaction and service delivery to the next layer.

At the highest layer of services in the service hierarchy, Business Level Services (BLS), is tied to the capability that is being delivered. At this level, the customer or entity might not care about how the service is composed or what ingredients are used, managed, and/or tracked to provide the service(s). The primary objective of business level services is to attain the goals set by the customer according to the overall contract terms and conditions established between the customer and the provider at the agreed to a financial agreement. BLS(s) are comprised of several Business Functional Services (BFS) and an overall SLA.

This arrangement and other service management features described herein are designed to meet the various requirements of edge computing with its unique and complex resource and service interactions. This service management arrangement is intended to inherently address several of the resource basic services within its framework, instead of through an agent or middleware capability. Services such as: locate, find, address, trace, track, identify, and/or register may be placed immediately in effect as resources appear on the framework, and the manager or owner of the resource domain can use management rules and policies to ensure orderly resource discovery, registration and certification.

Moreover, any number of edge computing architectures described herein may be adapted with service management features. These features may enable a system to be constantly aware and record information about the motion, vector, and/or direction of resources as well as fully describe these features as both telemetry and metadata associated with the devices. These service management features can be used for resource management, billing, and/or metering, as well as an element of security. The same functionality also applies to related resources, where a less intelligent device, like a sensor, might be attached to a more manageable resource, such as an edge gateway. The service management framework is made aware of change of custody or encapsulation for resources. Since nodes and components may be directly accessible or be managed indirectly through a parent or alternative responsible device for a short duration or for its entire lifecycle, this type of structure is relayed to the service framework through its interface and made available to external query mechanisms.

Additionally, this service management framework is always service aware and naturally balances the service delivery requirements with the capability and availability of the resources and the access for the data upload the data analytics systems. If the network transports degrade, fail or change to a higher cost or lower bandwidth function, service policy monitoring functions provide alternative analytics and service delivery mechanisms within the privacy or cost constraints of the user. With these features, the policies can trigger the invocation of analytics and dashboard services at the edge ensuring continuous service availability at reduced fidelity or granularity. Once network transports are re-established, regular data collection, upload and analytics services can resume.

The deployment of a multi-stakeholder edge computing system may be arranged and orchestrated to enable the deployment of multiple services and virtual edge instances, among multiple edge platforms and subsystems, for use by multiple tenants and service providers. In a system example applicable to a cloud service provider (CSP), the deployment of an edge computing system may be provided via an "over-the-top" approach, to introduce edge computing platforms as a supplemental tool to cloud computing. In a contrasting system example applicable to a telecommunications service provider (TSP), the deployment of an edge computing system may be provided via a "network-aggregation" approach, to introduce edge computing platforms at locations in which network accesses (from different types of data access networks) are aggregated. However, these over-the-top and network aggregation approaches may be implemented together in a hybrid or merged approach or configuration.

Figure 6:
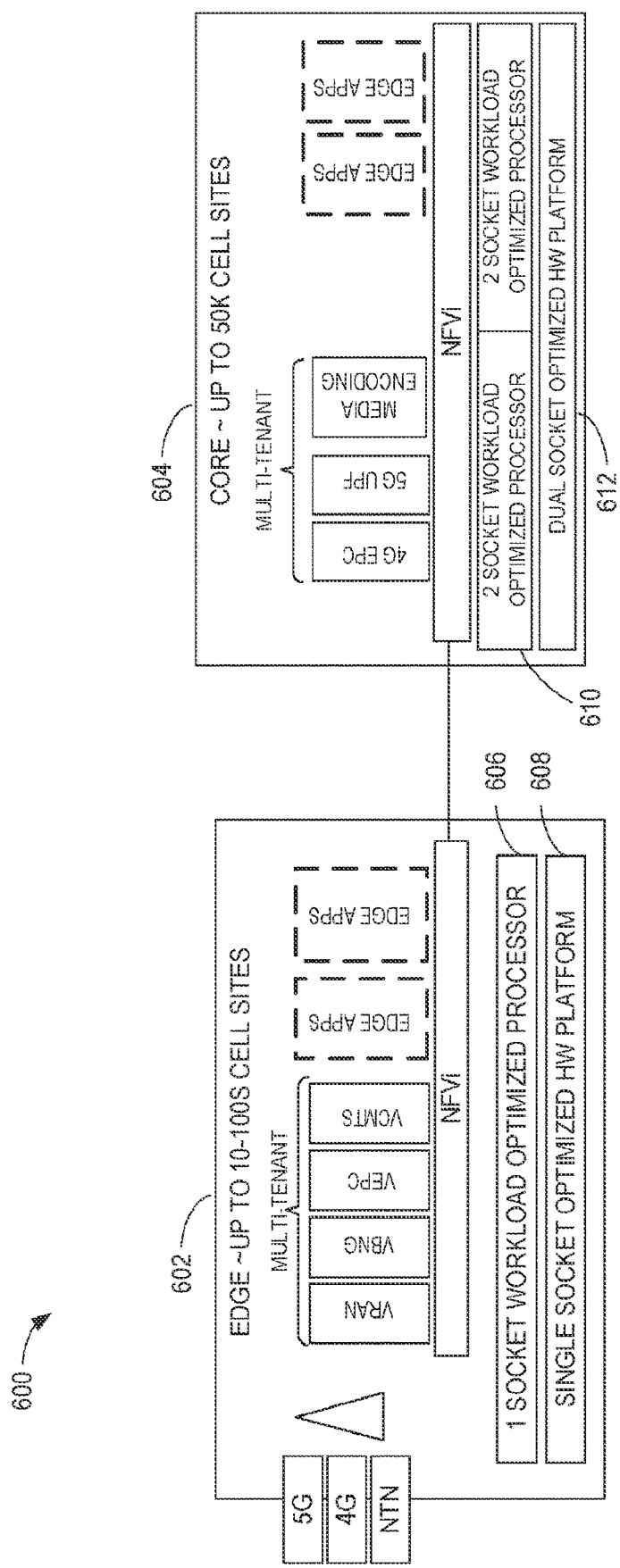
FIG. 6 is an illustration of an example single socket system and an example dual socket system implementing example network workload optimized settings.

FIG. 6 is an illustration of an example system 600 including an example single socket computing system 602 and an example dual socket computing system 604 implementing network workload optimized settings, according to an example. In this example, the single socket system 602 implements an edge server adapted to support an NFV platform and the use of multi-tenant network services (such as vRAN, virtual Broadband Network Gateway (vBNG), virtual Evolved Packet Core (vEPC), virtual Cable Modem Termination Systems (vCMTS)) and accompanying applications (e.g., edge applications hosted by a service provider or accessed by a service consumer). An example edge server deployment, such as at least one or more instances of the single socket system 602 in a multi-core computing environment, may be adapted for the management and servicing of 4G and 5G services with such NFV platform, such as for the support of edge NFV instances among dozens or hundreds of cell sites. The processing performed for this NFV platform is provided by a one-socket workload optimized processor 606, which operates on a single-socket optimized hardware platform 608. For purposes of simplicity, a number of hardware elements (including network interface cards, accelerators, memory, storage) are omitted from illustration in the hardware platform.

In this example, the dual socket computing system 604 implements a core server that is adapted to support an NFV platform and the use of additional multi-tenant management services, such as 4G Evolved Packet Core (EPC) and 5G user plane function (UPF) services and accompanying applications (e.g., cloud applications hosted by a service provider or accessed by a service consumer). An example core server deployment, such as at least one or more instances of the dual socket computing systems 604 in a multi-core computing environment, may be adapted for the management and servicing of 4G and 5G services with such NFV platform, such as for the support of core NFV instances among thousands or tens of thousands of cell sites. The processing performed for this NFV platform is provided by example two-socket workload optimized processors 610, which operates on an example dual-socket optimized hardware platform 612. For purposes of simplicity, a number of hardware elements (including network interface cards, accelerators, memory, storage) are also omitted from illustration in this hardware platform.

In some instances, varying latencies resulting from processor frequency scaling (e.g., caused by CPU "throttling" with dynamic frequency scaling to reduce power) produce inconsistent performance results among different type of applications workloads and usages. Thus, depending on the type of workload, whether in the form of scientific simulations, financial analytics, AI/deep learning, 3D modeling and analysis, image and audio/video processing, cryptography, data compression, or even 5G infrastructure workloads such as FlexRAN, significant variation in processor utilization—and thus power utilization and efficiency—will occur. Advantageously, example edge and/or core server deployments as described herein take advantage of the reduced power requirements needed by network workloads in some CPU components, to reduce the application ratio and increase the deterministic frequency of the processor. Specific examples of workloads considered for optimization may include workloads from: 5G UPF, virtual Converged Cable Access Platform (vCCAP), vBNG, vCG-NAPG, FlexRAN, Virtualized Infrastructure Managers (vIMS), virtual Next-Generation Firewalls (vNGFWs), Vector Packet Processing (VPP) Internet Protocol Security (IPSec), NGINX, VPP FWD, vEPC, Open vSwitch (OVS), Zettabyte File System (ZFS), Hadoop, VMware® vSAN, media encoding, and the like.

In some examples, different combinations and evaluations of these workloads, workload optimized "EDGE," "NETWORKING," or "CLOUD" processor SKU configurations (or other hybrid combinations) are all possible by utilizing one(s) of the one-socket workload-optimized processors 606 and/or two-socket workload-optimized processors 610. For example, the implementations may be used with evolving wired edge cloud workloads (content delivery network (CDN), IPsec, Broadband Network Gateway (BNG)) as edge cloudification is evolving now into vBNG, virtual Virtual Private Network (vVPN), virtual CDN (vCDN) use cases. Also, for example, the implementations may be used with wireless edge cloud workloads, such as in settings where the network edge is evolving from a traditional communications service provider RAN architecture to a centralized baseband unit (BBU) to virtual cloudification (e.g., virtual BBU (vBBU), vEPC) architecture and associated workloads.

In some examples, the 5G-ISA instructions as described herein may implement and/or otherwise correspond to Layer 1 (L1) baseband assist instructions. For example, AVX-512+ 5G-ISA instructions, and/or, more generally, 5G-ISA instructions as described herein may be referred to as L1 baseband assist instructions. In some such examples, the L1 baseband assist instructions, when executed, effectuate network loads executed by BBUs with increased performance, increased throughput, and/or reduced latency with respect to other types of instructions (e.g., SSE instructions, AVX-512 instructions, etc.). In some such examples, L1 baseband network loads (e.g., BBU network loads) may include resource demapping, sounding channel estimation, downlink and uplink beamforming generation, DMRS channel estimation, MU-MIMO detection, demodulation, descrambling, rate dematching, low-density parity-check (LDPC) decoding, cyclic redundancy check (CRC), LDPC encoding, rate matching, scrambling, modulation, layer mapping, precoding, and/or resource mapping computation tasks.

The foregoing and following examples provide reference to power and frequency optimizations for network workloads. Advantageously, the variations to the workloads or types of workloads as described herein may enable a processor fabricator or manufacturer to create any number of custom SKUs and combinations, including those not necessarily applicable to network processing optimizations.

Figure 7:
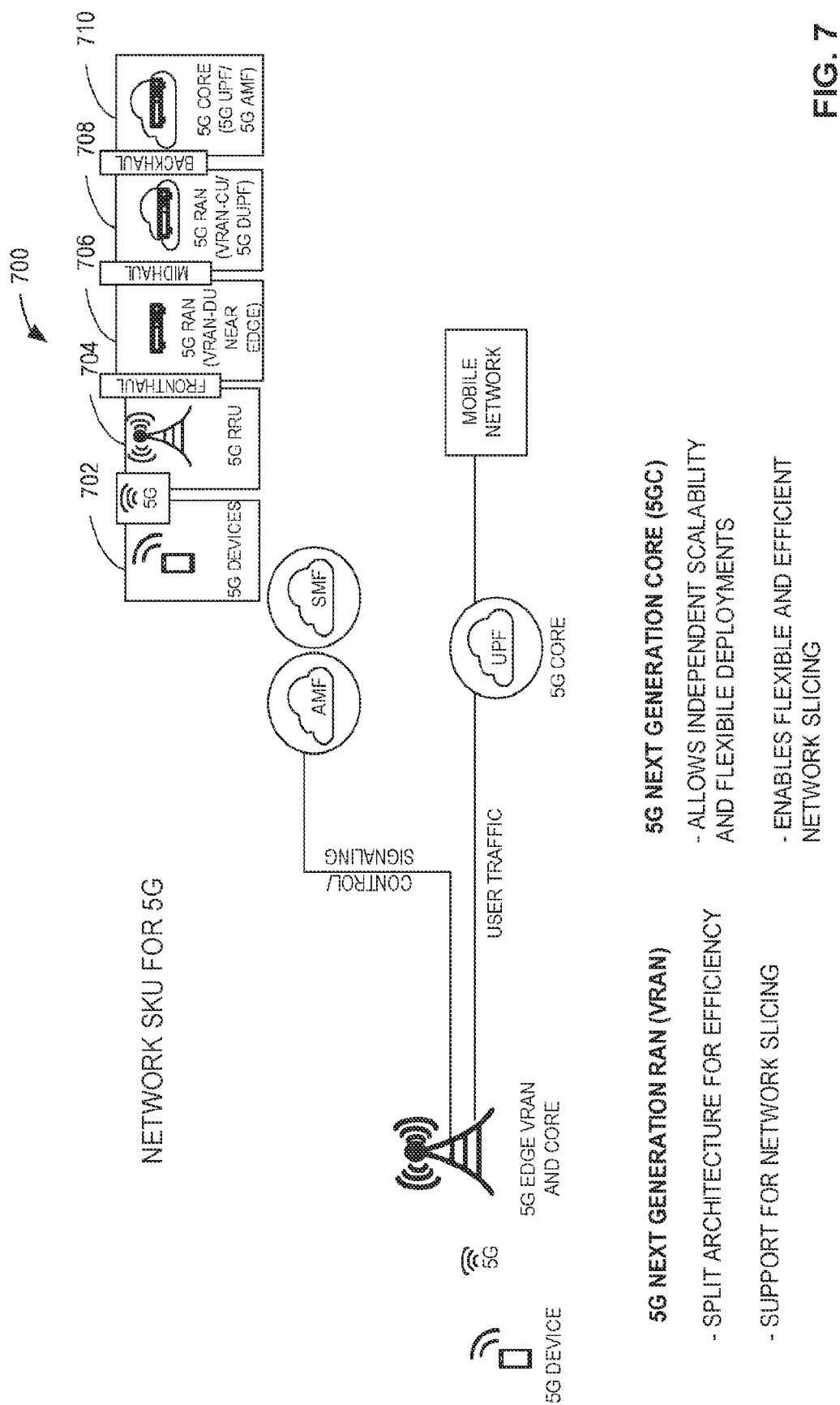
FIG. 7 is an illustration of an example fifth generation (5G) network architecture implemented by the example multi-core computing systems of FIG. 1.

FIG. 7 is an illustration of an example 5G network architecture 700. In this example, the 5G network architecture 700 may be implemented with one or more example 5G devices 702, one or more example 5G RRUs 704, one or more example 5G RANs 706, 708 such as example vRAN-DUs 706 and/or vRAN-CUs 708, and/or one or more example 5G cores (e.g., 5G core servers) 710. In this example, the 5G devices 702 may be implemented by one(s) of the devices 108, 110, 112, 114, 116 of FIG. 1. In this example, the 5G RRUs 704 may be implemented by the RRUs 120 of FIG. 1. In this example, the vRAN-DUs 706 may be implemented by the DUs 122 of FIG. 1. In this example, the vRAN-CUs 708 may be implemented by the CUs 124 of FIG. 1. In this example, the 5G core servers 710 may be implemented by the core devices 126 of FIG. 1.

Advantageously, examples described herein improve 5G next generation RAN (e.g., vRAN) by splitting the architecture for efficiency and supporting network slicing. For example, examples described herein can effectuate splitting a 5G architecture into hardware, software, and/or firmware.

Advantageously, examples described herein improve 5G next generation core (5GC) by allowing independent scalability and flexible deployments and enabling flexible and efficient network slicing. Advantageously, the application ratio of one(s) of processors included in the one or more 5G devices 702, the one or more 5G RRUs 704, the one or more 5G RANs 706, 708, and/or the one or more 5G cores 710 may be adjusted based on a network node location, latency requirements, throughput requirements, and/or power requirements associated with network workloads to be executed by such processor(s).

Figure 8:
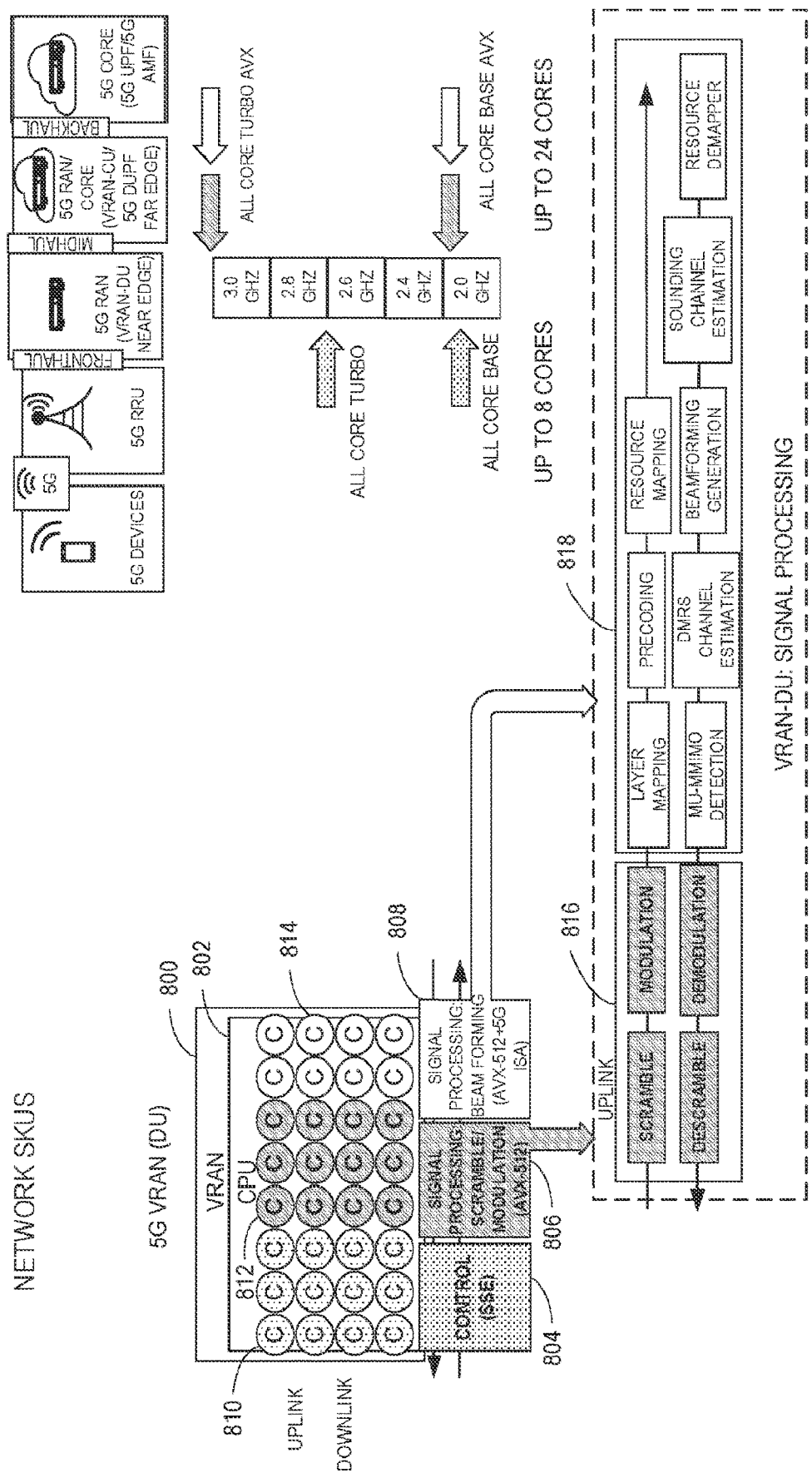
FIG. 8 is an illustration of an example workload-adjustable CPU that may implement an example 5G virtual radio access network (vRAN) distributed unit (DU).

FIG. 8 is an illustration of an example multi-core CPU 802 that may implement an example 5G vRAN DU 800. In this example, the vRAN DU 800 may be implemented by one(s) of the DUs 122 of FIG. 1. In this example, the multi-core CPU 802 is a workload adjustable and/or otherwise a network-optimizable CPU. For example, the multi-core CPU 802 may be optimized and/or otherwise configured based on a computing or network workload to be executed or processed. In such examples, the multi-core CPU 802 may be configurable on a per-core and/or per-uncore basis to improve at least one of performance, throughput, or latency associated with processing the computing or network workload. In some examples, the multi-core CPU 802 may implement a multi-SKU CPU that may be adapted to operate in different configurations associated with different respective SKUs.

In this example, the multi-core CPU 802 may execute first example instructions (e.g., hardware or machine readable instructions) 804, second example instructions 806, or third example instructions 808. For example, the instructions 804, 806, 808 may be written, implemented, and/or otherwise based on an assembly, hardware, or machine language. In this example, the first instructions 804 may implement and/or otherwise correspond to SSE instructions to effectuate control tasks (e.g., core control tasks, CPU control tasks, etc.). In this example, the second instructions 806 may implement and/or otherwise correspond to AVX-512 instructions. In this example, the third instructions 808 may implement and/or otherwise correspond to AVX-512+5G ISA instructions.

In the illustrated example of FIG. 8, the multi-core CPU 802 has first example cores 810, second example cores 812, and third example cores 814. In this example, the first cores 810 execute the first instructions 804 to effectuate first workloads by executing control tasks. In this example, the second cores 812 execute the second instructions 806 to effectuate second example network workloads 816. In this example, the first network workloads 816 are signal processing workloads, such as scrambling or descrambling data, modulating or demodulating data, etc. In this example, the third cores 814 execute the third instructions 808 to effectuate second example network workloads 818. In this example, the third network workloads 818 include layer mapping, precoding, resource mapping, multi-user, multiple input, multiple output (MU-MMIMO) detection, demodulated reference signal (DMRS) channel estimation, beamforming generation, sounding channel estimation, and resource demapping. Advantageously, one(s) of the first cores 810 may execute one(s) of the first instructions 804 while at least one of one(s) of the second cores 812 execute one(s) of the second instructions 806 or one(s) of the third cores 814 execute one(s) of the third instructions 808. Advantageously, the multi-core CPU 800 may effectuate different types of workloads using different types of instructions on a per-core basis.

In some examples, the multi-core CPU 802 invokes an application ratio based on a network node location, latency requirements, throughput requirements, and/or power requirements associated with network workloads to be executed by the 5G vRAN DU 800. For example, the multi-core CPU 802 may select a first application ratio (e.g., 0.7, 0.8, etc.) from a plurality of application ratios that the multi-core CPU 802 can support and/or is otherwise licensed to use. In such examples, the multi-core CPU 802 can calculate and/or otherwise determine CPU parameters or settings, such as operating frequencies, power consumption values, etc., for a core when executing a respective one of the instructions 804, 806, 808, operating frequencies, power consumption values, etc., for a corresponding uncore when executing the respective one of the instructions 804, 806, 808, etc. In some such examples, the multi-core CPU 802 can dynamically transition between application ratios based on historical and/or instantaneous values of the CPU parameters or settings.

Advantageously, in response to loading the second instructions 806, the second cores 812 may be configured based on the selected application ratio by increasing their operating frequencies from a base frequency to a turbo frequency (e.g., from 2.0 to 3.0 Gigahertz (GHz)). For example, the second instructions 806 may be optimized to execute compute bound and/or otherwise more processing intensive computing tasks compared to the first instructions 804. In some examples, the multi-core CPU 802 may determine to operate first one(s) of the second cores 812 at a first frequency (e.g., the base frequency of 2.0 GHz) while operating second one(s) of the second cores 812 at a second frequency (e.g., the turbo frequency of 3.0 GHz). In some examples, the multi-core CPU 802 may determine to operate all of the second cores 812 at the same frequency (e.g., the base frequency or the turbo frequency).

Advantageously, in response to loading the third instructions 808, the third cores 814 may be configured based on the selected application ratio by increasing their operating frequencies (e.g., from 2.0 to 3.2 GHz). For example, the third instructions 808 may be optimized to execute compute bound and/or otherwise more processing intensive computing tasks compared to the first instructions 804 and/or the second instructions 806. In some examples, the multi-core CPU 802 may determine to operate first one(s) of the third cores 814 at a first frequency (e.g., the base frequency of 2.0 GHz) while operating second one(s) of the third cores 814 at a second frequency (e.g., the turbo frequency of 3.0 GHz). In some examples, the multi-core CPU 802 may determine to operate all of the third cores 814 at the same frequency (e.g., the base frequency or the turbo frequency).

In this example, up to eight of the cores 810, 812, 814 may execute the first instructions 804 at the same time. Alternatively, a different number of the cores 810, 812, 814 may execute the first instructions 804 at the same time. In this example, up to 24 of the cores 810, 812, 814 may execute the second instructions 816 or the third instructions 818 at the same time. Alternatively, a different number of the cores 810, 812, 814 may execute the second instructions 816 or the third instructions 818 at the same time.

Although the cores 810, 812, 814 are represented in this example as executing the corresponding instructions 804, 806, 808, at a different point in time or operation, one(s) of the cores 810, 812, 814 may load different ones of the instructions 804, 806, 808 and thereby may be dynamically configured from a first instruction loading instance (e.g., loading one of the first instructions 804) to a second instruction loading instance (e.g., loading one of the second instructions 806 or the third instructions 808 after executing a workload with the one of the first instructions 804). For example, a first one of the first cores 810 may execute the first instructions 804 at a first time, the second instructions 806 at a second time after the first time, and the third instructions 808 at a third time after the second time.

Figure 9:
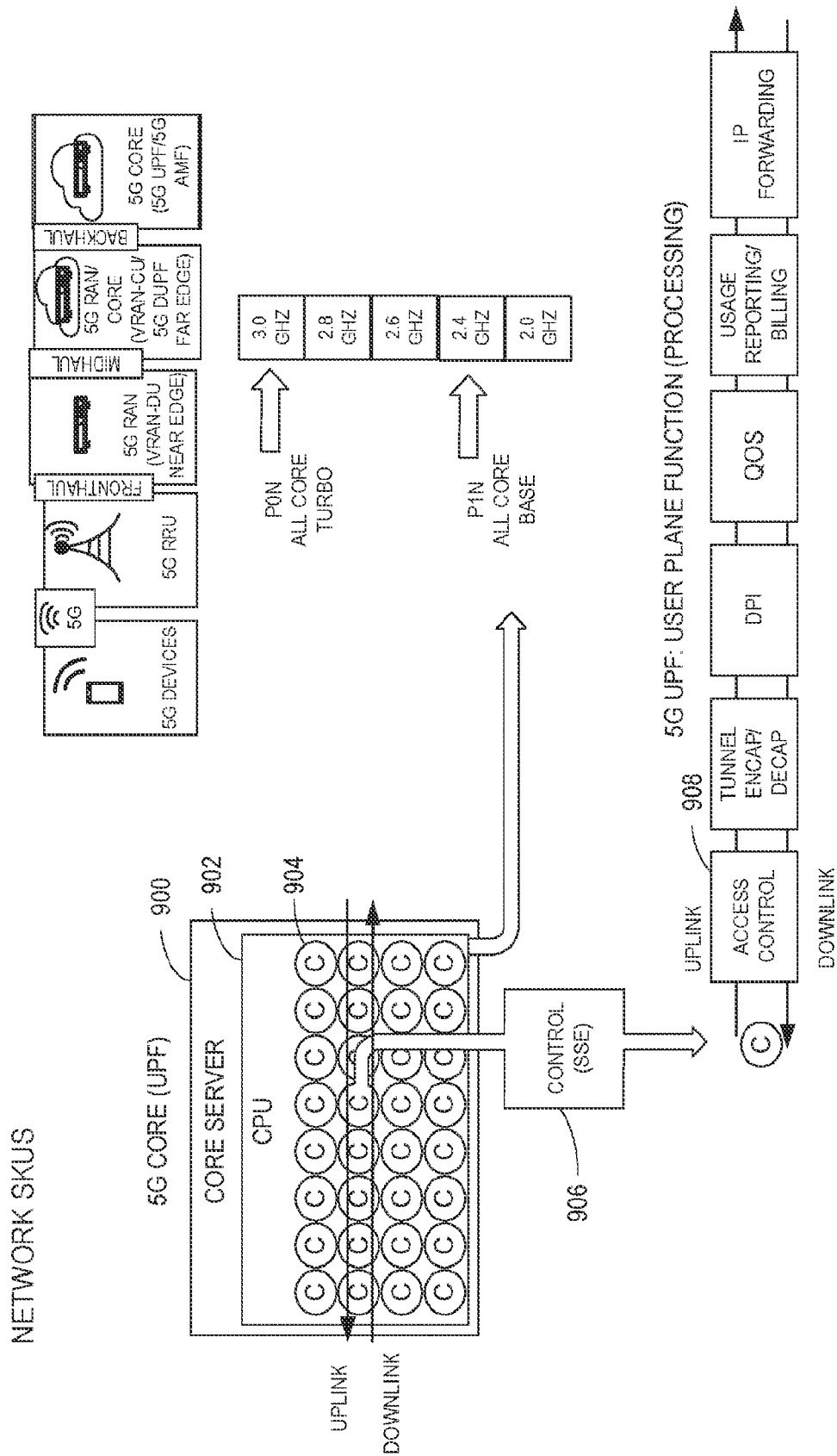
FIG. 9 is an illustration of an example implementation of a 5G core server including an example workload-adjustable CPU.

FIG. 9 is an illustration of an example implementation of a 5G core server 900 including an example multi-core CPU 902. In this example, the multi-core CPU 902 includes a plurality of example computing cores 904. In this example, the core server 900 may be implemented by the core devices 126 of FIG. 1. In this example, the multi-core CPU 902 is a workload adjustable and/or otherwise a network-optimizable CPU. For example, the multi-core CPU 902 may be optimized and/or otherwise configured based on a computing or network workload to be executed or processed. In such examples, the multi-core CPU 902 may implement a multi-SKU CPU that may be adapted to operate in different configurations associated with different respective SKUs based on the network node location, the latency requirements, the throughput requirements, and/or the power requirements of the core server 900.

In this example, the multi-core CPU 902 may execute first example instructions (e.g., machine readable instructions) 906. For example, the first instructions 906 of FIG. 9 may correspond to the first instructions 804 of FIG. 8. In this example, the first instructions 906 may be written, implemented, and/or otherwise based on an assembly, hardware, or machine language. In this example, the first instructions 906 may implement and/or otherwise correspond to SSE instructions to effectuate control tasks (e.g., core control tasks, CPU control tasks, etc.). In this example, the computing cores 904 execute the first instructions 906 to effectuate first example workloads 908 by executing control tasks. In this example, the first workloads 908 implement a 5G UPF (e.g., a 5G UPF processing or workload pipeline). For example, the cores 904 can load and execute the first instructions 906 to implement and/or otherwise execute access control, tunnel encapsulation or decapsulation, deep packet inspection (DPI), Quality-of-Service (QoS), usage reporting and/or billing, and/or Internet Protocol (IP) forwarding tasks.

In some examples, the multi-core CPU 902 invokes an application ratio based on a network node location, latency requirements, throughput requirements, and/or power requirements associated with network workloads to be executed by the core server 900. For example, the multi-core CPU 902 may select a first application ratio (e.g., 0.7, 0.8, etc.) from a plurality of application ratios that the multi-core CPU 902 can support and/or is licensed to support. In such examples, the multi-core CPU 902 can calculate and/or otherwise determine CPU parameters or settings, such as operating frequencies, power consumption values, etc., for one of the cores 904 when executing the instructions 906, operating frequencies, power consumption values, etc., for a corresponding uncore when executing the instructions 906, etc.

Advantageously, in response to loading the first instructions 906, the cores 904 may be configured based on the selected application ratio by increasing their operating frequencies (e.g., from 2.4 to 3.0 GHz). Although the cores 904 are represented in this example as executing the first instructions 906, at a different point in time or operation, one(s) of the cores 904 may load different instructions, such as one(s) of the instructions 804, 806, 808 of FIG. 8, and thereby may be dynamically configured from a first instruction loading instance (e.g., loading one of the first instructions 906) to a second instruction loading instance (e.g., loading one of the second instructions 806 of FIG. 8 after executing a workload with the one of the first instructions 906).

Figure 10:
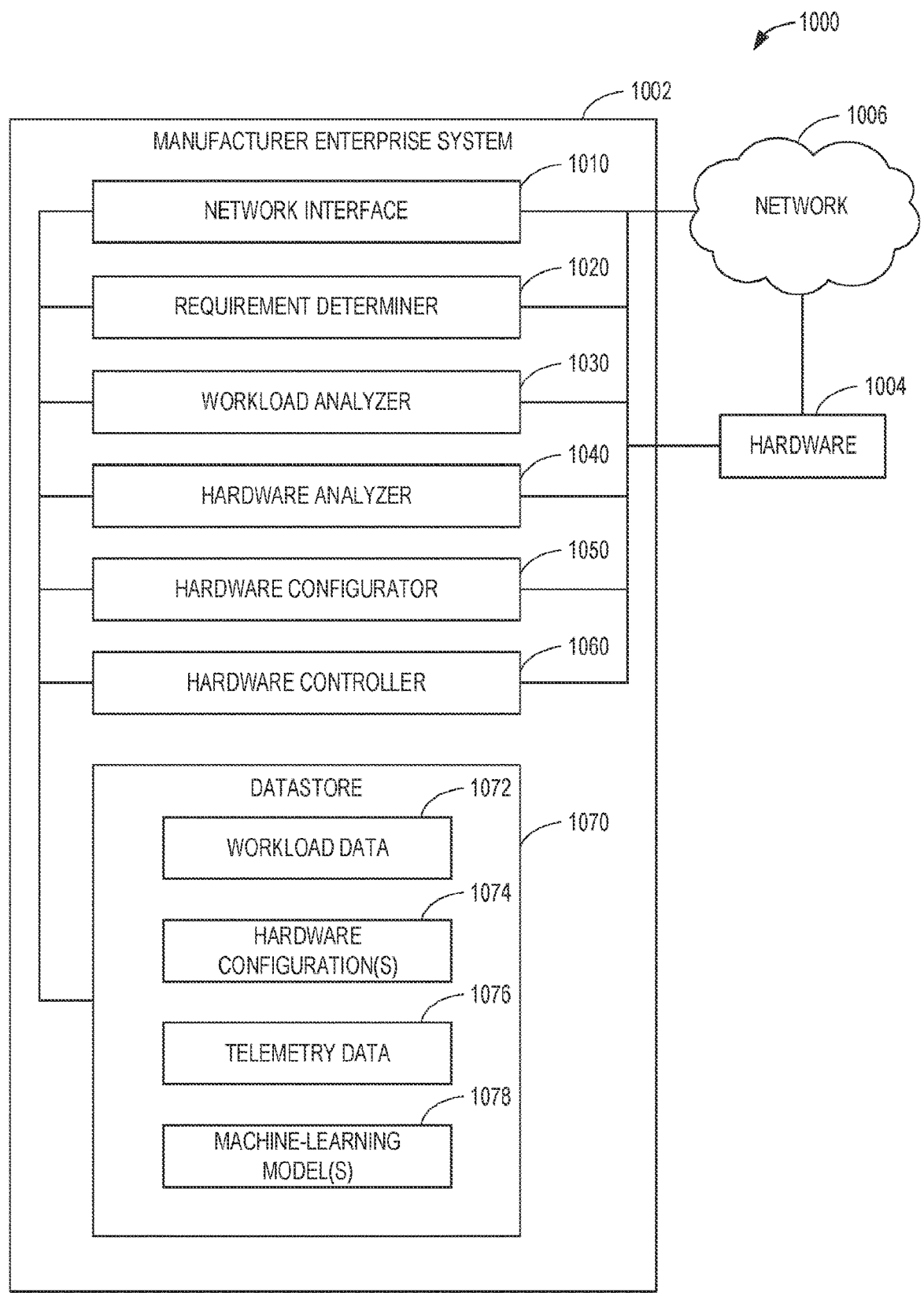
FIG. 10 is an example implementation of a manufacturer enterprise system that may implement the examples disclosed herein.

FIG. 10 is a block diagram of an example system 1000 including an example manufacturer enterprise system 1002 to determine an application ratio and invoke operation of example hardware 1004. In some examples, the manufacturer enterprise system 1002 may be implemented by any combination of hardware, software, and/or firmware. For example, the manufacturer enterprise system 1002 may be implemented by one or more servers, one or more virtual cloud-based applications, etc., and/or a combination thereof. In this example, the manufacturer enterprise system 1002 is in communication with the hardware 1004 via an example network 1006 or via a direct wired or wireless connection. The manufacturer enterprise system 1002 of the example of FIG. 10 includes an example network interface 1010, an example requirement determiner 1020, an example workload analyzer 1030, an example hardware analyzer 1040, an example hardware configurator 1050, an example hardware controller 1060, and an example datastore 1070. In this example, the datastore 1070 includes example workload data 1072, example hardware configuration(s) 1074, example telemetry data 1076, and example machine-learning model(s) 1078.

In the illustrated example of FIG. 10, the manufacturer enterprise system 1002 includes the network interface 1010 to obtain information from and/or transmit information to the network 1006. In some examples, the network interface 1010 implements a web server that transmits the hardware configuration(s) 1074 to the hardware 1004 (e.g., via the network 1006). In some examples, the network interface 1010 implements a web server that receives telemetry data 1076 from the hardware 1004 (e.g., via the network 1006). In some examples, the hardware configuration(s) 1074 and/ or the telemetry data 1076 is/are formatted as HTTP message(s). However, any other message format and/or protocol may additionally or alternatively be used such as, for example, a file transfer protocol (FTP), a simple message transfer protocol (SMTP), an HTTP secure (HTTPS) protocol, etc.

The example network 1006 of the illustrated example of FIG. 10 is the Internet. However, the network 1006 may be implemented using any suitable wired and/or wireless network(s) including, for example, one or more data buses, one or more Local Area Networks (LANs), one or more wireless LANs, one or more cellular networks, one or more private networks, one or more public networks, etc. The network 1006 enables the manufacturer enterprise system 1002 to be in communication with the hardware 1004. In some examples, the hardware 1004 may be implemented by one or more hardware platforms, such as the single socket optimized hardware platform 608 of FIG. 6, the dual socket optimized hardware platform 612 of FIG. 6, the 5G vRAN DU 800 of FIG. 8, the 5G core server 900 of FIG. 9, etc., and/or a combination thereof. In some examples, the hardware 1004 includes one or more programmable processors, such as the one-socket workload optimized processor 606, the two-socket workload optimized processor 608 of FIG. 6, the multi-core CPU 802 of FIG. 8, the multi-core CPU 902 of FIG. 9, etc., and/or a combination thereof.

In the illustrated example of FIG. 10, the manufacturer enterprise system 1002 includes the requirement determiner 1020 to obtain customer requirement(s) associated with application(s). For example, the application may be a wired or wireless networking workload to implement and/or otherwise execute vRAN, vBNG, vEPC, vCMTS, 4G EPC, 5G UPF, media encoding, edge, and/or cloud application workloads. In some examples, the requirement determiner 1020 may obtain the customer requirements from an external computing system (e.g., one or more servers, a user interface accessed by a customer, etc.). In some examples, the requirement determiner 1020 identifies at least one of a network node location in which the hardware 1004 is to execute a workload, a latency threshold, a power consumption threshold, or a throughput threshold associated with a workload based on the customer requirements.

In some examples, the requirement determiner 1020 determines that the customer requirements includes a workload. For example, the requirement determiner 1020 may determine that the customer requirements includes an executable file, high-level language source code, machine readable instructions, etc., that, when executed, implements a workload to be executed by the hardware 1004. In some examples, the requirement determiner 1020 determines and/or otherwise identifies type(s) of instructions to implement the workload, the customer requirements, etc. For example, the requirement determiner 1020 may identify which of the instructions 804, 806, 808 may be utilized to optimize and/or otherwise improve execution of the workload. In some examples, the requirement determiner 1020 may select which of the identified instructions to load onto the hardware 1004 to execute the workload.

In some examples, the requirement determiner 1020 implements example means for identifying at least one of a network node location of processor circuitry, a latency threshold associated with the workload, a power consumption threshold associated with the workload, or a throughput threshold associated with the workload. In some examples, the means for identifying the at least one of the latency threshold, the power consumption threshold, or the throughput threshold is based on requirements associated with the execution of the workload. For example, the means for identifying may be implemented by executable instructions such as that implemented by at least blocks 3304 and 3306 of FIG. 33, block 3402 of FIG. 34, and/or blocks 3602 and 3616 of FIG. 36. In some examples, the executable instructions of blocks 3304 and 3306 of FIG. 33, block 3402 of FIG. 34, and/or blocks 3602 and 3616 of FIG. 36 may be executed on at least one processor such as the example processor 4415, 4438, 4470, 4480, of FIG. 44, the example processor 4552 of FIG. 45, the example processor 4712 of FIG. 47, the example GPU 4740 of FIG. 47, the example vision processing unit 4742 of FIG. 47, and/or the example neural network processor 4744 of FIG. 47. In other examples, the means for identifying is implemented by hardware logic, hardware implemented state machines, logic circuitry, and/or any other combination of hardware, software, and/or firmware. For example, the means for identifying may be implemented by at least one hardware circuit (e.g., discrete and/or integrated analog and/or digital circuitry, a general purpose programmable processor, an FPGA, a PLD, a FPLD, an ASIC, a comparator, an operational-amplifier (op-amp), a logic circuit, etc.) structured to perform the corresponding operation without executing software or firmware, but other structures are likewise appropriate.

In the illustrated example of FIG. 10, the manufacturer enterprise system 1002 includes the workload analyzer 1030 to analyze a workload to be executed by the hardware 1004. In some examples, the workload analyzer 1030 executes a machine-learning model, such as one(s) of the machine-learning model(s) 1078, to identify at least one of a latency threshold, a power consumption threshold, or a throughput threshold associated with the workload. Many different types of machine learning models and/or machine learning architectures exist. In examples described herein, a neural network model may be used. Using a neural network model enables the workload analysis to classify activity of a processor, determine a probability representative of whether the activity is optimized for a given workload, and/or determine adjustment(s) to a configuration of one or more hardware cores and/or, more generally, the hardware 1004, based on at least one of the classification or the probability. In general, machine learning models/architectures that are suitable to use in the example approaches described herein include recurrent neural networks. However, other types of machine learning models could additionally or alternatively be used such as supervised learning artificial neural network models. Example supervised learning artificial neural network models can include two-layer (2-layer) radial basis neural networks (RBN), learning vector quantization (LVQ) classification neural networks, etc. For example, the machine-learning model(s) 1078 may be implemented by a neural network (e.g., a recurrent neural network, an artificial neural network, etc.) as described above.

In general, implementing a ML/AI system involves two phases, a learning/training phase and an inference phase. In the learning/training phase, a training algorithm is used to train the machine-learning model(s) 1078 to operate in accordance with patterns and/or associations based on, for example, training data. In general, the machine-learning model(s) 1078 include(s) internal parameters that guide how input data is transformed into output data, such as through a series of nodes and connections within the machine-learning model(s) 1078 to transform input data into output data. Additionally, hyperparameters are used as part of the training process to control how the learning is performed (e.g., a learning rate, a number of layers to be used in the machine-learning model(s) 1078, etc.). Hyperparameters are defined to be model hyperparameters that are determined prior to initiating the training process.

Different types of training may be performed based on the type of ML/AI model and/or the expected output. For example, supervised training uses inputs and corresponding expected (e.g., labeled) outputs to select parameters (e.g., by iterating over combinations of select parameters) for the machine-learning model(s) 1078 that reduce model error. As used herein, labelling refers to an expected output of the machine-learning model(s) 1078 (e.g., a classification, an expected output value, etc.). Alternatively, unsupervised training (e.g., used in deep learning, a subset of machine learning, etc.) involves inferring patterns from inputs to select parameters for the machine-learning model(s) 1078 (e.g., without the benefit of expected (e.g., labeled) outputs).

In examples described herein, ML/AI models, such as the machine-learning model(s) 1078, can be trained using stochastic gradient descent. However, any other training algorithm may additionally or alternatively be used. In examples described herein, training can be performed until the level of error is no longer reducing. In examples described herein, training can be performed locally on a computing system and/or remotely at an external computing system communicatively coupled to the computing system. For example, the workload analyzer 1030, and/or, more generally, the manufacturer enterprise system 1002 may train the machine-learning model(s) 1078 or obtain already trained or partially trained one(s) of the machine-learning model(s) 1078 from an external computing system via the network 1006. Training is performed using hyperparameters that control how the learning is performed (e.g., a learning rate, a number of layers to be used in the machine-learning model(s) 1078, etc.).

In examples described herein, hyperparameters that control model performance and training speed are the learning rate and regularization parameter(s). Such hyperparameters are selected by, for example, trial and error to reach an optimal model performance. In some examples, Bayesian hyperparameter optimization is utilized to determine an optimal and/or otherwise improved or more efficient network architecture to avoid model overfitting and improve the overall applicability of the machine-learning model(s) 1078. In some examples, re-training may be performed. Such re-training may be performed in response to override(s) to model-determined processor adjustment(s) by a user, a computing system, etc.

Training is performed using training data. In examples described herein, the training data originates from locally generated data, such as utilization data from the processor or different processor(s). For example, the training data may be implemented by the workload data 1072, the hardware configuration(s) 1074, the telemetry data 1076, or any other data. In some described examples where supervised training is used, the training data is labeled. Labeling is applied to the training data by a user manually or by an automated data pre-processing system. In some examples, the training data is pre-processed. In some examples, the training data is sub-divided into a first portion of data for training the machine-learning model(s) 1078, and a second portion of data for validating the machine-learning model(s) 1078.

Once training is complete, the machine-learning model(s) 1078 is deployed for use as an executable construct that processes an input and provides an output based on the network of nodes and connections defined in the machine-learning model(s) 1078. The machine-learning model(s) 1078 is stored in the datastore 1070 as the machine-learning model(s) 1078 or in a database of a remote computing system that may be accessible via the network 1006. The machine-learning model(s) 1078 may then be executed by the analyzed processor when deployed in a multi-core computing environment, or processor(s) that manage the multi-core computing environment. For example, one(s) of the machine-learning model(s) 1078 may be deployed to the hardware 1004 for execution by the hardware 1004.

Once trained, the deployed machine-learning model(s) 1078 may be operated in an inference phase to process data. In the inference phase, data to be analyzed (e.g., live data) is input to the machine-learning model(s) 1078, and the machine-learning model(s) 1078 execute(s) to create an output. This inference phase can be thought of as the AI "thinking" to generate the output based on what it learned from the training (e.g., by executing the machine-learning model(s) 1078 to apply the learned patterns and/or associations to the live data). In some examples, input data undergoes pre-processing before being used as an input to the machine-learning model(s) 1078. Moreover, in some examples, the output data may undergo post-processing after it is generated by the machine-learning model(s) 1078 to transform the output into a useful result (e.g., a display of data, an instruction to be executed by a machine, etc.).

In some examples, output of the deployed machine-learning model(s) 1078 may be captured and provided as feedback. By analyzing the feedback, an accuracy of the deployed machine-learning model(s) 1078 can be determined. If the feedback indicates that the accuracy of the deployed machine-learning model(s) 1078 is less than a threshold or other criterion, training of an updated machine-learning model(s) 1078 can be triggered using the feedback and an updated training data set, hyperparameters, etc., to generate an updated, deployed machine-learning model(s) 1078. In some examples, the deployed machine-learning model(s) 1078 may obtain customer requirements, such as a network node location, throughput requirements, power requirements, and/or latency requirements. In some examples, the deployed machine-learning model(s) 1078 may generate an output including an application ratio associated with a workload that is optimized to satisfy the customer requirements. For example, the output may specify an operating frequency of a core, corresponding uncore logic, etc., that satisfies the customer requirements. In some examples, the application ratio is based on the operating frequency to execute the workload. In some examples, the deployed machine-learning model(s) 1078 may generate an output including a selection or identification of a type of instruction, such as which one(s) of the instructions 804, 806, 808 of FIG. 8, to execute a workload. Additionally or alternatively, the machine-learning model(s) 1078, when executed, may generate an output including an indication or identification of a type of the workload. For example, the machine-learning model(s) 1078 may output an identification of the workload as an artificial intelligence and/or machine learning model execution and/or computation workload, an IoT service workload, an autonomous driving computation workload, a UE workload, a V2V workload, a V2X workload, a video surveillance monitoring workload, a real time data analytics workload, delivering and/or encoding media stream workload, a measuring advertisement impression rate workload, an object detection in media stream workload, a speech analytic workload, an asset and/or inventory management workload, a virtual reality workload, and/or an augmented reality processing workload. Advantageously, the workload analyzer 1030 as described herein may determine an application ratio based on the identification of the workload to execute the workload with increased performance and/or reduced latency.

In some examples, the workload analyzer 1030 executes an application(s) representative of a workload (e.g., a computing workload, a network workload, etc.) on the hardware 1004 to optimize and/or otherwise improve execution of the workload by the hardware 1004. In some examples, the workload analyzer 1030 determines application ratio(s) associated with the workload. For example, the requirement determiner 1020 can obtain a workload to process and store the workload as the workload data 1072. In some examples, the workload analyzer 1030 executes the machine-learning model(s) 1078 to identify threshold(s) (e.g., a latency threshold, a power consumption threshold, a throughput threshold, etc.) associated with the workload. The workload analyzer 1030 may deploy the workload to the hardware 1004 to execute the workload. The workload analyzer 1030 may determine workload parameters based on the execution. For example, the workload analyzer 1030 may determine a latency, a power consumption, a throughput, etc., of the hardware 1004 in response to the hardware 1004 executing the workload or portion(s) thereof. Additionally or alternatively, the hardware configurator 1050 may determine the workload parameters based on the execution.

In some examples, the workload analyzer 1030 determines whether one(s) of the threshold(s) have been satisfied. For example, the workload analyzer 1030 may determine a latency associated with one or more cores of the hardware 1004, compare the latency to the latency threshold, and determine whether the latency satisfies the latency threshold (e.g., the latency is greater than the latency threshold, is less than the latency threshold, etc.) based on the comparison.

In some examples, in response to determining that one or more of the thresholds have not been satisfied, the workload analyzer 1030 may execute the machine-learning model(s) 1078 to determine an adjustment, such as a change in operating frequency, of the hardware 1004. For example, the workload analyzer 1030 may select another operating frequency to process. In some examples, in response to determining that one or more of the thresholds have been satisfied, the workload analyzer 1030 may determine an application ratio based on the workload parameters. For example, the workload analyzer 1030 may determine the application ratio based on the operating frequency utilized to achieve the workload parameters. In some examples, the workload analyzer 1030 associates the workload parameter(s) with the application ratio and stores the association as the hardware configuration(s) 1074. In some examples, the workload analyzer 1030 associates an instruction invoked to execute the workload with the application ratio and stores the association as the hardware configuration(s) 1074.

In some examples, the workload analyzer 1030 implements example means for determining an application ratio associated with a workload, and the application ratio to be based on an operating frequency to execute the workload. For example, the means for determining the application ratio may be implemented by executable instructions such as that implemented by at least block 3306 of FIG. 33, block 3404 of FIG. 34, blocks 3502, 3504, 3512, 3514, 3516, 3518, and 3520 of FIG. 35, blocks 3612, 3614, 3616, and 3620 of FIG. 36, and/or blocks 3702 and 3704 of FIG. 37. In some examples, the executable instructions of block 3306 of FIG. 33, block 3404 of FIG. 34, blocks 3502, 3504, 3512, 3514, 3516, 3518, and 3520 of FIG. 35, blocks 3612, 3614, 3616, and 3620 of FIG. 36, and/or blocks 3702 and 3704 of FIG. 37 may be executed on at least one processor such as the example processor 4415, 4438, 4470, 4480, of FIG. 44, the example processor 4552 of FIG. 45, the example processor 4712 of FIG. 47, the example GPU 4740 of FIG. 47, the example vision processing unit 4742 of FIG. 47, and/or the example neural network processor 4744 of FIG. 47. In other examples, the means for determining the application ratio is implemented by hardware logic, hardware implemented state machines, logic circuitry, and/or any other combination of hardware, software, and/or firmware. For example, the means for determining may be implemented by at least one hardware circuit (e.g., discrete and/or integrated analog and/or digital circuitry, a general purpose programmable processor, an FPGA, a PLD, a FPLD, an ASIC, a comparator, an operational-amplifier (op-amp), a logic circuit, etc.) structured to perform the corresponding operation without executing software or firmware, but other structures are likewise appropriate.

In some examples, the means for determining is to execute a machine-learning model to identify at least one of a latency threshold, a power consumption threshold, or a throughput threshold associated with the workload. In some examples, the means for determining is to, during execution of the workload at the operating frequency, determine whether the at least one of the latency threshold, the power consumption threshold, or the throughput threshold is satisfied. In some examples, the means for determining is to, in response to a determination that at least one of the latency threshold, the power consumption threshold, or the throughput threshold is satisfied, store a value in processor circuitry, the value indicative of an association between the processor circuitry and the application ratio.

In some examples in which the application ratio is a first application ratio and the operating frequency is a first operating frequency, the means for determining is to, in response to execution of the workload at a second operating frequency based on a second application ratio, determine whether the at least one of the latency threshold, the power consumption threshold, or the throughput threshold is satisfied. In some examples, the means for determining is to, in response to a determination that at least one of the latency threshold, the power consumption threshold, or the throughput threshold is satisfied, modify the value in the processor circuitry to be indicative of an association between the processor circuitry, the first application ratio, and the second application ratio, at least one of the first application ratio or the second application ratio disabled until enabled by a license. In some examples, the means for determining is to determine a second application ratio associated with a second workload.

In some examples, the means for determining is to, during the execution of the workload, determine at least one of a latency of the processor circuitry, a power consumption of the processor circuitry, or a throughput of the processor circuitry. In some examples, the means for determining is to compare the at least one of the latency, the power consumption, or the throughput to a respective one of the latency threshold, the power consumption threshold, or the throughput threshold. In some examples, the means for determining is to, in response to the respective one of the latency threshold, the power consumption threshold, or the throughput threshold being satisfied, adjust the application ratio. In some examples, the means for determining is to associate the application ratio with at least one of the network node location, the latency, the power consumption, or the throughput. In some examples, the means for determining is to determine one or more workload parameters in response to the execution of the workload.

In the illustrated example of FIG. 10, the manufacturer enterprise system 1002 includes the hardware analyzer 1040 to identify multi-SKU processor(s) to support workload optimization(s). In some examples, such as in HVM, one or more processor(s), one or more servers, one or more semiconductor fabrication machines, etc., can be used to fabricate semiconductor wafer(s) on which are multi-core processor(s), that may be used to implement the hardware 1004. In some examples, the hardware analyzer 1040 may be implemented by semiconductor device inspection machines (e.g., electron beam inspection equipment or machines, laser inspection equipment or machines, etc.) to determine characteristic(s) of the hardware 1004. For example, the hardware analyzer 1040 may be implemented by the one or more semiconductor device inspection machines determining a guaranteed operating frequency at one or more temperature points associated with the hardware 1004.

In some examples, the hardware analyzer 1040 measures and/or otherwise determines parameters of the hardware 1004 in response to the hardware 1004 executing the workload. For example, the hardware analyzer 1040 can determine the amount of power consumed by at least one of one or more cores or uncore logic of the hardware 1004. In some examples, the hardware analyzer 1040 determines a throughput of at least one of one or more cores or uncore logic of the hardware 1004.

In some examples, the hardware analyzer 1040 identifies the hardware 1004 as a multi-SKU processor based on characteristic(s) supporting the configuration(s). For example, the hardware analyzer 1040 can identify the hardware 1004 as a multi-SKU processor if the hardware 1004 can operate according to configuration(s) that satisfy customer requirements and/or, more generally, to support multiple application ratios. In some examples, the hardware analyzer 1040 defines software silicon features for enabling software activation of the multiple application ratios. In some examples, the hardware analyzer 1040 identifies the hardware 1004 as a non-multi-SKU processor based on characteristic(s) that do not support the configuration(s). For example, the hardware analyzer 1040 can identify the hardware 1004 as a non-multi-SKU processor if the hardware 1004 cannot support multiple application ratios.

In some examples, the hardware analyzer 1040 implements example means for determining whether processor circuitry supports an application ratio of the workload based on whether at least one of (i) a first operating frequency of the processor circuitry corresponds to a second operating frequency associated with the application ratio or (ii) a first thermal design profile of the processor circuitry corresponds to a second thermal design profile associated with the application ratio. For example, the means for determining whether the processor circuitry supports the application ratio may be implemented by executable instructions such as that implemented by at least blocks 3314, 3316, 3318, and 3320 of FIG. 33, blocks 3406 and 3408 of FIG. 34, blocks 3608 and 3610 of FIG. 36, blocks 3706, 3708, and 3710 of FIG. 37, and/or blocks 3802, 3804, 3806, 3808, 3810, 3812, 3814 and 3818 of FIG. 38. In some examples, the executable instructions of blocks 3314, 3316, 3318, and 3320 of FIG. 33, blocks 3406 and 3408 of FIG. 34, blocks 3608 and 3610 of FIG. 36, blocks 3706, 3708, and 3710 of FIG. 37, and/or blocks 3802, 3804, 3806, 3808, 3810, 3812, 3814 and 3818 of FIG. 38 may be executed on at least one processor such as the example processor 4415, 4438, 4470, 4480, of FIG. 44, the example processor 4552 of FIG. 45, the example processor 4712 of FIG. 47, the example GPU 4740 of FIG. 47, the example vision processing unit 4742 of FIG. 47, and/or the example neural network processor 4744 of FIG. 47. In other examples, the means for determining whether the processor circuitry supports the application ratio is implemented by hardware logic, hardware implemented state machines, logic circuitry, and/or any other combination of hardware, software, and/or firmware. For example, the means for determining may be implemented by at least one hardware circuit (e.g., discrete and/or integrated analog and/or digital circuitry, a general purpose programmable processor, an FPGA, a PLD, a FPLD, an ASIC, a comparator, an operational-amplifier (op-amp), a logic circuit, etc.) structured to perform the corresponding operation without executing software or firmware, but other structures are likewise appropriate.

In some examples, the means for determining is to determine one or more electrical characteristics of the processor circuitry, the one or more electrical characteristics including the first operating frequency, the first operating frequency associated with a first temperature point. In some examples, the means for determining is to identify the processor circuitry as capable of applying a configuration based on the application ratio to the least one of (i) one or more cores of the processor circuitry based on the application ratio or (ii) uncore logic based on the one or more electrical characteristics. In some examples in which the application ratio is a first application ratio, the workload is a first workload, the one or more cores includes a first core, the means for determining is to determine that the processor circuitry supports a second application ratio of a second workload. In some examples in which the application ratio is a first application ratio, the means for determining is to identify the processor circuitry as capable of applying a configuration based on the first application ratio or a second application ratio to the least one of (i) one or more cores of the processor circuitry based on the application ratio or (ii) uncore logic.

In the illustrated example of FIG. 10, the manufacturer enterprise system 1002 includes the hardware configurator 1050 to facilitate configuration of the hardware 1004 to effectuate optimized execution of network workloads. In some examples, the hardware configurator 1050 adjusts configuration(s) of the hardware 1004 to optimize execution of an application. For example, the hardware configurator 1050 can adjust an operating frequency of a core, an uncore, etc., of the hardware 1004 based on an application ratio. In some examples, the hardware configurator 1050 identifies configuration(s) that satisfy customer requirements and optimize execution of the application. For example, the hardware configurator 1050 can identify an operating frequency of one or more cores, one or more uncores, etc., that satisfy a latency threshold, a power consumption threshold, a throughput threshold, etc., specified and/or otherwise indicated by customer requirements. In some examples, the hardware configurator 1050 deploys the hardware 1004 to a multi-core computing environment. For example, the hardware configurator 1050 may identify the hardware 1004 for deployment to the multi-core computing environment 100 of FIG. 1.

In some examples, the hardware configurator 1050 implements example means for configuring, before execution of the workload, at least one of (i) one or more cores of processor circuitry based on the application ratio or (ii) uncore logic of the processor circuitry based on the application ratio. For example, the means for configuring the at least one of (i) the one or more cores of the processor circuitry based on the application ratio or (ii) the uncore logic of the processor circuitry based on the application ratio may be implemented by executable instructions such as that implemented by at least blocks 3308, 3310, 3324 of FIG. 33, blocks 3410, 3412, and 3416 of FIG. 34, blocks 3506, 3510, 3516, and 3518 of FIG. 35, blocks 3604, 3608, 3610, and 3620 of FIG. 36, and/or block 3712 of FIG. 37. In some examples, the executable instructions of blocks 3308, 3310, 3324 of FIG. 33, blocks 3410, 3412, and 3416 of FIG. 34, blocks 3506, 3510, 3516, and 3518 of FIG. 35, blocks 3604, 3608, 3610, and 3620 of FIG. 36, and/or block 3712 of FIG. 37 may be executed on at least one processor such as the example processor 4415, 4438, 4470, 4480, of FIG. 44, the example processor 4552 of FIG. 45, the example processor 4712 of FIG. 47, the example GPU 4740 of FIG. 47, the example vision processing unit 4742 of FIG. 47, and/or the example neural network processor 4744 of FIG. 47. In other examples, the means for configuring the at least one of (i) the one or more cores of the processor circuitry or (ii) the uncore of the processor circuitry is implemented by hardware logic, hardware implemented state machines, logic circuitry, and/or any other combination of hardware, software, and/or firmware. For example, the means for configuring may be implemented by at least one hardware circuit (e.g., discrete and/or integrated analog and/or digital circuitry, a general purpose programmable processor, an FPGA, a PLD, a FPLD, an ASIC, a comparator, an operational-amplifier (op-amp), a logic circuit, etc.) structured to perform the corresponding operation without executing software or firmware, but other structures are likewise appropriate.

In some examples, the means for configuring is to configure the at least one of the one or more cores or the uncore logic in response to a determination that the application ratio is included in a set of application ratios of the processor circuitry. In some examples in which the workload is a first workload, the application ratio is a first application ratio, the one or more cores are one or more first cores, and the uncore logic is first uncore logic, the means for configuring is to configure, before execution of the second workload, at least one of (i) one or more second cores of the processor circuitry based on the second application ratio or (ii) second uncore logic of the processor circuitry based on the second application ratio.

In some examples in which the operating frequency is a first operating frequency, the means for configuring is to, in response to execution of the workload with a first type of instruction, determine a first power consumption based on operation of the processor circuitry at the first operating frequency, the first operating frequency associated with the first type, and, in response to execution of the workload with a second type of instruction, determine a second power consumption based on operation of the processor circuitry at a second operating frequency associated with the second type. In some examples, in response to the second power consumption satisfying a power consumption threshold, the means for determining (as described above) is to associate the second operating frequency with the workload.

In some examples in which the operating frequency is a first operating frequency, the means for configuring is to, in response to execution of the workload with a first type of instruction, determine a first throughput of the processor circuitry based on operation of the processor circuitry at the first operating frequency, the first operating frequency associated with the first type, and, in response to execution of the workload with a second type of instruction, determining a second throughput of the processor circuitry based on operation of the processor circuitry at a second operating frequency associated with the second type. In some examples, in response to the second throughput satisfying a throughput threshold, the means for determining (as described above) is to associate the second operating frequency with the workload.

In some examples, the means for configuring, in response to determining the processor circuitry supports the application ratio and before execution of the workload, is to configure at least one of (i) one or more cores of the processor circuitry based on the application ratio or (ii) uncore logic of the processor circuitry based on the application ratio. In some examples, the means for configuring is to determine a configuration of the least one of (i) one or more cores of the processor circuitry based on the application ratio or (ii) uncore logic of the processor circuitry based on the one or more workload parameters, the configuration to at least one of increase performance of the processor circuitry or reduce latency of the processor circuitry.

In some examples in which processor circuitry includes a first core, the means for configuring is to store first information accessible by the processor circuitry, the first information associating a first type of machine readable instruction with the workload, and, in response to identifying an instruction to be loaded by the first core is of the first type, configure the first core based on the application ratio. In some examples in which the application ratio is a first application ratio, the workload is a first workload, and the processor circuitry includes one or more cores including a first core, the means for configuring is to store second information accessible by the processor circuitry, the second information associating a second type of machine readable instruction with the second workload, and, in response to identifying the instruction to be loaded by the first core is of the second type, configure the first core based on the second application ratio.

In some examples in which the workload is a fifth-generation (5G) mobile network workload, the means for configuring is to, in response to the processor circuitry executing the 5G mobile network workload associated with an edge network, configure the processor circuitry to implement a virtual radio access network based on the application ratio. In some examples in which the workload is a fifth-generation (5G) mobile network workload, the means for configuring is to, in response to the processor circuitry executing the 5G mobile network workload associated with a core network, configure the processor circuitry to implement a core server based on the application ratio.

In some examples in which the application ratio is a first application ratio, the means for configuring is to configure the processor circuitry to have a first software silicon feature to control activation of the first application ratio and a second software silicon feature to control activation of the second application ratio, before deploying the processor circuitry to the edge network, activate the first software silicon feature and disabling the second software silicon feature, and after deploying the processor circuitry to the edge network, disable the first software silicon feature and enabling the second software silicon feature.

In the illustrated example of FIG. 10, the manufacturer enterprise system 1002 includes the hardware controller 1060 to load instruction(s) on core(s), uncore(s), etc., of the hardware 1004. For example, the hardware controller 1060 may identify an instruction to be loaded by a core of the hardware 1004 based on the workload. In some examples, the hardware configurator 1050 and/or the hardware controller 1060 changes a stored configuration of the core, the uncore, etc., based on the instruction. For example, the hardware configurator 1050 and/or the hardware controller 1060 may select a stored configuration in the hardware 1004 that corresponds to the instruction. In some examples, hardware configurator 1050 and/or the hardware controller 1060 may select the stored configuration based on an association between the stored configuration and the instruction stored as the hardware configuration(s) 1074. In some examples, the hardware configurator 1050 and/or the hardware controller 1060 configures the core, the uncore, etc., to adjust a guaranteed operating frequency for optimized application execution. For example, the hardware configurator 1050 and/or the hardware controller 1060 may change an operating frequency of the core, the uncore, etc., may be changed in response to the instruction to be loaded by the core for execution. Advantageously, the hardware controller 1060 may execute workload(s) on a per-core basis based on the configuration(s) for increased performance. For example, the hardware configurator 1050 and/or the hardware controller 1060 may monitor the hardware 1004 to determine whether to adjust an application ratio of at least one of the one or more cores or uncore logic based on the workload.

In some examples, the hardware controller 1060 implements example means for initiating the execution of a workload with at least one of one or more cores of processor circuitry or uncore logic of the processor circuitry. For example, the means for initiating the execution of the workload may be implemented by executable instructions such as that implemented by at least blocks 3326, 3328, and 3330 of FIG. 33, blocks 3414 and 3418 of FIG. 34, block 3508 of FIG. 35, and/or block 3606 of FIG. 36. In some examples, the executable instructions of blocks 3326, 3328, and 3330 of FIG. 33, blocks 3414 and 3418 of FIG. 34, block 3508 of FIG. 35, and/or block 3606 of FIG. 36 may be executed on at least one processor such as the example processor 4415, 4438, 4470, 4480, of FIG. 44, the example processor 4552 of FIG. 45, the example processor 4712 of FIG. 47, the example GPU 4740 of FIG. 47, the example vision processing unit 4742 of FIG. 47, and/or the example neural network processor 4744 of FIG. 47. In other examples, the means for initiating the execution of the workload is implemented by hardware logic, hardware implemented state machines, logic circuitry, and/or any other combination of hardware, software, and/or firmware. For example, the means for initiating may be implemented by at least one hardware circuit (e.g., discrete and/or integrated analog and/or digital circuitry, a general purpose programmable processor, an FPGA, a PLD, a FPLD, an ASIC, a comparator, an operational-amplifier (op-amp), a logic circuit, etc.) structured to perform the corresponding operation without executing software or firmware, but other structures are likewise appropriate.

In some examples in which the workload is a first workload, the application ratio is a first application ratio, the one or more cores are one or more first cores, and the uncore logic is first uncore logic, the means for initiating is to initiate the execution of the second workload with the at least one of the one or more second cores or the second uncore logic, a first portion of the first workload to be executed while a second portion of the second workload is executed.

In the illustrated example of FIG. 10, the manufacturer enterprise system 1002 includes the datastore 1070 to record data, such as the workload data 1072, the hardware configuration(s) 1074, the telemetry data 1076, the machine-learning model(s) 1078, etc. The datastore 1070 may be implemented by a volatile memory (e.g., a Synchronous Dynamic Random Access Memory (SDRAM), Dynamic Random Access Memory (DRAM), RAMBUS Dynamic Random Access Memory (RDRAM), etc.) and/or a non-volatile memory (e.g., flash memory). The datastore 1070 may additionally or alternatively be implemented by one or more double data rate (DDR) memories, such as DDR, DDR2, DDR3, DDR4, mobile DDR (mDDR), etc. The datastore 1070 may additionally or alternatively be implemented by one or more mass storage devices such as hard disk drive(s) (HDD(s)), CD drive(s), digital versatile disk (DVD) drive(s), solid-state disk drive(s), etc. While in the illustrated example the datastore 1070 is illustrated as a single datastore, the datastore 1070 may be implemented by any number and/or type(s) of datastores. Furthermore, the data stored in the datastore 1070 may be in any data format such as, for example, binary data, comma delimited data, tab delimited data, structured query language (SQL) structures, etc.

In some examples, the workload data 1072 may be implemented by a workload, an application, etc., to be executed by the hardware 1004. For example, the workload data 1072 may be one or more executable files representative of a workload to be executed by the hardware 1004. In some examples, the workload data 1072 includes workload parameters associated with a workload such as latency, power consumption, and/or throughput thresholds.

In the illustrated example of FIG. 10, the hardware configuration(s) 1074 may be implemented by core and/or uncore operating frequencies, frequency and temperature pairs, P-states, register values, etc., and/or a combination thereof. In the illustrated example of FIG. 10, the telemetry data 1076 may be implemented by activity data, utilization data, etc., of the hardware 1004. For example, the telemetry data 1076 can include a dynamic capacitance value associated with one or more cores, uncores, etc., of the hardware 1004. In some examples, the telemetry data 1076 can include a utilization of one or more cores, uncores, memory, etc., of the hardware 1004. In some examples, the telemetry data 1076 can include the amount of power consumed on a per-core, per-uncore, and/or per hardware 1004 basis. In the illustrated example of FIG. 10, the machine-learning model(s) 1078 may be implemented by one or more ML/AI models. For example, one(s) of the machine-learning model(s) 1078 may be implemented by a neural network or any other type of ML/AI model.

While an example manner of implementing the manufacturer enterprise system 1002 is illustrated in FIG. 10, one or more of the elements, processes and/or devices illustrated in FIG. 10 may be combined, divided, re-arranged, omitted, eliminated and/or implemented in any other way. Further, the example network interface 1010, the example requirement determiner 1020, the example workload analyzer 1030, the example hardware analyzer 1040, the example hardware configurator 1050, the example hardware controller 1060, the example datastore 1070, the example workload data 1072, the example hardware configuration(s) 1074, the example telemetry data 1076, the example machine-learning model(s) 1078, and/or, more generally, the example manufacturer enterprise system 1002 of FIG. 10 may be implemented by hardware, software, firmware and/or any combination of hardware, software and/or firmware. Thus, for example, any of the example network interface 1010, the example requirement determiner 1020, the example workload analyzer 1030, the example hardware analyzer 1040, the example hardware configurator 1050, the example hardware controller 1060, the example datastore 1070, the example workload data 1072, the example hardware configuration(s) 1074, the example telemetry data 1076, the example machine-learning model(s) 1078, and/or, more generally, the example manufacturer enterprise system 1002 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example network interface 1010, the example requirement determiner 1020, the example workload analyzer 1030, the example hardware analyzer 1040, the example hardware configurator 1050, the example hardware controller 1060, the example datastore 1070, the example workload data 1072, the example hardware configuration(s) 1074, the example telemetry data 1076, and/or the example machine-learning model(s) 1078 is/are hereby expressly defined to include a non-transitory computer readable storage device or storage disk such as a memory, a DVD, a CD, a Blu-ray disk, etc. including the software and/or firmware. Further still, the example manufacturer enterprise system 1002 of FIG. 10 may include one or more elements, processes and/or devices in addition to, or instead of, those illustrated in FIG. 10, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 11:
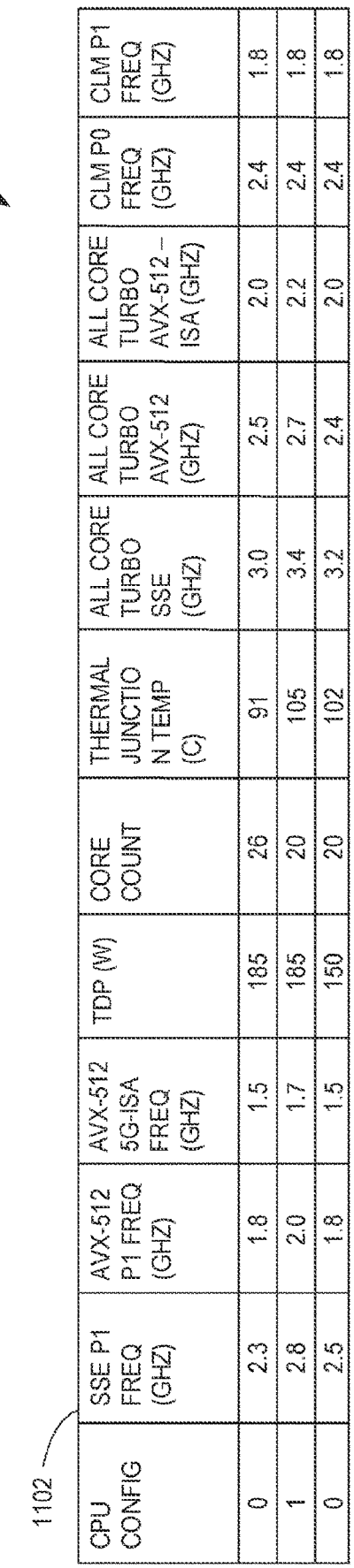
FIG. 11 is an illustration of example configurations that may be implemented by an example workload-adjustable CPU.

FIG. 11 is an illustration of example configuration information 1100 including example configurations 1102 that may be implemented by an example workload-adjustable CPU, such as the multi-core CPU 802 of FIG. 8, the multi-core CPU 902 of FIG. 9, and/or the hardware 1004 of FIG. 10. For example, the configurations 1102 may implement a persona or profile of the workload-adjustable CPU for optimized and/or otherwise improved execution of network workloads based on an application ratio. The configurations 1102 are processor configurations, such as CPU configurations, and include a first example configuration (CPU CONFIG 0), a second example configuration (CPU CONFIG 1), and a third example configuration (CPU CONFIG 2). Alternatively, there may be fewer or more configurations than depicted in the illustrated example of FIG. 11.

In the illustrated example of FIG. 11, each of the configurations 1102 has different guaranteed operating frequencies to be used to execute different types of instructions, which correspond to different network workloads. For example, CPU CONFIG 0 can have a guaranteed operating frequency of 2.3 GHz when executing SSE instructions when operating in the P1 state, a guaranteed operating frequency of 1.8 GHz when executing AVX-512 instructions when operating in the P1 state, and a guaranteed operating frequency of 1.5 GHz when executing AVX-512 5G-ISA instructions when operating in the P1 state. In this example, CPU CONFIG 0 has a TDP of 185 W, a core count of 26 (e.g., 26 cores to be enabled), and a thermal junction temperature of 91 degrees Centigrade. Further depicted in this example, CPU CONFIG 0 has a guaranteed operating frequency of 3.0 GHz for all cores (e.g., all 26 cores associated with the core count of 26) when executing SSE instructions (e.g., the first instructions 804 of FIG. 8) when operating in the turbo state or mode, a guaranteed operating frequency of 2.5 GHz for all cores when executing AVX-512 instructions (e.g., the second instructions 806 of FIG. 8) when operating in the turbo state or mode, and a guaranteed operating frequency of 2.0 GHz for all cores when executing AVX-512 5G-ISA instructions (e.g., the third instructions 808 of FIG. 8) when operating in the turbo state or mode.

In this example, CPU CONFIG 0 has a guaranteed operating frequency of 2.4 GHz for corresponding CLMs when operating in the P0 state (e.g., the turbo mode or state) and a guaranteed operating frequency of 1.8 GHz for corresponding CLMs when operating in the P1 mode. In some examples, the configuration information 1100 or portion(s) thereof are stored in a multi-core CPU. For example, the configuration information 1100 can be stored in NVM, ROM, etc., of the multi-core CPU, such as the multi-core CPU 802 of FIG. 8, the multi-core CPU 902 of FIG. 9, and/or the hardware 1004 of FIG. 10. In some examples, changing between ones of the configurations 1102 may include retrieving data stored in register(s) of the workload-adjustable CPU, and/or updating or modifying data stored in the register(s). For example, the multi-core CPU 802 of FIG. 8 may determine a first value indicative of CPU CONFIG 0 by retrieving the first value from a register. In some examples, the first multi-core CPU 230 can update the first value to a second value indicative of CPU CONFIG 1. In some examples, the multi-core CPU 802 can adjust and/or otherwise scale the SSE P1 frequency from 2.3 to 2.8 GHz, the AVX-512 P1 frequency from 1.5 to 1.7 GHz, etc., in response to the change in values of the register.

FIG. 12 is an illustration of an example static configuration 1200 of an example workload-adjustable CPU. In this example, the static configuration 1200 may be accessed and/or otherwise configured in BIOS of a multi-core CPU, such as the multi-core CPU 802 of FIG. 8, the multi-core CPU 902 of FIG. 9, the hardware 1004 of FIG. 10, etc. For example, dynamic speed select technology (SST) power profiles (PP) as provided by Intel® are disabled. In some examples, 16 cores of the multi-core CPU can be configured with a base configuration having a P1 ratio of 18 and a TDP of 185 W. In some examples, the static configuration 1200 may be implemented by the hardware configuration(s) 1074 of FIG. 10.

FIG. 13 is an illustration of an example dynamic configuration 1300 of an example workload-adjustable CPU. In this example, the dynamic configuration 1300 may be accessed and/or otherwise configured in BIOS of a multi-core CPU, such as the multi-core CPU 802 of FIG. 8, the multi-core CPU 902 of FIG. 9, the hardware 1004 of FIG. 10, etc. For example, dynamic SST-PP is enabled. In some examples, core(s) of the multi-core CPU can be configured on a per-core basis based on a first configuration (Base), a second configuration (Config 1), or a third configuration (Config 2) of the multi-core CPU. Advantageously, the multi-core CPU can configure the core(s) based on a workload to be executed by the core(s), which can be indicated by an instruction to be loaded on the core(s). In some examples, the dynamic configuration 1300 may be implemented by the hardware configuration(s) 1074 of FIG. 10.

Figure 14A:
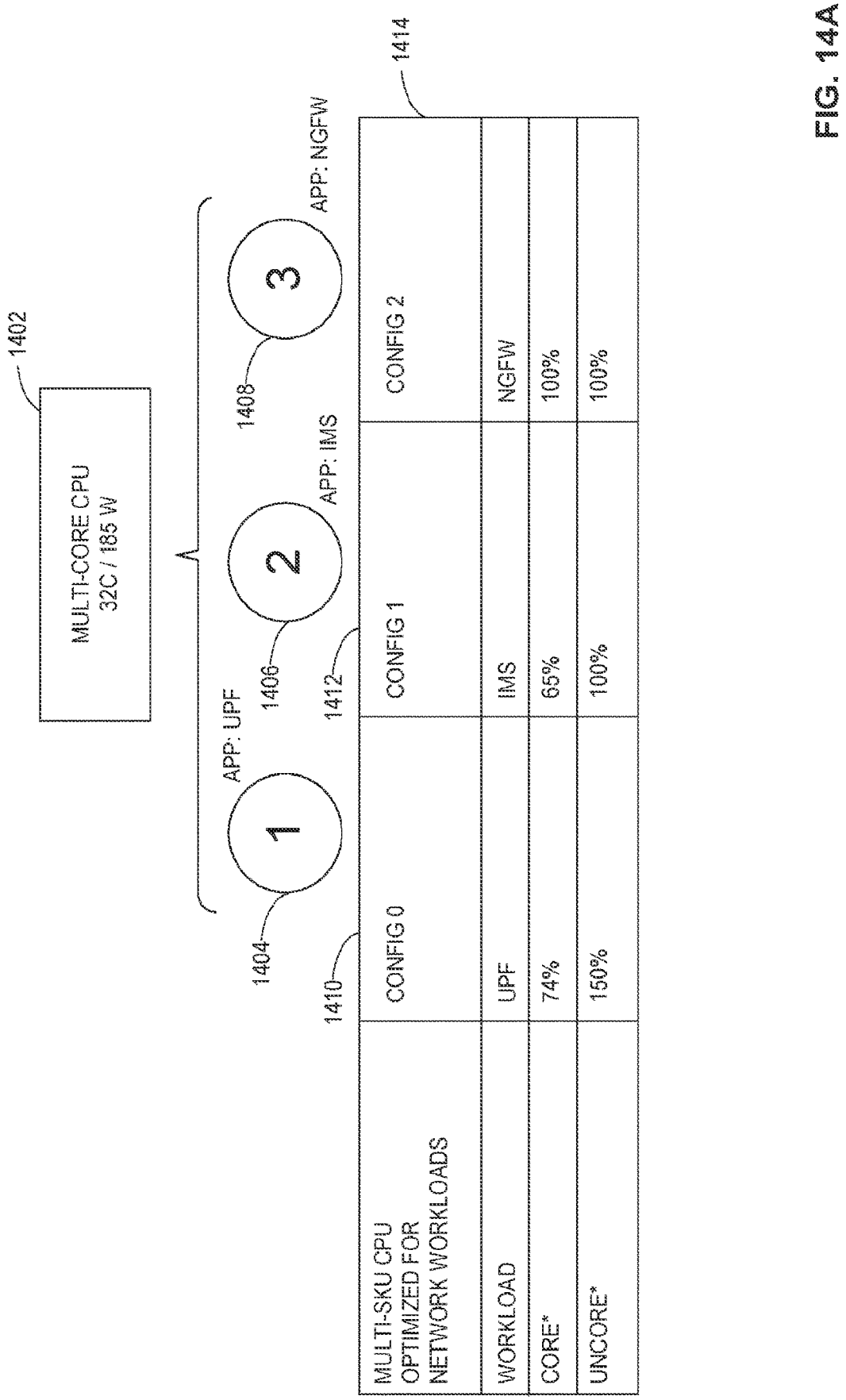

FIG. 14A is an illustration of example power adjustments to core(s) and uncore(s) of an example workload-adjustable CPU 1402 based on example workloads 1404, 1406, 1408. For example, the workload-adjustable CPU 1402 can be a multi-SKU CPU. In some examples, the workload-adjustable CPU 1402 can implement the multi-core CPU 802 of FIG. 8, the multi-core CPU 902 of FIG. 9, the hardware 1004 of FIG. 10, etc. In this example, the workloads 1404, 1406, 1408 include a first example workload 1404, a second example workload 1406, and a third example workload 1408. In this example, the first workload 1404 is a UPF application associated with effectuating a 5G network. In this example, the second workload 1406 is an IP Multimedia System Services (IMS) application. In this example, the third workload 1408 is a next generation firewall (NGFW) application.

In the illustrated example of FIG. 14A, in response to executing the first workload 1404, the workload-adjustable CPU 1402 can transition core(s) to a first example configuration (CONFIG 0) 1410. In this example, the first configuration 1410 includes configuring core(s) that execute the first workload 1404 with an application ratio of 0.74 (e.g., 74% of the Power Virus $C_{dyn}$ as computed for a processor core as described above) and configuring uncore(s) that correspond to the core(s) with an application ratio of 1.5 (e.g., 150% of the Power Virus $C_{dyn}$ as computed for uncore hardware as described above). Advantageously, in response to the uncore(s) being configured based on the application ratio of 1.5, their operating frequency can be increased to execute the first workload 1404 with increased throughput and/or reduced latency.

In the illustrated example of FIG. 14A, in response to executing the second workload 1406, the workload-adjustable CPU 1402 can transition core(s) to a second example configuration (CONFIG 1) 1412. In this example, the second configuration 1412 includes configuring core(s) that execute the second workload 1406 with an application ratio of 0.65 (e.g., 65% of the Power Virus $C_{dyn}$ as computed for a processor core as described above) and configuring uncore(s) that correspond to the core(s) with an application ratio of 1.0 (e.g., 100% of the Power Virus $C_{dyn}$ as computed for uncore hardware as described above). Advantageously, in response to the uncore(s) being configured based on the application ratio of 1.0, their operating frequency can be increased to execute the second workload 1406 with increased throughput and/or reduced latency.

In the illustrated example of FIG. 14A, in response to executing the third workload 1408, the workload-adjustable CPU 1402 can transition core(s) to a third example configuration (CONFIG 2) 1414. In this example, the third configuration 1414 includes configuring core(s) that execute the first workload 1404 with an application ratio of 1.0 (e.g., 100% of the Power Virus $C_{dyn}$ as computed for a processor core as described above) and configuring uncore(s) that correspond to the core(s) with an application ratio of 1.0 (e.g., 100% of the Power Virus $C_{dyn}$ as computed for uncore hardware described above). Advantageously, in response to the uncore(s) being configured based on the application ratio of 1.0, their operating frequency can be increased to execute the third workload 1414 with increased throughput and/or reduced latency. In some examples, the first configuration 1410, the second configuration 1412, and/or the third configuration 1414 may be implemented by the hardware configuration(s) 1074 of FIG. 10.

Advantageously, the workload-adjustable CPU 1402 can configure one(s) of the 32 cores on a per-core and/or per-uncore basis based on one(s) of the workloads 1404, 1406, 1408 to be executed. Advantageously, one(s) of the configurations 1410, 1412, 1414 can cause allocation of additional power from the core(s) to the uncore(s) to improve and/or otherwise optimize execution of workloads, such as the workloads 1404, 1406, 1408 that are I/O bound and can benefit from the increased activity of the uncore(s).

FIGS. 14B-14G are further illustrations of example power adjustments to core(s) and uncore(s) of the workload-adjustable CPU 1402 of FIG. 14A based on a workload. FIG. 14B depicts additional example configurations 1420, 1422, 1424 including a fourth example configuration (CONFIGURATION 1) 1420, a fifth example configuration (CONFIGURATION 2) 1422, and a sixth example configuration (CONFIGURATION 3) 1424. In some examples, the fourth configuration 1420, the fifth configuration 1422, and/or the sixth configuration 1424 may be implemented by the hardware configuration(s) 1074 of FIG. 10.

In the illustrated example of FIG. 14B, the fourth configuration 1420 is the optimal and/or otherwise best of the configurations 1420, 1422, 1424 for increasing throughput and latency based on the increased uncore frequency, which is advantageous for I/O-bound workloads, such as network workloads. In this example, the sixth configuration 1424 is the optimal and/or otherwise best of the configurations 1420, 1422, 1424 for performance based on the increased core frequency, which is advantageous for compute-bound workloads. Advantageously, the configurations 1420, 1422, 1424 of FIG. 14B illustrate an example manner of implementing N CPUs in one CPU package.

Figure 14C:
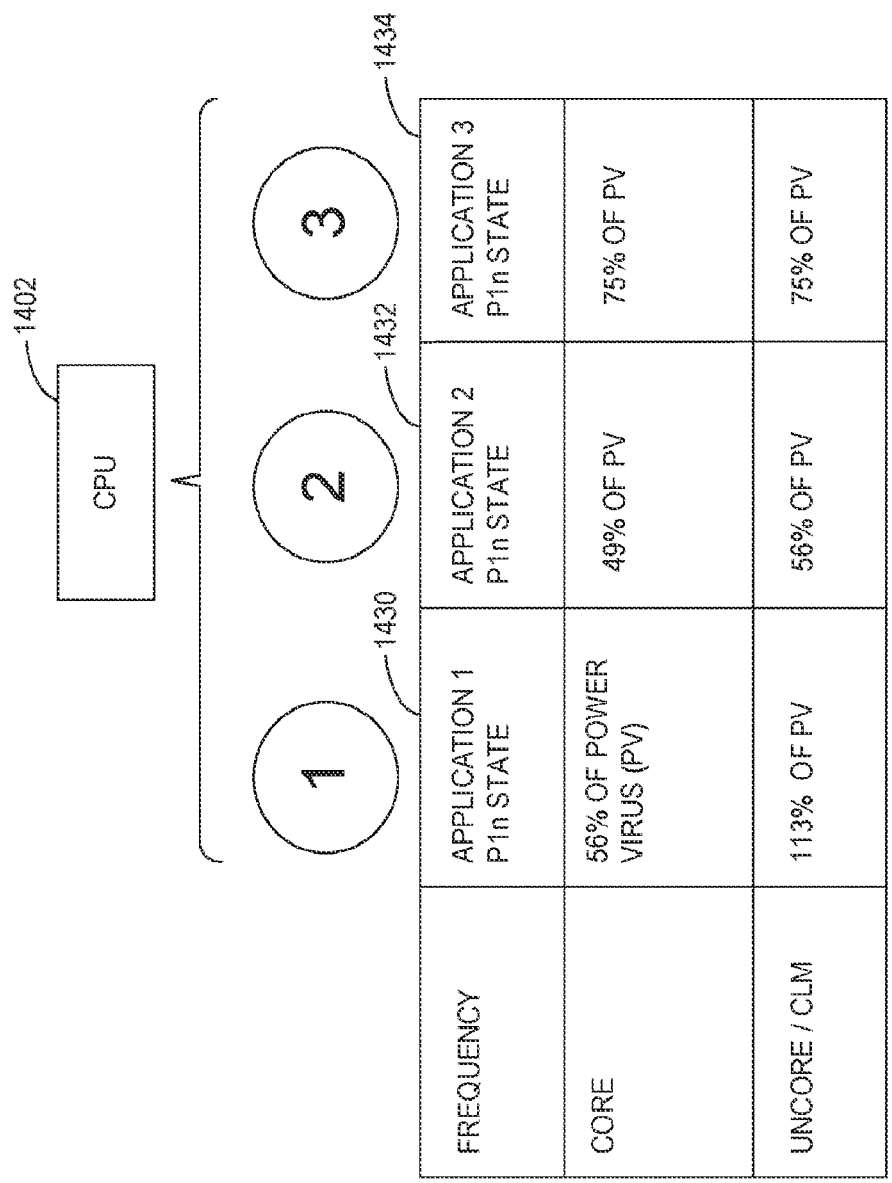

FIG. 14C depicts additional example configurations 1430, 1432, 1434 including a seventh example configuration (APPLICATION 1 P1n STATE) 1430, an eighth example configuration (APPLICATION 2 P1n STATE) 1432, and a ninth example configuration (APPLICATION 3 P1n STATE) 1434 for the workload-adjustable CPU 1402 of FIG. 14A. In this example, the seventh configuration 1430 has an application ratio of 0.56 (e.g., 56% of the power virus level for a core) for core(s) of the workload-adjustable CPU 1402 and an application ratio of 1.13 (e.g., 113% of the power virus level for an uncore) for an uncore or CLM. Advantageously, the seventh configuration 1430 may be beneficial for I/O-bound workloads with the increase in uncore operating frequency, while the ninth configuration 1434 may be beneficial for compute-bound workloads with the increase in core frequency. In some examples, the seventh configuration 1430, the eighth configuration 1432, and/or the ninth configuration 1434 may be implemented by the hardware configuration(s) 1074 of FIG. 10.

FIG. 14D depicts additional example configurations 1440, 1442, 1444 including a tenth example configuration (APPLICATION 1 P1n STATE) 1440, an eleventh example configuration (APPLICATION 2 P1n STATE) 1442, and a twelfth example configuration (APPLICATION 3 P1n STATE) 1444 for the workload-adjustable CPU 1402 of FIG. 14A. In this example, the tenth configuration 1430 has an application ratio that may be advantageous for UPF workloads, the eleventh configuration 1432 has an application ratio that may be advantageous for control plane function (CPF) workloads, and the twelfth configuration 1444 that may be advantageous for database (DB) functions. In some examples, the tenth configuration 1440, the eleventh configuration 1442, and/or the twelfth configuration 1444 may be implemented by the hardware configuration(s) 1074 of FIG. 10.

Figure 14E:
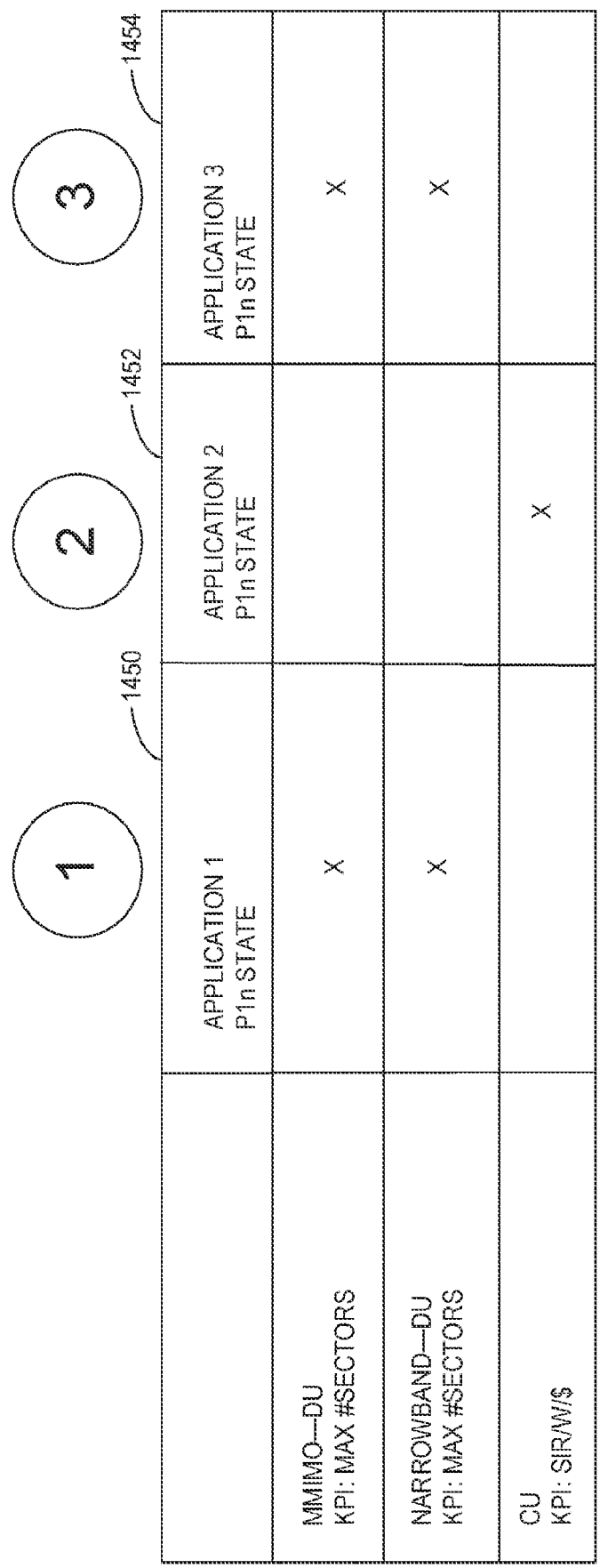

FIG. 14E depicts additional example configurations 1450, 1452, 1454 including a thirteenth example configuration (APPLICATION 1 P1n STATE) 1450, a fourteenth example configuration (APPLICATION 2 P1n STATE) 1452, and a fifteenth example configuration (APPLICATION 3 P1n STATE) 1454 for the workload-adjustable CPU 1402 of FIG. 14A. In this example, the thirteenth configuration 1450 and the fifteenth configuration 1454 have respective application ratios that may be advantageous for massive MIMO (mMIMO) workloads and narrowband workloads that may be implemented by a DU. In this example, the fourteenth configuration 1452 has an application ratio that may be advantageous for CU workloads that may be implemented by a CU. In some examples, the thirteenth configuration 1450, the fourteenth configuration 1452, and/or the fifteenth configuration 1454 may be implemented by the hardware configuration(s) 1074 of FIG. 10.

Figure 14F:
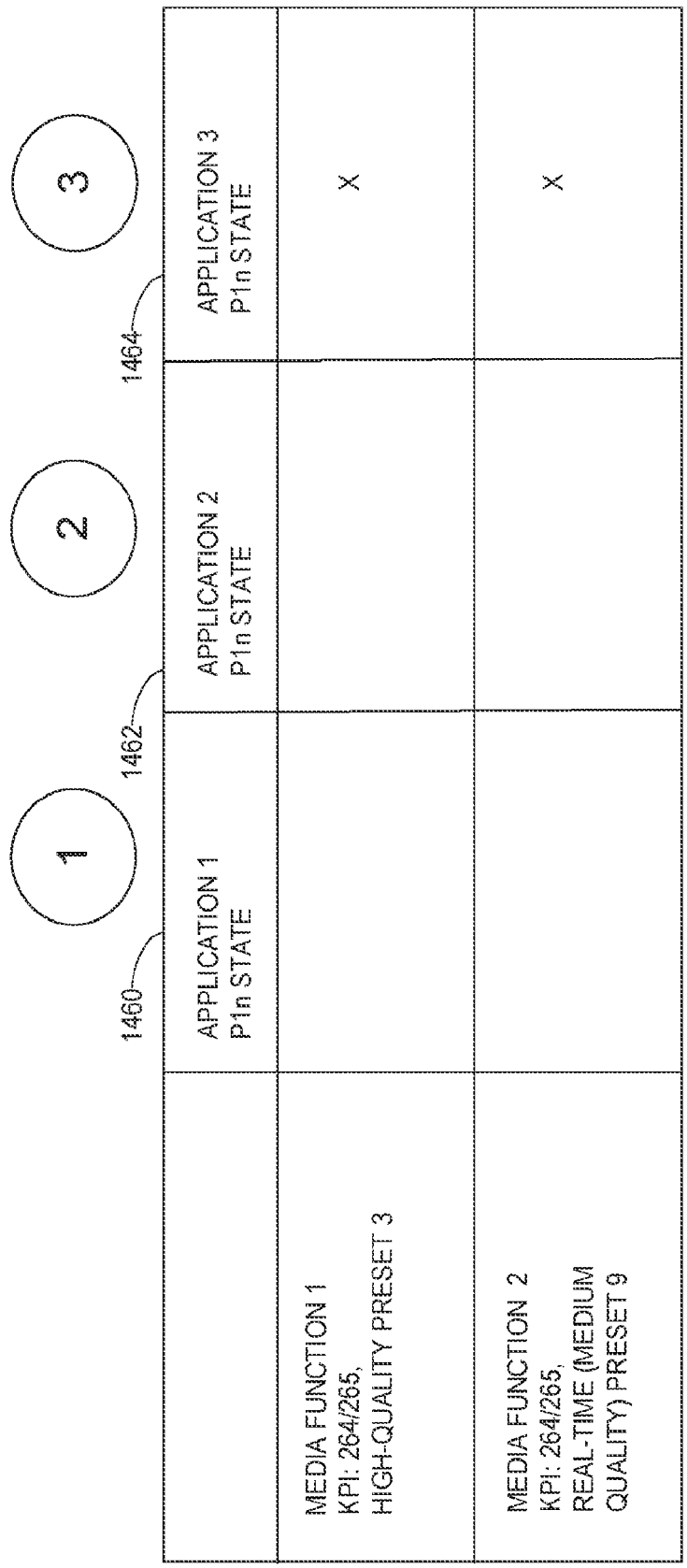

FIG. 14F depicts additional example configurations 1460, 1462, 1464 including a sixteenth example configuration (APPLICATION 1 P1n STATE) 1460, a seventeenth example configuration (APPLICATION 2 P1n STATE) 1462, and an eighteenth example configuration (APPLICATION 3 P1n STATE) 1464 for the workload-adjustable CPU 1402 of FIG. 14A. In this example, the eighteenth configuration 1464 has an application ratio that may be advantageous for media workloads, such as IMS, media encoding, etc. In some examples, the sixteenth configuration 1460, the seventeenth configuration 1462, and/or the eighteenth configuration 1464 may be implemented by the hardware configuration(s) 1074 of FIG. 10.

FIG. 14G depicts additional example configurations 1470, 1472, 1474 including a nineteenth example configuration (APPLICATION 1 P1n STATE) 1470, a twentieth example configuration (APPLICATION 2 P1n STATE) 1472, and a twenty-first example configuration (APPLICATION 3 P1n STATE) 1474 for the workload-adjustable CPU 1402 of FIG. 14A. In this example, the nineteenth configuration 1470 has an application ratio that may be advantageous for proxy server workloads, load balance workloads, etc., such as NGINX workloads. In this example, the twentieth configuration 1472 has an application ratio that may be advantageous for PERF, vNGFW, and network intrusion detection system workloads (e.g., SNORT workloads). In some examples, the nineteenth configuration 1470, the twentieth configuration 1472, and/or the twenty-first configuration 1474 may be implemented by the hardware configuration(s) 1074 of FIG. 10.

FIG. 14H is an illustration of example power adjustments to core(s) and uncore(s) of the example workload-adjustable CPU 1402 of FIG. 14A based on example application ratios 1482, 1484, 1486. In this example, the application ratios 1482, 1484, 1486 include a first example application ratio 1482, a second example application ratio 1484, and a third example application ratio 1486. In this example, the first application ratio 1482 may be utilized to effectuate network workloads (e.g., NFV workloads). In this example, the second application ratio 1484 may be utilized to effectuate general purpose workloads. In this example, the third application ratio 1486 may be utilized to effectuate cloud workloads.

In the illustrated example of FIG. 14H, the first application ratio 1482 has multiple options, variants, etc. For example, the first application ratio 1482 has a first option (OPTION 1), a second option (OPTION 2), a third option (OPTION 3), and a fourth option (OPTION 4). In this example, each of the options for the first application ratio 1482 have the same application ratio of 0.82 (e.g., 74% of the Power Virus $C_{dyn}$ as computed for a processor core and/or uncore as described above). Advantageously, even though each of the options have the same application ratio of 0.82, cores and/or uncores may be configured differently. For example, the first option may be selected to configure an uncore to have an operating frequency of 1.3 GHz to achieve a potential throughput of 75 Gbps. In some such examples, the second option may be selected to configure an uncore to have an operating frequency of 1.7 GHz to achieve a potential throughput of 225 Gbps. Advantageously, the second option may be selected to achieve a higher throughput and/or reduced latency with respect to the first option while having the same application ratio of 0.82. Additionally or alternatively, one or more of the options may also include different configurations for CLMs. For example, the first option may include a first operating frequency for a CLM, the second option may include a second operating frequency for the CLM, and/or the third option may include a third operation frequency for the CLM. In some such examples, the first operating frequency, the second operating frequency, and/or the third operating frequency of the CLM may be different from one(s) of each other.

In the illustrated example of FIG. 14H, the first option specifies different operating frequencies for a core of the multi-core CPU 1402 based on a number of cores of the multi-core CPU 1402 and/or a TDP of the multi-core CPU 1402. For example, the first option specifies that for a 32-core CPU having a TDP of 185 W, the operating frequency is 2.1 GHz for a core when the core is configured for the first option of the first application ratio 1482. As illustrated in the example of FIG. 14H, as the uncore frequency increases with the different options of the first application ratio 1482 (e.g., an uncore frequency of 1.3 GHz for the first option, an uncore frequency of 1.7 GHz for the second option, etc.), the core frequency decreases with the different options of the first application ratio 1482 (e.g., a core frequency of 2.1 GHz for the first option, a core frequency of 2.0 GHz for the second option, etc.).

Advantageously, the workload-adjustable CPU 1402 can configure one(s) of a plurality of cores of the workload-adjustable CPU 1402 on a per-core and/or per-uncore basis based on one(s) of the application ratios 1482, 1484, 1486 of FIG. 14H. Advantageously, one(s) of the application ratios 1482, 1484, 1486, one(s) of the options within the application ratios 1482, 1484, 1486, etc., can cause allocation of additional power from the core(s) to the uncore(s) (or from the uncore(s) to the core(s)) to improve and/or otherwise optimize execution of workloads, such as the workloads 1404, 1406, 1408 of FIG. 14A that are I/O bound and can benefit from the increased activity of the uncore(s).

Figure 15:
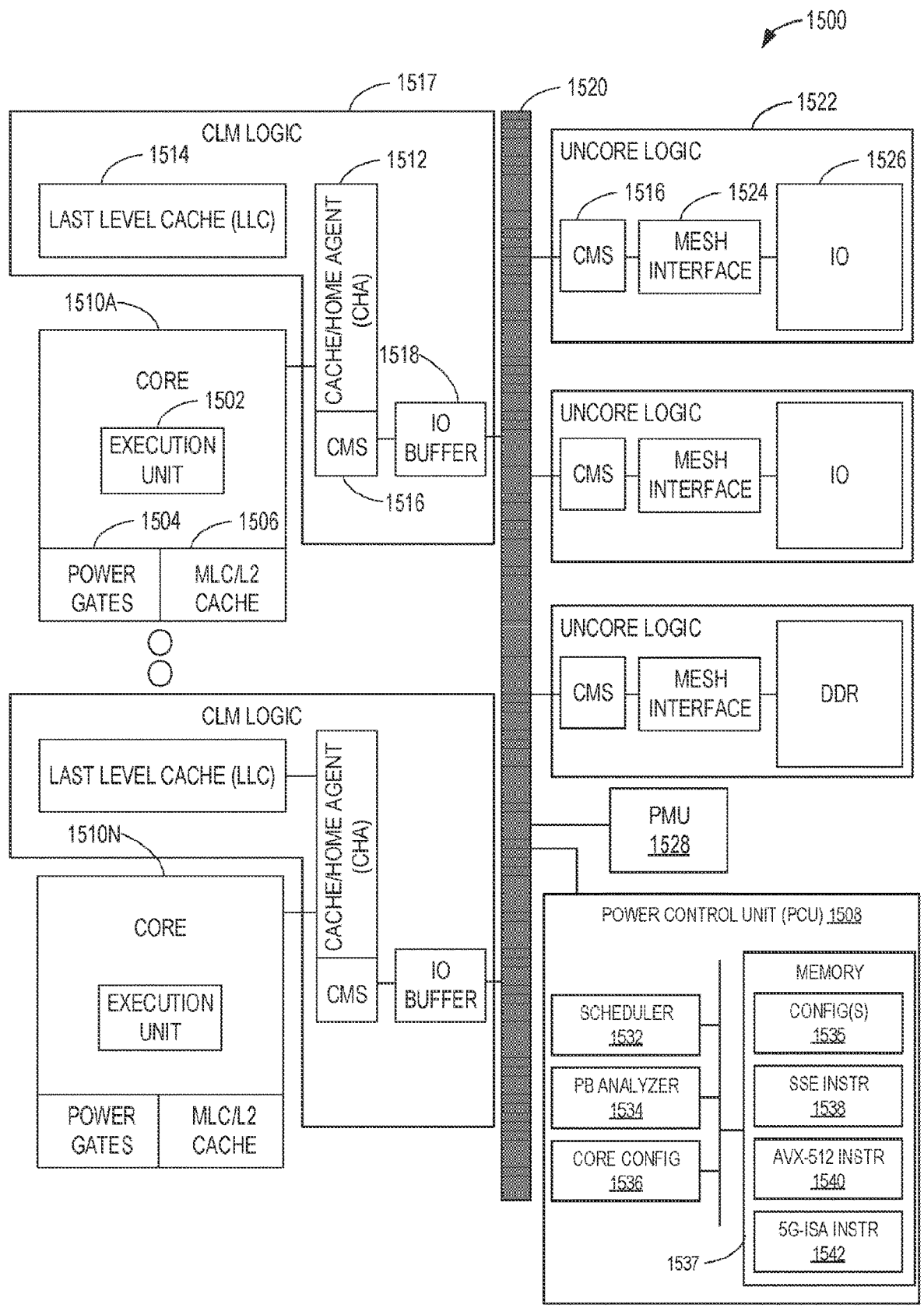
FIG. 15 is an example implementation of an example workload-adjustable CPU that may implement the examples disclosed herein.

FIG. 15 is a block diagram of an example processor 1500 that may be used to implement per-core and/or per-uncore basis configuration to improve and/or otherwise optimize the processing of network workloads. As illustrated in FIG. 15, the processor 1500 may be a multi-core processor including a plurality of example cores 1510A-1510N. By way of example, the processor 1500 may include 32 of the cores 1510A-1510N. Alternatively, the processor 1500 may include any other number of the cores 1510A-1510N. For example, the processor 1500 can implement the multi-core CPU 802 of FIG. 8, the multi-core CPU 902 of FIG. 9, etc. In this example, the cores 1510A-1510N implement circuitry to facilitate execution of the cores 1510A-1510N, such as an example execution unit 1502, one or more example power gates 1504 to deliver power to one(s) of the cores 1510A-1510N, and example cache memory 1506. In this example, the cache memory 1506 is mid-level cache (MLC), which may also be referred to as level two (L2) cache. In some examples, one or more of the cores 1510A-1510N may be of an independent power domain and can be configured to enter and exit active states and/or maximum performance states based on workload.

In this example, the cores 1510A-1510N are coupled to a respective caching/home agent (CHA) 1512 that maintain the cache coherency between one(s) of the cores 1510A-1510N and respective example last level cache (LLC) 1514. In this example, the CHA 1512 implements an example converged/common mesh stop (CMS) 1516. In this example, the CMS 1516 implements an interface between the cores 1510A-1510N and an example I/O buffer 1518. In this example, the I/O buffer 1518 implements an interface between the CMS 1516 and an example interconnect 1520, which may also be referred to as a mesh. For example, the interconnect 1520 may be implemented as a bus, a fabric (e.g., a mesh fabric), etc., that incorporates a multi-dimensional array of half rings that form a system-wide interconnect grid. In some examples, at least one of the CHA 1512, the CMS 1516, or the I/O buffer 1518 may implement a CLM. For example, each of the cores 1510A-1510N may have a corresponding CLM.

In this example, the interconnect 1520 facilitates communication between the cores 1510A-1510N and corresponding hardware and example uncore logic 1522. In this example, the uncore logic 1522 includes instances of the CMS 1516, an example mesh interface 1524, and example I/O 1526. For example, each of the cores 1510A-1510N can have corresponding instances of portions of the uncore logic 1522. In such examples, the first core 1510A can have a corresponding portion of the uncore logic 1522, such as a first instance of the CMS 1516, a first instance of the mesh interface 1524, and a first instance of the I/O 1526. The uncore logic 1522 may also include various hardware, such as an example performance monitoring unit (PMU) 1528, and an example power control unit (PCU) 1508, which may include logic to perform power management techniques as described herein.

In the illustrated example of FIG. 15, the cores 1510A-1510N may be configured on a per-core basis to optimize the execution of network workloads as described herein. In some examples, one(s) of the cores 1510A-1510N process data for an operating system (OS) running on or using the cores 1510A-1510N for processing. In some examples, one(s) of the cores 1510A-1510N is/are configured to process data for one or more applications (e.g., software applications) running on the OS. In this example, the cores 1510A-1510N may include hardware, circuitry, components and/or logic necessary for such processing. In addition, such processing may include using hardware, circuitry, components and/or logic in addition to the cores 1510A-1510N.

In some examples, one or more of the cores 1510A-1510N each have a core identifier (ID), processor firmware (e.g., microcode), a shared state, and/or a dedicated state. For example, each of the cores 1510A-1510N may have two or more P-states (e.g., a P0 state, a P1n state, etc.). In some examples, the microcode of the cores 1510A-1510N is utilized in performing the save/restore functions of the processor state and for various data flows in the performance various processor states.

In some examples, the processor 1500 can operate at various performance states or levels, so-called P-states, namely from P0 to PN. In some examples, the P1 performance state may correspond to the highest guaranteed performance state that can be requested by an OS. In addition to this P1 state, the OS can further request a higher performance state, namely a P0 state. This P0 state may thus be an opportunistic or turbo mode state in which, when power and/or thermal budget is available, processor hardware can configure the processor 1500 or at least portions thereof to operate at a higher than guaranteed frequency. In some examples, the processor 1500 can include multiple so-called bin frequencies above the P1 guaranteed maximum frequency, exceeding to a maximum peak frequency of the particular processor, as fused or otherwise written into the processor during manufacture. In some examples, the processor 1500 can operate at various power states or levels. With regard to power states, different power consumption states may be specified for the processor 1500, generally referred to as C-states, C0, C1 to Cn states. When a core is active, it runs at a C0 state, and when the core is idle it may be placed in a core low power state, also called a core non-zero C-state (e.g., C1-C6 states), with each C-state being at a lower power consumption level (such that C6 is a deeper low power state than C1, and so forth).

In some examples, the cores 1510A-1510N and the uncore logic 1522 may operate at the same guaranteed operating frequency and thereby operate with the same operating power (e.g., same operating voltage or available power). In some examples, this guaranteed operating frequency may be variable and may be managed (e.g., controlled or varied) such as depending on processing needs, P-states, application ratios, and/or other factors. For example, one(s) of the cores 1510A-1510N may receive different voltages and/or clock frequencies. In some examples, the voltage may be in range of approximately 0 to 1.2 volts at frequencies in a range of 0 to 3.6 GHz. In some examples, the active operating voltage may be 0.7 to 1.2 volts at 1.2 to 3.6 GHz. Alternatively, any other values for voltage and/or clock frequencies may be used.

Advantageously, the guaranteed operating frequency associated with the cores 1510A-1510N or portion(s) thereof, the guaranteed operating frequency associated with the uncore logic 1522 or portion(s) thereof, and/or the guaranteed operating frequency associated with the CLM or portion(s) thereof may be adjusted to improve and/or otherwise optimize execution of network workloads. For example, for I/O-bound workloads such as those associated with effectuating 5G computing tasks, the guaranteed operating frequency of the CMS 1516, the mesh interface 1524, the I/O 1526, and/or, more generally, the uncore logic 1526, may be increased. In such examples, respective guaranteed operating frequencies of one(s) of the cores 1510A-1510N may be decreased and thereby allocate additional power for the CMS 1516, the mesh interface 1524, the I/O 1526 and/or, more generally, the uncore logic 1522, to consume without violating the TDP of the processor 1500. Additionally or alternatively, one or more instances of the CLMs may operate at different guaranteed operating frequencies.

In the illustrated example of FIG. 15, the uncore logic 1522 and/or, more generally, the processor 1500, includes the PCU 1508 to control and/or otherwise invoke the processor 1500 to operate at one of multiple different example configurations 1535. Such configurations 1535 may be stored in example memory 1537 of the processor 1500. In this example, the configurations 1535 may include information regarding at least one of guaranteed operating frequency or core count at which the processor 1500 may operate at a given temperature operating point. In some examples, the configurations 1535 may be implemented by the hardware configuration(s) 1074 of FIG. 10. Advantageously, the PCU 1508 may dynamically control the processor 1500 to operate at one of these configurations 1535 based at least in part on a type of instruction to be executed and thereby a type of workload to be processed.

In the illustrated example of FIG. 15, the PCU 1508 includes an example scheduler 1532, an example power budget analyzer (PB ANALYZER) 1534, an example core configurator (CORE CONFIG) 1536, and example memory 1537, which includes and/or otherwise stores example configuration(s) 1535, example SSE instructions 1538, example AVX-512 instructions 1540, and example 5G-ISA instructions 1542. In this example, the memory 1537 is non-volatile memory. Alternatively, the memory 1537 may be implemented by cache memory, ROM, or any other type of memory. In this example, the scheduler 1532, the power budget analyzer 1534, the core configurator 1536, and/or, more generally, the PCU 1508, is/are coupled to the cores 1510A-1510N through the interconnect 1520.

In the illustrated example of FIG. 15, the scheduler 1532 identifies one(s) of the cores 1510A-1510N to execute instructions based on a workload, such as a network workload. In an example where there are 32 of the cores 1510A-1510N, the scheduler 1532 may determine that eight of the 32 cores are to be used to execute instructions to effectuate a function to be executed by an application (e.g., a software application, a 5G telecommunication application, etc.). In such examples, the scheduler 1532 can determine that the eight identified cores are to execute one(s) of the SSE instructions 1538, one(s) of the AVX-512 instructions 1540, and/or one(s) of the 5G-ISA instructions 1542. For example, the scheduler 1532 may cause one(s) of the cores 1510A-1510N to load one(s) of the SSE instructions 1538, the AVX-512 instructions 1540, or the 5G-ISA instructions 1542.

In the illustrated example of FIG. 15, the power budget analyzer 1534 determines whether one(s) of the cores 1510A-1510N can execute one(s) of the instructions 1538, 1540, 1542 with increased performance (e.g., at a higher voltage and/or frequency). In some examples, the cores 1510A-1510N query and/or otherwise interface with the power budget analyzer 1534 in response to loading an instruction. For example, the scheduler 1532 can cause the first core 1510A to load one or more of the 5G-ISA instructions 1542. In such examples, in response to the first core 1510A loading the one or more of the 5G-ISA instructions 1542, the first core 1510A queries the power budget analyzer 1534 whether increased performance can be achieved. In some such examples, the power budget analyzer 1534 may compare a current or instant value of the power being consumed by one(s) of the cores 1510A-1510N to a threshold (e.g., a power budget threshold, a TDP threshold, etc.).

In some examples, the power budget analyzer 1534 determines that there is available power budget to increase the performance of the first core 1510A to execute the one or more 5G-ISA instructions 1542 in response to determining that the increase does not cause the threshold to be exceeded and/or otherwise not satisfied. In such examples, the power budget analyzer 1534 may direct the core configurator 1536 to change a configuration (e.g., a P-state, a core configuration, etc.) of the first core 1510A to execute the one or more 5G-ISA instructions 1542 with increased performance.

In some examples, the power budget analyzer 1534 determines that there is not enough available power budget to increase the performance of the first core 1510A to execute the one or more 5G-ISA instructions 1542 in response to determining that the increase causes the threshold to be exceeded and/or otherwise satisfied. In such examples, the power budget analyzer 1534 may direct the core configurator 1536 to change a configuration (e.g., a P-state, a core configuration, etc.) of the first core 1510A to execute the one or more 5G-ISA instructions 1542 without increased performance, such as operating at a base or baseline voltage and/or frequency.

In some examples, the power budget analyzer 1534 determines whether instance(s) of the uncore logic 1522 can operate with increased performance (e.g., at a higher voltage and/or frequency). In some examples, the power budget analyzer 1534 can determine an instantaneous power consumption of a first instance of the uncore logic 1522, a second instance of the uncore logic 1522, etc., and/or a total instantaneous power consumption of the first instance, the second instance, etc. In some such examples, the power budget analyzer 1534 may compare a current or instant value of the power being consumed by one(s) of the uncore logic 1522 to a threshold (e.g., a power budget threshold, a TDP threshold, an uncore power threshold, etc.).

In some examples, the power budget analyzer 1534 determines that there is available power budget to increase the performance of a first instance of the uncore logic 1522 to operate at a higher operating frequency in response to determining that the increase does not cause the threshold to be exceeded and/or otherwise not satisfied. In such examples, the power budget analyzer 1534 may direct the core configurator 1536 to change a configuration (e.g., a P-state, an uncore core configuration, a guaranteed operating frequency, etc.) of the first instance of the uncore logic 1522. In some examples, the power budget analyzer 1534 can determine that the instance(s) of the uncore logic 1522 can be operated at the higher frequency to reduce latency and/or improve throughput based on the instantaneous power consumption measurements.

In some examples, the power budget analyzer 1534 determines that there is not enough available power budget to increase the performance of the first instance of the uncore logic 1522 to operate at the higher operating frequency in response to determining that the increase causes the threshold to be exceeded and/or otherwise satisfied. In such examples, the power budget analyzer 1534 may direct the core configurator 1536 to change a configuration (e.g., a P-state, an uncore core configuration, a guaranteed operating frequency, etc.) of the first instance of the uncore logic 1522 to operate without increased performance, such as operating at a base or baseline voltage and/or frequency.

In the illustrated example of FIG. 15, the core configurator 1536 adjusts, modifies, and/or otherwise changes a configuration of the first core 1510A, the second core 1510N, etc., of the processor 1500. For example, the core configurator 1536 may configure one(s) of the cores 1510A-1510N on a per-core basis. In such examples, the core configurator 1536 may instruct and/or otherwise invoke the first core 1510A to change from a first P-state to a second P-state, the second core 1510N to change from the second P-state to a third P-state, etc. For example, the core configurator 1536 can increase a voltage and/or frequency at which one(s) of the cores 1510A-1510N operate.

In some examples, the core configurator 1536 adjusts, modifies, and/or otherwise changes a configuration of one or more instances of the uncore logic 1522 of the processor 1500. For example, the core configurator 1536 may configure instance(s) of the uncore logic 1522 on a per-uncore basis. In such examples, the core configurator 1536 may instruct and/or otherwise invoke a first instance of the CMS 1516, a first instance of the mesh interface 1524, a first instance of the I/O 1526, and/or, more generally, the first instance of the uncore logic 1522, to change from a first uncore configuration (e.g., a first guaranteed operating frequency) to a second uncore configuration (e.g., a second guaranteed operating frequency). For example, the core configurator 1536 can increase a voltage and/or frequency at which one(s) of the uncore logic 1522 operate. Additionally or alternatively, the PCU 1508 may include an uncore configurator to adjust, modify, and/or otherwise change a configuration of one or more instances of the uncore logic 1522 of the processor 1500 as described herein.

In some examples, the core configurator 1536 adjusts, modifies, and/or otherwise changes a configuration of one or more instances of the CLMs of the processor 1500. For example, the core configurator 1536 may configure instance(s) of the CHA 1512, the CMS 1516, the I/O buffer 1518, and/or, more generally, the CLM(s) on a per-CLM basis. In such examples, the core configurator 1536 may instruct and/or otherwise invoke a first instance of the CHA 1512, a first instance of the CMS 1516, a first instance of the I/O buffer 1518, and/or, more generally, the first instance of the CLM, to change from a first CLM configuration (e.g., a first guaranteed operating frequency) to a second CLM configuration (e.g., a second guaranteed operating frequency). For example, the core configurator 1536 can increase a voltage and/or frequency at which one(s) of the CLM(s) operate. Additionally or alternatively, the PCU 1508 may include a CLM configurator to adjust, modify, and/or otherwise change a configuration of one or more instances of the CLM logic 1517 of the processor 1500 as described herein.

In the illustrated example, the configurations 1535 include one or more configurations 1535 that may be used to adjust operation of the cores 1510A-1510N. In this example, each of the configuration(s) 1535 may be associated with a configuration identifier, a maximum current level (ICCmax), a maximum operating temperature (in terms of degrees Celsius), a guaranteed operating frequency (in terms of Gigahertz (GHz)), a maximum power level, namely a thermal design profile (TDP) level (in terms of Watts), a maximum case temperature (in terms of degrees Celsius), a core count, and/or a design life (in terms of years, such as 3 years, 5 years, etc.). Additionally or alternatively, one or more of the configurations 1535 may include different parameters, settings, etc.

In some examples, the one or more configurations 1535 may be based on an application ratio. For example, the processor 1500 may be deployed to implement the 5G vRAN DU 800 of FIG. 8 having a core application ratio of 0.7 and an uncore application ratio of 0.9. In such examples, the core configurator 1536 can configure one(s) of the cores 1510A-1510N to operate with one of the configurations 1535 to ensure that the cores 1510A-1510N and/or, more generally, the processor 1500, do not violate the TDP of the processor 1500. For example, the core configurator 1536 can increase a core frequency of one(s) of the cores 1510A-1510N. In some examples, the core configurator 1536 can configure portion(s) of the uncore logic 1522 to operate with one of the configurations 1535 to ensure that the portion(s) of the uncore logic 1522 and/or, more generally, the processor 1500, do(es) not violate the TDP of the processor 1500. For example, the core configurator 1536 can increase an uncore frequency (e.g., an UCLK frequency) of at least one of the interconnect 1520, the CMS 1516, the mesh interface 1524, or the I/O 1526. In some examples, the uncore frequency may be fixed or static. In some examples, the uncore frequency may be dynamic by being a function of the core frequency. In some examples, the uncore frequency may be dynamic by being adjusted independent of the core frequency.

In some examples, the core configurator 1536 can configure portion(s) of the CLMs 1517 to operate with one of the configurations 1535 to ensure that the portion(s) of the CLMs 1517 and/or, more generally, the processor 1500, do(es) not violate the TDP of the processor 1500. For example, the core configurator 1536 can increase a frequency of at least one of the LLC 1514, the CHA 1512, the CMS 1516, the I/O buffer 1518, and/or, more generally, the CLM 1517.

In the illustrated example, the SSE instructions 1538 may implement the first instructions 804 of FIG. 8. For example, the SSE instructions 1538, when executed, may implement the network workloads 908 of FIG. 9. In the illustrated example, the AVX-512 instructions 1540 may implement the second instructions 806 of FIG. 8. For example, the AVX-512 instructions 1540, when executed, may implement the network workloads 816 of FIG. 8. In the illustrated example, the 5G-ISA instructions 1542 may implement the third instructions 808 of FIG. 8. For example, the 5G-ISA instructions 1542, when executed, may implement the network workloads 818 of FIG. 8. In some examples, one(s) of the SSE instructions 1538, the AVX-512 instructions 1540, and/or the 5G-ISA instructions 1542 may be stored in memory (e.g., volatile memory, non-volatile memory, cache memory, etc.) of the PCU 1508. Alternatively, one or more of the SSE instructions 1538, the AVX-512 instructions 1540, and/or the 5G-ISA instructions 1542 may be stored in a different location than the PCU 1508, such as in the LLC 1530, system memory (e.g., DDR memory), etc.

In some examples, frequencies of one(s) of the cores 1510A-1510N, portion(s) of the uncore logic 1522, and/or portion(s) of the CLM logic 1517 may be adjusted based on a type of the instructions 1538, 1540, 1542 to be executed. For example, in response to the first core 1510A executing the SSE instructions 1538, the core configurator 1536 may increase an operating frequency of the first core 1510A based on the configuration 1535 of the first core 1510A, increase an operating frequency of a corresponding portion of the uncore logic 1522, and/or increase an operating frequency of a corresponding portion of the CLM 1517. In some examples, in response to the first core 1510A executing the 5G-ISA instructions 1542, the core configurator 1536 may decrease an operating frequency of the first core 1510A based on the configuration 1535 of the first core 1510A, and increase an operating frequency of a corresponding portion of the uncore logic 1522, and/or increase an operating frequency of a corresponding portion of the CLM 1517.

In the illustrated example of FIG. 15, the processor 1500 includes the PMU 1528 to measure and/or otherwise determine performance parameters of the processor 1500. For example, the PMU 1528 can determine performance parameters such as a number of instruction cycles, cache hits, cache misses, branch misses, etc. In some examples, the PMU 1528 implements a plurality of hardware performance counters to store counts associated with the performance parameters. In some examples, the PMU 1528 determines workload parameters such as values of latency, throughput, etc., associated with a workload executed by the processor 1500. For example, the PMU 1528 may implement one or more hardware performance counters to store counts associated with the workload parameters. In some examples, the PMU 1528 may transmit the performance parameters, the workload parameters, hardware performance counter values, etc., to an external system (e.g., the manufacturer enterprise system 1002 of FIG. 10) as telemetry data.

While an example manner of implementing the PCU 1508, and/or, more generally, the processor 1500, is illustrated in FIG. 15, one or more of the elements, processes and/or devices illustrated in FIG. 15 may be combined, divided, re-arranged, omitted, eliminated and/or implemented in any other way. Further, the example scheduler 1532, the example power budget analyzer 1534, the example core configurator 1536, the example configuration(s) 1535, the example memory 1537, the example SSE instructions 1538, the example AVX-512 instructions 1540, the example 5G-ISA instructions 1542, and/or, more generally, the example PCU 1508 of FIG. 15 may be implemented by hardware, software, firmware and/or any combination of hardware, software and/or firmware. Thus, for example, any of the example scheduler 1532, the example power budget analyzer 1534, the example core configurator 1536, the example configuration(s) 1535, the example memory 1537, the example SSE instructions 1538, the example AVX-512 instructions 1540, the example 5G-ISA instructions 1542, and/or, more generally, the example PCU 1508 could be implemented by one or more analog or digital circuit(s), logic circuits, programmable processor(s), programmable controller(s), GPU(s), DSP(s), ASIC(s), PLD(s), and/or FPLD(s). When reading any of the apparatus or system claims of this patent to cover a purely software and/or firmware implementation, at least one of the example scheduler 1532, the example power budget analyzer 1534, the example core configurator 1536, the example configuration(s) 1535, the example memory 1537, the example SSE instructions 1538, the example AVX-512 instructions 1540, and/or the example 5G-ISA instructions 1542 is/are hereby expressly defined to include a non-transitory computer readable storage device or storage disk such as a memory, a DVD, a CD, a Blu-ray disk, etc. including the software and/or firmware. Further still, the example PCU 1508 of FIG. 15, and/or, more generally, the processor 1500, may include one or more elements, processes and/or devices in addition to, or instead of, those illustrated in FIG. 15, and/or may include more than one of any or all of the illustrated elements, processes and devices.

Figure 16:
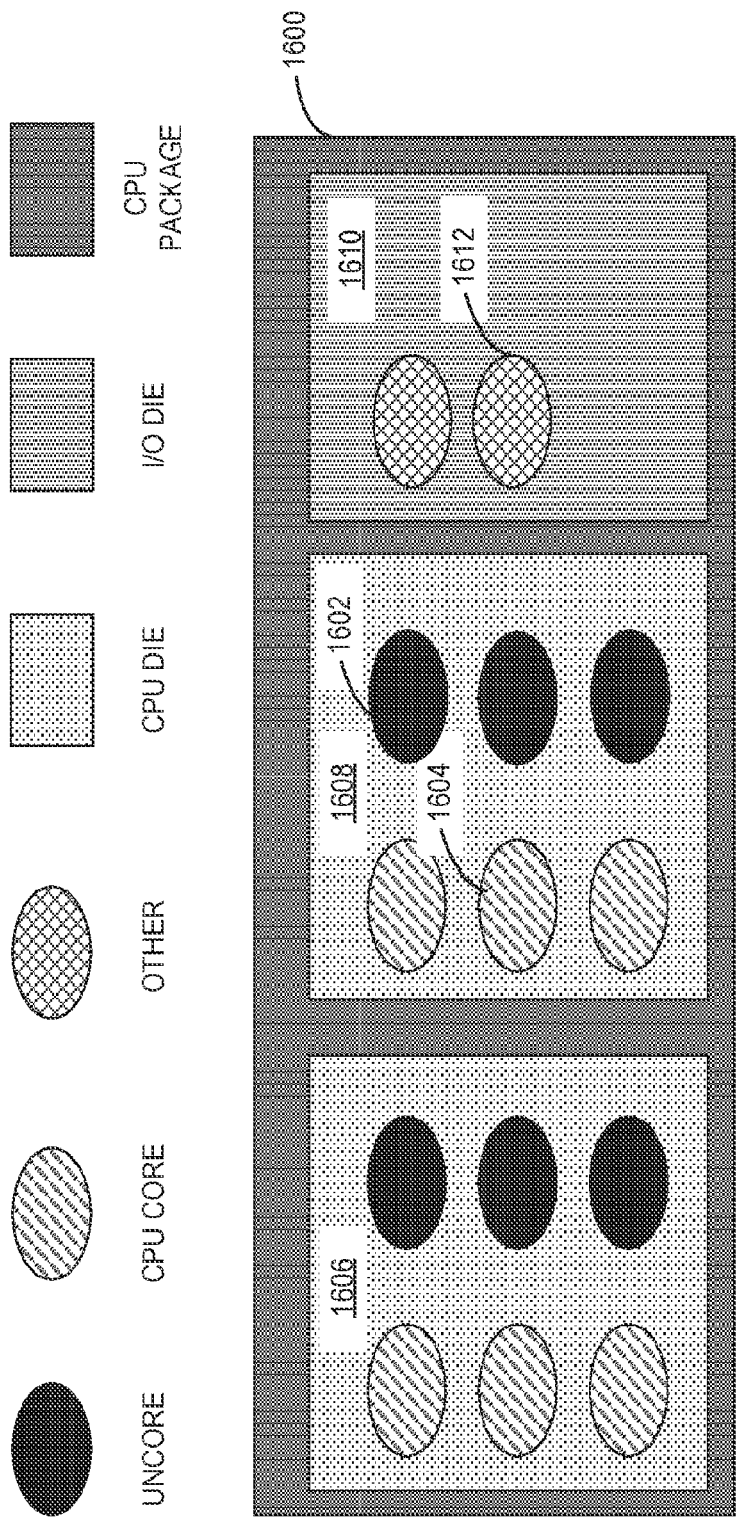
FIG. 16 is an example implementation of another example workload-adjustable CPU that may implement the examples disclosed herein.

FIG. 16 is a block diagram of an example implementation of an example processor 1600. In this example, the processor 1600 is a multi-core processor that is represented as being included in a CPU package. In this example, the processor 1600 is hardware. For example, the processor 1600 can be implemented by one or more integrated circuits, logic circuits, microprocessors, GPUs, DSPs, or controllers from any desired family or manufacturer.

In this example, the processor 1600 is a multi-core CPU including example CPU cores 1604. For example, the processor 1600 can be included in one or more of the DUs 122 of FIG. 1, one or more of the CUs 124 of FIG. 1, etc. In such examples, the processor 1600 can be an example implementation of the multi-core CPU 802 of FIG. 8, the multi-core CPU 902 of FIG. 9, the hardware 1004 of FIG. 10, etc.

In the illustrated example of FIG. 16, the processor 1600 is a semiconductor based (e.g., silicon based) device. In this example, the processor 1600 includes at least a first example semiconductor die 1606, a second example semiconductor die 1608, and a third example semiconductor die 1610. In this example, the first semiconductor die 1606 is a CPU die that includes a first set of uncore logic (e.g., uncore logic circuitry) 1602, a first set of CPU cores 1604, etc. In this example, the second semiconductor die 1608 is a CPU die that includes a second set of the uncore logic 1602 and a second set of the CPU cores 1604. In this example, the third semiconductor die 1610 is an I/O die that includes other example circuitry 1612 (e.g., memory, logic circuitry, etc.) to facilitate operation of the processor 1600. Alternatively, one or more of the semiconductor dies 1606, 1608, 1610 may include fewer or more uncore logic 1602, fewer or more CPU cores 1604, fewer or more other circuitry 1612, etc., and/or a combination thereof. In this example, the uncore logic 1602 is/are in communication with corresponding one(s) of the CPU cores 1604.

Figure 17:
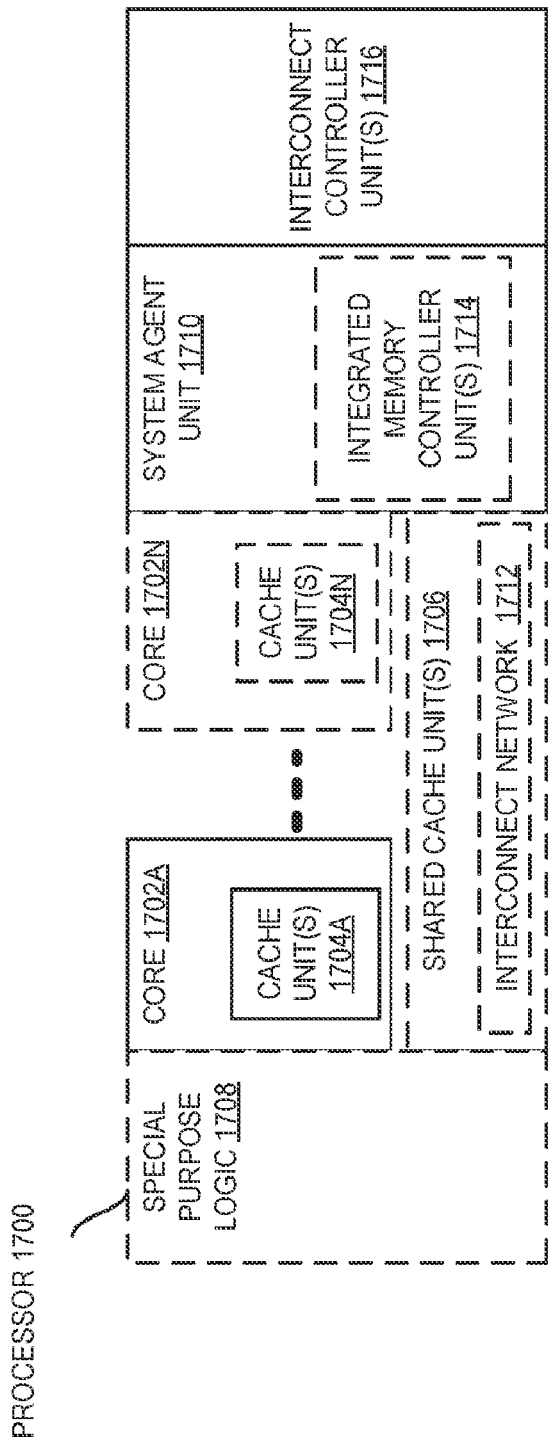
FIG. 17 illustrates a block diagram of an example processor that may have more than one core, may have an integrated memory controller, and may have integrated graphics.

FIG. 17 illustrates a block diagram of examples of a processor 1700 that may have more than one core, may have an integrated memory controller, and may have integrated graphics. In some examples, the processor 1700 of FIG. 17 may implement the multi-core CPU 802 of FIG. 8, the multi-core CPU 902 of FIG. 9, the hardware 1004 of FIG. 10, the workload-adjustable CPU 1402 of FIG. 14, etc. The solid lined boxes illustrate a processor 1700 with a single core 1702A, a system agent 1710, a set of one or more interconnect controller units circuitry 1716, while the optional addition of the dashed lined boxes illustrates an alternative processor 1700 with multiple cores 1702(A)-(N), a set of one or more integrated memory controller unit(s) circuitry 1714 in the system agent unit circuitry 1710, and special purpose logic 1708, as well as a set of one or more interconnect controller units circuitry 1716. Note that the processor 1700 may be one of the processors 4470 or 4480, or co-processor 4438 or 4415 of FIG. 44. In some examples, the processor 1700 may be the processor 4552 of FIGS. 45 and/or 46 and/or the processor 4712 of FIG. 47.

Thus, different implementations of the processor 1700 may include: 1) a CPU with the special purpose logic 1708 being integrated graphics and/or scientific (throughput) logic (which may include one or more cores, not shown), and the cores 1702(A)-(N) being one or more general purpose cores (e.g., general purpose in-order cores, general purpose out-of-order cores, or a combination of the two); 2) a coprocessor with the cores 1702(A)-(N) being a large number of special purpose cores intended primarily for graphics and/or scientific (throughput); and 3) a coprocessor with the cores 1702(A)-(N) being a large number of general purpose in-order cores. Thus, the processor 1700 may be a general-purpose processor, coprocessor or special-purpose processor, such as, for example, a network or communication processor, compression engine, graphics processor, general purpose graphics processing unit (GPGPU) circuitry, a high-throughput many integrated core (MIC) coprocessor (including 30 or more cores), embedded processor, or the like. The processor may be implemented on one or more chips. The processor 1700 may be a part of and/or may be implemented on one or more substrates using any of a number of process technologies, such as, for example, BiCMOS, CMOS, or NMOS.

A memory hierarchy includes one or more levels of cache unit(s) circuitry 1704(A)-(N) within the cores 1702(A)-(N), a set of one or more shared cache units circuitry 1706, and external memory (not shown) coupled to the set of integrated memory controller units circuitry 1714. The set of one or more shared cache units circuitry 1706 may include one or more mid-level caches, such as level 2 (L2), level 3 (L3), level 4 (L4), or other levels of cache, such as a last level cache (LLC), and/or combinations thereof. While in some examples ring-based interconnect network circuitry 1712 interconnects the special purpose logic 1708 (e.g., integrated graphics logic), the set of shared cache units circuitry 1706, and the system agent unit circuitry 1710, alternative examples use any number of well-known techniques for interconnecting such units. In some examples, coherency is maintained between one or more of the shared cache units circuitry 1706 and cores 1702(A)-(N).

In some examples, one or more of the cores 1702(A)-(N) are capable of multi-threading. The system agent unit circuitry 1710 includes those components coordinating and operating cores 1702(A)-(N). The system agent unit circuitry 1710 may include, for example, power control unit (PCU) circuitry and/or display unit circuitry (not shown). The PCU may be or may include logic and components needed for regulating the power state of the cores 1702(A)-(N) and/or the special purpose logic 1708 (e.g., integrated graphics logic). For example, the PCU, and/or, more generally, the system agent unit circuitry 1710, may be an example implementation of the PCU 1508 of FIG. 15. The display unit circuitry is for driving one or more externally connected displays.

The cores 1702(A)-(N) may be homogenous or heterogeneous in terms of architecture instruction set; that is, two or more of the cores 1702(A)-(N) may be capable of executing the same instruction set, while other cores may be capable of executing only a subset of that instruction set or a different instruction set.

Figure 18A:
FIG. 18A is a block diagram illustrating both an exemplary in-order pipeline and an exemplary register renaming, out-of-order issue/execution pipeline according to examples of the disclosure.
Figure 18B:
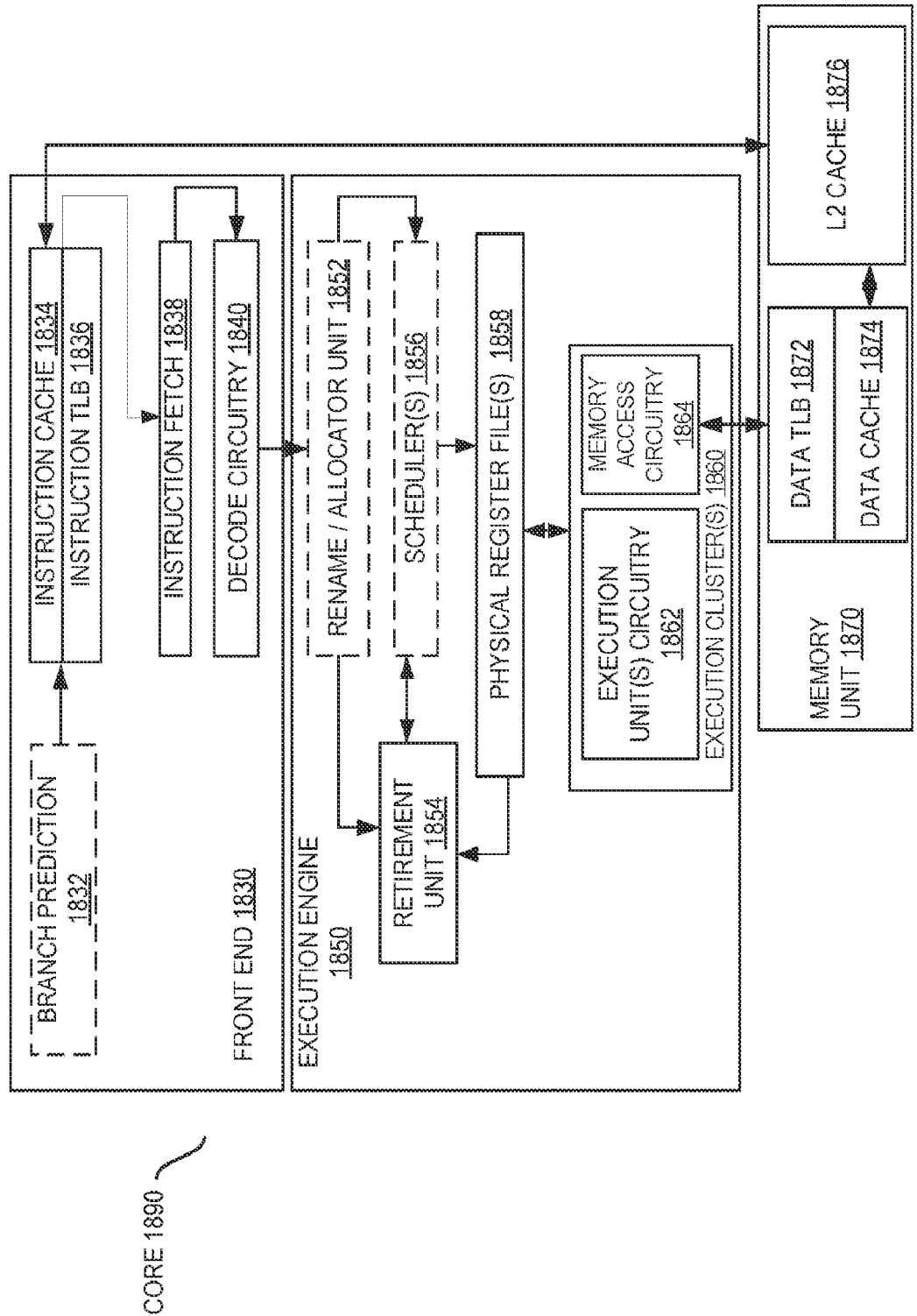
FIG. 18B is a block diagram illustrating both an example of an in-order architecture core and an example register renaming, out-of-order issue/execution architecture core to be included in a processor according to examples of the disclosure.

FIG. 18A is a block diagram illustrating both an exemplary in-order pipeline and an exemplary register renaming, out-of-order issue/execution pipeline according to examples of the disclosure. FIG. 18B is a block diagram illustrating both an example of an in-order architecture core and an example register renaming, out-of-order issue/execution architecture core to be included in a processor according to examples of the disclosure. The solid lined boxes in FIGS. 18A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 18A, a processor pipeline 1800 includes a fetch stage 1802, an optional length decode stage 1804, a decode stage 1806, an optional allocation stage 1808, an optional renaming stage 1810, a scheduling (also known as a dispatch or issue) stage 1812, an optional register read/memory read stage 1814, an execute stage 1816, a write back/memory write stage 1818, an optional exception handling stage 1822, and an optional commit stage 1824. For example, a multi-core processor as described herein may determine whether an SSE instruction, an AVX-512 instruction, or a 5G-ISA instruction is to be executed at one or more of the stages of the processor pipeline 1800. One or more operations can be performed in each of these processor pipeline stages. For example, during the fetch stage 1802, one or more instructions (e.g., SSE instructions, AVX-512 instructions, 5G-ISA instructions, etc.) are fetched from instruction memory, during the decode stage 1806, the one or more fetched instructions may be decoded, addresses (e.g., load store unit (LSU) addresses) using forwarded register ports may be generated, and branch forwarding (e.g., immediate offset or a link register (LR)) may be performed. In some examples, the decode stage 1806 and the register read/memory read stage 1814 may be combined into one pipeline stage. In some examples, during the execute stage 1816, the decoded instructions may be executed, LSU address/data pipelining to an Advanced Microcontroller Bus (AMB) interface may be performed, multiply and add operations may be performed, arithmetic operations with branch results may be performed, etc.

By way of example, the exemplary register renaming, out-of-order issue/execution core architecture may implement the pipeline 1800 as follows: 1) the instruction fetch unit circuitry 1838 performs the fetch and length decoding stages 1802 and 1804; 2) the decode unit circuitry 1840 performs the decode stage 1806; 3) the rename/allocator unit circuitry 1852 performs the allocation stage 1808 and renaming stage 1810; 4) the scheduler unit(s) circuitry 1856 performs the schedule stage 1812; 5) the physical register file(s) unit(s) circuitry 1858 and the memory unit circuitry 1870 perform the register read/memory read stage 1814; the execution cluster 1860 perform the execute stage 1816; 6) the memory unit circuitry 1870 and the physical register file(s) unit(s) circuitry 1858 perform the write back/memory write stage 1818; 7) various units (unit circuitry) may be involved in the exception handling stage 1822; and 8) the retirement unit circuitry 1854 and the physical register file(s) unit(s) circuitry 1858 perform the commit stage 1824.

FIG. 18B shows processor core 1890 including front-end unit circuitry 1830 coupled to an execution engine unit circuitry 1850, and both are coupled to a memory unit circuitry 1870. The core 1890 may be a reduced instruction set computing (RISC) core, a complex instruction set computing (CISC) core, a very long instruction word (VLIW) core, or a hybrid or alternative core type. As yet another option, the core 1890 may be a special-purpose core, such as, for example, a network or communication core, compression engine, coprocessor core, GPGPU core, graphics core, or the like.

The front end unit circuitry 1830 may include branch prediction unit circuitry 1832 coupled to an instruction cache unit circuitry 1834, which is coupled to an instruction translation lookaside buffer (TLB) 1836, which is coupled to instruction fetch unit circuitry 1838, which is coupled to decode unit circuitry 1840. In some examples, the instruction cache unit circuitry 1834 is included in the memory unit circuitry 1870 rather than the front-end unit circuitry 1830. The decode unit circuitry 1840 (or decoder) may decode instructions, and generate as an output one or more micro-operations, micro-code entry points, microinstructions, other instructions, or other control signals, which are decoded from, or which otherwise reflect, or are derived from, the original instructions. The decode unit circuitry 1840 may further include an address generation unit circuitry (AGU, not shown). In some examples, the AGU generates an LSU address using forwarded register ports, and may further perform branch forwarding (e.g., immediate offset branch forwarding, LR register branch forwarding, etc.). The decode unit circuitry 1840 may be implemented using various different mechanisms. Examples of suitable mechanisms include, but are not limited to, look-up tables, hardware implementations, programmable logic arrays (PLAs), microcode ROMs, etc. In some examples, the core 1890 includes a microcode ROM (not shown) or other medium that stores microcode for certain macroinstructions (e.g., in decode unit circuitry 1840 or otherwise within the front end unit circuitry 1830). In some examples, the decode unit circuitry 1840 includes a micro-operation (micro-op) or operation cache (not shown) to hold/cache decoded operations, micro-tags, or micro-operations generated during the decode or other stages of the processor pipeline 1800. The decode unit circuitry 1840 may be coupled to rename/allocator unit circuitry 1852 in the execution engine unit circuitry 1850.

The execution engine unit circuitry 1850 includes the rename/allocator unit circuitry 1852 coupled to a retirement unit circuitry 1854 and a set of one or more scheduler(s) circuitry 1856. The scheduler(s) circuitry 1856 represents any number of different schedulers, including reservations stations, central instruction window, etc. In some examples, the scheduler(s) circuitry 1856 can include arithmetic logic unit (ALU) scheduler/scheduling circuitry, ALU queues, arithmetic generation unit (AGU) scheduler/scheduling circuitry, AGU queues, etc. The scheduler(s) circuitry 1856 is coupled to the physical register file(s) circuitry 1858. Each of the physical register file(s) circuitry 1858 represents one or more physical register files, different ones of which store one or more different data types, such as scalar integer, scalar floating-point, packed integer, packed floating-point, vector integer, vector floating-point, status (e.g., an instruction pointer that is the address of the next instruction to be executed), etc. In some examples, the physical register files 1858 can store the hardware configuration(s) 1074 of FIG. 10, the configuration information 1100 of FIG. 11, etc., or portion(s) thereof. For example, the 5G-ISA instructions as described herein, when executed, may invoke one(s) of the physical register file(s) circuitry 1858 to effectuate 5G network workloads. In such examples, a PCU can read a configuration identifier associated with a core from one of the physical register file(s) 1858 and adjust the configuration identifier associated with the core to adjust a guaranteed operating frequency corresponding to the adjusted configuration identifier to effectuate the 5G network workloads. In some examples, the physical register file(s) unit circuitry 1858 includes vector registers unit circuitry, writemask registers unit circuitry, and scalar register unit circuitry. These register units may provide architectural vector registers, vector mask registers, general-purpose registers, etc. The physical register file(s) unit(s) circuitry 1858 is overlapped by the retirement unit circuitry 1854 (also known as a retire queue or a retirement queue) to illustrate various ways in which register renaming and out-of-order execution may be implemented (e.g., using a reorder buffer(s) (ROB(s)) and a retirement register file(s); using a future file(s), a history buffer(s), and a retirement register file(s); using a register maps and a pool of registers; etc.). The retirement unit circuitry 1854 and the physical register file(s) circuitry 1858 are coupled to the execution cluster(s) 1860. The execution cluster(s) 1860 includes a set of one or more execution units circuitry 1862 and a set of one or more memory access circuitry 1864. The execution units circuitry 1862 may perform various arithmetic, logic, floating-point or other types of operations (e.g., shifts, addition, subtraction, multiplication) and on various types of data (e.g., scalar floating-point, packed integer, packed floating-point, vector integer, vector floating-point). For example, the execution units circuitry 1862 may perform such processing in response to executing 5G-ISA instructions as described herein. While some examples may include a number of execution units or execution unit circuitry dedicated to specific functions or sets of functions, other examples may include only one execution unit circuitry or multiple execution units/execution unit circuitry that all perform all functions. The scheduler(s) circuitry 1856, physical register file(s) unit(s) circuitry 1858, and execution cluster(s) 1860 are shown as being possibly plural because certain examples create separate pipelines for certain types of data/operations (e.g., a scalar integer pipeline, a scalar floating-point/packed integer/packed floating-point/vector integer/vector floating-point pipeline, and/or a memory access pipeline that each have their own scheduler circuitry, physical register file(s) unit circuitry, and/or execution cluster—and in the case of a separate memory access pipeline, certain examples are implemented in which only the execution cluster of this pipeline has the memory access unit(s) circuitry 1864). It should also be understood that where separate pipelines are used, one or more of these pipelines may be out-of-order issue/execution and the rest in-order.

In some examples, the execution engine unit circuitry 1850 may perform load store unit (LSU) address/data pipelining to an Advanced Microcontroller Bus (AMB) interface (not shown), and address phase and writeback, data phase load, store, and branches.

The set of memory access circuitry 1864 is coupled to the memory unit circuitry 1870, which includes data TLB unit circuitry 1872 coupled to a data cache circuitry 1874 coupled to a level 2 (L2) cache circuitry 1876. In some examples, the memory access units circuitry 1864 may include a load unit circuitry, a store address unit circuit, and a store data unit circuitry, each of which is coupled to the data TLB circuitry 1872 in the memory unit circuitry 1870. The instruction cache circuitry 1834 is further coupled to a level 2 (L2) cache unit circuitry 1876 in the memory unit circuitry 1870. In some examples, the instruction cache 1834 and the data cache 1874 are combined into a single instruction and data cache (not shown) in L2 cache unit circuitry 1876, a level 3 (L3) cache unit circuitry (not shown), and/or main memory. The L2 cache unit circuitry 1876 is coupled to one or more other levels of cache and eventually to a main memory.

The core 1890 may support one or more instructions sets (e.g., the x86 instruction set (with some extensions that have been added with newer versions); the MIPS instruction set; the ARM instruction set (with optional additional extensions such as NEON), the AVX-512 instruction set, the AVX-512 5G-ISA instruction set, etc., including the instruction(s) described herein. In some examples, the core 1890 includes logic to support a packed data instruction set extension (e.g., AVX1, AVX2, AVX-512, 5G-ISA, etc.), thereby allowing the operations used by many multimedia applications to be performed using packed data.

Figure 19:
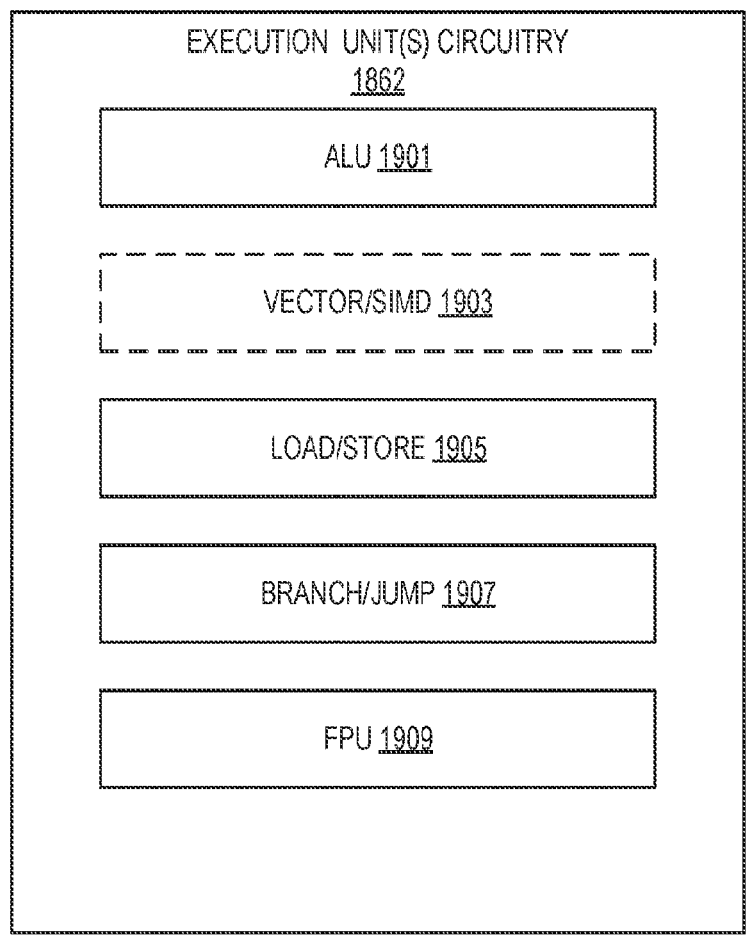
FIG. 19 illustrates examples of execution unit(s) circuitry, such as execution unit(s) circuitry of FIG. 18B.

FIG. 19 illustrates examples of execution unit(s) circuitry, such as execution unit(s) circuitry 1862 of FIG. 18B. As illustrated, execution unit(s) circuitry 1862 may include one or more ALU circuits 1901, vector/SIMD unit circuits 1903, load/store unit circuits 1905, and/or branch/jump unit circuits 1907. ALU circuits 1901 perform integer arithmetic and/or Boolean operations. Vector/SIMD unit circuits 1903 perform vector/SIMD operations on packed data (such as SIMD/vector registers). Load/store unit circuits 1905 execute load and store instructions to load data from memory into registers or store from registers to memory. Load/store unit circuits 1905 may also generate addresses. Branch/jump unit circuits 1907 cause a branch or jump to a memory address depending on the instruction. Floating-point unit (FPU) circuits 1909 perform floating-point arithmetic. For example, the FPU circuits 1909 may perform floating-point arithmetic (e.g., FP16, FP32, etc., arithmetic) in response to invocation of 5G-ISA instructions as described herein. The width of the execution unit(s) circuitry 1862 varies depending upon the example and can range from 16-bit to 1,024-bit. In some examples, two or more smaller execution units are logically combined to form a larger execution unit (e.g., two 128-bit execution units are logically combined to form a 256-bit execution unit).

Figure 20:
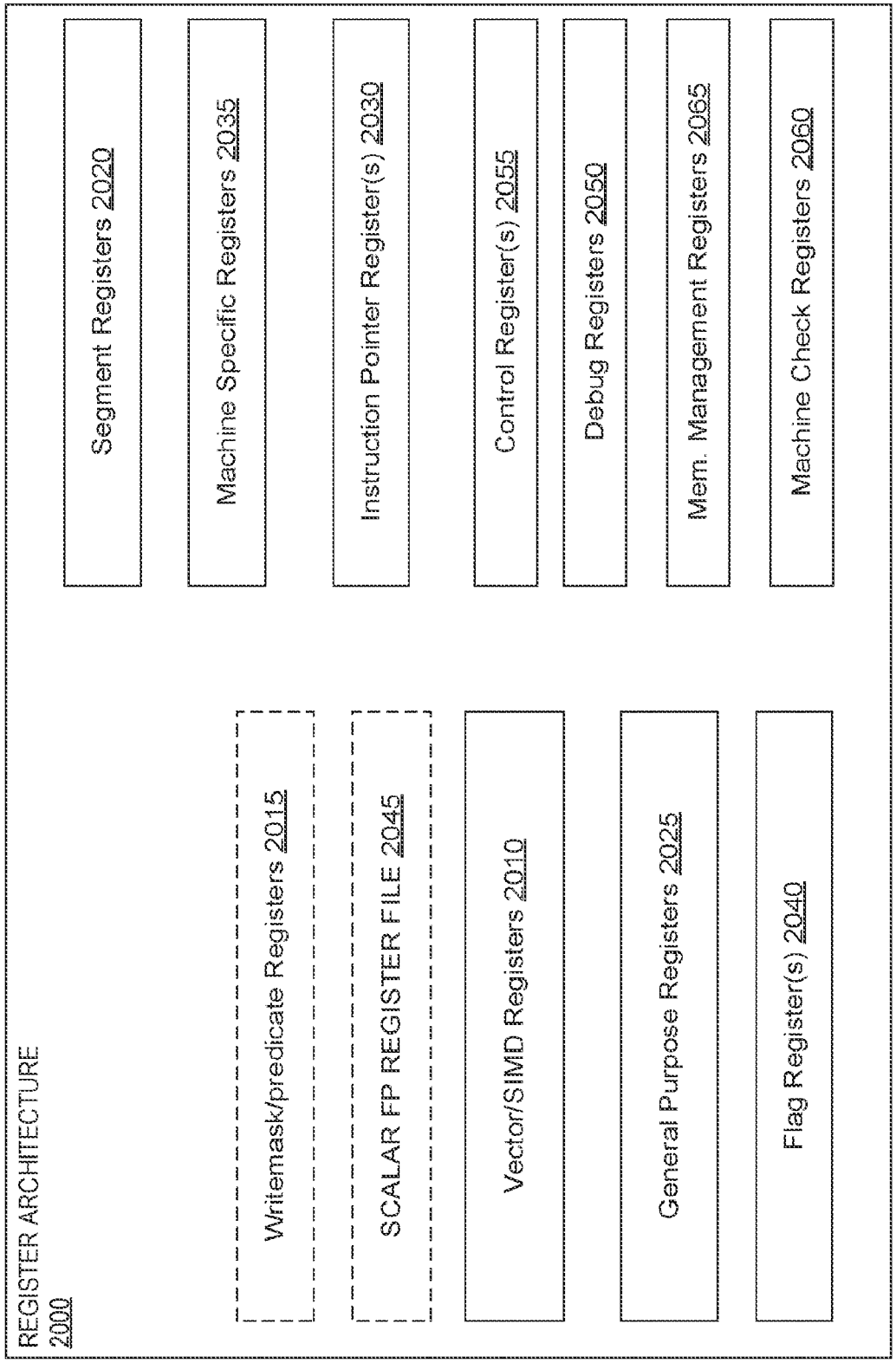
FIG. 20 is a block diagram of an example register architecture according to some examples.

FIG. 20 is a block diagram of an example register architecture 2000 according to some examples. As illustrated, there are vector/SIMD registers 2010 that vary from 128-bit to 1,024 bits width. In some examples, the vector/SIMD registers 2010 are physically 512-bits and, depending upon the mapping, only some of the lower bits are used. In some examples, the vector/SIMD registers 2010 are ZMM registers which are 512 bits: the lower 256 bits are used for YMM registers and the lower 128 bits are used for XMM registers. In some such examples, 5G-ISA instructions as described herein, when executed, may invoke one(s) of the ZMM registers, the YMM registers, and/or the XMM registers to effectuate 5G-related network workloads. As such, there is an overlay of registers. In some examples, a vector length field selects between a maximum length and one or more other shorter lengths, where each such shorter length is half the length of the preceding length. Scalar operations are operations performed on the lowest order data element position in a ZMM/YMM/XMM register; the higher order data element positions are either left the same as they were prior to the instruction or zeroed depending on the example.

In some examples, the register architecture 2000 includes writemask/predicate registers 2015. For example, there are 8 writemask/predicate registers (sometimes called k0 through k7) that are each 16-bit, 32-bit, 64-bit, or 128-bit in size. Writemask/predicate registers 2015 may allow for merging (e.g., allowing any set of elements in the destination to be protected from updates during the execution of any operation) and/or zeroing (e.g., zeroing vector masks allow any set of elements in the destination to be zeroed during the execution of any operation). In some examples, each data element position in a given writemask/predicate register 2015 corresponds to a data element position of the destination. In other examples, the writemask/predicate registers 2015 are scalable and consist of a set number of enable bits for a given vector element (e.g., 8 enable bits per 64-bit vector element).

The register architecture 2000 includes a plurality of general-purpose registers 2025. These registers may be 16-bit, 32-bit, 64-bit, etc., and can be used for scalar operations. In some examples, these registers are referenced by the names RAX, RBX, RCX, RDX, RBP, RSI, RDI, RSP, and R8 through R15.

In some examples, the register architecture 2000 includes a scalar floating-point register file 2045, which is used for scalar floating-point operations on 32/64/80-bit floating-point data using the x87 instruction set extension or as MMX registers to perform operations on 64-bit packed integer data, as well as to hold operands for some operations performed between the MMX and XMM registers. For example, the 5G-ISA instructions as described herein, when executed, may use the scalar floating-point register file 2045 to process network workloads.

One or more flag registers 2040 (e.g., EFLAGS, RFLAGS, etc.) store status and control information for arithmetic, compare, and system operations. For example, the one or more flag registers 2040 may store condition code information such as carry, parity, auxiliary carry, zero, sign, and overflow. In some examples, the one or more flag registers 2040 are called program status and control registers.

Segment registers 2020 contain segment points for use in accessing memory. In some examples, these registers are referenced by the names CS, DS, SS, ES, FS, and GS.

Machine specific registers (MSRs) 2035 control and report on processor performance. Most MSRs 2035 handle system-related functions and are not accessible to an application program. Machine check registers 2060 consist of control, status, and error reporting MSRs that are used to detect and report on hardware errors.

One or more instruction pointer register(s) 2030 store an instruction pointer value. Control register(s) 2055 (e.g., CR0-CR4) determine the operating mode of a processor (e.g., processor 4415, 4438, 4470, 4480 of FIG. 44, processor 4552 of FIGS. 45 and/or 46, and/or processor 4712 of FIG. 47) and the characteristics of a currently executing task. Debug registers 2050 control and allow for the monitoring of a processor or core's debugging operations.

Memory management registers 2065 specify the locations of data structures used in protected mode memory management. These registers may include a GDTR, IDRT, task register, and a LDTR register.

Alternative examples of the disclosure may use wider or narrower registers. Additionally, alternative examples of the disclosure may use more, less, or different register files and registers.

An instruction set architecture (ISA) (e.g., a 5G-ISA instruction set architecture) may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down through the definition of instruction templates (or sub-formats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA (e.g., a 5G-ISA) is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands.

Examples of the instruction(s) described herein may be embodied in different formats. Additionally, exemplary systems, architectures, and pipelines are detailed below. Examples of the instruction(s) may be executed on such systems, architectures, and pipelines, but are not limited to those detailed.

FIG. 21 illustrates an example of an instruction format. As illustrated, an instruction may include multiple components including, but not limited to, one or more fields for: one or more prefixes 2101, an opcode 2103, addressing information 2105 (e.g., register identifiers, memory addressing information, etc.), a displacement value 2107, and/or an immediate 2109. For example, one(s) of the 5G-ISA instructions as described herein (e.g., the third instructions 808 of FIG. 8) may have an instruction format based on the example of FIG. 21 or portion(s) thereof. Note that some instructions utilize some or all of the fields of the format whereas others may only use the field for the opcode 2103. In some examples, the order illustrated is the order in which these fields are to be encoded, however, it should be appreciated that in other examples these fields may be encoded in a different order, combined, etc.

The prefix(es) field(s) 2101, when used, modifies an instruction. In some examples, one or more prefixes are used to repeat string instructions (e.g., 0xF0, 0xF2, 0xF3, etc.), to provide section overrides (e.g., 0x2E, 0x36, 0x3E, 0x26, 0x64, 0x65, 0x2E, 0x3E, etc.), to perform bus lock operations, and/or to change operand (e.g., 0x66) and address sizes (e.g., 0x67). Certain instructions require a mandatory prefix (e.g., 0x66, 0xF2, 0xF3, etc.). Certain of these prefixes may be considered "legacy" prefixes. Other prefixes, one or more examples of which are detailed herein, indicate, and/or provide further capability, such as specifying particular registers, etc. The other prefixes typically follow the "legacy" prefixes.

The opcode field 2103 is used to at least partially define the operation to be performed upon a decoding of the instruction. In some examples, a primary opcode encoded in the opcode field 2103 is 1, 2, or 3 bytes in length. In other examples, a primary opcode can be a different length. An additional 3-bit opcode field is sometimes encoded in another field.

The addressing field 2105 is used to address one or more operands of the instruction, such as a location in memory or one or more registers.

FIG. 22 illustrates an example of the addressing field 2105 of FIG. 21. For example, the 5G-ISA instructions as described herein may have an addressing field implemented by the addressing field 2105 of FIG. 21. In this illustration, an optional ModR/M byte 2202, and an optional Scale, Index, Base (SIB) byte 2204 are shown. The ModR/M byte 2202 and the SIB byte 2204 are used to encode up to two operands of an instruction, each of which is a direct register or effective memory address. Note that each of these fields are optional in that not all instructions include one or more of these fields. The MOD R/M byte 2202 includes a MOD field 2242, a register field 2244, and R/M field 2246.

The content of the MOD field 2242 distinguishes between memory access and non-memory access modes. In some examples, when the MOD field 2242 has a value of b11, a register-direct addressing mode is utilized, and otherwise register-indirect addressing is used.

The register field 2244 may encode either the destination register operand or a source register operand, or may encode an opcode extension and not be used to encode any instruction operand. The content of register index field 2244, directly or through address generation, specifies the locations of a source or destination operand (either in a register or in memory). In some examples, the register field 2244 is supplemented with an additional bit from a prefix (e.g., prefix 2101) to allow for greater addressing.

The R/M field 2246 may be used to encode an instruction operand that references a memory address, or may be used to encode either the destination register operand or a source register operand. Note the R/M field 2246 may be combined with the MOD field 2242 to dictate an addressing mode in some examples.

The SIB byte 2204 includes a scale field 2252, an index field 2254, and a base field 2256 to be used in the generation of an address. The scale field 2252 indicates scaling factor. The index field 2254 specifies an index register to use. In some examples, the index field 2254 is supplemented with an additional bit from a prefix (e.g., prefix 2101) to allow for greater addressing. The base field 2256 specifies a base register to use. In some examples, the base field 2256 is supplemented with an additional bit from a prefix (e.g., prefix 2101) to allow for greater addressing. In practice, the content of the scale field 2252 allows for the scaling of the content of the index field 2254 for memory address generation (e.g., for address generation that uses $2^{scale}*$index+base).

Some addressing forms utilize a displacement value to generate a memory address. For example, a memory address may be generated according to $2^{scale}*$ index+base+displacement, index*scale+displacement, r/m+displacement, instruction pointer (RIP/EIP)+displacement, register+displacement, etc. The displacement may be a 1-byte, 2-byte, 4-byte, etc., value. In some examples, a displacement field 2107 provides this value. Additionally, in some examples, a displacement factor usage is encoded in the MOD field of the addressing field 2105 that indicates a compressed displacement scheme for which a displacement value is calculated by multiplying disp8 in conjunction with a scaling factor N that is determined based on the vector length, the value of a b bit, and the input element size of the instruction. The displacement value is stored in the displacement field 2107.

In some examples, an immediate field 2109 specifies an immediate for the instruction. An immediate may be encoded as a 1-byte value, a 2-byte value, a 4-byte value, etc.

FIG. 23 illustrates an example of a first prefix 2101(A). In some examples, the first prefix 2101(A) is an example of a REX prefix. Instructions that use this prefix may specify general purpose registers, 64-bit packed data registers (e.g., single instruction, multiple data (SIMD) registers or vector registers), and/or control registers and debug registers (e.g., CR8-CR15 and DR8-DR15).

Instructions using the first prefix 2101(A) may specify up to three registers using 3-bit fields depending on the format: 1) using the reg field 2244 and the R/M field 2246 of the Mod R/M byte 2202; 2) using the Mod R/M byte 2202 with the SIB byte 2204 including using the reg field 2244 and the base field 2256 and index field 2254; or 3) using the register field of an opcode.

In the first prefix 2101(A), bit positions 7:4 are set as 0100. Bit position 3 (W) can be used to determine the operand size, but may not solely determine operand width. As such, when W=0, the operand size is determined by a code segment descriptor (CS.D) and when W=1, the operand size is 64-bit.

Note that the addition of another bit allows for 16 ($2^4$) registers to be addressed, whereas the MOD R/M reg field 2244 and MOD R/M R/M field 2246 alone can each only address 8 registers.

In the first prefix 2101(A), bit position 2 (R) may an extension of the MOD R/M reg field 2244 and may be used to modify the ModR/M reg field 2244 when that field encodes a general purpose register, a 64-bit packed data register (e.g., an SSE register), or a control or debug register. R is ignored when Mod R/M byte 2202 specifies other registers or defines an extended opcode.

Bit position 1 (X) X bit may modify the SIB byte index field 2254.

Bit position B (B) B may modify the base in the Mod R/M R/M field 2246 or the SIB byte base field 2256; or it may modify the opcode register field used for accessing general purpose registers (e.g., general purpose registers 3825).

FIGS. 24A-D illustrate examples of how the R, X, and B fields of the first prefix 2101(A) are used. FIG. 24A illustrates R and B from the first prefix 2101(A) being used to extend the reg field 2244 and R/M field 2246 of the MOD R/M byte 2202 when the SIB byte 2204 is not used for memory addressing. FIG. 24B illustrates R and B from the first prefix 2101(A) being used to extend the reg field 2244 and R/M field 2246 of the MOD R/M byte 2202 when the SIB byte 2204 is not used (register-register addressing). FIG. 24C illustrates R, X, and B from the first prefix 1801(A) being used to extend the reg field 2244 of the MOD R/M byte 2202 and the index field 2254 and base field 2256 when the SIB byte 2204 being used for memory addressing. FIG. 24D illustrates B from the first prefix 2101(A) being used to extend the reg field 2244 of the MOD R/M byte 2202 when a register is encoded in the opcode 2103.

FIGS. 25A-B illustrate examples of a second prefix 2101 (B). In some examples, the second prefix 2101(B) is an example of a VEX prefix. The second prefix 2101(B) encoding allows instructions to have more than two operands, and allows SIMD vector registers (e.g., vector/SIMD registers 2010) to be longer than 64-bits (e.g., 128-bit and 256-bit). The use of the second prefix 2101(B) provides for three-operand (or more) syntax. For example, previous two-operand instructions performed operations such as A=A+B, which overwrites a source operand. The use of the second prefix 2101(B) enables operands to perform nondestructive operations such as A=B+C.

In some examples, the second prefix 2101(B) comes in two forms—a two-byte form and a three-byte form. The two-byte second prefix 2101(B) is used mainly for 128-bit, scalar, and some 256-bit instructions; while the three-byte second prefix 2101(B) provides a compact replacement of the first prefix 2101(A) and 3-byte opcode instructions.

FIG. 25A illustrates an example of a two-byte form of the second prefix 2101(B). In one example, a format field 2501 (byte 0 2503) contains the value C5H. In one example, byte 1 2505 includes a "R" value in bit[7]. This value is the complement of the same value of the first prefix 2101(A). Bit[2] is used to dictate the length (L) of the vector (where a value of 0 is a scalar or 128-bit vector and a value of 1 is a 256-bit vector). Bits[1:0] provide opcode extensionality equivalent to some legacy prefixes (e.g., 00=no prefix, 01=66H, 10=F3H, and 11=F2H). Bits[6:3] shown as vvvv may be used to: 1) encode the first source register operand, specified in inverted (1s complement) form and valid for instructions with 2 or more source operands; 2) encode the destination register operand, specified in is complement form for certain vector shifts; or 3) not encode any operand, the field is reserved and should contain a certain value, such as 1111b.

Instructions that use this prefix may use the Mod R/M R/M field 2246 to encode the instruction operand that references a memory address or encode either the destination register operand or a source register operand.

Instructions that use this prefix may use the Mod R/M reg field 2244 to encode either the destination register operand or a source register operand, be treated as an opcode extension and not used to encode any instruction operand.

For instruction syntax that support four operands, vvvv, the Mod R/M R/M field 2246 and the Mod R/M reg field 2244 encode three of the four operands. Bits[7:4] of the immediate 2109 are then used to encode the third source register operand.

FIG. 25B illustrates an example of a three-byte form of the second prefix 2101(B). In one example, a format field 2511 (byte 0 2513) contains the value C4H. Byte 1 2515 includes in bits[7:5] "R," "X," and "B" which are the complements of the same values of the first prefix 2101(A). Bits[4:0] of byte 1 2515 (shown as mmmmm) include content to encode, as need, one or more implied leading opcode bytes. For example, 00001 implies a 0FH leading opcode, 00010 implies a 0F38H leading opcode, 00011 implies a leading 0F3AH opcode, etc.

Bit[7] of byte 2 2517 is used similar to W of the first prefix 2101(A) including helping to determine promotable operand sizes. Bit[2] is used to dictate the length (L) of the vector (where a value of 0 is a scalar or 128-bit vector and a value of 1 is a 256-bit vector). Bits[1:0] provide opcode extensionality equivalent to some legacy prefixes (e.g., 00=no prefix, 01=66H, 10=F3H, and 11=F2H). Bits[6:3], shown as vvvv, may be used to: 1) encode the first source register operand, specified in inverted (1s complement) form and valid for instructions with 2 or more source operands; 2) encode the destination register operand, specified in is complement form for certain vector shifts; or 3) not encode any operand, the field is reserved and should contain a certain value, such as 1111b.

Instructions that use this prefix may use the Mod R/M R/M field 2246 to encode the instruction operand that references a memory address or encode either the destination register operand or a source register operand.

Instructions that use this prefix may use the Mod R/M reg field 2244 to encode either the destination register operand or a source register operand, be treated as an opcode extension and not used to encode any instruction operand.

For instruction syntax that support four operands, vvvv, the Mod R/M R/M field 2246, and the Mod R/M reg field 2244 encode three of the four operands. Bits[7:4] of the immediate 2109 are then used to encode the third source register operand.

Figure 26:
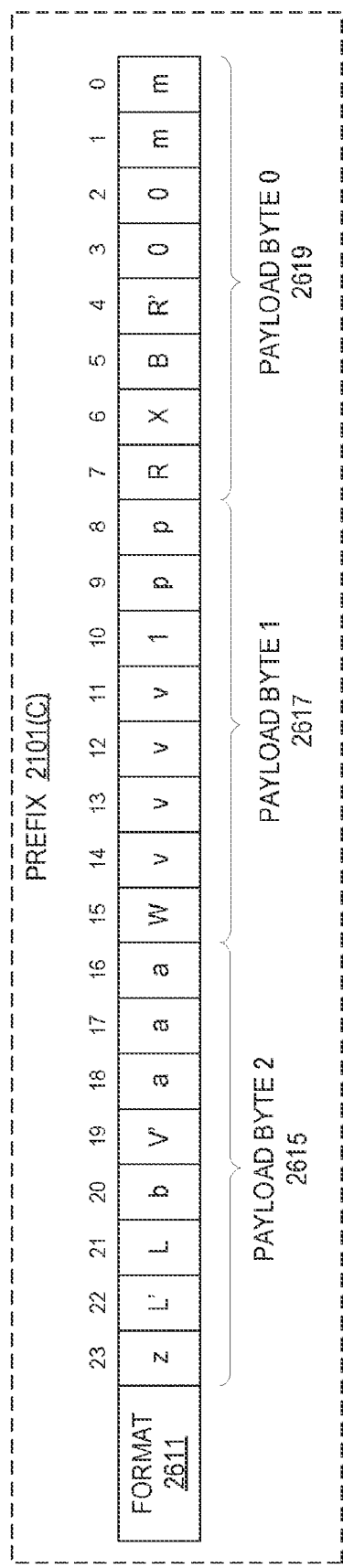
FIG. 26 illustrates an example of a third prefix.

FIG. 26 illustrates an example of a third prefix 2101(C). In some examples, the first prefix 2101(A) is an example of an EVEX prefix. The third prefix 2101(C) is a four-byte prefix.

The third prefix 2101(C) can encode 32 vector registers (e.g., 128-bit, 256-bit, and 512-bit registers) in 64-bit mode. In some examples, instructions that utilize a writemask/opmask (see discussion of registers in a previous figure, such as FIG. 20) or predication utilize this prefix. Opmask register allow for conditional processing or selection control. Opmask instructions, whose source/destination operands are opmask registers and treat the content of an opmask register as a single value, are encoded using the second prefix 2101(B).

The third prefix 2101(C) may encode functionality that is specific to instruction classes (e.g., a packed instruction with "load+op" semantic can support embedded broadcast functionality, a floating-point instruction with rounding semantic can support static rounding functionality, a floating-point instruction with non-rounding arithmetic semantic can support "suppress all exceptions" functionality, etc.). For example, the third prefix 2101(C) may encode functionality that is specific to a 5G-ISA instruction class.

The first byte of the third prefix 2101(C) is a format field 2611 that has a value, in one example, of 62H. Subsequent bytes are referred to as payload bytes 2615-2619 and collectively form a 24-bit value of P[23:0] providing specific capability in the form of one or more fields (detailed herein).

In some examples, P[1:0] of payload byte 2619 are identical to the low two mmmmm bits. P[3:2] are reserved in some examples. Bit P[4] (R') allows access to the high 16 vector register set when combined with P[7] and the ModR/M reg field 2244. P[6] can also provide access to a high 16 vector register when SIB-type addressing is not needed. P[7:5] consist of an R, X, and B which are operand specifier modifier bits for vector register, general purpose register, memory addressing and allow access to the next set of 8 registers beyond the low 8 registers when combined with the ModR/M register field 2244 and ModR/M R/M field 2246. P[9:8] provide opcode extensionality equivalent to some legacy prefixes (e.g., 00=no prefix, 01=66H, 10=F3H, and 11=F2H). P[10] in some examples is a fixed value of 1. P[14:11], shown as vvvv, may be used to: 1) encode the first source register operand, specified in inverted (1s complement) form and valid for instructions with 2 or more source operands; 2) encode the destination register operand, specified in is complement form for certain vector shifts; or 3) not encode any operand, the field is reserved and should contain a certain value, such as 1111b.

P[15] is similar to W of the first prefix 2101(A) and second prefix 2101(B) and may serve as an opcode extension bit or operand size promotion.

P[18:16] specify the index of a register in the opmask (writemask) registers (e.g., writemask/predicate registers 2015). In some examples, the specific value aaa=000 has a special behavior implying no opmask is used for the particular instruction (this may be implemented in a variety of ways including the use of an opmask hardwired to all ones or hardware that bypasses the masking hardware). When merging, vector masks allow any set of elements in the destination to be protected from updates during the execution of any operation (specified by the base operation and the augmentation operation). In some examples, preserving the old value of each element of the destination where the corresponding mask bit has a 0. In contrast, when zeroing vector masks allow any set of elements in the destination to be zeroed during the execution of any operation (specified by the base operation and the augmentation operation). In some examples, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the opmask field allows for partial vector operations, including loads, stores, arithmetic, logical, etc. While examples are described in which the opmask field's content selects one of a number of opmask registers that contains the opmask to be used (and thus the opmask field's content indirectly identifies that masking to be performed), alternative examples instead or additional allow the mask write field's content to directly specify the masking to be performed.

P[19] can be combined with P[14:11] to encode a second source vector register in a non-destructive source syntax which can access an upper 16 vector registers using P[19]. P[20] encodes multiple functionalities, which differs across different classes of instructions and can affect the meaning of the vector length/rounding control specifier field (P[22:21]). P[23] indicates support for merging-writemasking (e.g., when set to 0) or support for zeroing and merging-writemasking (e.g., when set to 1).

Examples of encoding of registers in instructions using the third prefix 2101(C) are detailed in the following tables.

TABLE 1

32-Register Support in 64-bit Mode

| | 4 | 3 | [2:0] | REG. TYPE | COMMON USAGES |
|---|---|---|---|---|---|
| REG | R' | R | ModR/M reg | GPR, Vector | Destination or Source |
| VVVV | V' | | vvvv | GPR, Vector | 2nd Source or Destination |
| RM | X | B | ModR/M R/M | GPR, Vector | 1st Source or Destination |
| BASE | 0 | B | ModR/M R/M | GPR | Memory addressing |
| INDEX | 0 | X | SIB. index | GPR | Memory addressing |
| VIDX | V' | X | SIB. index | Vector | VSIB memory addressing |

TABLE 2

Encoding Register Specifiers in 32-bit Mode

| | [2:0] | REG. TYPE | COMMON USAGES |
|---|---|---|---|
| REG | ModR/M reg | GPR, Vector | Destination or Source |
| VVVV | vvvv | GPR, Vector | $2^{nd}$ Source or Destination |
| RM | ModR/M R/M | GPR, Vector | $1^{st}$ Source or Destination |
| BASE | ModR/M R/M | GPR | Memory addressing |
| INDEX | SIB. index | GPR | Memory addressing |
| VIDX | SIB. index | Vector | VSIB memory addressing |

TABLE 3

Opmask Register Specifier Encoding

| | [2:0] | REG. TYPE | COMMON USAGES |
|---|---|---|---|
| REG | ModR/M Reg | k0-k7 | Source |
| VVVV | vvvv | k0-k7 | $2^{nd}$ Source |
| RM | ModR/M R/M | k0-7 | $1^{st}$ Source |
| {k1} | aaa | k0$^1$-k7 | Opmask |

Program code may be applied to input instructions to perform the functions described herein and generate output information. The output information may be applied to one or more output devices. In some examples, a processing system includes any system that has a processor, such as, for example, a DSP, a microcontroller, an ASIC, or a microprocessor.

In some examples, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 27:
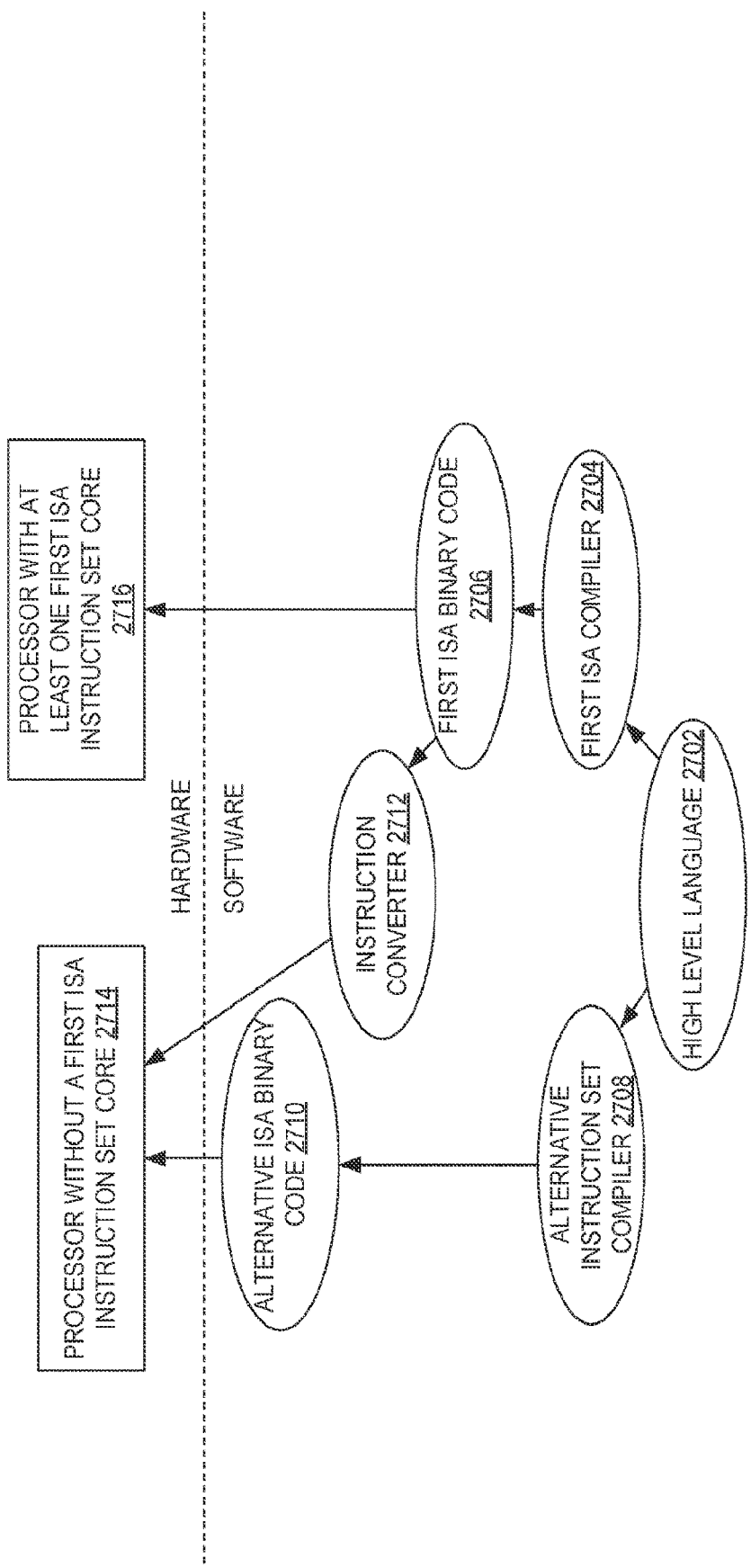
FIG. 27 illustrates a block diagram contrasting the use of a software instruction converter to convert binary instructions in a source instruction set to binary instructions in a target instruction set according to examples of the disclosure.

FIG. 27 illustrates a block diagram contrasting the use of a software instruction converter to convert binary instructions in a source instruction set to binary instructions in a target instruction set according to examples of the disclosure. In the illustrated example, the instruction converter is a software instruction converter, although alternatively the instruction converter may be implemented in software, firmware, hardware, or various combinations thereof. FIG. 27 shows a program in a high level language 2702 may be compiled using a first ISA compiler 2704 to generate first ISA binary code 2706 that may be natively executed by a processor with at least one first instruction set core 2716. The processor with at least one first ISA instruction set core 2716 represents any processor that can perform substantially the same functions as an Intel® processor with at least one first ISA instruction set core by compatibly executing or otherwise processing (1) a substantial portion of the instruction set of the first ISA instruction set core or (2) object code versions of applications or other software targeted to run on an Intel processor with at least one first ISA instruction set core, in order to achieve substantially the same result as a processor with at least one first ISA instruction set core. The first ISA compiler 2704 represents a compiler that is operable to generate first ISA binary code 2706 (e.g., object code) that can, with or without additional linkage processing, be executed on the processor with at least one first ISA instruction set core 2716. Similarly, FIG. 27 shows the program in the high level language 2702 may be compiled using an alternative instruction set compiler 2708 to generate alternative instruction set binary code 2710 that may be natively executed by a processor without a first ISA instruction set core 2714. The instruction converter 2712 is used to convert the first ISA binary code 2706 into code that may be natively executed by the processor without a first ISA instruction set core 2714. This converted code is not likely to be the same as the alternative instruction set binary code 2710 because an instruction converter capable of this is difficult to make; however, the converted code will accomplish the general operation and be made up of instructions from the alternative instruction set. Thus, the instruction converter 2712 represents software, firmware, hardware, or a combination thereof that, through emulation, simulation or any other process, allows a processor or other electronic device that does not have a first ISA instruction set processor or core to execute the first ISA binary code 2706.

Figure 28:
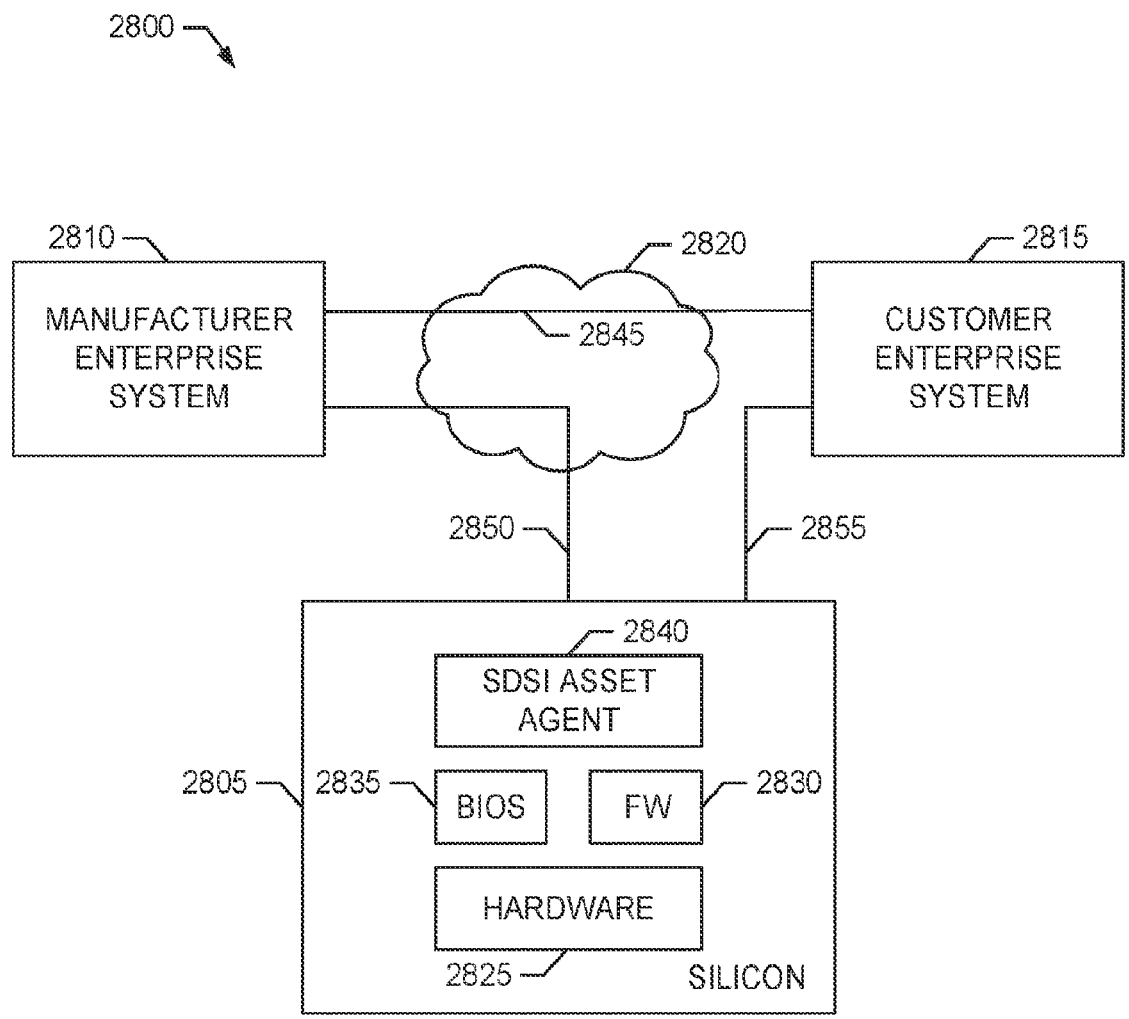
FIG. 28 is a block diagram of an example system to implement and manage software defined silicon products in accordance with teachings of this disclosure.
Figure 29:
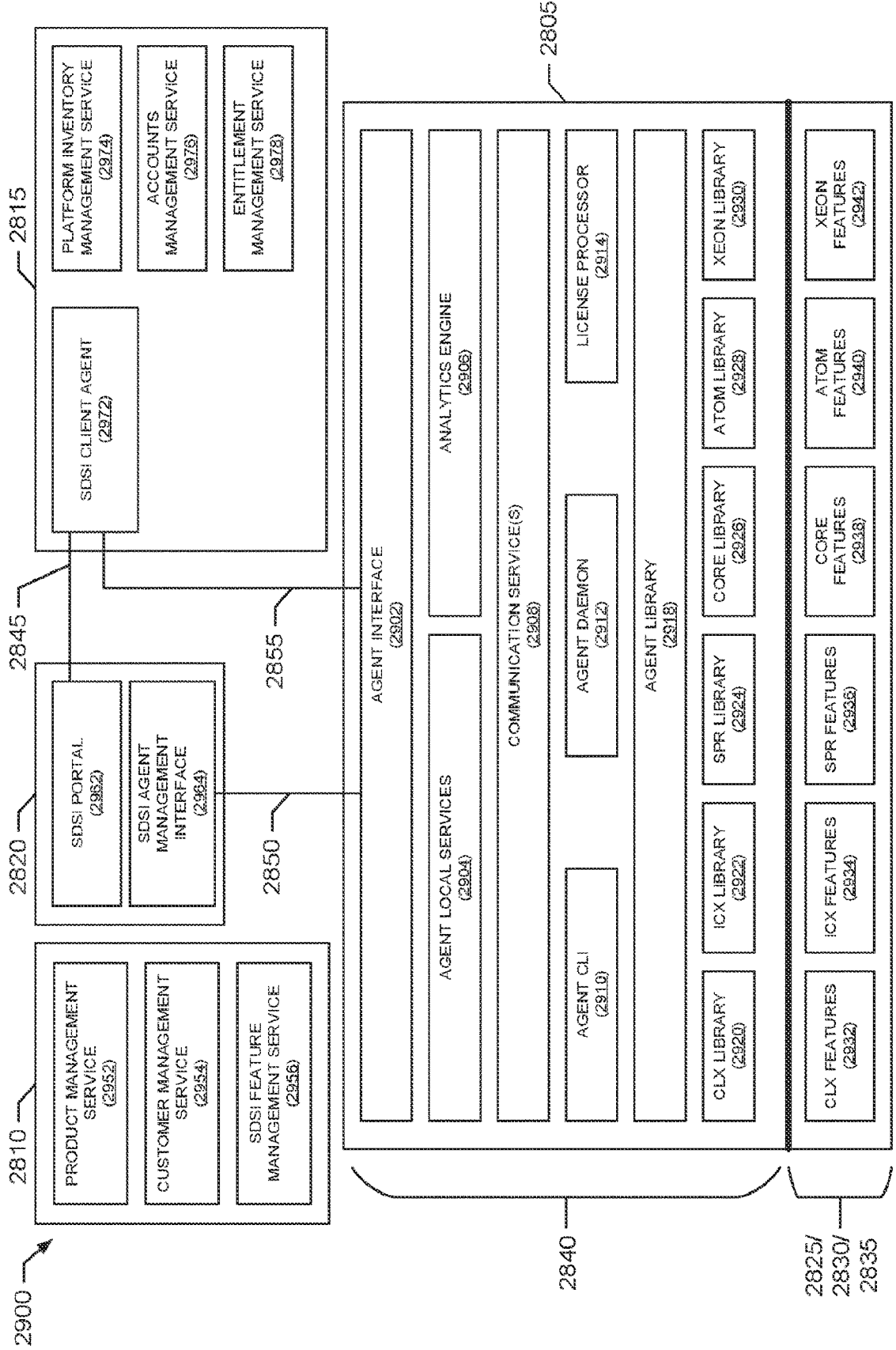
FIG. 29 is a block diagram illustrating example implementations of an example software defined silicon agent, an example manufacturer enterprise system and an example customer enterprise system included in the example system of FIG. 28.
Figure 30:
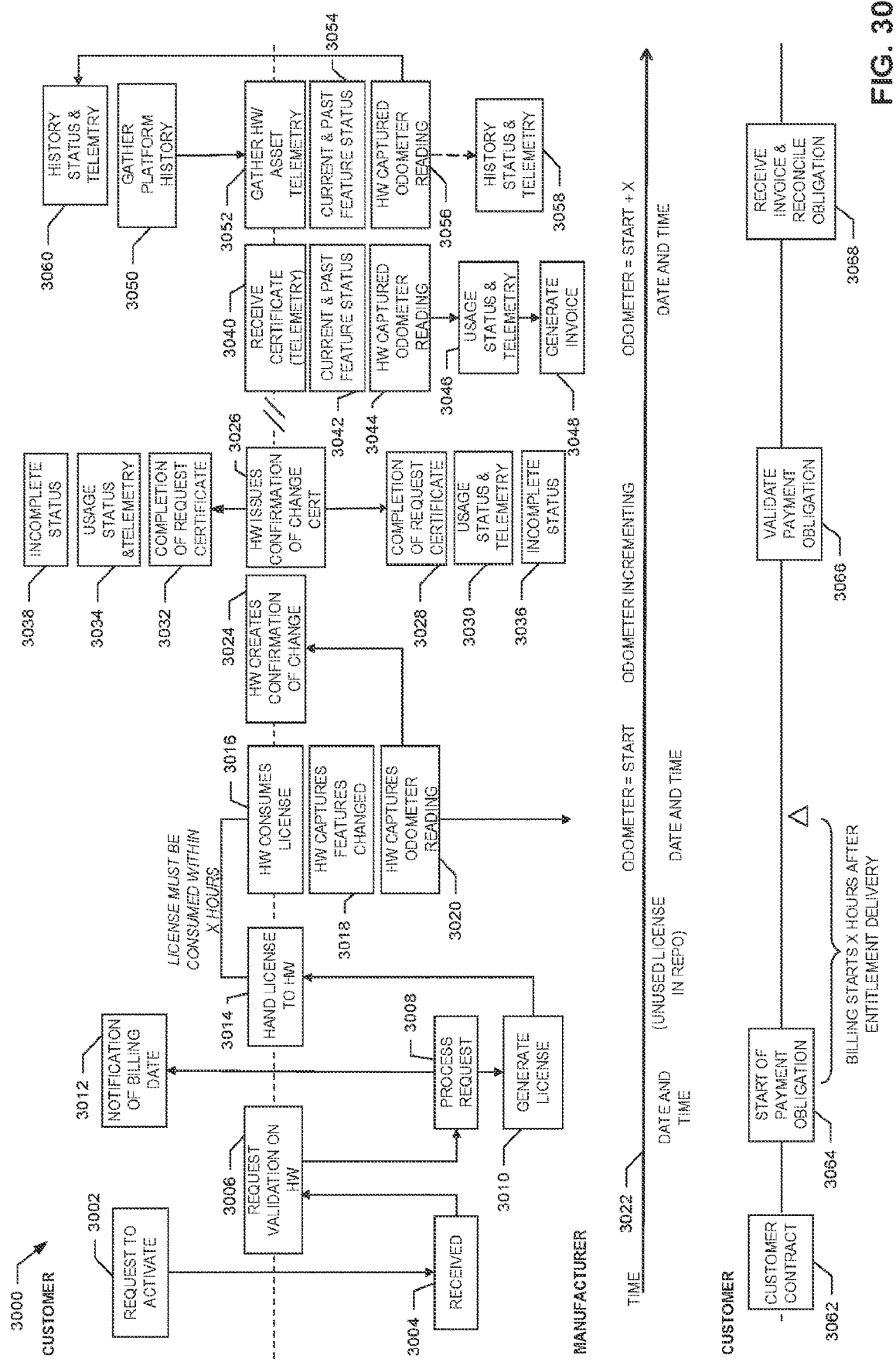
FIG. 30 illustrates an example software defined silicon management lifecycle implemented by the example systems of FIGS. 28 and/or 29.

FIGS. 28-30 illustrate example implementations of managing SDSi products in accordance with teachings of this disclosure. Device enhancements for software defined silicon implementations are also disclosed herein. As used herein, "the absolute time" refers to a particular clock and date reading (e.g., 11:11 PM EST, Jan. 1, 2020, etc.). As used herein, "the relative time" refers to an elapsed time between a fixed event (e.g., a time of manufacture of a device, etc.) and the current time. As used, herein a "time reference" refers to a singular absolute time reading and/or a singular relative time reading and may be used to generate a timestamp and/or an odometer reading.

As used herein, a "feature configuration" of a silicon product refers to the hardware, firmware, and/or physical features enabled on the silicon products. Feature configurations can, for example, include the number of cores of a processor that have been activated and/or the speed at which each core runs. As described in further detail below, a license can be used to change the feature configuration of a silicon product.

As least some prior silicon products, such as CPUs and other semiconductor devices, are not able to provide/determine relative or absolute time references. For example, some existing CPUs lack internal clocks. Also, in at least some silicon products that include clocks, the clocks can be set and/or adjusted by a user of the machine, and, thusly, may not be reliable for determining absolute and/or relative time references. Further, some internal clocks (e.g., monotonic clocks, etc.) require power and, accordingly, cannot measure time if the silicon product and/or machine including the silicon product is powered off. Example SDSi systems disclosed herein utilize absolute and/or relative time references to enable or prohibit certain actions to ensure business and financial viability of feature activation decisions associated with the silicon product. In some examples, some silicon product features can be available only before or after a particular date and/or time from the time of manufacture of the processor.

Examples disclosed herein overcome the above-noted problems by adding one or more features to the silicon product, such that the feature has electrical properties that are time-dependent. In some examples disclosed herein, the electrical properties of the feature change in a known or predetermined manner as a function of time. In some examples disclosed herein, the electrical properties of the feature change when the silicon product is not powered on. In some examples disclosed herein, by determining the electrical properties of the feature at two separate points of time, the relative time between those points can be determined. In some examples disclosed herein, the electrical properties of the time-dependent features are measured at the time of manufacture and are stored with the date and time of manufacture. In such examples, the absolute time can be determined by adding the determined relative time between the current time and the time of manufacture to the date and time of manufacture. In some examples disclosed herein, the feature is implemented by a radioisotope. In some examples disclosed herein, the feature is implemented by a physical unclonable function (PUF) with time-varying electrical properties. As such, the examples disclosed herein provide a reliable and unfalsifiable measures of absolute and relative time references that do not require constant power to the silicon product and/or machine in which the silicon product is used.

Examples disclosed herein enable users, customers, and/or machine-manufacturers flexibility of changing the configuration of a processor after the silicon product has been manufactured. In some examples, the changing of the configuration of a silicon product can affect the operating conditions (e.g., TDP, etc.) of the silicon product, and, thusly, affect the lifespan and/or condition of the processor. As such, in some examples, changing the configuration of the silicon product can cause the silicon product to have a combination of features that damage the silicon product and/or reduce the lifespan of a silicon product to an unacceptable level. In some examples, the features activated in a given configuration can affect the operating conditions of a silicon product in an interdependent manner. For example, the number of active cores in a semiconductor device such as a CPU impacts the maximum frequency those cores can operate at, as well as the thermal design power of the semiconductor device. As such, to prevent unacceptable device degradation and damage, examples disclosed herein account for the effect of each feature on the operating conditions of the device.

A block diagram of an example system 2800 to implement and manage SDSi products in accordance with teachings of this disclosure is illustrated in FIG. 28. The example SDSi system 2800 of FIG. 28 includes an example silicon product 2805, such as an example semiconductor device 2805 or any other silicon asset 2805, that implement SDSi features as disclosed herein. Thus, the silicon product 2805 of the illustrated example is referred to herein as an SDSi product 2805, such as an SDSi semiconductor device 2805 or SDSi silicon asset 2805. In some examples, the silicon product 2805 may implement the multi-core CPU 802 of FIG. 8, the multi-core CPU 902 of FIG. 9, the hardware 1004 of FIG. 10, etc. The system 2800 also includes an example manufacturer enterprise system 2810 and an example customer enterprise system 2815 to manage the SDSi product 2805. In the illustrated example of FIG. 28, at least some aspects of the manufacturer enterprise system 2810 are implemented as cloud services in an example cloud platform 2820.

The example manufacturer enterprise system 2810 can be implemented by any number(s) and/or type(s) of computing devices, servers, data centers, etc. In some examples, the manufacturer enterprise system 2810 is implemented by a processor platform, such as the example multiprocessor processor system 4400 of FIG. 44, the computing device 4550 of FIG. 45, the system 4600 of FIG. 46, and/or the processor platform 4700 of FIG. 47. In some examples, the manufacturer enterprise system 2810 may be implemented by the manufacturer enterprise system 1002 of FIG. 10. Likewise, the example customer enterprise system 2815 can be implemented by any number(s) and/or type(s) of computing devices, servers, data centers, etc. In some examples, the customer enterprise system 2815 is implemented by a processor platform, such as the example multiprocessor processor system 4400 of FIG. 44, the computing device 4550 of FIG. 45, the system 4600 of FIG. 46, and/or the processor platform 4700 of FIG. 47. The example cloud platform 2820 can be implemented by any number(s) and/or type(s), such as Amazon Web Services (AWS®), Microsoft's Azure® Cloud, etc. In some examples, the cloud platform 2820 is implemented by one or more edge clouds as described above in connection with FIGS. 2-4. Aspects of the manufacturer enterprise system 2810, the customer enterprise system 2815 and the cloud platform 2820 are described in further detail below.

In the illustrated example of FIG. 28, the SDSi product 2805 is an SDSi semiconductor device 2805 that includes example hardware circuitry 2825 that is configurable under the disclosed SDSi framework to provide one or more features. For example, such features can include a configurable number of processor cores, a configurable clock rate from a set of possible clock rates, a configurable cache topology from a set of possible cache topologies, configurable coprocessors, configurable memory tiering, etc. In some examples, such features may be based on a plurality of application ratios as described herein. As such, the hardware circuitry 2825 can include one or more analog or digital circuit(s), logic circuits, programmable processor(s), programmable controller(s), GPU(s), DSP(s), ASIC(s), PLD(s), field programmable gate arrays (FPGAs), FPLD(s), etc., or any combination thereof. The SDSi semiconductor device 2805 of FIG. 28 also includes example firmware 2830 and an example basic input/output system (BIOS) 2835 to, among other things, provide access to the hardware circuitry 2825. In some examples, the firmware 2830 and/or the BIOS 2835 additionally or alternatively implement features that are configurable under the disclosed SDSi framework. The SDSi semiconductor device 2805 of FIG. 28 further includes an example SDSi asset agent 2840 to configure (e.g., activate, deactivate, etc.) the SDSi features provided by the hardware circuitry 2825 (and/or the firmware 2830 and/or the BIOS 2835), confirm such configuration and operation of the SDSi features, report telemetry data associated with operation of the SDSi semiconductor device 2805, etc. Aspects of the SDSi asset agent 2840 are described in further detail below.

The system 2800 allows a customer, such as an original equipment manufacturer (OEM) of computers, tablets, mobile phones, other electronic devices, etc., to purchase the SDSi semiconductor device 2805 from a silicon manufacturer and later configure (e.g., activate, deactivate, etc.) one or more SDSi features of the SDSi semiconductor device 2805 after it has left the silicon manufacturer's factory. In some examples, the system 2800 allows the customer (OEM) to configure (e.g., activate, deactivate, etc.) the SDSi feature(s) of the SDSi semiconductor device 2805 at the customer's facility (e.g., during manufacture of a product including the SDSi semiconductor device 2805) or even downstream after customer's product containing the SDSi semiconductor device 2805 has been purchased by a third party (e.g., a reseller, a consumer, etc.)

By way of example, consider an example implementation in which the semiconductor device 2805 includes up to eight (8) processor cores. Previously, the number of cores activated on the semiconductor device 2805 would be fixed, or locked, at the manufacturer's factory. Thus, if a customer wanted the semiconductor device 2805 to have two (2) active cores, the customer would contract with the manufacturer to purchase the semiconductor device 2805 with 2 active cores, and the manufacturer would ship the semiconductor device 2805 with 2 cores activated, and identify the shipped device with a SKU indicating that 2 cores were active. However, the number of active cores (e.g., 2 in this example) could not be changed after the semiconductor device 2805 left the manufacturer's factory. Thus, if the customer later determined that 4 (or 8) active cores were needed for its products, the customer would have to contract with the manufacturer to purchase new versions of the semiconductor device 2805 with 4 (or 8) active cores, and the manufacturer would ship the new versions of the semiconductor device 2805 with 4 (or 8) cores activated, and identify the shipped device with a different SKU indicating that 4 (or 8) cores were active. In such examples, the customer and/or the manufacturer may be left with excess inventory of the semiconductor device 2805 with the 2-core configuration, which can incur economic losses, resource losses, etc.

In contrast, assume the number of processor cores activated on the semiconductor device 2805 is an SDSi feature that can be configured in the example system 2800 in accordance with teachings of this disclosure. In such an example, the customer could contract with the manufacturer to purchase the SDSi semiconductor device 2805 with 2 active cores, and the manufacturer would ship the SDSi semiconductor device 2805 with 2 cores activated, and identify the shipped device with a SKU indicating that 2 cores were active. After the device is shipped, if the customer determines that it would prefer that 4 cores were active, the customer management system 2805 can contact the manufacturer enterprise system 2810 via a cloud service implemented by the cloud platform 2820 (represented by the line labeled 2845 in FIG. 28) to request activation of 2 additional cores. Assuming the request is valid, the manufacturer enterprise system 2810 generates a license (also referred to as a license key) to activate the 2 additional cores, and sends the license to the customer management system 2815 via the cloud service implemented by the cloud platform 2820 (represented by the line labeled 2845 in FIG. 28) to confirm the grant of an entitlement to activate the 2 additional cores. The customer enterprise system 2815 then sends the license (or license key) to the SDSi asset agent 2840 of the SDSi semiconductor device 2805 (via a network as represented by represented by the line labeled 2855 in FIG. 28) to cause activation of 2 additional cores provided by the hardware circuitry 2825 of the SDSi semiconductor device 2805. In the illustrated example, the SDSi asset agent 2840 reports a certificate back to the manufacturer enterprise system 2810 (e.g., via an appropriate cloud service implemented by the cloud platform 2820, as represented by the line labeled 2850 in FIG. 28) to confirm activation of the 2 cores. In some examples, the SDSi asset agent 2840 also reports the certificate back to the customer enterprise system 2815 (e.g., via the network as represented by the line labeled 2855 in FIG. 28) to confirm activation of the 2 cores. In some examples, the SDSi asset agent 2840 also reports telemetry data associated with operation of the SDSi semiconductor device 2805 to the manufacturer enterprise system 2810 (e.g., via the appropriate cloud service implemented by the cloud platform 2820, as represented by the line labeled 2850 in FIG. 28) and/or the customer enterprise system 2815 (e.g., via the network as represented by the line labeled 2855 in FIG. 28). After successful activation is confirmed, the manufacturer then invoices the customer (e.g., via the manufacturer enterprise system 2810 and the customer management system 2815) for the newly activate features (e.g., 2 additional cores). In some examples, the manufacturer enterprise system 2810 and/or the customer management system 2815 determine a new SKU (e.g., a soft SKU) to identify the same SDSi semiconductor device 2805 but with the new feature configuration (e.g., 4 cores instead of 2 cores).

If the customer later determines that it would prefer that 8 cores were active, the customer management system 2815 can contact the manufacturer enterprise system 2810 via the cloud service implemented by the cloud platform 2820 (represented by the line labeled 2845 in FIG. 28) to request activation of the remaining 4 additional cores. Assuming the request is valid, the manufacturer enterprise system 2810 generates another license (or license key) to activate the 4 additional cores, and sends the license to the customer management system 2815 via the cloud service implemented by the cloud platform 2820 (represented by the line labeled 2845 in FIG. 28) to confirm the grant of an entitlement to activate the 4 remaining cores. The customer enterprise system 2815 then sends license (or license key) to the SDSi asset agent 2840 of the SDSi semiconductor device 2805 (e.g., via the network as represented by the line labeled 2855 in FIG. 28) to cause activation of the 4 remaining cores provided by the hardware circuitry 2825 of the SDSi semiconductor device 2805. In the illustrated example, the SDSi asset agent 2840 reports a certificate back to the manufacturer enterprise system 2810 (e.g., via the appropriate cloud service implemented by the cloud platform 2820, as represented by the line labeled 2850 in FIG. 28) to confirm activation of the 4 remaining cores. In some examples, the SDSi asset agent 2840 also reports the certificate back to the customer enterprise system 2815 (e.g., via the network as represented by the line labeled 2855 in FIG. 28) to confirm activation of the 4 remaining cores. In some examples, the SDSi asset agent 2840 reports telemetry data associated with operation of the SDSi semiconductor device 2805 to the manufacturer enterprise system 2810 (e.g., via the appropriate cloud service implemented by the cloud platform 2820, as represented by the line labeled 2850 in FIG. 28) and/or the customer enterprise system 2815 (e.g., via the network as represented by the line labeled 2855 in FIG. 28). After successful activation is confirmed, the manufacturer then invoices the customer (e.g., via the manufacturer enterprise system 2810 and the customer management system 2815) for the newly activate features (e.g., the 4 additional cores). In some examples, the manufacturer enterprise system 2810 and/or the customer management system 2815 determine yet another new SKU (e.g., a soft SKU) to identify the same SDSi semiconductor device 2805 but with the new feature configuration (e.g., 8 cores instead of 4 cores).

By way of another example, consider an example implementation in which the semiconductor device 2805 includes up to thirty-two (32) processor cores configured by selecting a first application of three or more application ratios. Previously, the application ratio of the semiconductor device 2805 activated on the semiconductor device 2805 would be fixed, or locked, at the manufacturer's factory. Thus, if a customer wanted the semiconductor device 2805 to have a second application ratio, such as to implement a vRAN DU instead of a core server, the customer management system 2805 can contact the manufacturer enterprise system 2810 via a cloud service implemented by the cloud platform 2820 to request activation of the second application ratio. Assuming the request is valid, the manufacturer enterprise system 2810 generates a license (also referred to as a license key) to activate the second application ratio, and sends the license to the customer management system 2815 via the cloud service implemented by the cloud platform 2820 to confirm the grant of an entitlement to activate the second application ratio. The customer enterprise system 2815 then sends the license (or license key) to the SDSi asset agent 2840 of the SDSi semiconductor device 2805 (via a network as represented by represented by the line labeled 2855 in FIG. 28) to cause activation of the second application ratio provided by the hardware circuitry 2825 of the SDSi semiconductor device 2805. For example, in response to activating the second application ratio, the SDSi semiconductor device 2805 can configure core(s), uncore(s), etc., of the SDSi semiconductor device 2805 based on the second application ratio. In some examples, the activation includes activating one(s) of the configurations 1535 of FIG. 15. In some examples, the activation includes transmitting new one(s) of the hardware configuration(s) 1074 of FIG. 10, the configuration information 1100 of FIG. 11, the configurations 1535 of FIG. 15, etc., to the SDSi semiconductor device 2805.

In the illustrated example, the SDSi asset agent 2840 reports a certificate back to the manufacturer enterprise system 2810 (e.g., via an appropriate cloud service implemented by the cloud platform 2820, as represented by the line labeled 2850 in FIG. 28) to confirm activation of the second application ratio. In some examples, the SDSi asset agent 2840 also reports the certificate back to the customer enterprise system 2815 (e.g., via the network as represented by the line labeled 2855 in FIG. 28) to confirm activation of the second application ratio. In some examples, the SDSi asset agent 2840 also reports telemetry data associated with operation of the SDSi semiconductor device 2805 to the manufacturer enterprise system 2810 (e.g., via the appropriate cloud service implemented by the cloud platform 2820, as represented by the line labeled 2850 in FIG. 28) and/or the customer enterprise system 2815 (e.g., via the network as represented by the line labeled 2855 in FIG. 28). After successful activation is confirmed, the manufacturer then invoices the customer (e.g., via the manufacturer enterprise system 2810 and the customer management system 2815) for the newly activate features (e.g., the second application ratio). In some examples, the manufacturer enterprise system 2810 and/or the customer management system 2815 determine a new SKU (e.g., a soft SKU) to identify the same SDSi semiconductor device 2805 but with the new feature configuration (e.g., the second application ratio instead of the first application ratio).

In the illustrated examples of FIG. 28, the communications between the manufacturer enterprise system 2810 and the customer enterprise system 2815, between the manufacturer enterprise system 2810 and the SDSi asset agent 2840 of the SDSi semiconductor device 2805, and between the SDSi asset agent 2840 of the SDSi semiconductor device 2805 and the customer enterprise system 2815 can be implemented by one or more networks. For example, such networks can include the Internet, one or more wireless (cellular, satellite, etc.) service provider networks, one or more wired (e.g., cable, digital subscriber line, optical fiber, etc.) networks, one or more communication links, busses, etc.

In some examples, the SDSi semiconductor device 2805 is included in or otherwise implements an example edge node, edge server, etc., included in or otherwise implementing one or more edge clouds. In some examples, the SDSi semiconductor device 2805 is included in or otherwise implements an appliance computing device. In some examples, the manufacturer enterprise system 2810 is implemented by one or more edge node, edge server, etc., included in or otherwise implementing one or more edge clouds. In some examples, the manufacturer enterprise system 2810 is implemented by one or more appliance computing devices. In some examples, the customer enterprise system 2815 is implemented by one or more edge node, edge server, etc., included in or otherwise implementing one or more edge clouds. In some examples, the customer enterprise system 2815 is implemented by one or more appliance computing devices. Examples of such edge nodes, edge servers, edge clouds and appliance computing devices are described in further detail above in connection with FIGS. 2-4. Furthermore, in some examples, such edge nodes, edge servers, edge clouds and appliance computing devices may themselves be implemented by SDSi semiconductor devices capable of being configured/managed in accordance with the teachings of this disclosure.

In some examples, the manufacturer enterprise system 2810 communicates with multiple customer enterprise systems 2815 and/or multiple SDSi semiconductor devices 2805 via the cloud platform 2820. In some examples, the manufacturer enterprise system 2810 communicates with multiple customer enterprise systems 2815 and/or multiple SDSi semiconductor device(s) 2805 via the cloud platform 2820 through one or more edge servers/nodes. In either such example, the customer enterprise system(s) 2815 and/or SDSi semiconductor device(s) 2805 can themselves correspond to one or more edge nodes, edge servers, edge clouds and appliance computing devices, etc.

In some examples, the manufacturer enterprise system 2810 may delegate SDSi license generation and management capabilities to one or more remote edge nodes, edge servers, edge clouds, appliance computing devices, etc., located withing a customer's network domain. For example, such remote edge nodes, edge servers, edge clouds, appliance computing devices, etc., may be included in the customer enterprise system 2815. In some such examples, the manufacturer enterprise system 2810 can delegate to such remote edge nodes, edge servers, edge clouds, appliance computing devices, etc., a full ability to perform SDSi license generation and management associated with the customer's SDSi semiconductor devices 2805 provided the remote edge nodes, edge servers, edge clouds, appliance computing devices, etc., are able to communicate with manufacturer enterprise system 2810. However, in some examples, if communication with the manufacturer enterprise system 2810 is disrupted, the remote edge nodes, edge servers, edge clouds, appliance computing devices may have just a limited ability to perform SDSi license generation and management associated with the customer's SDSi semiconductor devices 2805. For example, such limited ability may restrict the delegated SDSi license generation and management to supporting failure recovery associated with the SDSi semiconductor devices 2805. Such failure recovery may be limited to generating and providing licenses to configure SDSi features of a client's SDSi semiconductor device 2805 to compensate for failure of one or more components of the SDSi semiconductor device 2805 (e.g., to maintain a previously contracted quality of service).

A block diagram of an example system 2900 that illustrates example implementations of the SDSi asset agent 2840 of the SDSi silicon product 2805, the manufacturer enterprise system 2810 and the customer enterprise system 2815 included in the example system 2800 of FIG. 28 is illustrated in FIG. 29. The example SDSi asset agent 2840 of FIG. 29 includes an example agent interface 2902, example agent local services 2904, an example analytics engine 2906, example communication services 2908, an example agent command line interface (CLI) 2910, an example agent daemon 2912, an example license processor 2914, and an example agent library 2918. The example SDSi asset agent 2840 of FIG. 29 also includes example feature libraries 2920-2930 corresponding to respective example feature sets 2932-2942 implemented by the hardware circuitry 2825, firmware 2830 and/or BIOS 2835 of the SDSi semiconductor device 2805. The example manufacturer enterprise system 2810 of FIG. 29 includes an example product management service 2952, an example customer management service 2954, and an example SDSi feature management service 2956. The example manufacturer enterprise system 2810 of FIG. 29 also implements an example SDSi portal 2962 and an example SDSi agent management interface 2964 as cloud services in the cloud platform 2820. The example customer enterprise system 2815 of FIG. 29 includes an example SDSi client agent 2972, an example platform inventory management service 2974, an example accounts management service 2976, and an example entitlement management service 2978.

In the illustrated example of FIG. 29, the agent interface 2902 implements an interface to process messages sent between the SDSi asset agent 2840 and the manufacturer enterprise system 2810, and between the SDSi asset agent 2840 and the customer enterprise system 2815. The SDSi asset agent 2840 of the illustrated example includes the agent local services 2904 to implement any local services used to execute the SDSi asset agent 2840 on the semiconductor device 2805. The SDSi asset agent 2840 of the illustrated example includes the analytics engine 2906 to generate telemetry data associated with operation of the semiconductor device 2805. Accordingly, the analytics engine 2906 is an example of means for reporting telemetry data associated with operation of the semiconductor device 2805. The communication services 2908 provided in the SDSi asset agent 2840 of the illustrated example include a local communication service to enable the SDSi asset agent 2840 to communicate locally with the other elements of the semiconductor device 2805 and/or a product platform including the semiconductor device 2805. The communication services 2908 also include a remote communication service to enable the SDSi asset agent 2840 to communicate remotely with the SDSi agent management interface 2964 of the manufacturer enterprise system 2810 and the SDSi client agent 2972 of the customer enterprise system 2815. The SDSi asset agent 2840 of the illustrated example includes the agent CLI 2910 to process commands entered locally to the semiconductor device 2805 via a command line interface. The SDSi asset agent 2840 of the illustrated example includes the license processor 2914 to process license(s) received from the customer enterprise system 2815 to configure (e.g., activate, deactivate, etc.) one or more SDSi features included in the feature sets 2932-2942 implemented by the hardware circuitry 2825, firmware 2830 and/or BIOS 2835 of the SDSi semiconductor device 2805. Accordingly, the license processor 2914 is an example of means for activating or deactivating at least one feature of the semiconductor device 2805 based on a license received via a network from a remote enterprise system. The SDSi asset agent 2840 of the illustrated example includes the agent daemon 2912 to securely execute the elements of the SDSi asset agent 2840. For example, the agent daemon 2912 can execute one or more of the agent interface 2902, the agent local services 2904, the analytics engine 2906, the communication services 2908, the agent CLI 2910 and/or the license processor 2914 in a protected environment, such as a trusted execution environment (TEE), implemented by the semiconductor device 2805. The SDSi asset agent 2840 of the illustrated example includes the agent library 2918 to provide, among other things, hardware-agnostic application programming interfaces (APIs) to be used by the license processor 2914 to invoke the respective, hardware-specific feature libraries 2920-2930 to configure (e.g., activate, deactivate, etc.), based on the received license data, one or more features in the corresponding example features sets 2932-2942 implemented by the hardware circuitry 2825, firmware 2830 and/or BIOS 2835 of the SDSi semiconductor device 2805. Accordingly, the hardware circuitry 2825, firmware 2830, and/or BIOS 2835 are examples of means for providing SDSi features in the SDSi semiconductor device 2805. In some examples, the agent library 2918 and/or the hardware-specific feature libraries 2920-2930 also operate in a protected environment, such as a TEE, implemented by the semiconductor device 2805. Further details concerning the elements of the SDSi asset agent 2840 of FIG. 29 are described below.

In the illustrated example of FIG. 29, the manufacturer enterprise system 2810 includes the example product management service 2952 to manage the inventory, pricing, etc., of the products manufactured by the manufacturer of the SDSi semiconductor device 2805. The manufacturer enterprise system 2810 of the illustrated example includes the customer management service 2954 to manage customer accounts, billing, reconciliation, etc., for the manufacturer of the SDSi semiconductor device 2805. The manufacturer enterprise system 2810 of the illustrated example includes the SDSi feature management service 2956 to manage the configuration of SDSi feature(s) implemented by the silicon products manufactured by the manufacturer of the SDSi semiconductor device 2805. The manufacturer enterprise system 2810 of the illustrated example implements the SDSi portal 2962 to communicate (e.g., via a network) with the customer enterprise system 2815. The manufacturer enterprise system 2810 of the illustrated example implements the SDSi agent management interface 2964 to communicate (e.g., via a network) with the SDSi asset agent 2840 of the SDSi semiconductor device 2805. Further details concerning the elements of the manufacturer enterprise system 2810 of FIG. 29 are described below.

In the illustrated example of FIG. 29, the customer enterprise system 2815 includes the SDSi client agent 2972 to communicate (e.g., via a network) with the manufacturer enterprise system 2810 and the SDSi asset agent 2840 of the SDSi semiconductor device 2805. The customer enterprise system 2815 of the illustrated example includes the platform inventory management service 2974 to manage the platforms offered by the customer (OEM), such as platforms that include the SDSi semiconductor device 2805. The customer enterprise system 2815 of the illustrated example includes the accounts management service 2976 to manage accounts, billings, reconciliations, etc., the customer has with manufacturers, downstream customers, etc., such as the manufacturer of the SDSi semiconductor device 2805. The customer enterprise system 2815 of the illustrated example includes the entitlement management service 2978 to manage licenses granted by manufacturers of SDSi products, such as the manufacturer of the SDSi semiconductor device 2805, to configure (e.g., activate, deactivate, etc.) SDSi features implemented by those products. Further details concerning the elements of the customer enterprise system 2815 of FIG. 29 are described below.

An example SDSi management lifecycle 3000 capable of being implemented by the example systems 2800 and/or 2900 of FIGS. 28-29 is illustrated in FIG. 30. The lifecycle 3000 is described from the perspective of activating or deactivating an SDSI feature provided by the SDSi semiconductor device 2805, but also can be applied to any type of configuration change of an SDSI feature provided by the SDSi semiconductor device 2805. The lifecycle 3000 begins at block 3002 at which the SDSi client agent 2972 of the customer enterprise system 2815 sends a request to the SDSi portal 2962 of the manufacturer enterprise system 2810 to activate (or deactivate) an SDSI feature provided by the SDSi semiconductor device 2805. Accordingly, the SDSi portal 2962 is an example of means for receiving a request to activate or deactivate a feature provided by the semiconductor device 2805. For example, the customer may access a customer management record for the SDSi semiconductor device 2805 maintained by the platform inventory management service 2974, and modify the customer management record to invoke the SDSi client agent 2972 to send the request. Accordingly, the SDSi client agent 2972 is an example of means for sending a request to activate or deactivate an SDSi feature provided by the semiconductor device 2805.

At block 3004, the SDSi portal 2962 of the manufacturer enterprise system 2810 receives the request sent by the SDSi client agent 2972 of the customer enterprise system 2815 to activate (or deactivate) the SDSI feature provided by the SDSi semiconductor device 2805. At block 3006, the SDSi agent management interface 2964 sends a query to the SDSi asset agent 2840 to confirm that the SDSi semiconductor device 2805 supports the SDSi feature to be activated (or deactivated). For example, the SDSi feature management service 2956 may process the customer request received via the SDSi portal 2962 and invoke the SDSi agent management interface 2964 to send the query. The agent interface 2902 of the SDSi asset agent 2840 receives the query and invokes the license processor 2914 to generate a response. The license processor 2914 analyzes the configuration of the hardware circuitry 2825, the firmware 2830 and/or the BIOS 2835 of the semiconductor device 2805, generates feature support verification information indicating whether the queried feature is supported by the semiconductor device 2805, and reports, via the agent interface 2902, a response including the feature support verification information to the SDSi agent management interface 2964. In some examples, rather than querying the SDSi asset agent 2840 of the SDSi semiconductor device 2805, the SDSi agent management interface 2964 accesses one or more databases and/or other data structures (e.g., based on device identifier and/or SKU information included in the feature request) that store specification/configuration data for the SDSi semiconductor device 2805 to confirm whether the SDSi semiconductor device 2805 supports the requested feature.

At block 3008 of the lifecycle 3000, the SDSi agent management interface 2964 receives the query response from the SDSi asset agent 2840 (or from the queries database(s) and/or data structure(s)), which is processed by the SDSi feature management service 2956. If the response indicates the SDSi feature of interest is supported by the SDSi semiconductor device 2805, at block 3010 the SDSi feature management service 2956 generates a license to activate (or deactivate) the SDSi feature as requested. Accordingly, the SDSi feature management service 2956 is an example of means for generating a license to be processed by the semiconductor device 2805 to activate or deactivate an SDSi feature. Also, at block 3012, the SDSi feature management service 2956 causes the license to be sent via the SDSi portal 2962 to the SDSi client agent 2972 of the customer enterprise system 2815. Accordingly, the SDSi client agent 2972 is an example of means for receive a license from an enterprise management system to authorize activation or deactivation of an SDSi feature provided by the semiconductor device 2805 In the illustrated example, the license generated at block 3010 is associated with a license key and/or license data that specifies, for example, an identifier of the semiconductor device 2805, the SDSi feature to be activated (or deactivated), terms of the activation (or deactivation), such as whether this is a one-time feature activation (deactivation) or renewable activation subject to a subscription, a valid start window (e.g., X hours, where X is a numerical value, or some other duration) for invoking the license to activate (or deactivate) the SDSI feature, etc. At this point in the lifecycle 3000, the license generated at block 3010 is treated as an unused license to activate (or deactivate) the SDSi feature, which is stored in a repository at the customer enterprise system 2815 until the customer triggers use of the license to activate (or deactivate) the requested feature, such as an application ratio, a processor configuration, etc. For example, the SDSi feature management service 2956 of the manufacturer enterprise system 2810 can update a manufacturer management record maintained by the manufacturer for the semiconductor device 2805 to include the license and/or license data generated at block 3010. Likewise, the entitlement management service 2978 of the customer enterprise system 2815 can update the customer management record maintained by the customer for the semiconductor device 2805 to indicate receipt of the license along with the license details. Accordingly, the entitlement management service 2978 is an example of means for updating a management record associated with the semiconductor device 2805 based on a license. In some such examples, the entitlement management service 2978 can be invoked by the customer to update the customer management record to trigger operation of the license to activate (or deactivate) the SDSi feature, which cause the SDSi client agent 2972 of the customer enterprise system 2815 to transmit (e.g., download) the license via the network 2855 to the SDSi asset agent 2840 of the semiconductor device 2805.

For example, upon receipt of a request at the SDSi client agent 2972 to invoke the license, at block 3014 the SDSi client agent 2972 sends the license to the SDSi asset agent 2840. Accordingly, the SDSi client agent 2972 is an example of means for sending a license to the semiconductor device 2805. The license is received by the agent interface 2902, which at block 3016 invokes the license processor 2914. At block 3016, the license processor 2914 processes the license data to identify the feature to be activated (or deactivated), and activates (or deactivates) the feature in accordance with the license data. For example, if the feature is representative of a second application ratio (e.g., one(s) of the cores can operate at second operating frequencies based on a workload), and the semiconductor device 2805 was initialized to have a first application ratio (e.g., one(s) of the cores can operate at first operating frequencies based on a workload), the license data may specify that the second application ratio to be activated (e.g., in response to a request from the customer enterprise system 2815 to activate the second application ratio). The license data may also identify one(s) of the cores, the uncores, etc., in which to apply the second application ratio. In such an example, the license processor 2914 invokes the agent library 2918 to activate the second application ratio specified in the license data. As another example, the SDSi asset agent 2840 may later receive a second license from the SDSi client agent 2972 of the customer enterprise system 2815 that specifies a third application ratio to be activated (e.g., with the second license being generated by the manufacturer enterprise system 2810 in response to a request from the customer enterprise system 2815 to activate the third application ratio). The second license data may also identify which ones of the cores are to be affected by the third application ratio. In such an example, the license processor 2914 invokes the agent library 2918 to configure the cores specified in the license data. In some examples, if the feature is a configurable clock rate, and the semiconductor device was initialized to activate a first clock rate from a set of possible clock rates, the license generated by the manufacturer enterprise system 2810 and downloaded via the SDSi client agent 2972 of the customer enterprise system 2815 may identify a second clock rate different from the first clock rate that is to be activated (e.g., in response to a request from the customer enterprise system 2815 to activate the second clock rate). In such an example, the license processor 2914 invokes the agent library 2918 to activate the second clock rate identified in the license data.

In some examples, a single license can configure multiple features across different feature categories. For example, a single license may include first license data to activate one or more additional cores, and second license to modify and/or otherwise adjust a clock rate of one or more cores to effectuate a change in application ratio. In such an example, the adjusted clock rate may be applied to one or more previously activated cores and/or one(s) of the one or more additional cores to be activated in response to the license processor 2914 processing the license. Additionally or alternatively, in some examples, a single license can activate one or more features, and also deactivate one or more other features.

At block 3018 of the lifecycle 3000, the analytics engine 2906 of the SDSi asset agent 2840 logs the SDSi feature activation (or deactivation) performed on the semiconductor device 2805. At block 3020, the analytics engine 2906 captures an odometer reading representative of a present, local time maintained by the circuitry 2825 (in combination with the firmware 2835 and/or BIOS 2840) of the semiconductor device 2805. For example, the circuitry 2825 may utilize a counter, timer or other mechanism to implement an odometer to track the passage of time locally at the semiconductor device 2805 (which is represented by the directed line 3022 in FIG. 30.). In some examples, the odometer reading may be used by the manufacturer enterprise system 2810 to determine whether operation of the SDSi semiconductor device 2805 has violated a warranty and/or otherwise the usage terms and activation agreement associated with the SDSi semiconductor device 2805. At block 3020, the analytics engine 2906 captures a value of the odometer to act as a timestamp of when the requested feature was activated (or deactivated). At block 3024, the analytics engine 2906 generates a certificate to confirm the successful activation (or deactivation) of the requested SDSi feature. In the illustrated example, the certificate includes telemetry data associated with operation of the semiconductor device 2805 and generated by the analytics engine 2906 in response to activation (or deactivation) of the requested SDSi feature. In some examples, the telemetry data includes an indication of whether the feature activation (or deactivation) was a success, a status of the SDSi feature affected by the activation (or deactivation) (e.g., such as the presently configured number of cores that are configured with an application ratio, the presently active clock rate, etc.), a first odometer reading (e.g., first timestamp) indicating when the feature activation (or deactivation) occurred, a second odometer reading (e.g., a second timestamp) indicating whether the certificate was generated, etc. For example, the telemetry data may be an implementation of the telemetry data 1076 of FIG. 10.

At block 3026 of the lifecycle 3000, the analytics engine 2906 reports, via the agent interface 2902, the certificate with the telemetry data in response to the activation (or deactivation) of the SDSi feature based on the received license data. In the illustrated example, the analytics engine 2906 reports the certificate with the telemetry data to both the manufacturer enterprise system 2810 and the customer enterprise system 2815. For example, at block 3028, the example SDSi agent management interface 2964 of the manufacturer enterprise system 2810 receives the certificate, and at block 3030 provides it to the SDSi feature management service 2956 of the manufacturer enterprise system 2810. Accordingly, the SDSi agent management interface 2964 is an example of means for receiving a certificate from the semiconductor device 2805 to confirm successful activation or deactivation of an SDSi feature. The SDSi feature management service 2956 processes the certificate and included telemetry data to log the successful feature activation (or deactivation). Similarly, at block 3032, the SDSi client agent 2972 of the customer enterprise system 2815 receives the certificate and at block 3034 provides it to the entitlement management service 2978 of the customer enterprise system 2815. The entitlement management service 2978 processes the certificate and included telemetry data to log the successful feature activation (or deactivation). In the illustrated example, at this point in the lifecycle 3000, the status of the feature activation (or deactivation) may be considered incomplete until verified by a subsequent certificate from the SDSi asset agent 2840 (see blocks 3036 and 3038).

At block 3040 of the lifecycle 3000, the SDSi agent management interface 2964 of the manufacturer enterprise system 2810 receives a subsequent certificate with updated telemetry data from the SDSi asset agent 2840. At block 3042, the subsequent certificate is provided to the SDSi feature management service 2956 of the manufacturer enterprise system 2810. The SDSi feature management service 2956 processes the certificate to obtain the updated telemetry data, and also obtains the prior telemetry data included in the previous certificate. At block 3044, the SDSi feature management service 2956 accesses the odometer readings included in the telemetry data. At block 3046, the SDSi feature management service 2956 compares the telemetry data and odometer reading to confirm the successful activation (or deactivation) (or, more generally, the successful configuration change) of the SDSi feature of interest. Accordingly, the SDSi feature management service 2956 is an example of means for validating the successful activation or deactivation of an SDSi feature based on telemetry data. At block 3048, the customer management service 2954 of the manufacturer enterprise system 2810 generates an invoice for the successful activation (or deactivation) of the SDSi feature of interest, and sends it to the customer enterprise system 2815 via the SDSi portal 2962 for processing by the accounts management service 2976. In some examples, assuming the semiconductor device 2805 is associated with a present SKU (e.g., a first SKU), after the requested SDSi feature is activated (or deactivated), the product management service 2952 of the manufacturer enterprise system 2810 generates a new SKU (e.g., a second SKU) and updates the manufacturer management record maintained for the semiconductor device 2805 to associate the new SKU (second SKU) with the semiconductor device 2805. Accordingly, the product management service 2952 is an example of means for updating a management record to associate a second SKU with the semiconductor device 2805 after an SDSi feature is activated or deactivated. Additionally or alternatively, in some examples, assuming the semiconductor device 2805 is associated with a present SKU (e.g., a first SKU), after the requested SDSi feature is activated (or deactivated), the platform inventory management service 2974 of the customer enterprise system 2815 generates a new SKU (e.g., a second SKU) and updates the customer management record maintained for the semiconductor device 2805 to associate the new SKU (second SKU) with the semiconductor device 2805. Accordingly, the platform inventory management service 2974 is an example of means for updating a management record to associate a second SKU with the semiconductor device 2805 after an SDSi feature is activated or deactivated.

At block 3050 of the lifecycle 3000, the entitlement management service 2978 of the customer enterprise system 2815 generates a request for status of the semiconductor device 2805, and sends the request via the SDSi client agent 2972 to the SDSi asset agent 2840. Additionally or alternatively, the SDSi feature management service 2956 of the manufacturer enterprise system 2810 could generate the request for status of the semiconductor device 2805, and send the request via the SDSi agent management interface 2964 to the SDSi asset agent 2840. In either case, at block 3052, the agent interface 2902 receives the request and invokes the analytics engine 2906 to generate a certificate in response to the request. In the illustrated example, the certificate includes updated telemetry data associated with operation of the semiconductor device 2805 generated by the analytics engine 2906 in response to the request. The updated telemetry data is timestamped with a local time corresponding to an odometer reading captured in response to the request. At blocks 3054 and 3056, the SDSi agent management interface 2964 receives the requested certificate with the updated telemetry data from the SDSi asset agent 2840 and provides it to the SDSi feature management service 2956 of the manufacturer enterprise system 2810. The SDSi feature management service 2956 obtains the updated telemetry data, and also obtains the prior telemetry data for the semiconductor device 2805, and further accesses the odometer readings included in the telemetry data. At block 3056, the example SDSi feature management service 2956 updates a history of the operational status of the semiconductor device 2805 and uses the telemetry data to determine whether the semiconductor device 2805 is operating properly.

Similarly, at block 3060 of the lifecycle 3000, the SDSi client agent 2972 receives the requested certificate with the updated telemetry data from the SDSi asset agent 2840 and provides it to the entitlement management service 2978 of the customer enterprise system 2815. The entitlement management service 2978 obtains the updated telemetry data, and also obtains any prior telemetry data for the semiconductor device 2805, and further accesses the odometer readings included in the telemetry data. The entitlement management service 2978 then updates a history of the operational status of the semiconductor device 2805 and uses the telemetry data to determine whether the semiconductor device 2805 is operating properly. In some examples, the accounts management service 2976 of the customer enterprise system 2815 updates, based on receipt of the certificate, the customer management record associated with the semiconductor device 2805 to confirm establishment or conclusion of a payment obligation with the manufacturer of the semiconductor device 2805, such as the payment obligation associated with the invoice received from the manufacturer enterprise system 2810 at block 3048. Accordingly, the accounts management service 2976 is an example of means for updating a management record, based on a certificate, to confirm establishment or conclusion of a payment obligation with a manufacturer of the semiconductor device 2805.

As illustrated in the example lifecycle 3000 of FIG. 30, the request to activate (or deactivate) the SDSI feature sent by the customer enterprise system 2815 at block 3002 and received by the manufacturer enterprise system 2810 at block 3004 can initiate a contract between the customer and the manufacturer. Later, the sending of the license to the customer enterprise system 2815 at block 3012 can be a trigger to start a payment obligation (see block 3064). In some examples, the start of the payment obligation can be delayed until the feature is activated (or deactivated) in the semiconductor device 2805 based on the license at block 3016. Later, the reporting at block 3026 of the certificate in response to the activation (or deactivation) of the SDSi feature in the semiconductor device 2805 can validate the payment obligation (see block 3066). Later, the generation and receipt of the invoice at block 3048 can trigger reconciliation of the payment obligation (see block 3068).

The licenses generated by the manufacturer enterprise system 2810 to activate (or deactivate) SDSi features in the semiconductor device 2805 can support one-time activation, on-demand activation and/or recurring subscription models. For example, the license may include license data to instruct the license processor 2914 of the SDSi asset agent 2840 executing in the semiconductor device 2805 to perform a one-time activation (or deactivation) of one or more features identified by the license data. In some examples, to support on-demand activation and/or recurring subscription models, the license generated by the manufacturer enterprise system 2810 can include license data that instructs the license processor 2914 to activate (or deactivate) the specified SDSi feature(s) in accordance with an express permit or an express deny control mechanism. For example, under an express permit control mechanism, the license processor 2914 causes an SDSi feature that is activated based on the license to be deactivated upon expiration of a time period (e.g., tracked by a counter, clock, or other mechanism) unless an express permit control signal is received from the manufacturer enterprise system 2810 (e.g., via the SDSi agent management interface 2964) before the time period expires. Conversely, under an express deny control mechanism, the license processor 2914 causes an SDSi feature that is activated based on the license to be remain active unless an express deny control signal is received from the manufacturer enterprise system 2810 (e.g., via the SDSi agent management interface 2964). In such an example, receipt of the express deny control signal causes the license processor 2914 to deny access to the activated feature, such as, by deactivating the feature.

In some examples, the license processor 2914 of the SDSi asset agent 2840 executing in the semiconductor device 2805 activates and deactivates SDSI features through the use of reprogrammable soft fuse(s), register(s), logic gate(s), etc. For example, such reprogrammable soft fuse(s), register(s), logic gate(s), etc., can be connected to control lines of the hardware blocks included in the hardware circuitry 2825 of the semiconductor device 2805 to implement the SDSi features, connected to control inputs read by the firmware 2830 and/or BIOS 2835 to enable/disable the SDSi features, etc. The license processor 2914 can set and/or reset ones of the reprogrammable soft fuse(s), values of the register(s), input(s) of the logic gate(s), etc., to activate/deactivate different SDSi features of the semiconductor device 2805.

In some examples, the license processor 2914 writes received license(s) and/or the license data included therein to a protected license memory region of the semiconductor device 2805. In some examples, the license data is encrypted and the license processor 2914 decrypts the license data before writing it to the protected license memory region of the semiconductor device 2805. In some such examples, SDSi feature activation/deactivation responsive to a received license does not occur until the semiconductor device 2805 reboots (e.g., via a soft reset, a hard reset, etc.) and the license data in the protected license memory region is read upon start-up. In some examples, the license processor 2914 sets one or more particular locations of the protected license memory region to activate one or more SDSi features, and erases or overwrites the license data contained in those location(s) of the protected license memory region to deactivate those SDSi feature(s). For example, to deactivate a given SDSi feature, the license processor 2914 may write random or otherwise garbage data to the location(s) associated with that feature in the protected license memory region, and rely on an error checking capability of the semiconductor device 2805 that causes the given SDSi feature to remain disabled in response to such random or otherwise garbage data.

In some examples, the location(s) of the protected license memory region for deactivated SDSi feature(s) is(are) not erased or overwritten. Rather, in some such examples, to deactivate an SDSi feature, a deactivation license is appended to the list of licenses already stored in the protected license memory region for that SDSi feature. The newly received deactivation license in such an example overrides the actions of previously received licenses for that SDSi feature. In that way, the history of SDSi configuration operations (activations and deactivations) performed on the SDSi feature are stored by the semiconductor device 2805 in the order the SDSi licenses were applied. In some examples, this information could be read by the customer.

Data diagrams, flowcharts, and/or workflows representative of example hardware logic, machine readable instructions, hardware implemented state machines, and/or any combination thereof for implementing the one-socket workload optimized processor 606 of FIG. 6, the single-socket optimized hardware platform 608 of FIG. 6, the two-socket workload optimized processors 610 of FIG. 6, the dual-socket optimized hardware platform 612 of FIG. 6, the 5G devices 702 of FIG. 7, the 5G RRUs 704 of FIG. 7, the vRAN-DUs 706 of FIG. 7, the vRAN-CUs 708 of FIG. 7, the 5G core servers 710 of FIG. 7, the 5G vRAN DU 800 of FIG. 8, the multi-core CPU 802 of FIG. 8, the 5G core server 900 of FIG. 9, the multi-core CPU 902 of FIG. 9, the manufacturer enterprise system 1002 of FIG. 10, the hardware 1004 of FIG. 10, the processor 1500 of FIG. 15, the processor 1600 of FIG. 16, the processor 1700 of FIG. 17, etc., and/or portion(s) thereof are shown in FIGS. 31-43. The machine readable instructions may be one or more executable programs or portion(s) of an executable program for execution by a computer processor and/or processor circuitry, such as the processor 4415, 4438, 4470, 4480 of FIG. 44, the processor 4552 of FIGS. 45 and/or 46, and/or the processor 4712 of FIG. 47. The program may be embodied in software stored on a non-transitory computer readable medium such as a CD-ROM, a floppy disk, a hard drive, a DVD, a Blu-ray disk, or a memory associated with the processor 4415, 4438, 4470, 4480, 4552, 4712, but the entire program and/or parts thereof could alternatively be executed by a device other than the processor 4415, 4438, 4470, 4480, 4552, 4712 and/or embodied in firmware or dedicated hardware. Further, although the example program is described with reference to the data flow diagrams and/or flowcharts illustrated in FIGS. 31-43, many other methods of implementing the one-socket workload optimized processor 606 of FIG. 6, the single-socket optimized hardware platform 608 of FIG. 6, the two-socket workload optimized processors 610 of FIG. 6, the dual-socket optimized hardware platform 612 of FIG. 6, the 5G devices 702 of FIG. 7, the 5G RRUs 704 of FIG. 7, the vRAN-DUs 706 of FIG. 7, the vRAN-CUs 708 of FIG. 7, the 5G core servers 710 of FIG. 7, the 5G vRAN DU 800 of FIG. 8, the multi-core CPU 802 of FIG. 8, the 5G core server 900 of FIG. 9, the multi-core CPU 902 of FIG. 9, the manufacturer enterprise system 1002 of FIG. 10, the hardware 1004 of FIG. 10, the processor 1500 of FIG. 15, the processor 1600 of FIG. 16, the processor 1700 of FIG. 17, etc., may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement one or more functions that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C #, Perl, Python, JavaScript, HyperText Markup Language (HTML), Structured Query Language (SQL), Swift, etc.

As mentioned above, the example processes of FIGS. 31-43 may be implemented using executable instructions (e.g., computer and/or machine readable instructions) stored on a non-transitory computer and/or machine readable medium such as an HDD, a flash memory, a read-only memory, a CD, a DVD, a cache, a random-access memory, and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

Figure 31:
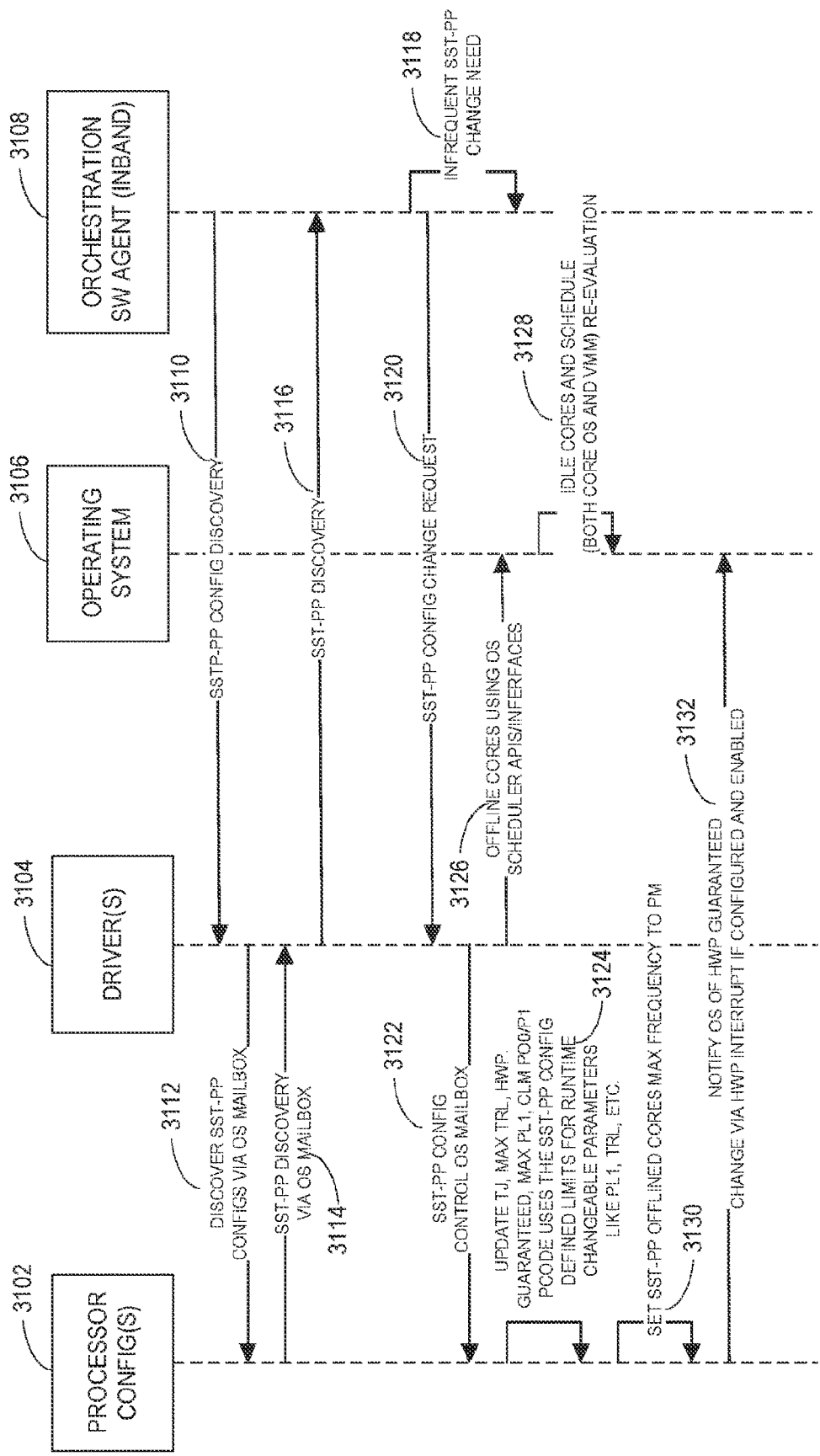
FIG. 31 is an example data flow diagram associated with an example workload-adjustable CPU.

FIG. 31 is a first example data flow diagram 3100 associated with an example workload-adjustable CPU, such as a multi-SKU CPU as described herein. For example, the first data flow diagram 3100 can correspond to actions, functions, operations, etc., implemented by the one-socket workload optimized processor 606 of FIG. 6, the single-socket optimized hardware platform 608 of FIG. 6, the two-socket workload optimized processors 610 of FIG. 6, the dual-socket optimized hardware platform 612 of FIG. 6, the 5G devices 702 of FIG. 7, the 5G RRUs 704 of FIG. 7, the vRAN-DUs 706 of FIG. 7, the vRAN-CUs 708 of FIG. 7, the 5G core servers 710 of FIG. 7, the 5G vRAN DU 800 of FIG. 8, the multi-core CPU 802 of FIG. 8, the 5G core server 900 of FIG. 9, the multi-core CPU 902 of FIG. 9, the manufacturer enterprise system 1002 of FIG. 10, the hardware 1004 of FIG. 10, the processor 1500 of FIG. 15, the processor 1600 of FIG. 16, and/or the processor 1700 of FIG. 17. In some examples, the first data flow diagram 3100 is implemented by machine readable instructions. For example, the first data flow diagram 3100 or portion(s) thereof can be implemented with a workload-adjustable CPU executing machine readable instructions. In this example, the first data flow diagram 3100 implements dynamic SST PP as provided by Intel®. Alternatively, any other technique for adjusting configuration(s) of core(s) of a workload-adjustable CPU may be used.

The first data flow diagram 3100 of FIG. 31 is implemented by example processor configuration(s) 3102, example driver(s) 3104, an example operating system 3106, and an example orchestration software (SW) agent 3108. In this example, the processor configuration(s) 3102 can implement a configuration of one or more cores of a workload-adjustable CPU, and/or, more generally, of the workload-adjustable CPU. For example, the processor configuration(s) 3102 can implement the hardware configuration(s) 1074 of FIG. 10, the configuration information 1100 of FIG. 11, and/or the configuration(s) 1535 of FIG. 15. In some examples, the processor configuration 3102 can implement a first configuration for the first core 1510A, a second configuration for the second core 1510N, a third configuration for the processor 1500, etc., of FIG. 15.

In this example, the driver(s) 3104 can implement one or more firmware and/or software drivers. For example, the driver(s) 3104 can be implemented by the hardware configurator 1050 of FIG. 10 and/or the core configurator 1536 of FIG. 15. In this example, the operating system 3106 can implement a computer operating system, a virtual machine manager, etc. In this example, the orchestration software agent 3108 is inband. For example, the orchestration software agent 3108 can implement a software application, a software driver, etc., that can obtain a request for a change in a core and/or processor configuration. Alternatively, the orchestration software agent 3108 may be out-of-band.

In the first data flow diagram 3100, at a first time 3110, the orchestration software agent 3108 generates a configuration discovery request to the driver(s) 3104 for configuration(s) of respective one(s) of cores and/or, more generally, a workload-adjustable CPU. At a second time 3112, the driver(s) 3104 discover the configuration(s) via OS mailbox. At a third time 3114, the processor configuration(s) 3102 are retrieved. For example, the hardware configurator 1050 and/or the core configurator 1536 of FIG. 15 may generate a response to the OS mailbox discover request that includes the requested one(s) of the hardware configuration(s) 1074 and/or the configuration(s) 1535.

At a fourth time 3116, the driver(s) 3104 provides a response to the configuration discovery request from the orchestration software agent 3108. At a fifth time 3118, the orchestration software agent 3108 receives a request to change a configuration of one or more cores and/or, more generally, the workload-adjustable CPU. At a sixth time 3120, the orchestration software agent 3108 transmits a configuration change request to the driver(s) 3104. At a seventh time 3122, the driver(s) 3104 invoke configuration control via OS mailbox. At an eighth time 3124, the processor configuration(s) 3102 are changed. For example, the hardware configurator 1050 and/or the core configurator 1536 can update a junction temperature (Ta), a max TRL, a guaranteed hardware P-state (HWP), a change in a CLM P-state, a change in a core P-state, etc., and/or a combination thereof. Alternatively, any other parameter of a core may be adjusted.

At a ninth time 3126, the driver(s) 3104 invoke offline cores to use OS scheduler application programming interfaces (APIs) or other interfaces. At a tenth time 3128, the operating system 3106 re-evaluates idle cores and the scheduler for the core operating system, the VMM, etc., and/or a combination thereof. At an eleventh time 3130, processor configuration(s) 3102 invoke offlined cores to have a max frequency. At a twelfth time 3132, the processor configuration(s) 3102 notify the operating system 3106 of HWP guaranteed change via an HWP interrupt if configured and enabled.

Figure 32:
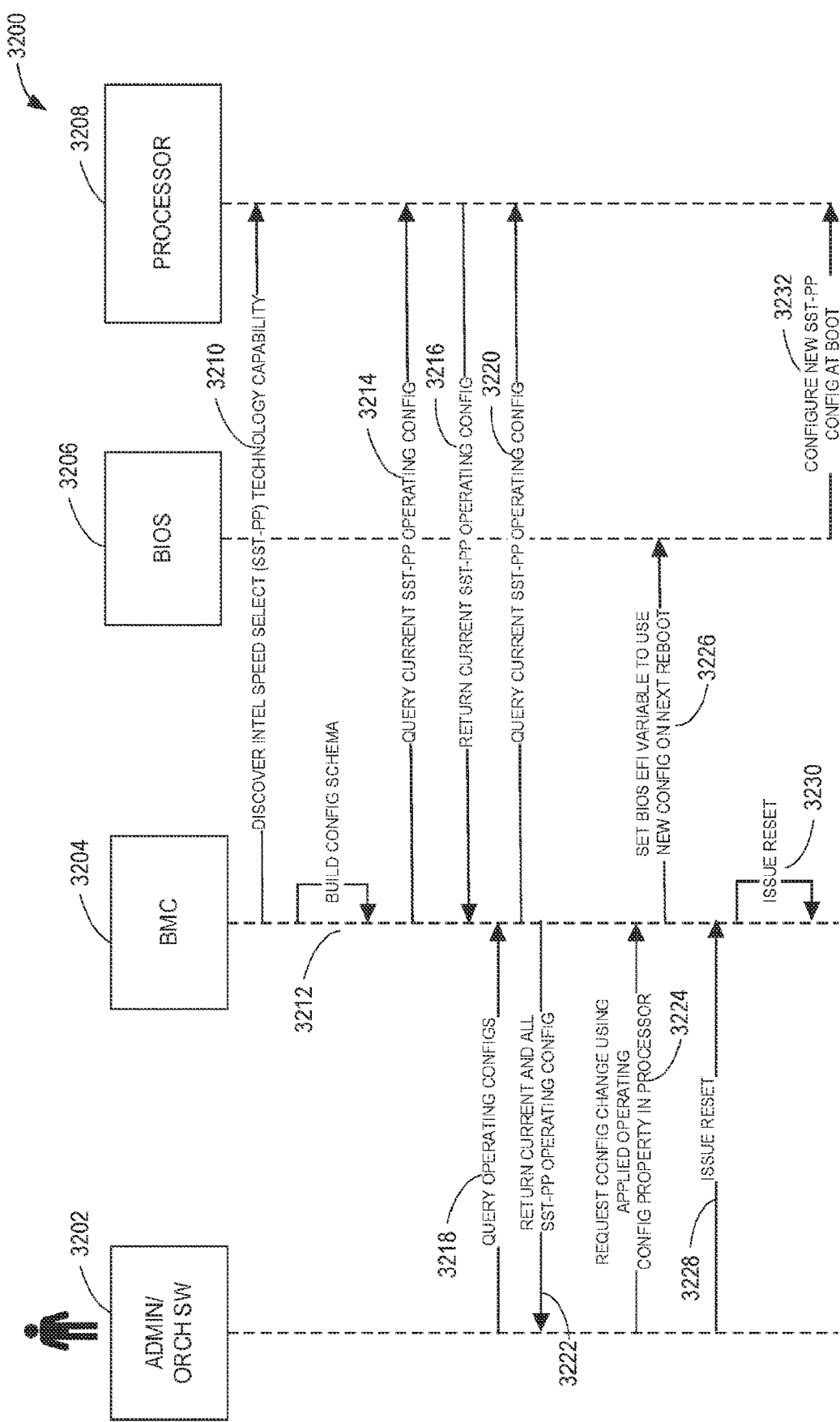
FIG. 32 is another example data flow diagram associated with an example workload-adjustable CPU.

FIG. 32 is a second example data flow diagram 3200 associated with an example workload-adjustable CPU, such as a multi-SKU CPU as described herein. For example, the second data flow diagram 3200 can correspond to actions, functions, operations, etc., implemented by the one-socket workload optimized processor 606 of FIG. 6, the single-socket optimized hardware platform 608 of FIG. 6, the two-socket workload optimized processors 610 of FIG. 6, the dual-socket optimized hardware platform 612 of FIG. 6, the 5G devices 702 of FIG. 7, the 5G RRUs 704 of FIG. 7, the vRAN-DUs 706 of FIG. 7, the vRAN-CUs 708 of FIG. 7, the 5G core servers 710 of FIG. 7, the 5G vRAN DU 800 of FIG. 8, the multi-core CPU 802 of FIG. 8, the 5G core server 900 of FIG. 9, the multi-core CPU 902 of FIG. 9, the manufacturer enterprise system 1002 of FIG. 10, the hardware 1004 of FIG. 10, the processor 1500 of FIG. 15, the processor 1600 of FIG. 16, and/or the processor 1700 of FIG. 17. In some examples, the second data flow diagram 3200 is implemented by machine readable instructions. For example, the second data flow diagram 3200 or portion(s) thereof can be implemented with a workload-adjustable CPU executing machine readable instructions. In this example, the second data flow diagram 3200 implements dynamic SST PP as provided by Intel®. Alternatively, any other technique for adjusting configuration(s) of core(s) of a workload-adjustable CPU may be used.

The second data flow diagram 3200 of FIG. 32 is implemented by an example administrator and/or orchestrator software 3202, an example baseboard management controller (BMC) 3204, an example BIOS 3206, and an example processor 3208. In this example, the second data flow diagram 3200 implements out-of-band (OOB) configuration control of the processor 3208. In this example, the orchestrator software 3202 can be controlled by an administrator, a computing device associated with the administrator, etc. For example, the orchestrator software 3202 can be implemented using a cloud-based architecture. In this example, the BMC 3204 is in communication with at least one of the orchestrator software 3202, the BIOS 3206, or the processor 3208. For example, the BMC 3204 and the processor 3208 can be included in a 1S (e.g., a rack-mounted server with one slot for the processor 3208) or 2S server (e.g., a rack-mounted server with two slots for the processor 3208). In such examples, the BMC 3204 can communicate with the processor 3208 or other instances of the processor 3208 included in the 1S or 2S server.

In this example, the BIOS 3206 is implemented by and/or otherwise executes on the processor 3208. In this example, the processor 3208 can implement the one-socket workload optimized processor 606 of FIG. 6, the two-socket workload optimized processors 610 of FIG. 6, the multi-core CPU 802 of FIG. 8, the multi-core CPU 902 of FIG. 9, the hardware 1004 of FIG. 10, the processor 1500 of FIG. 15, the processor 1600 of FIG. 16, and/or the processor 1700 of FIG. 17. At a first time 3210, the BMC 3204 discovers the capability of the processor 3208 to implement configuration change on a per-core basis and/or a per-processor basis. At a second time 3212, the BMC 3204 builds a configuration schema, architecture, etc. At a third time 3214, the BMC 3204 queries the processor 3208 for current operating configuration(s) associated with the processor 3208. For example, the BMC 3204 can query the processor 3208 for a configuration of one(s) of cores of the processor 3208. In such examples, the configuration(s) can implement the hardware configurator(s) 1074 of FIG. 10, the configuration information 1100 of FIG. 11, and/or the configuration(s) 1535 of FIG. 15.

At a fourth time 3216, the processor 3208 returns the current operating configuration(s). For example, the BMC 3204 can update the configuration schema built and/or otherwise instantiated at the second time 3212. At a fifth time 3218, the administrator and/or the orchestrator software 3202 queries the BMC 3204 for the operating configuration(s) associated with the processor 3208. At a sixth time 3220, the BMC 3204 queries the processor 3208 for the current operating configurations associated with the processor 3208.

At a seventh time 3222, the BMC 3204 returns the requested configuration(s) to the administrator and/or the orchestrator software 3202. At an eighth time 3224, the administrator and/or the orchestrator software 3202 requests one or more configuration changes. At a ninth time 3226, the BMC 3204 sets one or more variables in the BIOS 3206 to use the new requested configuration changes upon reboot of the BIOS 3206, the processor 3208, etc. At a tenth time 3228, the administrator and/or the orchestrator software 3202 issues a reset of the BMC 3204. At an eleventh time 3230, the BMC 3204 issues a reset. At a twelfth time 3232, the BIOS 3206 configures the new configurations at boot of the processor 3208.

Figure 33:
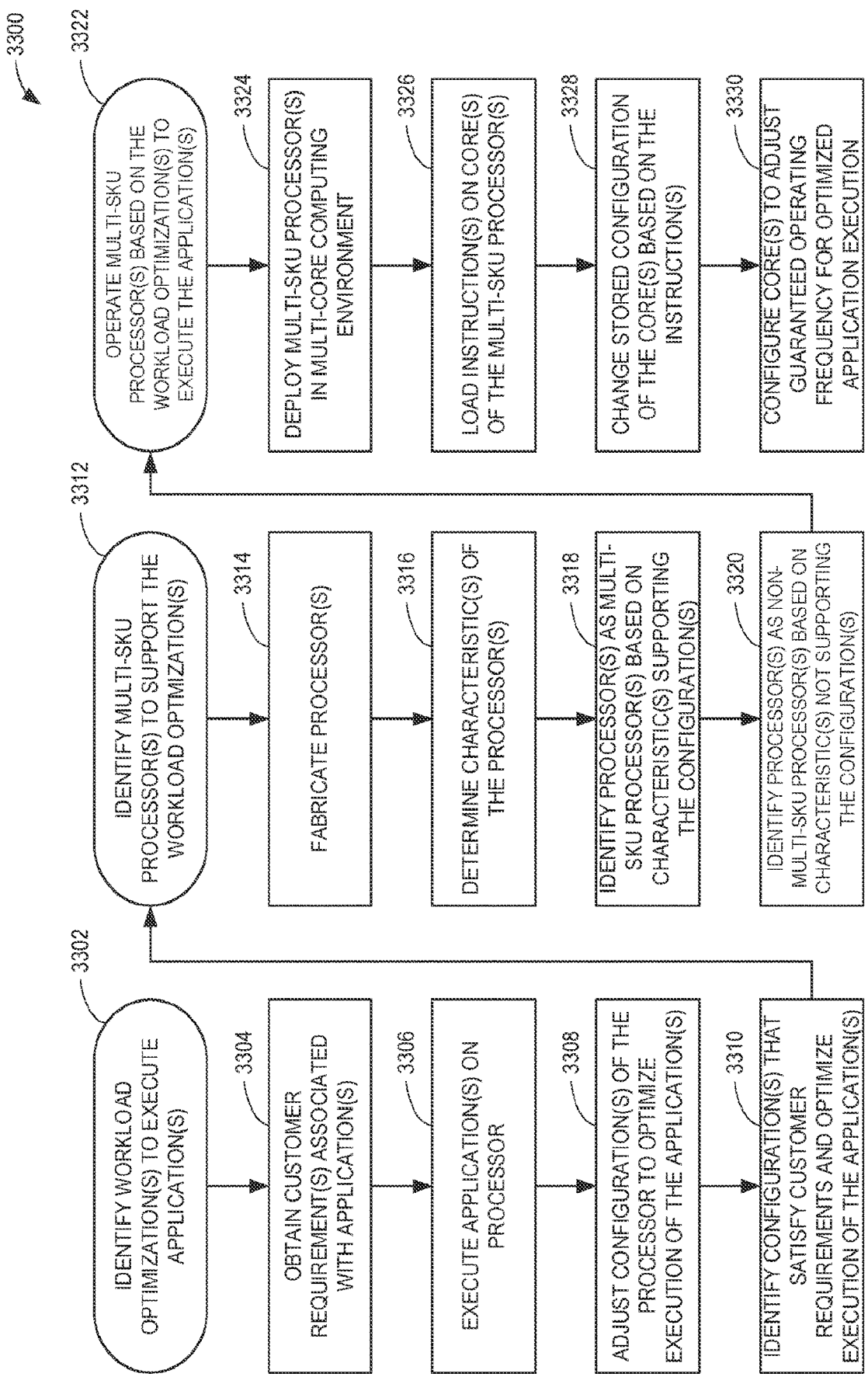
FIG. 33 is a flowchart representative of example machine readable instructions that may be executed to implement an example manufacturer enterprise system and/or an example workload-adjustable CPU.

FIG. 33 is a flowchart representative of example machine readable instructions 3300 that may be executed to implement an example manufacturer enterprise system, such as the manufacturer enterprise system 1002 of FIG. 10 and/or the manufacturer enterprise system 2810 of FIG. 28, and/or an example workload-adjustable CPU, such as the multi-core CPU 802 of FIG. 8 and/or the hardware 1004 of FIG. 10. In some examples, the machine readable instructions 3300 may implement a workflow of an example technique (e.g., a method, a process, etc.) of manufacturing a multi-SKU CPU, an example technique of identifying the multi-SKU CPU, and/or an example technique of operating the multi-SKU CPU in an example multi-core computing environment, such as the first multi-core computing environment 100 of FIG. 1. In some examples, the workflow 3300 or portion(s) thereof can be representative of machine readable instructions that may be executed by one or more multi-core CPUs, one or more example processor platforms, etc., as disclosed herein.

The machine readable instructions 3300 of FIG. 33 includes blocks 3304, 3306, 3308, and 3310 that may implement more generally block 3302. For example, at block 3302, processor(s) (e.g., a multi-core processor, the multi-core CPU 802 of FIG. 8, the multi-core CPU 902 of FIG. 9, the hardware 1004 of FIG. 10, etc.) may identify workload optimization(s) to improve and/or otherwise optimize the execution of application(s), such as a network application (e.g., a 5G network application). At block 3304, the processor(s) can obtain customer requirement(s) associated with the application(s). For example, the network interface 1010 of FIG. 10 can obtain customer or end-user requirements via the network 1006 of FIG. 10. In some examples, the requirement determiner 1020 of FIG. 10 can determine that the customer requirements include, define, and/or otherwise specify a number of compute cores, a number of multi-core CPUs, a guaranteed operating frequency, a thermal design profile, etc., that is/are to be used to execute an application. In some examples, the requirement determiner 1020 can obtain customer requirements such as network node location(s), latency requirements, throughput requirements, and/or power requirements for optimized operation of the processor(s) or different processor(s).

At block 3306, the processor(s) execute(s) the application(s). For example, the workload analyzer 1030 of FIG. 10 can execute one(s) of the first workloads 816, one(s) of the second workloads 818, etc., of FIG. 8 for a time period on the hardware 1004 of FIG. 10. In some examples, the network interface 1010 can obtain machine readable code from a customer, a server, etc., via the network 1006. In some examples, the requirement determiner 1020 can determine that the machine readable code is representative of an application that may implement the one(s) of the first workloads 816, one(s) of the second workloads 818, etc., of FIG. 8 for a time period to be executed on the hardware 1004. In some examples, the workload analyzer 1030 can execute the machine-learning model(s) 1078 of FIG. 10 using data generated in response to the execution of the application(s) as input data.

At block 3308, the hardware configurator 1050 of FIG. 10 adjust(s) configuration(s) of the one(s) of the first workloads 816, one(s) of the second workloads 818, etc., of FIG. 8 for a time period to optimize an execution of the application(s). For example, the hardware configurator 1050 can adjust a guaranteed operating frequency of a core, a CLM associated with the core, an I/O peripheral associated with the core or a different core, an uncore, etc., and/or a combination thereof.

At block 3310, the hardware configurator 1050 identifies configuration(s) that satisfy the customer requirements and optimize execution of the application(s). For example, the hardware configurator 1050 can identify a first configuration to execute a first one of the workloads 816 in such a manner that satisfies the customer requirements and improves and/or otherwise optimizes the execution of the first one of the workloads 816 compared to a baseline configuration. In such examples, the hardware configurator 1050 can identify a second configuration to execute the first one of the workloads 816 and/or a second one of the workloads 816 in such a manner that satisfies the customer requirements and improves and/or otherwise optimizes the execution of the first one of the workloads 816 compared to the baseline configuration and/or the first configuration.

The machine readable instructions 3300 of FIG. 33 includes blocks 3314, 3316, 3318, and 3320 that may implement more generally block 3312 to identify the multi-SKU processor(s) to support the workload optimization(s) identified at block 3310. At block 3314, a silicon manufacturer fabricate processor(s). For example, in HVM, one or more processor(s), one or more servers, one or more semiconductor fabrication machines, etc., can be used to fabricate semiconductor wafer(s) on which are multi-core processor(s). At block 3316, one or more semiconductor device inspection machines (e.g., electron beam inspection equipment or machines, laser inspection equipment or machines, etc.) determine characteristic(s) of the processor(s). For example, the hardware analyzer 1040 of FIG. 10 may implement one or more semiconductor device inspection machines or portion(s) thereof to determine a guaranteed operating frequency at one or more temperature points associated with the fabricated processor(s).

At block 3318, the hardware analyzer 1040 can identify processor(s) as multi-SKU processor(s) based on characteristic(s) supporting the configuration(s) (e.g., the configuration(s) identified at block 3310). For example, the hardware analyzer 1040 can identify a processor as a multi-SKU processor if the processor can operate according to the configuration(s) identified at block 3310. At block 3320, the hardware analyzer 1040 can identify processor(s) as non-multi-SKU processor(s) based on characteristic(s) that do not support the configuration(s). For example, the hardware analyzer 1040 can identify a processor as a non-multi-SKU processor if the processor cannot operate according to one(s) of the configuration(s) identified at block 3310. In some examples, blocks 3316, 3318, and/or 3320 can implement a binning process to allocate processor(s) based on their respective characteristic(s). For example, the hardware analyzer 1040 may execute machine readable instructions that implement blocks 3314, 3316, 3318, and/or 3320 to implement a binning process to identify multi-SKU processor(s).

The machine readable instructions 3300 of FIG. 33 includes blocks 3324, 3326, 3328, and 3330 that may implement more generally block 3322 to operate the multi- SKU processor based on the workload optimization(s) to execute the application(s). At block 3324, multi-SKU processor(s) is/are deployed in a multi-core computing environment, such as the first multi-core computing environment 100 of FIG. 1. For example, the hardware configurator 1050 may invoke software-defined or software-enabled silicon features of the hardware 1004 via the network 1006 to adjust a configuration of the hardware 1004. In some examples, the hardware configurator 1050 may transmit additional configurations to the hardware 1004 that may not be currently stored on the hardware 1004 in response to accepting terms and conditions, submitting monetary payment, etc.

At block 3326, the multi-SKU processor(s) can load instruction(s) to core(s) of the multi-SKU processor. For example, the multi-core CPU 802 of FIG. 8 and/or the hardware controller 1060 of FIG. 10 can load one(s) of the instructions 804, 806, 808 of FIG. 8 onto core(s) of the multi-core CPU 802 and/or the hardware 1004. At block 3328, the multi-SKU processor changes a stored configuration of the core(s) based on the instructions. For example, the multi-core CPU 802 and/or the hardware controller 1060 can determine that execution of a first instruction that is to be loaded onto a first core having a first configuration can be improved and/or otherwise optimized by changing to a second configuration. In some such examples, the multi-core CPU 802 and/or the hardware controller 1060 can adjust a first configuration identifier associated with the first core to a second configuration identifier to indicate a change in the configuration of the first core.

At block 3330, the multi-SKU processor(s) configures the core(s) to adjust guaranteed operating frequency for optimized execution. For example, the multi-core CPU 802 and/or the hardware controller 1060 can adjust a guaranteed operating frequency associated with the core(s), uncore(s) associated with the core(s), CLM(s) associated with the core(s), I/O peripheral(s) associated with the core(s), etc., based on the loaded instruction(s), which are indicative of a type of workload to be processed. In response to configuring the core(s) at block 3330, the example machine readable instructions 3300 of FIG. 33 concludes. Alternatively, one or more blocks of the machine readable instructions 3300 may be re-executed, reiterated, etc.

Figure 34:
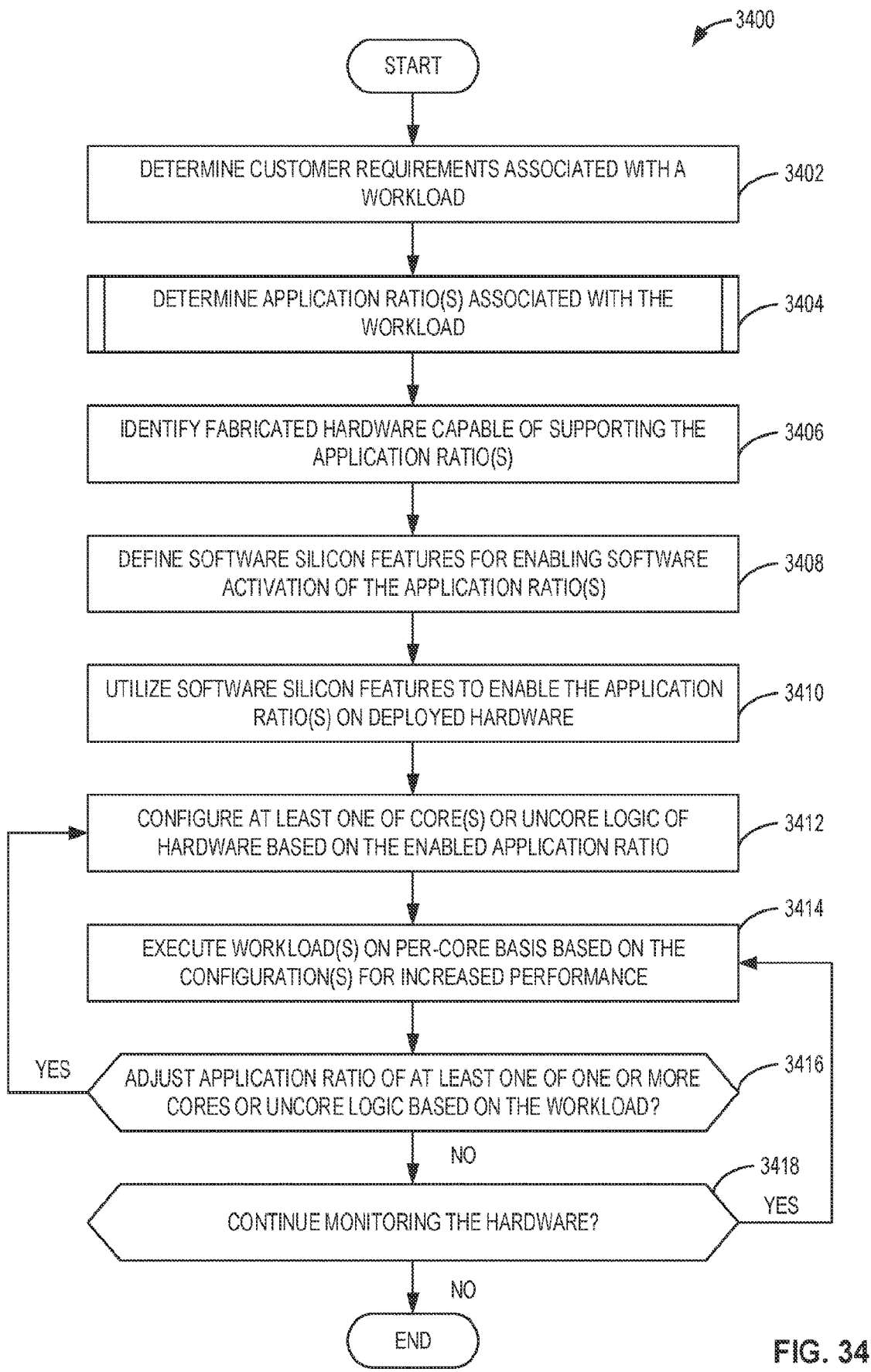
FIG. 34 is a flowchart representative of example machine readable instructions that may be executed to implement an example manufacturer enterprise system and/or an example workload-adjustable CPU to execute network workloads.

FIG. 34 is a flowchart representative of example machine readable instructions 3400 that may be executed to implement an example manufacturer enterprise system, such as the manufacturer enterprise system 1002 of FIG. 10 and/or the manufacturer enterprise system 2810 of FIG. 28, and/or an example workload-adjustable CPU, such as the multi-core CPU 802 of FIG. 8 and/or the hardware 1004 of FIG. 10, to execute network workloads. The machine readable instructions 3400 of FIG. 34 begin at block 3402, at which the manufacturer enterprise system 1002, 2810 determine customer requirements associated with a workload. For example, the requirement determiner 1020 (FIG. 10) may determine latency, power consumption, or throughput requirements associated with the first workloads 816 of FIG. 8, the second workloads 818 of FIG. 8, etc., and/or a combination thereof.

At block 3404, the manufacturer enterprise system 1002, 2810 determines application ratio(s) associated with the workload. For example, the workload analyzer 1030 (FIG. 10) can determine an application ratio based on an operating frequency to execute the first workloads 816. An example process that may be executed to implement block 3404 is described below in connection with FIG. 35.

At block 3406, the manufacturer enterprise system 1002, 2810 identifies fabricated hardware capable of supporting the application ratio(s). For example, the hardware analyzer 1040 (FIG. 10) can identify the hardware 1004 (or a plurality of the hardware 1004) fabricated in HVM that is capable of supporting one or more application ratios to effectuate network workloads with optimized and/or otherwise improved execution.

At block 3408, the manufacturer enterprise system 1002, 2810 defines software silicon features for enabling software activation of the application ratio(s). For example, the hardware analyzer 1040 can define one or more features, such as an operating frequency of a core, an uncore, etc., access to a type of instruction (e.g., a 5G-ISA instruction), etc., that may be enabled or disabled via SDSi as described herein.

At block 3410, the manufacturer enterprise system 1002, 2810 utilizes software silicon features to enable the application ratio(s) on deployed hardware. For example, the hardware configurator 1050 can activate one(s) of the application ratio(s) on the hardware 1004 via license(s).

At block 3412, the manufacturer enterprise system 1002, 2810 configures at least one of core(s) or uncore logic of hardware based on the enabled application ratio. For example, the hardware configurator 1050 can configure an operating frequency of one or more cores, one or more uncore regions or portion(s) thereof, etc., based on the enabled application ratio.

At block 3414, the manufacturer enterprise system 1002, 2810 executes workload(s) on a per-core basis based on the configuration(s) for increased performance. For example, the hardware controller 1060 (FIG. 10) can execute the workloads on a per-core and/or per-uncore basis based on the configured operating frequencies.

At block 3416, the manufacturer enterprise system 1002, 2810 determines whether to adjust an application ratio of at least one of one or more cores or uncore logic based on the workload. For example, the hardware configurator 1050 can determine one or more workload parameters associated with the workload based on the execution. In some examples, the hardware configurator 1050 can determine that a power consumption threshold has not been satisfied and, thus, increased performance may be achieved by increasing operating frequencies to a level so as to not exceed a TDP of the hardware 1004.

If, at block 3416, the manufacturer enterprise system 1002, 2810 determines to adjust the application ratio of at least one of one or more cores or uncore logic based on the workload, control returns to block 3412 to configure the at least one of the core(s) or uncore logic of the hardware based on a different application ratio. If, at block 3416, the manufacturer enterprise system 1002, 2810 determines not to adjust the application ratio of at least one of one or more cores or uncore logic based on the workload, then, at block 3418, the manufacturer enterprise system 1002, 2810 determines whether to continue monitoring the hardware. For example, the hardware controller 1060 may continue to determine workload parameters associated with workload(s) executed by the hardware 10004 and determine whether to adjust an application ratio of the hardware 1004 or portion(s) thereof to achieve increased performance and/or reduced latency.

If, at block 3418, the manufacturer enterprise system 1002, 2810 determines to continue monitoring the hardware, control returns to block 3414 to execute the workload(s) on a per-core basis based on the configuration(s) for increased performance. If, at block 3418, the manufacturer enterprise system 1002, 2810 determines not to continue monitoring the hardware, the machine readable instructions 3400 of FIG. 34 conclude.

Figure 35:
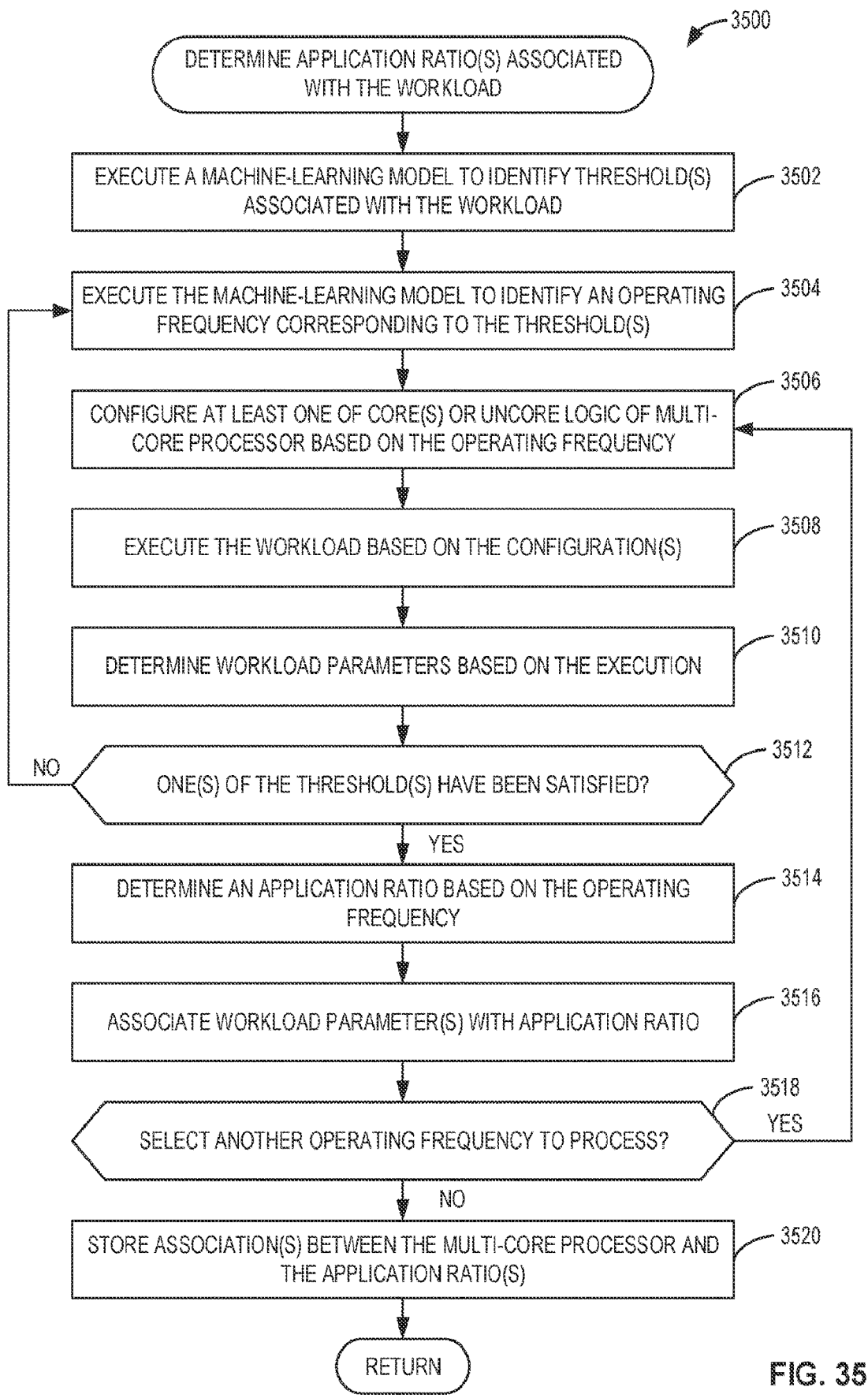
FIG. 35 is a flowchart representative of example machine readable instructions that may be executed to implement an example manufacturer enterprise system and/or an example workload-adjustable CPU to determine application ratio(s) associated with a network workload.

FIG. 35 is a flowchart representative of example machine readable instructions that may be executed to implement an example manufacturer enterprise system, such as the manufacturer enterprise system 1002 of FIG. 10 and/or the manufacturer enterprise system 2810 of FIG. 28, and/or an example workload-adjustable CPU, such as the multi-core CPU 802 of FIG. 8 and/or the hardware 1004 of FIG. 10, to determine application ratio(s) associated with a network workload. In some examples, the machine readable instructions 3500 of FIG. 35 may implement block 3404 of FIG. 34.

The machine readable instructions 3500 of FIG. 35 begin at block 3502, at which the manufacturer enterprise system 1002, 2810 executes a machine-learning model to identify threshold(s) associated with the workload. For example, the workload analyzer 1030 (FIG. 10) can execute the machine-learning model(s) 1078 to identify a latency threshold, a power consumption threshold, a throughput threshold, etc., associated with a workload, such as the first workloads 816 of FIG. 8, the second workloads 818 of FIG. 8, etc.

At block 3504, the manufacturer enterprise system 1002, 2810 executes the machine-learning model to identify an operating frequency corresponding to the threshold(s). For example, the workload analyzer 1030 can execute the machine-learning model(s) 1078 to identify an operating frequency for one or more cores of the hardware 1004 that may satisfy at least one of the latency threshold, the power consumption threshold, or the throughput threshold associated with the workload.

At block 3506, the manufacturer enterprise system 1002, 2810 configures at least one of core(s) or uncore logic of a multi-core processor based on the operating frequency. For example, the hardware configurator 1050 (FIG. 10) can configure at least one of the first core 1510A, the second core 1510N, the CHA 1512, the CMS 1516, or the IO buffer 1518 of FIG. 15 based on the operating frequency.

At block 3508, the manufacturer enterprise system 1002, 2810 executes the workload based on the configuration(s). For example, the hardware controller 1060 (FIG. 10) can invoke the hardware 1004, the processor 1500, etc., to execute the workload based on the operating frequency.

At block 3510, the manufacturer enterprise system 1002, 2810 determines workload parameters based on the execution. For example, the hardware configurator 1050 can determine values of latency, power consumption and/or throughput of the hardware 1004, the processor 1500, etc., or portion(s) thereof.

At block 3512, the manufacturer enterprise system 1002, 2810 determines whether one(s) of the threshold(s) have been satisfied. For example, the workload analyzer 1030 can determine whether respective values of the latency, power consumption, and/or throughput satisfy a respective one of the latency threshold, the power consumption threshold, and/or the throughput threshold. If, at block 3512, the manufacturer enterprise system 1002, 2810 determines that one(s) of the threshold(s) have not been satisfied, control returns to block 3504 to execute the machine-learning model to identify a different operating frequency corresponding to the threshold(s). If, at block 3512, the manufacturer enterprise system 1002, 2810 determines that one(s) of the threshold(s) have been satisfied, then, at block 3514, the manufacturer enterprise system 1002, 2810 determines an application ratio based on the operating frequency. For example, the workload analyzer 1030 can determine an application ratio of 0.7 based on one or more cores of the processor 1500 having a frequency of 2.1 GHz and the uncore logic of the processor 1500 having a frequency of 1.8 GHz (e.g., the fourth configuration 1420 of FIG. 14B).

At block 3516, the manufacturer enterprise system 1002, 2810 associates the workload parameter(s) with the application ratio. For example, the workload analyzer 1030 can associate the values of the latency, power consumption, and/or throughput with the application ratio of 0.7. In some examples, the hardware configurator 1050 can determine an application ratio to configure the processor 1500 by mapping workload parameters associated with a workload to the workload parameters associated with the application ratio based on the association. Advantageously, the hardware configurator 1050 and/or the processor 1500 can dynamically change an application ratio of the processor 1500 or portion(s) thereof based on workload parameters, and/or, more generally, the workload in execution or in queue to be executed by the processor 1500 to improve performance and/or reduce latency of the processor 1500.

At block 3518, the manufacturer enterprise system 1002, 2810 determines whether to select another operating frequency to process. For example, the workload analyzer 1030 can determine that the processor 1500 can support a different operating frequency and that the different operating frequency may be analyzed to determine whether a different application ratio may be supported by the processor 1500. If, at block 3518, the manufacturer enterprise system 1002, 2810 determines to select another operating frequency to process, control returns to block 3506 to configure at least one of the core(s) or uncore logic of the multi-core processor based on the operating frequency.

If, at block 3518, the manufacturer enterprise system 1002, 2810 determines not to select another operating frequency to process, then, at block 3520, the manufacturer enterprise system 1002, 2810 stores association(s) between the multi-core processor and the application ratio(s). For example, the workload analyzer 1030 can store a first association between the hardware 1004, the processor 1500, etc., and the first application ratio of 0.7, a second association between the hardware 1004, the processor 1500, etc., and a second application ratio, etc. In some examples, the workload analyzer 1030 stores the associations in the datastore 1070 (FIG. 10) as the hardware configuration(s) 1074. In some examples, the hardware configurator 1050 may retrieve and/or otherwise look-up the associations in the hardware configuration(s) 1074 to configure the hardware 1004, the processor 1500, for optimized and/or otherwise improved execution of network workloads (e.g., 5G network workloads).

In some examples, in response to storing the association(s) between the multi-core processor and the application ratio(s) at block 3520, the machine readable instructions 3500 of FIG. 35 return to block 3406 of the machine readable instructions 3400 of FIG. 34 to identify fabricated hardware capable of supporting the application ratio(s). In some examples, in response to storing the association(s) between the multi-core processor and the application ratio(s) at block 3520, the machine readable instructions 3500 of FIG. 35 conclude.

Figure 36:
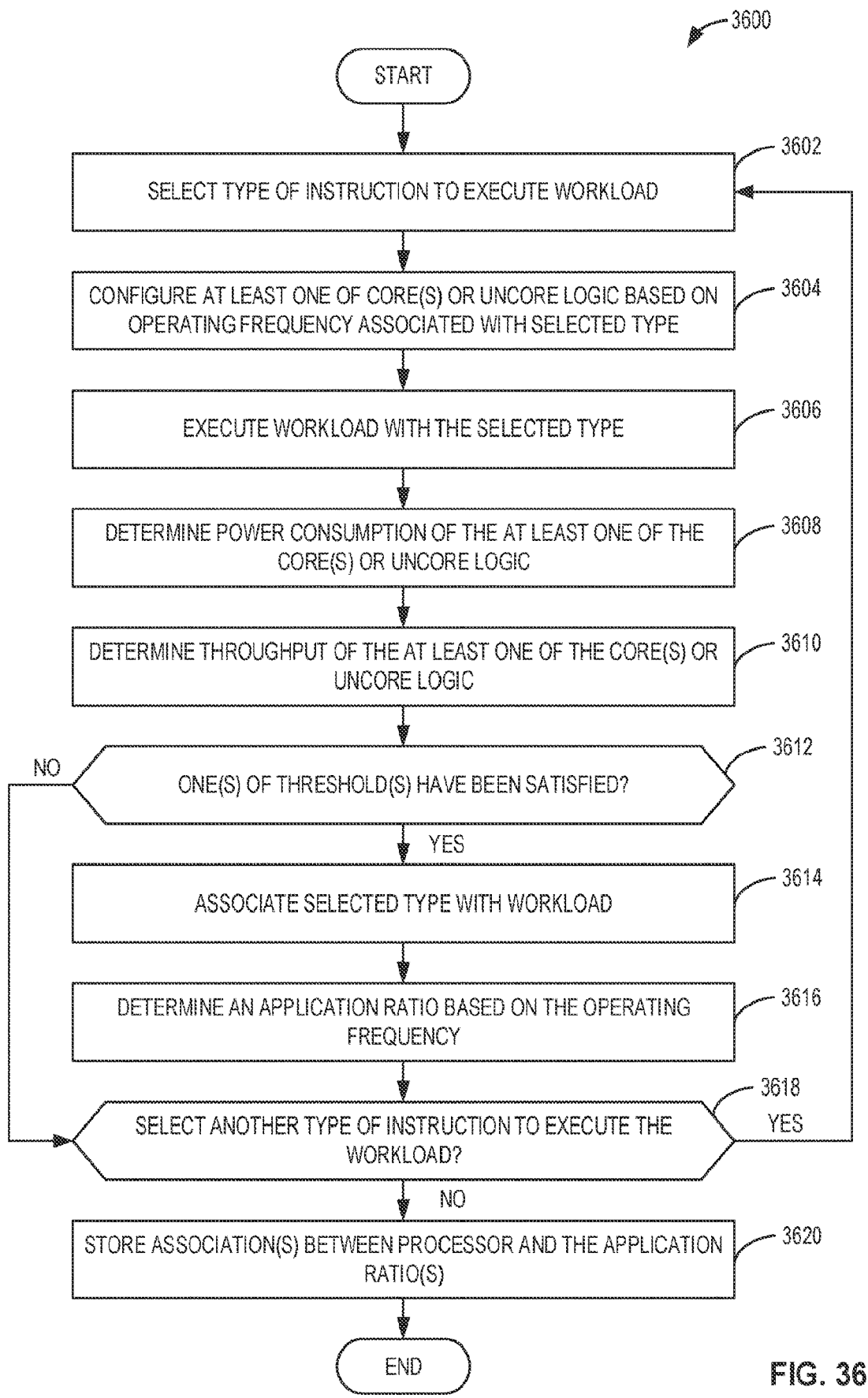
FIG. 36 is another flowchart representative of example machine readable instructions that may be executed to implement an example manufacturer enterprise system and/or an example workload-adjustable CPU to determine an application ratio based on workload parameters.

FIG. 36 is a flowchart representative of example machine readable instructions 3600 that may be executed to implement an example manufacturer enterprise system, such as the manufacturer enterprise system 1002 of FIG. 10 and/or the manufacturer enterprise system 2810 of FIG. 28, and/or an example workload-adjustable CPU, such as the multi-core CPU 802 of FIG. 8 and/or the hardware 1004 of FIG. 10, to determine an application ratio based on workload parameters. The machine readable instructions 3600 of FIG. 36 begin at block 3602, at which the manufacturer enterprise system 1002, 2810 selects a type of instruction to execute a workload. For example, the requirement determiner 1020 (FIG. 10) can select a first type of instruction such as the second instructions 806 of FIG. 8.

At block 3604, the manufacturer enterprise system 1002, 2810 configures at least one of core(s) or uncore logic based on an operating frequency associated with the selected type. For example, the hardware configurator 1050 (FIG. 10) can configure one(s) of the cores 810, 812, 814 of FIG. 8 to operate at an operating frequency of 3.0 GHz.

At block 3606, the manufacturer enterprise system 1002, 2810 executes a workload with the selected type. For example, the hardware controller 1060 (FIG. 10) can execute the third workloads 818 with the third instructions 808.

At block 3608, the manufacturer enterprise system 1002, 2810 determines a power consumption of the at least one of the core(s) or uncore logic. For example, the hardware analyzer 1040 (FIG. 10) can determine a power consumption of the one(s) of the cores 810, 812, 814 that are configured to operate at the operating frequency of 3.0 GHz. Additionally or alternatively, the hardware configurator 1050 (FIG. 10) may determine the power consumption.

At block 3610, the manufacturer enterprise system 1002, 2810 determines a throughput of the at least one of the core(s) or uncore logic. For example, the hardware analyzer 1040 may determine a throughput (e.g., a quantity of network packets processed, a number of computing tasks processed, etc.) of the one(s) of the cores 810, 812, 814 and/or uncore logic associated with the one(s) of the cores 810, 812, 814 that are configured to operate at the operating frequency of 3.0 GHz. Additionally or alternatively, the hardware configurator 1050 may determine the throughput.

At block 3612, the manufacturer enterprise system 1002, 2810 determines whether one(s) of threshold(s) have been satisfied. For example, the workload analyzer 1030 (FIG. 10) may compare the power consumption to a power consumption threshold, the throughput to a throughput threshold, etc., and/or a combination thereof. In some examples, in response to determining that the power consumption is less than the power consumption threshold and, thus, does not satisfy the power consumption threshold, the workload analyzer 1030 may determine that increased performance may be achieved by increasing the operating frequency to a level that does not violate the TDP of the multi-core processor 802 of FIG. 8.

If, at block 3612, the manufacturer enterprise system 1002, 2810 determines that one(s) of the threshold(s) have not been satisfied, control proceeds to block 3618 to determine whether to select another type of instruction to execute the workload. If, at block 3612, the manufacturer enterprise system 1002, 2810 determines that one(s) of the threshold(s) have been satisfied, then, at block 3614, the manufacturer enterprise system 1002, 2810 associates the selected type with the workload. For example, the workload analyzer 1030 can associate the third instructions 808 with the third workloads 818. Advantageously, the manufacturer enterprise system 1002, 2810 may identify one(s) of the instructions 804, 806, 808 that may optimally execute the third workloads 818 based on one(s) of the threshold(s) being satisfied.

At block 3616, the manufacturer enterprise system 1002, 2810 determines an application ratio based on the operating frequency. For example, the workload analyzer 1030 may determine an application ratio of 0.8 based on the one(s) of the cores 810, 812, 814 operating at the operating frequency of 3.0 GHz when processing the third workloads 818 with the third instructions 808. At block 3618, the manufacturer enterprise system 1002, 2810 determines whether to select another type of instruction to execute the workload. For example, the requirement determiner 1020 may determine to select the second instructions 806 of FIG. 8 to execute the workload.

If, at block 3618, the manufacturer enterprise system 1002, 2810 determines to select another type of instruction to execute the workload, control returns to block 3602 to select the type of instruction to execute the workload. If at block 3618, the manufacturer enterprise system 1002, 2810 determines not to select another type of instruction to execute the workload, then, at block 3620, the manufacturer enterprise system 1002, 2810 stores an association(s) between a processor and the application ratio(s). For example, the workload analyzer 1030 may store an association between the multi-core CPU 802 and the application ratio of 0.8 as a hardware configuration (e.g., the hardware configuration(s) 1074 of FIG. 10, the configuration information 1100 of FIG. 11, etc.). In some examples, the hardware configurator 1050 may determine the application ratio for a specified workload by retrieving the association from the datastore 1070 (FIG. 10). In response to storing the association(s) between the processor and the application ratio(s) at block 3620, the machine readable instructions 3600 of FIG. 36 conclude.

Figure 37:
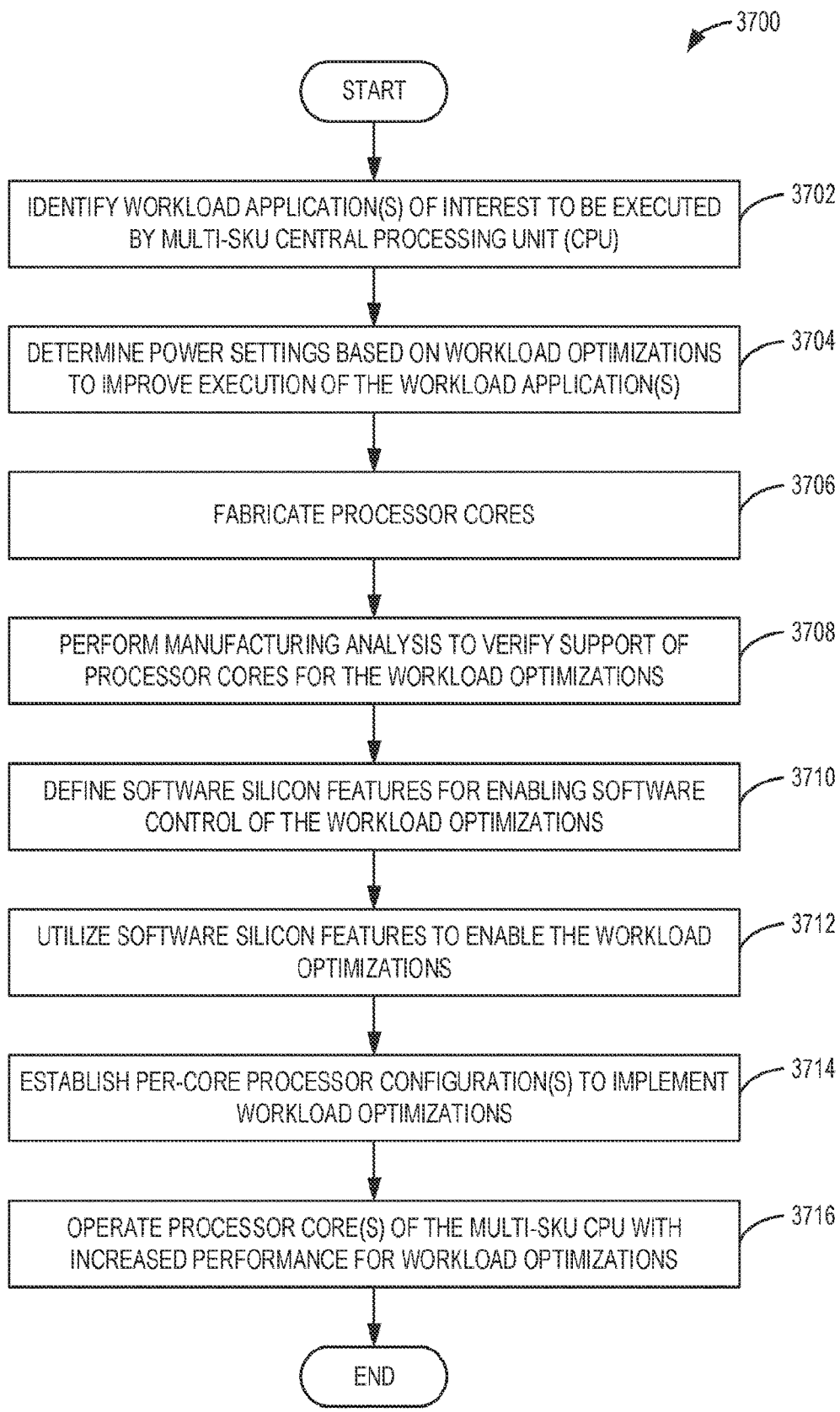
FIG. 37 is a flowchart representative of example machine readable instructions that may be executed to implement an example workload-adjustable CPU to operate processor core(s) of a multi-SKU CPU based on a workload.

FIG. 37 is a flowchart representative of example machine readable instructions 3700 that may be executed to implement an example method of implementing and operating a processor with network workload optimized settings, which would involve the consideration of these manufacturing and configuration settings. The machine readable instructions 3700 of FIG. 37 begin at block 3702, at which workload application(s) of interest to be executed by a multi-SKU CPU are identified. For example, the manufacturer enterprise system 1002 of FIG. 10 and/or the manufacturer enterprise system 2810 of FIG. 28 can obtain data indicative of workload application(s) of interest to be analyzed. In some examples, the workload analyzer 1030 (FIG. 10) executes the machine-learning model(s) 1078 (FIG. 10) using the data as inputs to determine an application ratio that may be utilized to optimally and/or otherwise execute the workload application(s) with improved efficiency.

At block 3704, the manufacturer enterprise system 1002, 2810 determines power settings for a CPU architecture based on workload optimizations to improve execution of the workload application(s). For example, the workload analyzer 1030 can determine the workload optimizations based on profiling, modeling, and/or simulations performed with various types of network workloads as described herein. In some such examples, the workload analyzer 1030 can produce the optimizations from separate analysis of core versus uncore, compute versus mesh versus memory, or a first area (first component) versus a second area (second component) of the CPU. In some such examples, the workload analyzer 1030 can determine the optimizations to include various power values and/or frequency settings, such as an application ratio described herein.

At block 3706, the manufacturer enterprise system 1002, 2810 fabricates processor cores. For example, the hardware analyzer 1040 (FIG. 10) can control semiconductor fabrication equipment to manufacture semiconductor substrates on which multi-core CPUs are assembled.

At block 3708, the manufacturer enterprise system 1002, 2810 performs manufacturing analysis to verify support of the processor cores for the workload optimizations. For example, the hardware analyzer 1040 can execute and/or otherwise invoke manufacturing analysis to verify the support of the processor cores for the workload optimizations (e.g., the power values and frequency settings determined at block 3704).

At block 3710, the manufacturer enterprise system 1002, 2810 defines software silicon features for enabling software control of the workload optimizations. For example, the hardware analyzer 1040 can determine silicon defined control features to enable the workload optimizations. In some such examples, the hardware analyzer 1040 can define the software silicon features to enable software control and activation of the workload optimizations.

At block 3712, the manufacturer enterprise system 1002, 2810 utilize software silicon features to enable the workload optimizations. For example, block 3712 may occur long after manufacturing, such as at a customer deployment. In some such examples, hardware configurator 1050 (FIG. 10) can activate the software silicon features of the multi-core CPU 802 of FIG. 8 with activation commands, instructions, etc., transmitted from the manufacturer enterprise system 1002, 2810 to the multi-core CPU 802 via the network 1006. For example, the hardware configurator 1050 can activate an application ratio of the multi-core CPU 802 from a plurality of application ratios. In some such examples, the multi-core CPU 802 can determine one or more operating frequencies at which a core, corresponding uncore logic, etc., may be configured based on the application ratio. In some examples, the manufacturer enterprise system 1002, 2810 can transmit new application ratios to the multi-core CPU 802. For example, the multi-core CPU 802 may be shipped from a silicon manufacturer as having configurations that may implement three (or more) application ratios. In some such examples, the manufacturer enterprise system 1002, 2810 can transmit one or more additional configurations that the multi-core CPU 802 was not shipped with that may implement additional application ratios than the multi-core CPU 802 was previously capable of implementing.

At block 3714, a multi-SKU CPU, such as the multi-core CPU 802, can establish per-core processor configuration(s) to implement workload optimizations. For example, the multi-core CPU 802 can store the hardware configuration(s) 1074 of FIG. 10, the configuration information 1100 of FIG. 11, the configuration(s) 1535 of FIG. 15 in the memory 1537 of FIG. 15 that, when invoked, can configure one(s) of the cores 1510A-1510N on a per-core basis. In some examples, block 3714 can be implemented at the time of manufacturing with a hard SKU or at blocks 3710, 3712 with a soft SKU.

At block 3716, the multi-SKU CPU operates processor core(s) of the multi-SKU CPU with increased performance for workload optimizations. For example, the multi-core CPU 802, the hardware 1004 of FIG. 10, the processor 1500, etc., can provide increased performance optimizations (such as, improved frequency and processing throughput for network workloads at reduced latency) with the operation of one or more processor cores based on the hardware configuration(s) 1074, the configuration information 1100, the configuration(s) 1535, etc.

In some examples, resulting effects from a workload optimization setting may include but are not limited to higher P-states (e.g., higher P1n, higher P0n, etc.), higher deterministic performance in the execution of specialized instruction sets, among others. In some examples referring to an Intel Xeon x86 architecture, these optimizations may result in a higher SSE base P1n state on some cores, and a higher AVX P1n state on other cores. In some examples, the optimization settings may be applied in combination with other ISA amplifications or acceleration techniques to further optimize performance or performance options. Thus, a variety of acceleration instruction sets or features may be activated, enabled, or used in conjunction with the improved performance attributes related to application ratio and workload processing. In response to operating the processor core(s) at block 3716, the machine readable instructions 3700 conclude.

Figure 38:
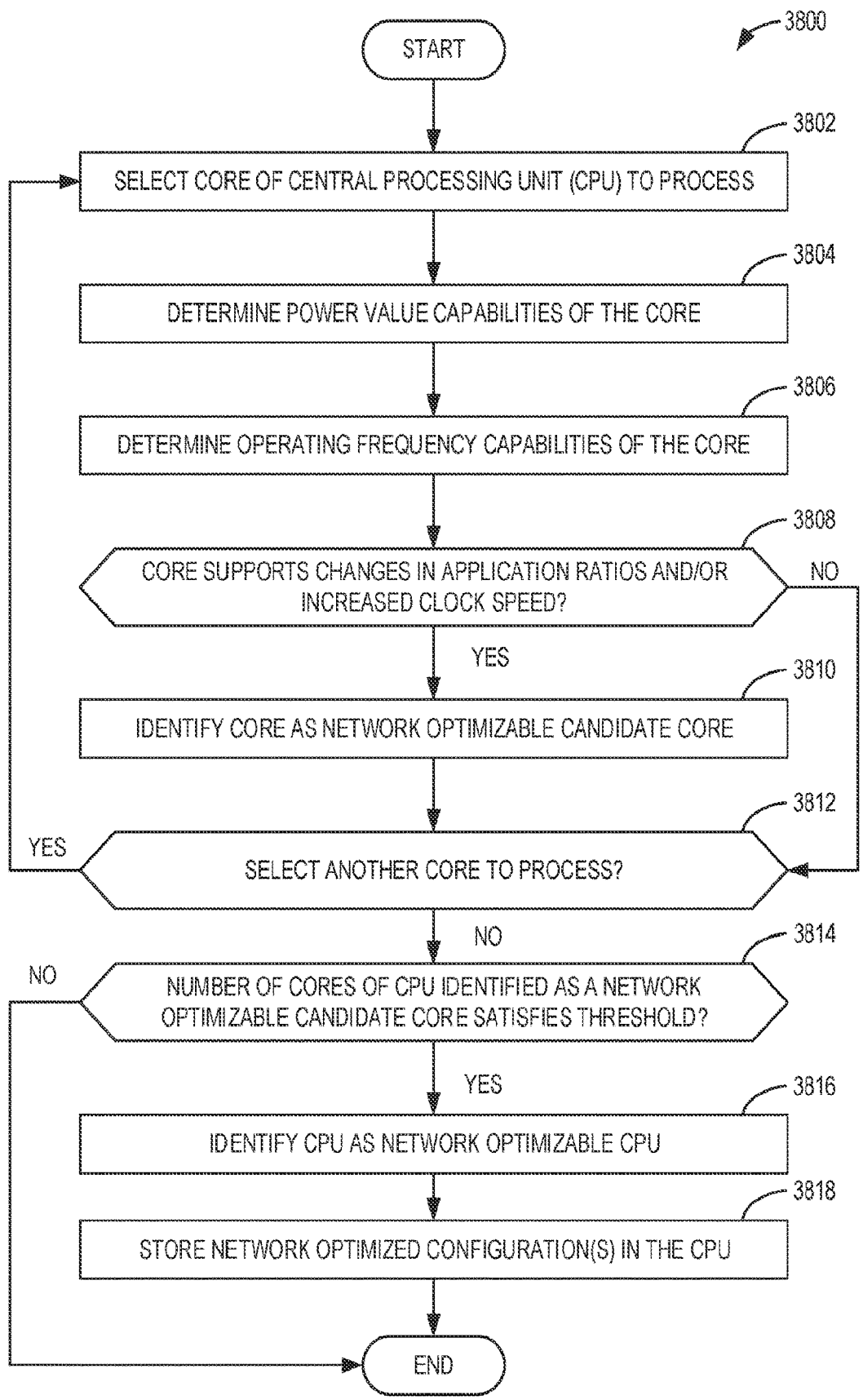
FIG. 38 is a flowchart representative of example machine readable instructions that may be executed to implement an example manufacturer enterprise system to identify a CPU as a multi-SKU CPU.

FIG. 38 is a flowchart representative of example machine readable instructions 3800 that may be executed to implement an example manufacturer enterprise system, such as the manufacturer enterprise system 1002 of FIG. 10 and/or the manufacturer enterprise system 2810 of FIG. 28, to identify a CPU as a multi-SKU CPU. In some examples, the machine readable instructions 3800 may be executed by one or more servers, one or more semiconductor device inspection machines (e.g., electron beam inspection equipment or machines, laser inspection equipment or machines, etc.), etc., that may be used to analyze, inspect, and/or otherwise characterize semiconductors during or after fabrication.

The example machine readable instructions 3800 of FIG. 38 begin at block 3802, at which the manufacturer enterprise system 1002, 2810 selects a core of a central processing unit (CPU) to process. For example, the hardware analyzer 1040 (FIG. 10) can select a first one of the cores 1604 of the first semiconductor die 1606 of the processor 1600 of FIG. 16 to process.

At block 3804, the manufacturer enterprise system 1002, 2810 determines power value capabilities of the core. For example, the hardware analyzer 1040 can determine electrical characteristics including boundary conditions, a power profile, etc., of the core. In some such examples, the hardware analyzer 1040 can determine electrical characteristics including a range of operating voltages, a range of electrical currents, etc., at which the core may operate (e.g., safely operate without damaging the core or other components in circuit with the core).

At block 3806, the manufacturer enterprise system 1002, 2810 determines operating frequency capabilities of the core. For example, the hardware analyzer 1040 can determine a range of deterministic frequencies at which the core may operate. In some such examples, the hardware analyzer 1040 can determine one or more application ratios that the first one of the cores 1604 may support based on the power value capabilities and/or the operating frequency capabilities of the core.

At block 3808, the manufacturer enterprise system 1002, 2810 determines whether the core supports changes in application ratios and/or increased clock speed. For example, the hardware analyzer 1040 can read a value from a register (e.g., a configuration register, a core configuration register, etc.), a memory area or location, etc. Based on the value, the hardware analyzer 1040 can determine that the core can support two or more application ratios (e.g., can support a range of operating frequencies, P-states, etc.). In some such examples, the hardware analyzer 1040 can determine that the core may support two or more application ratios that may be advantageous to execute network workloads associated with a 5G telecommunications network.

If, at block 3808, the manufacturer enterprise system 1002, 2810 determines that the core does not support changes in application ratios and/or increased clock speeds, control proceeds to block 3812 to determine whether to select another core to process. If, at block 3808, the manufacturer enterprise system 1002, 2810 determines that the core supports changes in application ratios and/or increased clock speeds, then, at block 3810, the manufacturer enterprise system 1002, 2810 identifies the core as a network optimizable candidate core. For example, the hardware analyzer 1040 can identify the core as capable of supporting multiple application ratios. In some such examples, the hardware analyzer 1040 can store the indication, the identification, etc., in storage (e.g., non-volatile memory, volatile memory, one or more mass storage devices, etc.) of the hardware 1004, the processor 1500, etc.

In response to identifying the core as a network optimizable candidate core at block 3810, the manufacturer enterprise system 1002, 2810 determines whether to select another core to process at block 3812. For example, the hardware analyzer 1040 can select a second one of the cores 1604 of the first semiconductor die 1606 of the processor 1600 to process.

If, at block 3812, the manufacturer enterprise system 1002, 2810 determines that there is another core to process, control returns to block 3802 to select another core of the CPU to process. If, at block 3812, the manufacturer enterprise system 1002, 2810 determines that there is not another core to process, then, at block 3814, the manufacturer enterprise system 1002, 2810 determines whether a number of cores of the CPU identified as a network optimizable candidate core satisfies a threshold. For example, the hardware analyzer 1040 can determine that 24 of 32 cores of a CPU have been identified as network optimizable candidate cores, which satisfies a threshold of 16 cores. Alternatively, the threshold may be any other number of cores.

If, at block 3814, the manufacturer enterprise system 1002, 2810 determines that the number of cores of the CPU identified as a network optimizable candidate core does not satisfy the threshold, the example machine readable instructions 3800 of FIG. 38 conclude. If, at block 3814, the manufacturer enterprise system 1002, 2810 determines that the number of cores of the CPU identified as a network optimizable candidate core satisfies the threshold, then, at block 3816, the manufacturer enterprise system 1002, 2810 identifies the CPU as a network optimizable CPU. For example, the network optimizable CPU may be deployed to an MEC environment to implement a multi-core CPU as described herein. In some such examples, the network optimizable CPU may be used to implement the DUs 122 of FIG. 1, the CUs 124 of FIG. 1, the core servers 126 of FIG. 1, etc. In some such examples, the network optimizable CPU may be assigned a single hard SKU that may be configured after fabrication into two or more soft SKUs, such as a first soft SKU to implement the DUs 122, which may be used to implement a vRAN-DU.

In response to identifying the CPU as a network optimizable CPU at block 3816, the manufacturer enterprise system 1002, 2810 stores network optimized configuration(s) in the CPU at block 3818. For example, the hardware analyzer 1040 can store one or more of the hardware configuration(s) 1074, the configuration information, the configurations 1535, etc., in the memory 1537. In response to storing the network optimized configuration(s) in the CPU at block 3818, the example machine readable instructions 3800 of FIG. 38 conclude.

Figure 39:
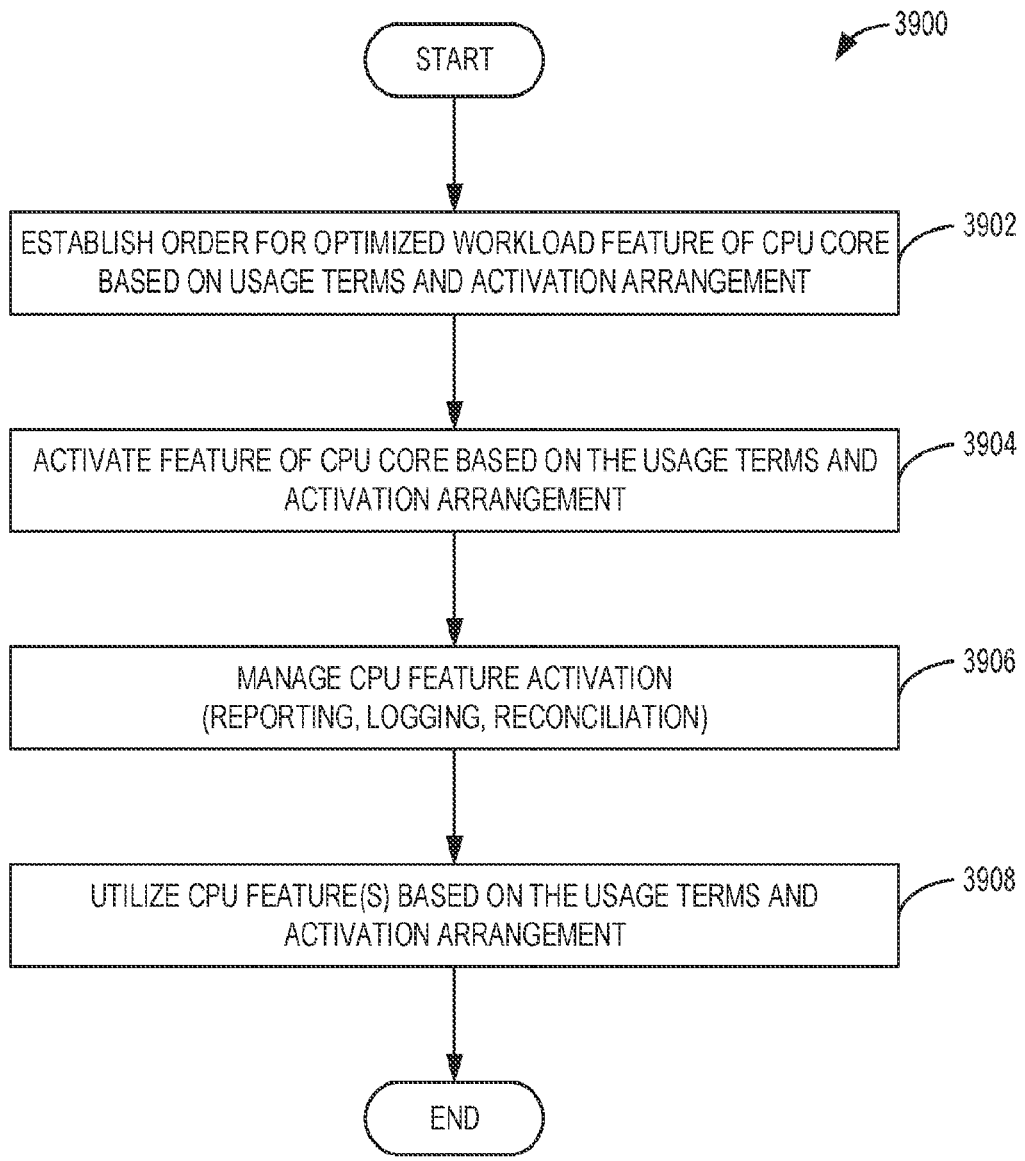
FIG. 39 is a flowchart representative of example machine readable instructions that may be executed to implement an example manufacturer enterprise system and an example workload-adjustable CPU to utilize CPU feature(s) based on an example usage terms and activation arrangement.

FIG. 39 is a flowchart representative of example machine readable instructions 3900 that may be executed to implement an example manufacturer enterprise system, such as the manufacturer enterprise system 1002 of FIG. 10 and/or the manufacturer enterprise system 2810 of FIG. 28, and an example workload-adjustable CPU, such as the multi-core CPU 802 of FIG. 8 and/or the hardware 1004 of FIG. 10, to utilize CPU feature(s) based on an example usage terms and activation arrangement. For example, the machine readable instructions 3900 can implement a method of defining and/or activating software defined silicon features, such as the network workload optimized settings described herein, within a processor.

At block 3902, an order (e.g., request, contract, agreement, etc.) for an optimized workload feature of one or more CPU core(s), according to usage terms and an activation agreement is generated. For example, the manufacturer enterprise system 1002 of FIG. 10 and/or the manufacturer enterprise system 2810 of FIG. 28 can obtain the order based on the usage terms and activation agreement from at least one of the SDSi product 2805 or the customer enterprise system 2815 of FIG. 28.

At block 3904, the manufacturer enterprise system 1002, 2810 activates the workload feature of the CPU core(s), according to the usage terms and activation agreement. For example, the manufacturer enterprise system 1002, 2810 can activate one or more software defined silicon features of the multi-core CPU 802, the multi-core CPU 902, the hardware 1004, the SDSi product 2805, etc., via a network (e.g., a wireless network). For example, the manufacturing of a CPU may enable the integration or configuration of a CPU workload optimization using software defined silicon. This may include a soft SKU mechanism on top of manufacturing settings and verification—such as to enable, unlock, verify, or modify a configuration consistent with manufacturing settings. In some examples, the manufacturer enterprise system 1002, 2810 can activate one or more software defined silicon features of the multi-core CPU 802, the multi-core CPU 902, etc., such that the multi-core CPU 802, the multi-core CPU 902, etc., may implement a specified application ratio.

At block 3906, management of the CPU feature activation is executed. For example, additional operations may be conducted at block 3906 to perform management (e.g., reporting, logging, reconciliation) of the feature, and establish usage terms. For example, this may include the manufacturer enterprise system 1002, 2810 effectuating licensing that corresponds to the type of optimization provided, the number of cores activated, and contractual provisions for the particular customer, manufacturer, or third party managing entity.

At block 3908, in response to successful activation and management, a multi-SKU CPU can utilize CPU feature(s) based on the usage terms and activation arrangement (e.g., according to the defined usage terms) to effectuate optimized execution of network workloads as described herein. In response to utilizing the CPU feature(s) at block 3908, the example machine readable instructions 3900 of FIG. 39 conclude.

Figure 40:
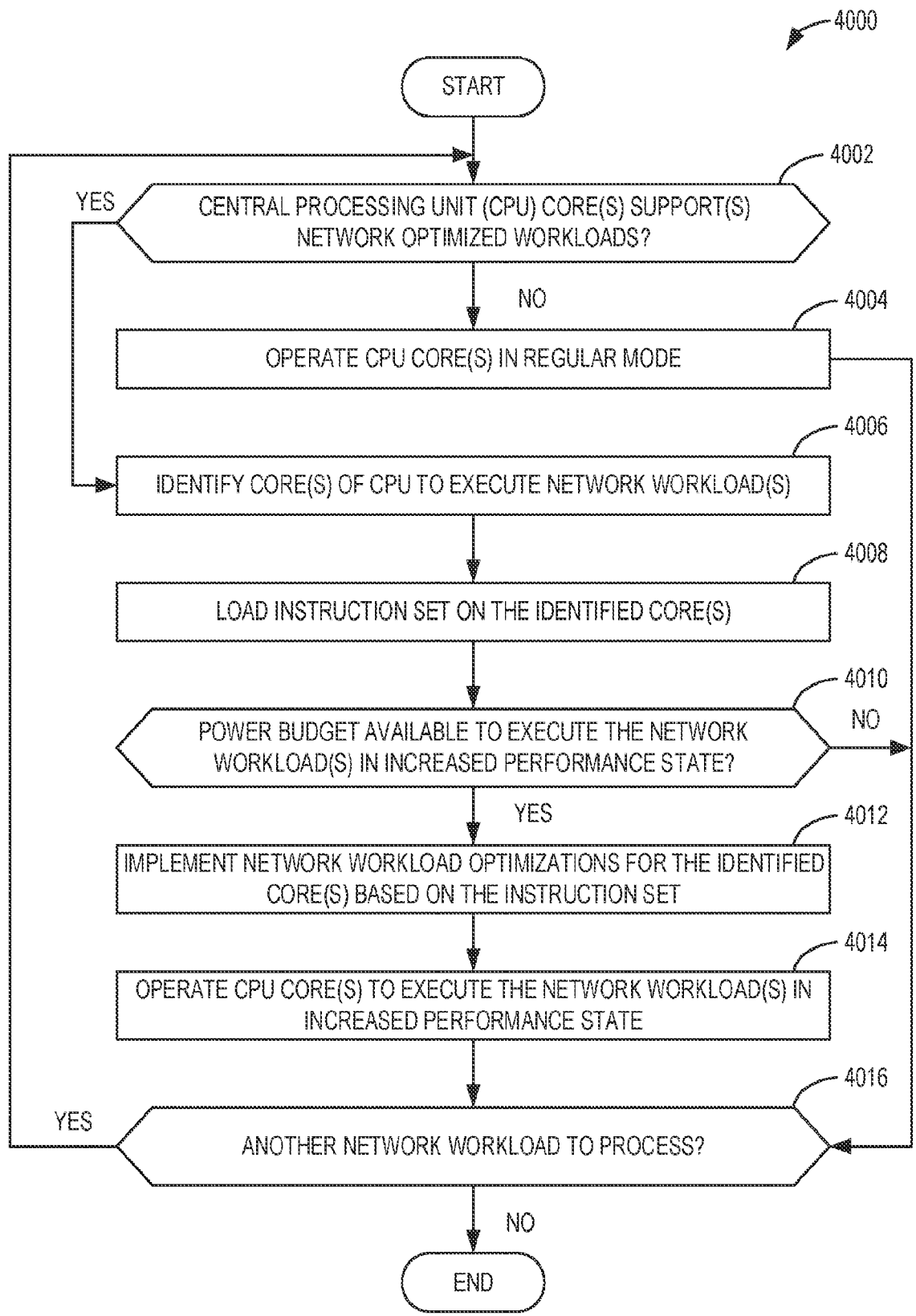
FIG. 40 is a flowchart representative of example machine readable instructions that may be executed to implement an example workload-adjustable CPU to modify an operation of CPU core(s) based on a workload.

FIG. 40 is a flowchart representative of example machine readable instructions 4000 that may be executed to implement an example workload-adjustable CPU to modify an operation of CPU core(s) based on a workload. For example, the machine readable instructions 4000 of FIG. 40 may be executed by the multi-core CPU 802 of FIG. 8, the multi-core CPU 902 of FIG. 9, the hardware 1004 of FIG. 10, the processor 1500 of FIG. 15, etc.

The machine readable instructions 4000 of FIG. 40 begin at block 4002, at which the workload-adjustable CPU determines whether central processing unit (CPU) core(s) support(s) network optimized workloads. For example, the core configurator 1536 (FIG. 15) and/or, more generally, the PCU 1508 of FIG. 15, may determine whether the first core 1510A, the second core 1510N, etc., of FIG. 15 support the execution of network optimized workloads, such as the first network workloads 816, the second network workloads 818, etc., of FIG. 8. In some such examples, the core configurator 1536 can read a value from a register (e.g., a configuration register, a core configuration register, etc.), a memory area or location, etc. Based on the value, the core configurator 1536 may determine that first core 1510A can support two or more application ratios (e.g., can support a range of operating frequencies, P-states, etc.). In some such examples, the core configurator 1536 may determine that the first core 1510A can be invoked to operate in different core configurations based on one of two or more application ratios.

If, at block 4002, the workload-adjustable CPU determines that the CPU core(s) do not support network optimized workloads, then, at block 4004, the workload-adjustable CPU operates the CPU core(s) in regular mode. For example, the core configurator 1536 can instruct the first core 1510A-1510N to operate at a base or baseline voltage and/or operating frequency. In response to operating the CPU core(s) in regular mode at block 4004, control proceeds to block 4016 to determine whether there is another network workload to process.

If, at block 4002, the workload-adjustable CPU determines that one(s) of the CPU core(s) support network optimized workloads, control proceeds to block 4006 to identify core(s) of the CPU to execute the network workload(s). For example, an application (e.g., a computing application, a software application, etc.) may execute an application function (e.g., a telecommunication function, a 5G function, etc.) and the scheduler 1532 (FIG. 15) can determine that the application function requires one or more network workloads to be completed to execute the application function. In some such examples, the scheduler 1532 can identify the first core 1510A and the second core 1510N (or a different number or one(s) of the cores 1510A-1510N) to execute the one or more network workloads. For example, the scheduler 1532 can identify the first core 1510A to execute a first one of the AVX-512 instructions 1540 (FIG. 15) and the second core 1510N to execute a second one of the 5G-ISA instructions 1542 (FIG. 15).

At block 4008, the workload-adjustable CPU loads an instruction set on the identified core(s). For example, the scheduler 1532 can invoke the first core 1510A to load the first one of the AVX-512 instructions 1540 and the second core 1510N to load the second one of the 5G-ISA instructions 1542.

At block 4010, the workload-adjustable CPU determines whether a power budget is available to execute the network workload(s) in an increased performance state. For example, the first core 1510A may interface with the power budget analyzer 1534 (FIG. 15) in response to loading the first one of the AVX-512 instructions 1540. In such examples, the first core 1510A may transmit data, such as a type of the loaded instruction (e.g., an SSE instruction, an AVX-512 instruction, a 5G-ISA instruction, etc.), an identifier of the first core 1510A, configuration information (e.g., a P-state, an operating voltage, an operating frequency, etc.) of the first core 1510A, etc., and/or a combination thereof. In some such examples, the power budget analyzer 1534 may compare a first power consumption of the processor 1500 without the first core 1510A operating in an increased performance state (e.g., operating at a higher operating voltage and frequency) and a second power consumption of the processor 1500 with the first core 1510A operating in the increased performance state.

In some examples, the power budget analyzer 1534 compares the second power consumption to a threshold (e.g., a power budget threshold, a thermal design profile threshold, etc.). The power budget analyzer 1534 may not grant a license to the first core 1510A to operate in the increased performance state if the threshold is exceeded and/or otherwise satisfied. The power budget analyzer 1534 may grant the license to the first core 1510A to operate in the increased performance state if the threshold is not exceeded and/or otherwise not satisfied.

If, at block 4010, the workload-adjustable CPU determines that there is not enough power budget available to execute the network workload(s) in the increased performance state, control proceeds to block 4016 to determine whether there is another network load to process. For example, the power budget analyzer 1534 may determine that the increase in the performance state of the first core 1510A causes the power budget to be exceeded and thereby the threshold is satisfied.

If, at block 4010, the workload-adjustable CPU determines that there is enough power budget available to execute the network workload(s) in the increased performance state, then, at block 4012, the workload-adjustable CPU implements network workload optimizations for the identified core(s) based on the instruction set. For example, the power budget analyzer 1534 may determine that the increase in the performance state of the first core 1510A does not cause the power budget to be exceeded and thereby the threshold is not satisfied. In some such examples, the core configurator 1536 may invoke the core logic 1512 (FIG. 15) to deliver increased voltage to the first core 1510A and/or may invoke the core logic 1512 to operate the first core 1510A with an increased deterministic frequency.

At block 4014, the workload-adjustable CPU operates the CPU core(s) to execute the network workload(s) in the increased performance state. For example, the first core 1510A may execute the first one of the AVX-512 instructions 1540 and the second core 1510N may execute the second one of the 5G-ISA instructions 1542 in the increased performance state.

At block 4016, the workload-adjustable CPU determines whether there is another workload to process. For example, the scheduler 1532 may determine whether the application has another network function to execute. If, at block 4016, the workload-adjustable CPU determines that there is another network workload to process, control returns to block 4002 to determine whether the CPU core(s) support(s) network optimized workloads, otherwise the example machine readable instructions 4000 of FIG. 40 conclude.

Figure 41:
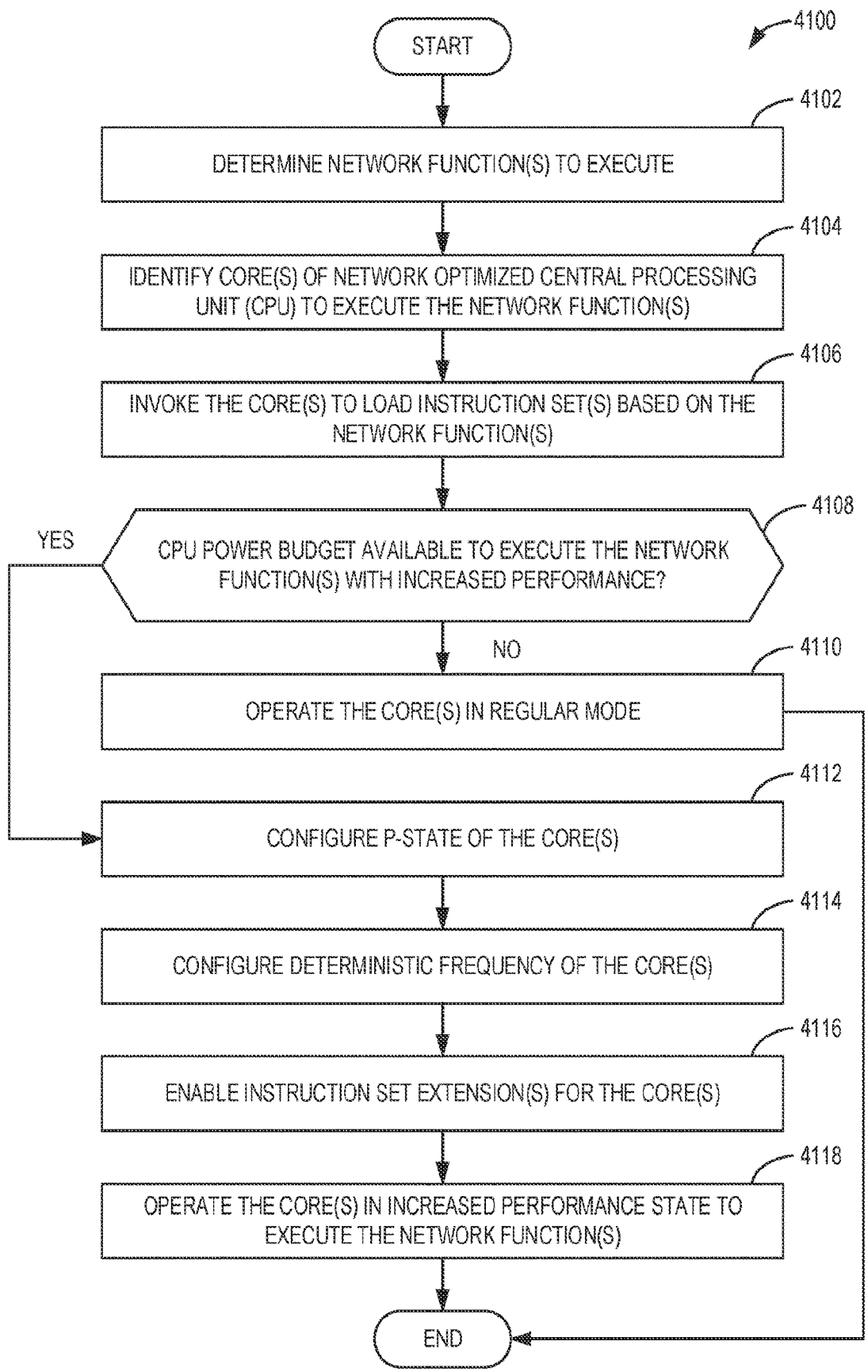
FIG. 41 is another flowchart representative of example machine readable instructions that may be executed to implement an example workload-adjustable CPU to modify an operation of CPU core(s) based on a workload.

FIG. 41 is another flowchart representative of example machine readable instructions 4100 that may be executed to implement an example workload-adjustable CPU to modify an operation of CPU core(s) based on a workload. For example, the machine readable instructions 4100 of FIG. 41 may be executed by the multi-core CPU 802 of FIG. 8, the multi-core CPU 902 of FIG. 9, the hardware 1004 of FIG. 10, the processor 1500 of FIG. 15, etc., to modify an operation of CPU core(s) based on a workload.

The example machine readable instructions 4100 of FIG. 41 begin at block 4102, at which the workload-adjustable CPU determines network function(s) to execute. For example, the scheduler 1532 (FIG. 15) may be in communication with an application operating on an OS. In some such examples, the scheduler 1532 may determine that to facilitate an application function, task, workload, etc., one or more network workloads, such as the network workloads 816, 818 of FIG. 8, is/are to be executed. For example, the scheduler 1532 may determine that AVX-512 network workloads, such as scrambling or descrambling, modulation or demodulation, etc., are to be executed. In some examples, the scheduler 1532 may determine that AVX-512 and/or 5G-ISA workloads, such as beam forming workloads, are to be executed.

At block 4104, the workload-adjustable CPU identifies core(s) of the network optimized central processing unit (CPU) to execute the network function(s). For example, the scheduler 1532 can identify the first core 1510A and the second core 1510N (or a different number or one(s) of the cores 1510A-1510N) of FIG. 15 to execute the one or more network workloads. For example, the scheduler 1532 can identify the first core 1510A to execute a first one of the AVX-512 instructions 1540 (FIG. 15) and/or the second core 1510N to execute a second one of the 5G-ISA instructions 1542 (FIG. 15).

At block 4106, the workload-adjustable CPU invokes the core(s) to load instruction set(s) based on the network function(s). For example, the scheduler 1532 can invoke the first core 1510A to load the first one of the AVX-512 instructions 1540 based on the first network workloads 816 to be executed and the second core 1510N to load the second one of the 5G-ISA instructions 1542 based on the second network workloads 818 to be executed.

At block 4108, the workload-adjustable CPU determines whether a CPU power budget is available to execute the network function(s) with increased performance. For example, the second core 1510N may interface with the power budget analyzer 1534 (FIG. 15) in response to loading the first one of the 5G-ISA instructions 1542. In some such examples, the second core 1510N may transmit data, such as a type of the loaded instruction (e.g., an SSE instruction, an AVX-512 instruction, a 5G-ISA instruction, etc.), an identifier of the second core 1510N, configuration information (e.g., a P-state, an operating voltage, an operating frequency, etc.) of the second core 1510N, etc., and/or a combination thereof using the interconnect 1520 (FIG. 15). In some such examples, the power budget analyzer 1534 may compare a power consumption (e.g., 120 W, 150 W, 185 W, etc.) of the processor 1500 with the second core 1510N operating in an increased performance state (e.g., operating at a higher operating voltage and frequency) to a threshold (e.g., a power budget threshold, a power consumption threshold, etc.). The power budget analyzer 1534 may not grant a license to the second core 1510N to operate in the increased performance state if the threshold is exceeded and/or otherwise satisfied. For example, the power budget analyzer 1534 may instruct the core logic 1512 to maintain and/or otherwise not increase the operating voltage of the second core 1510N. The power budget analyzer 1534 may grant the license to the second core 1510N to operate in the increased performance state if the threshold is not exceeded and/or otherwise not satisfied. For example, the power budget analyzer 1534 may instruct the core logic 1512 to increase the operating voltage of the second core 1510N.

If, at block 4108, the workload-adjustable CPU determines that there is not enough CPU power budget available to execute the network functions(s) with increased performance, then, at block 4110, the workload-adjustable CPU operates the CPU core(s) in regular mode. For example, the core configurator 1536 (FIG. 15) can instruct the second core 1510N to operate at a base or baseline voltage and/or operating frequency. In response to operating the CPU core(s) in regular mode at block 4110, the example machine readable instructions 4100 of FIG. 41 conclude.

If, at block 4108, the workload-adjustable CPU determines that there is available CPU power budget to execute the network functions(s) with increased performance, control proceeds to block 4112 to configure a P-state of the core(s). For example, the core configurator 1536 may adjust a P-state of the second core 1510N from P1n to P0n to increase a voltage and frequency of the second core 1510N.

At block 4114, the workload-adjustable CPU configures a deterministic frequency of the core(s). For example, in response to adjusting the P-state of the second core 1510N, the core configurator 1536 may cause the clock speed of the second core 1510N to increase.

At block 4116, the workload-adjustable CPU enables instruction set extension(s) for the core(s). For example, the scheduler 1532 may grant the second core 1510N access to one(s) of the 5G-ISA instructions 1542 for execution to execute the second network workloads 818.

At block 4118, the workload-adjustable CPU operates the core(s) in the increased performance state to execute the network function(s). For example, the core logic 1512 may operate the first core 1510A, the second core 1510N, etc., in the increased performance state in response to optimizing a configuration and/or operation of the cores 1510A-1510N on a per-core basis. In response to operating the core(s) in the increased performance state to execute the network function(s) at block 4118, the example machine readable instructions 4100 of FIG. 41 conclude.

Figure 42:
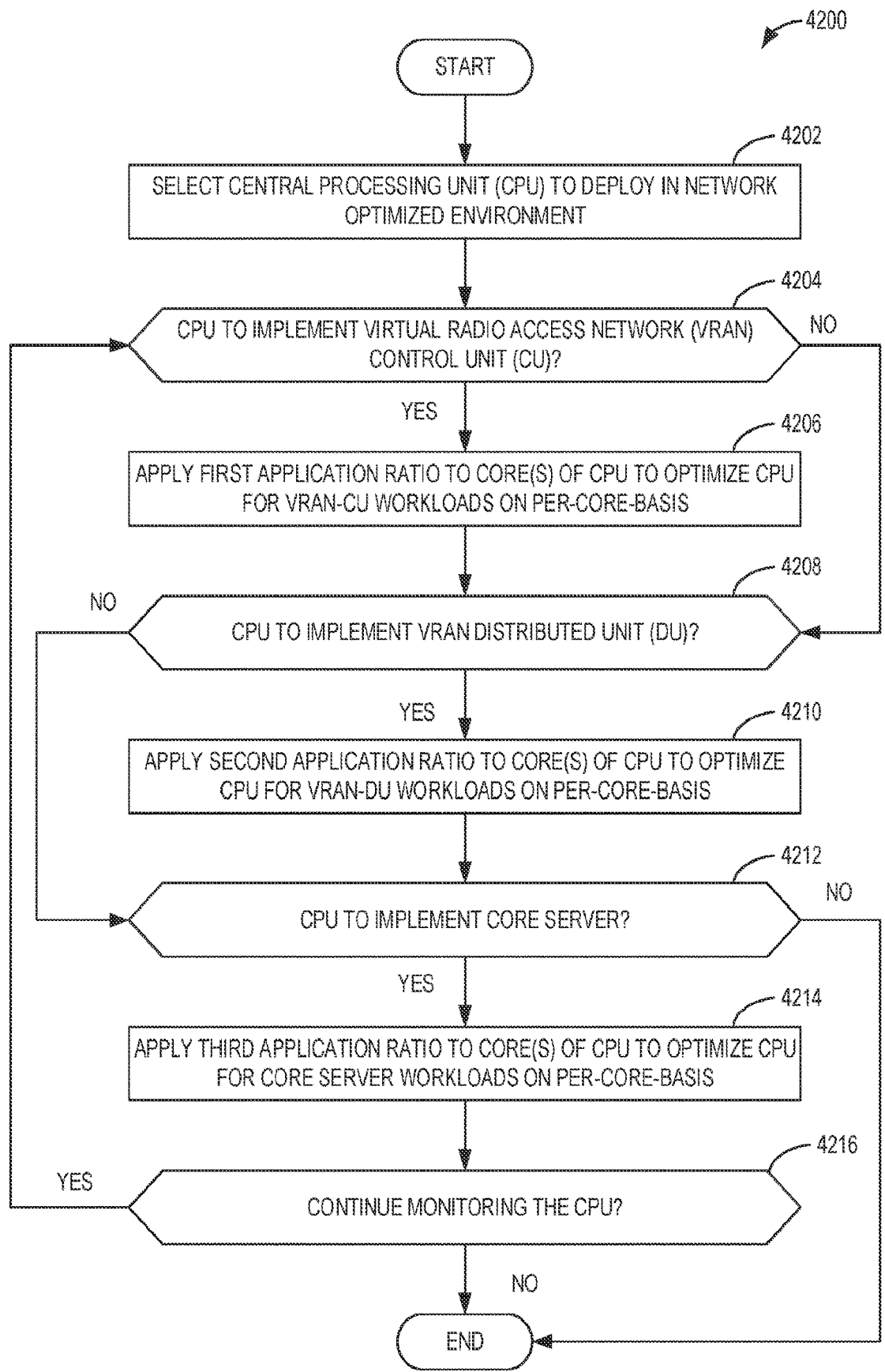
FIG. 42 is yet another flowchart representative of example machine readable instructions that may be executed to implement an example workload-adjustable CPU to modify an operation of CPU core(s) based on a workload.

FIG. 42 is a flowchart representative of example machine readable instructions 4200 that may be executed to implement an example workload-adjustable CPU to modify an operation of CPU core(s) based on a workload. For example, the machine readable instructions 4200 of FIG. 42 may be executed by the multi-core CPU 802 of FIG. 8, the multi-core CPU 902 of FIG. 9, the hardware 1004 of FIG. 10, the processor 1500, etc. The example machine readable instructions 4200 of FIG. 42 begin at block 4202, at which a central processing unit (CPU) is selected to deploy in a network optimized environment. For example, the processor 1500 may be selected to deploy in the first multi-core computing environment 100 of FIG. 1.

At block 4204, the CPU determines whether the CPU is to implement a virtual radio access network (vRAN) centralized unit (CU). For example, the processor 1500 may determine that the processor 1500 is to implement the vRAN-CU based on CU workloads the processor 1500 is to process.

If, at block 4204, the CPU determines that the CPU is not to implement a vRAN-CU, control proceeds to block 4208 to determine whether the CPU is to implement a vRAN distributed unit (DU). If, at block 4204, the CPU determines that the CPU is to implement a vRAN-CU, then, at block 4206, the CPU is to apply a first application ratio to core(s) of the CPU to optimize CPU for vRAN-CU workloads on a per-core basis. For example, one(s) of the cores 1510A-1510N may be configured with a first operating frequency based on a first core application ratio of 0.74 and corresponding one(s) of the uncore logic 1522 with a second operating frequency based on a first uncore application ratio of 1.5.

At block 4208, the CPU determines whether to implement a vRAN-DU. For example, the processor 1500 may determine that the processor 1500 is to implement the vRAN-DU based on one(s) of the network workloads 816, 818 of FIG. 8 that the processor 1500 is to process.

If, at block 4208, the CPU determines that the CPU is not to implement a vRAN-DU, control proceeds to block 4212 to determine whether the CPU is to implement a core server. If, at block 4208, the CPU determines that the CPU is to implement a vRAN-DU, then, at block 4210, the CPU is to apply a second application ratio to core(s) of the CPU to optimize the CPU for vRAN-DU workloads on a per-core basis. For example, one(s) of the cores 1510A-1510N may be configured with a second operating frequency based on a second core application ratio of 0.65 and corresponding one(s) of the uncore logic 1522 with a second operating frequency based on a second uncore application ratio of 1.0.

At block 4212, the CPU determines whether to implement a core server. For example, the processor 1500 may determine that the processor 1500 is to implement the core server based on one(s) of the network workloads 908 of FIG. 9 the processor 1500 is to process.

If, at block 4212, the CPU determines that the CPU is not to implement a core server, the example machine readable instructions 4200 of FIG. 42 conclude. If, at block 4212, the CPU determines that the CPU is to implement a core server, then, at block 4214, the CPU is to apply a third application ratio to core(s) of the CPU to optimize the CPU for core server workloads on a per-core basis 1510A. For example, one(s) of the cores 1510A-1510N may be configured with a third operating frequency based on a third core application ratio of 1.0 and corresponding one(s) of the uncore logic 1522 with a third operating frequency based on a third uncore application ratio of 1.0. In response to applying the third application ratio to core(s) of the CPU to optimize the CPU for core server workloads on a per-core basis at block 4214, the CPU determines whether to continue monitoring the CPU at block 4216. For example, the processor 1500 may obtain a request to implement a different configuration (e.g., a vRAN-CU, a vRAN-DU, a core server, etc.). If, at block 4216, the CPU determines to continue monitoring the CPU, control returns to block 4204 to determine whether the CPU is to implement a vRAN-CU, otherwise the example machine readable instructions 4200 of FIG. 42 conclude.

Figure 43:
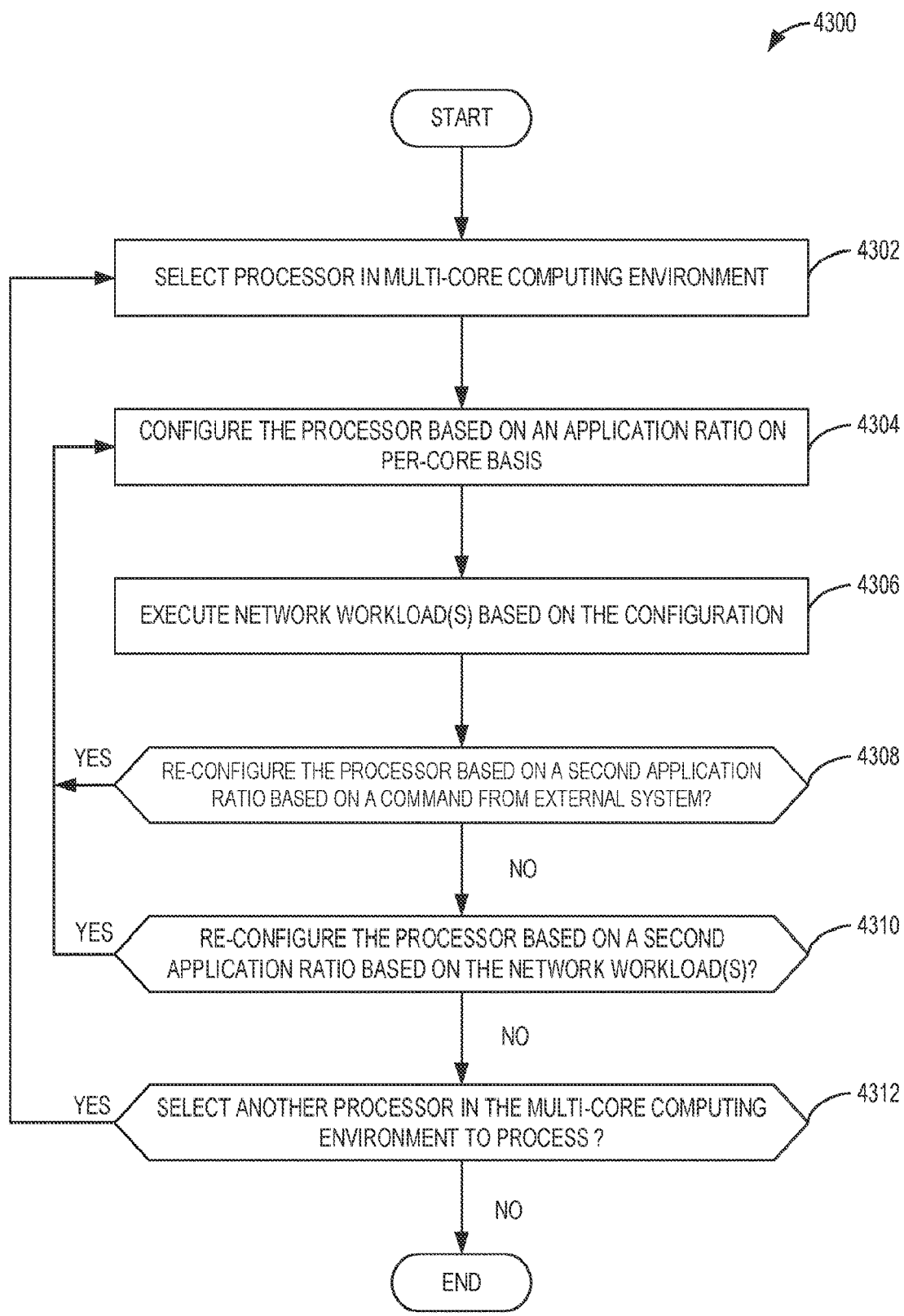
FIG. 43 is another flowchart representative of example machine readable instructions that may be executed to implement an example workload-adjustable CPU to modify an operation of CPU core(s) based on a workload.

FIG. 43 is a flowchart representative of example machine readable instructions 4300 that may be executed to implement an example workload-adjustable CPU to modify an operation of CPU core(s) based on a workload. For example, the machine readable instructions 4300 of FIG. 43 may be executed by the multi-core CPU 802 of FIG. 8, the multi-core CPU 902 of FIG. 9, the hardware 1004 of FIG. 10, the processor 1500 of FIG. 15, etc. The example machine readable instructions 4300 of FIG. 43 begin at block 4302, at which a central processing unit (CPU) is selected in a multi-core computing environment. For example, an instance of the processor 1500 in the first multi-core computing environment 100 of FIG. 1 may be selected.

At block 4304, the CPU configures the CPU based on an application ratio on a per-core basis. For example, the processor 1500 can configure one(s) of the cores 1510A-1510N with a first operating frequency based on a core application ratio of 0.74 and corresponding one(s) of the uncore logic 1522 with a second operating frequency based on a first uncore application ratio of 1.5. In some such examples, the processor 1500 can be configured to implement a vRAN-DU.

At block 4306, the CPU executes network workload(s) based on the configuration. For example, the cores 1510A-1510N can execute the first workloads 816, the second workloads 818, etc., of FIG. 8.

At block 4308, the CPU determines whether to re-configure the CPU based on a second application ratio based on a command from an external system. For example, the customer enterprise system 2815 as described above in connection with FIGS. 28-30 can request a license from the manufacturer enterprise system 1002 of FIG. 10 and/or the manufacturer enterprise system 2810 of FIG. 28 to operate the processor 1500 based on the second application ratio. In some examples, a user in connection with the customer enterprise system 2815 can transmit a request (e.g., via an OS mailbox command as described above in connection with FIG. 32) to re-configure the processor 1500 based on the second application ratio.

If, at block 4308, the CPU determines to re-configure the CPU based on the second application ratio based on the command from the external system, control returns to block 4304 to configure the CPU based on the second application ratio on a per-core basis. If, at block 4308, the CPU determines not to re-configure the CPU based on the second application ratio based on the command from the external system, then, at block 4310, the CPU determines whether to re-configure the CPU based on the second application ratio based on the network workload(s). For example, the processor 1500 can generate an output from a trained ML/AI model (e.g., the machine-learning model(s) 1078 of FIG. 10) using data associated with the network workload(s) as input(s). In some such examples, the processor 1500 can generate the output to indicate that a different application ratio may be used to execute the network workload(s) in a more optimized and/or otherwise improved manner, such as by increasing throughput and/or reducing latency when executing the network workload(s).

If, at block 4310, the CPU determines to re-configure the CPU based on the second application ratio based on the network workload(s), control returns to block 4304 to configure the CPU based on the second application ratio on a per-core basis. If, at block 4310, the CPU determines not to re-configure the CPU based on the second application ratio based on the network workload(s), then, at block 4312, the processor 1500 determines whether to select another processor in the multi-core computing environment to process. If, at block 4312, the CPU determines to select another processor in the multi-core computing environment to process, control returns to block 4302 to select another processor in the multi-core computing environment, otherwise the example machine readable instructions 4300 of FIG. 43 conclude.

Figure 44:
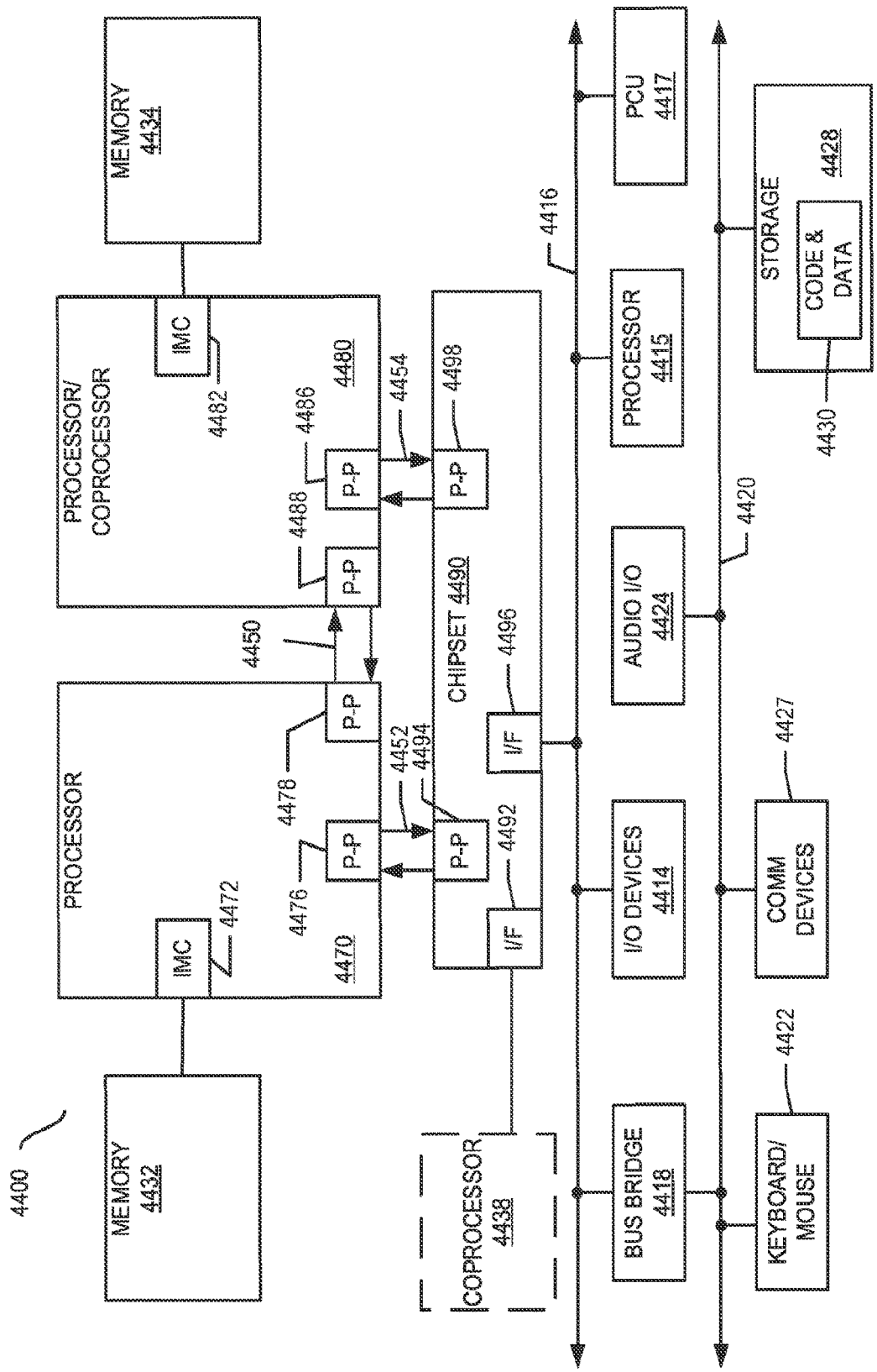
FIG. 44 illustrates an exemplary system that may implement the examples disclosed herein.

FIG. 44 illustrates examples of an exemplary system. Multiprocessor system 4400 is a point-to-point interconnect system and includes a plurality of processors including a first processor 4470 and a second processor 4480 coupled via a point-to-point interconnect 4450. In some examples, the first processor 4470 and the second processor 4480 are homogeneous. In some examples, first processor 4470 and the second processor 4480 are heterogenous. For example, the multiprocessor system 4400 may implement the DUs 122 of FIG. 1, the CUs 124 of FIG. 1, the core servers 126 of FIG. 1, etc. In some examples, the first processor 4470 and/or the second processor 4480 may implement the multi-core CPU 802 of FIG. 8, the multi-core CPU 902 of FIG. 9, the hardware 1004 of FIG. 10, the processor 1500 of FIG. 15, etc. For example, the multiprocessor system 4400 may execute 5G-ISA instructions as described herein to improve processing of telecommunication workloads related to 5G networks.

Processors 4470 and 4480 are shown including integrated memory controller (IMC) units circuitry 4472 and 4482, respectively. Processor 4470 also includes as part of its interconnect controller units point-to-point (P-P) interfaces 4476 and 4478; similarly, second processor 4480 includes P-P interfaces 4486 and 4488. Processors 4470, 4480 may exchange information via the point-to-point (P-P) interconnect 4450 using P-P interface circuits 4478, 4488. IMCs 4472 and 4482 couple the processors 4470, 4480 to respective memories, namely a memory 4432 and a memory 4434, which may be portions of main memory locally attached to the respective processors. For example, the P-P interfaces 4486 and/or 4488 may implement the interfaces 1550A-1550N of FIG. 15.

Processors 4470, 4480 may each exchange information with a chipset 4490 via individual P-P interconnects 4452, 4454 using point to point interface circuits 4476, 4494, 4486, 4498. Chipset 4490 may optionally exchange information with a coprocessor 4438 via a high-performance interface 4492. In some examples, the coprocessor 4438 is a special-purpose processor, such as, for example, a high-throughput MIC processor, a network or communication processor, compression engine, graphics processor, GPGPU, embedded processor, or the like.

A shared cache (not shown) may be included in either processor 4470, 4480 or outside of both processors, yet connected with the processors via P-P interconnect, such that either or both processors' local cache information may be stored in the shared cache if a processor is placed into a low power mode.

Chipset 4490 may be coupled to a first interconnect 4416 via an interface 4496. In some examples, the first interconnect 4416 may be a Peripheral Component Interconnect (PCI) interconnect, or an interconnect such as a PCI Express interconnect or another I/O interconnect. In some examples, one of the interconnects couples to a power control unit (PCU) 4417, which may include circuitry, software, and/or firmware to perform power management operations with regard to the processors 4470, 4480 and/or co-processor 4438. For example, PCU 4417 may implement the PCU 1508 of FIG. 15. PCU 4417 provides control information to a voltage regulator to cause the voltage regulator to generate the appropriate regulated voltage. PCU 4417 also provides control information to control the operating voltage generated. In various examples, PCU 4417 may include a variety of power management logic units (circuitry) to perform hardware-based power management. Such power management may be wholly processor controlled (e.g., by various processor hardware, and which may be triggered by workload and/or power, thermal or other processor constraints) and/or the power management may be performed responsive to external sources (such as a platform or power management source or system software).

PCU 4417 is illustrated as being present as logic separate from the processor 4470 and/or processor 4480. In other cases, PCU 4417 may execute on a given one or more of cores (not shown) of processor 4470 or 4480. In some cases, PCU 4417 may be implemented as a microcontroller (dedicated or general-purpose) or other control logic configured to execute its own dedicated power management code, sometimes referred to as P-code. In yet other examples, power management operations to be performed by PCU 4417 may be implemented externally to a processor, such as by way of a separate power management integrated circuit (PMIC) or another component external to the processor. In yet other examples, power management operations to be performed by PCU 4417 may be implemented within BIOS or other system software.

Various I/O devices 4414 may be coupled to first interconnect 4416, along with an interconnect (bus) bridge 4418 which couples first interconnect 4416 to a second interconnect 4420. In some examples, one or more additional processor(s) 4415, such as coprocessors, high-throughput MIC processors, GPGPU's, accelerators (such as, e.g., graphics accelerators or digital signal processing (DSP) units), field programmable gate arrays (FPGAs), or any other processor, are coupled to first interconnect 4416. In some examples, second interconnect 4420 may be a low pin count (LPC) interconnect. Various devices may be coupled to second interconnect 4420 including, for example, a keyboard and/or mouse 4422, communication devices 4427 and a storage unit circuitry 4428. Storage unit circuitry 4428 may be a disk drive or other mass storage device which may include instructions/code and data 4430, in some examples. Further, an audio I/O 4424 may be coupled to second interconnect 4420. Note that other architectures than the point-to-point architecture described above are possible. For example, instead of the point-to-point architecture, a system such as multiprocessor system 4400 may implement a multi-drop interconnect or other such architecture.

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die as the described CPU (sometimes referred to as the application core(s) or application processor(s)), the above described coprocessor, and additional functionality. Exemplary core architectures are described next, followed by descriptions of exemplary processors and computer architectures.

Figure 45:
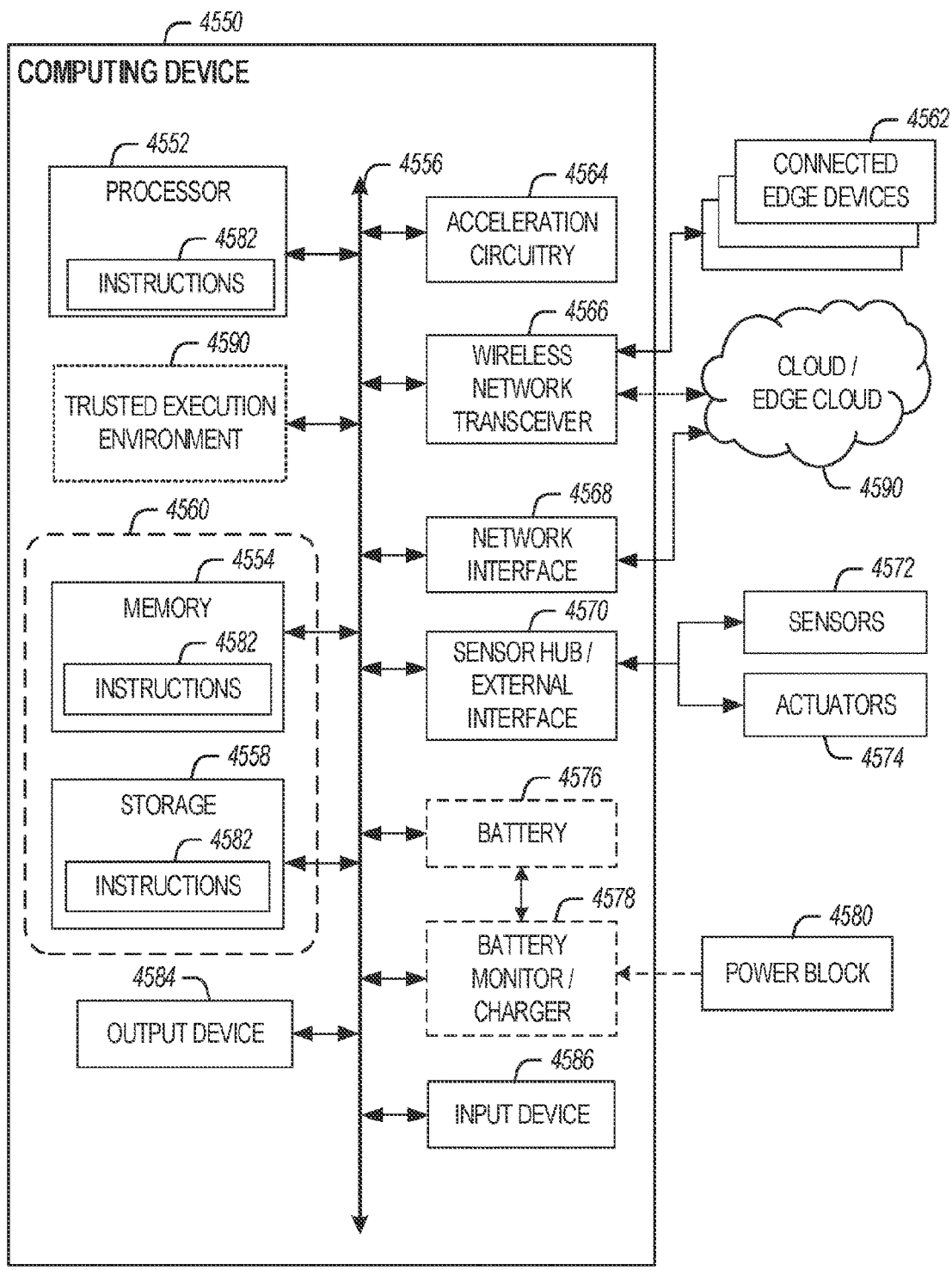
FIG. 45 is a block diagram of an example processing platform structured to execute the example machine readable instructions of FIGS. 31-43 to implement an example workload-adjustable CPU.

In a more detailed example, FIG. 45 illustrates a block diagram of an example of components that may be present in an edge computing node 4550 for implementing the techniques (e.g., operations, processes, methods, and methodologies) described herein. The edge computing node 4550 may include any combinations of the components referenced above, and it may include any device usable with an edge communication network or a combination of such networks. The components may be implemented as ICs, portions thereof, discrete electronic devices, or other modules, logic, hardware, software, firmware, or a combination thereof adapted in the edge computing node 4550, or as components otherwise incorporated within a chassis of a larger system. Further, to support the security examples provided herein, a hardware RoT (e.g., provided according to a DICE architecture) may be implemented in each IP block of the edge computing node 4550 such that any IP Block could boot into a mode where a RoT identity could be generated that may attest its identity and its current booted firmware to another IP Block or to an external entity.

The edge computing node 4550 may include processing circuitry in the form of a processor 4552, which may be a microprocessor, a multi-core processor, a multithreaded processor, an ultra-low voltage processor, an embedded processor, or other known processing elements. The processor 4552 may be a part of a system on a chip (SoC) in which the processor 4552 and other components are formed into a single integrated circuit, or a single package, such as the Edison™ or Galileo™ SoC boards from Intel Corporation, Santa Clara, California. As an example, the processor 4552 may include an Intel® Architecture Core™ based processor, such as a Quark™, an Atom™, a Xeon™, an i3, an i5, an i7, an i9, or an MCU-class processor, or another such processor available from Intel®. However, any number other processors may be used, such as available from Advanced Micro Devices, Inc. (AMD) of Sunnyvale, California, a MIPS-based design from MIPS Technologies, Inc. of Sunnyvale, California, an ARM-based design licensed from ARM Holdings, Ltd. or a customer thereof, or their licensees or adopters. The processors may include units such as an A5-A13 processor from Apple® Inc., a Snapdragon™ processor from Qualcomm® Technologies, Inc., or an OMAP™ processor from Texas Instruments, Inc.

In some examples, the processor 4552 implements the processor 1500 of FIG. 15. For example, the processor 4552 can include and/or otherwise implement the example scheduler 1532, the example power budget analyzer 1534, and/or the example core configurator 1536 of FIG. 15. In some examples, the processor 4552 includes memory, such as NVM, ROM, etc. In such examples, the processor 4552 can include, store, and/or otherwise implement the memory 1537 of FIG. 15, which includes the configuration(s) 1535, the SSE instructions 1538, the AVX-512 instructions 1540, and the 5G-ISA instructions 1542 of FIG. 15.

The processor 4552 may communicate with a system memory 4554 over an interconnect 4556 (e.g., a bus). Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g., LPDDR, LPDDR2, LPDDR3, or LPDDR4). In particular examples, a memory component may comply with a DRAM standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces. In various implementations, the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 4558 may also couple to the processor 4552 via the interconnect 4556. In an example, the storage 4558 may be implemented via a solid-state disk drive (SSDD). Other devices that may be used for the storage 4558 include flash memory cards, such as SD cards, microSD cards, XD picture cards, and the like, and USB flash drives. In an example, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magneto-resistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

In low power implementations, the storage 4558 may be on-die memory or registers associated with the processor 4552. However, in some examples, the storage 4558 may be implemented using a micro HDD. Further, any number of new technologies may be used for the storage 4558 in addition to, or instead of, the technologies described, such resistance change memories, phase change memories, holographic memories, or chemical memories, among others.

The components may communicate over the interconnect 4556. The interconnect 4556 may include any number of technologies, including industry standard architecture (ISA), extended ISA (EISA), peripheral component interconnect (PCI), peripheral component interconnect extended (PCIx), PCI express (PCIe), or any number of other technologies. The interconnect 4556 may be a proprietary bus, for example, used in an SoC based system. Other bus systems may be included, such as an I2C interface, an SPI interface, point to point interfaces, and a power bus, among others.

The interconnect 4556 may couple the processor 4552 to a transceiver 4566, for communications with the connected edge devices 4562. The transceiver 4566 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the connected edge devices 4562. For example, a wireless local area network (WLAN) unit may be used to implement Wi-Fi® communications in accordance with the Institute of Electrical and Electronics Engineers (IEEE) 802.11 standard. In addition, wireless wide area communications, e.g., according to a cellular or other wireless wide area protocol, may occur via a wireless wide area network (WWAN) unit.

The wireless network transceiver 4566 (or multiple transceivers) may communicate using multiple standards or radios for communications at a different range. For example, the edge computing node 4550 may communicate with close devices, e.g., within about 10 meters, using a local transceiver based on BLE, or another low power radio, to save power. More distant connected edge devices 4562, e.g., within about 50 meters, may be reached over ZigBee or other intermediate power radios. Both communications techniques may take place over a single radio at different power levels or may take place over separate transceivers, for example, a local transceiver using BLE and a separate mesh transceiver using ZigBee.

A wireless network transceiver 4566 (e.g., a radio transceiver) may be included to communicate with devices or services in the edge cloud 4590 via local or wide area network protocols. The wireless network transceiver 4566 may be an LPWA transceiver that follows the IEEE 802.15.4, or IEEE 802.15.4g standards, among others. The edge computing node 4550 may communicate over a wide area using LoRaWAN™ (Long Range Wide Area Network) developed by Semtech and the LoRa Alliance. The techniques described herein are not limited to these technologies but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the wireless network transceiver 4566, as described herein. For example, the transceiver 4566 may include a cellular transceiver that uses spread spectrum (SPA/SAS) communications for implementing high-speed communications. Further, any number of other protocols may be used, such as Wi-Fi® networks for medium speed communications and provision of network communications. The transceiver 4566 may include radios that are compatible with any number of 3GPP (Third Generation Partnership Project) specifications, such as Long Term Evolution (LTE) and 5th Generation (5G) communication systems, discussed in further detail at the end of the present disclosure. A network interface controller (NIC) 4568 may be included to provide a wired communication to nodes of the edge cloud 4590 or to other devices, such as the connected edge devices 4562 (e.g., operating in a mesh). The wired communication may provide an Ethernet connection or may be based on other types of networks, such as Controller Area Network (CAN), Local Interconnect Network (LIN), DeviceNet, ControlNet, Data Highway+, PROFIBUS, or PROFINET, among many others. An additional NIC 4568 may be included to enable connecting to a second network, for example, a first NIC 4568 providing communications to the cloud over Ethernet, and a second NIC 4568 providing communications to other devices over another type of network.

Given the variety of types of applicable communications from the device to another component or network, applicable communications circuitry used by the device may include or be embodied by any one or more of components 4564, 4566, 4568, or 4570. Accordingly, in various examples, applicable means for communicating (e.g., receiving, transmitting, etc.) may be embodied by such communications circuitry.

The edge computing node 4550 may include or be coupled to acceleration circuitry 4564, which may be embodied by one or more AI accelerators, a neural compute stick, neuromorphic hardware, an FPGA, an arrangement of GPUs, one or more SoCs, one or more CPUs, one or more digital signal processors, dedicated ASICs, or other forms of specialized processors or circuitry designed to accomplish one or more specialized tasks. These tasks may include AI processing (including machine learning, training, inferencing, and classification operations), visual data processing, network data processing, object detection, rule analysis, or the like. Accordingly, in various examples, applicable means for acceleration may be embodied by such acceleration circuitry.

The interconnect 4556 may couple the processor 4552 to a sensor hub or external interface 4570 that is used to connect additional devices or subsystems. The devices may include sensors 4572, such as accelerometers, level sensors, flow sensors, optical light sensors, camera sensors, temperature sensors, a global positioning system (GPS) sensors, pressure sensors, barometric pressure sensors, and the like.

The hub or interface 4570 further may be used to connect the edge computing node 4550 to actuators 4574, such as power switches, valve actuators, an audible sound generator, a visual warning device, and the like.

In some optional examples, various input/output (I/O) devices may be present within or connected to, the edge computing node 4550. For example, a display or other output device 4584 may be included to show information, such as sensor readings or actuator position. An input device 4586, such as a touch screen or keypad may be included to accept input. An output device 4584 may include any number of forms of audio or visual display, including simple visual outputs such as binary status indicators (e.g., LEDs) and multi-character visual outputs, or more complex outputs such as display screens (e.g., LCD screens), with the output of characters, graphics, multimedia objects, and the like being generated or produced from the operation of the edge computing node 4550.

A battery 4576 may power the edge computing node 4550, although, in examples in which the edge computing node 4550 is mounted in a fixed location, it may have a power supply coupled to an electrical grid. The battery 4576 may be a lithium ion battery, or a metal-air battery, such as a zinc-air battery, an aluminum-air battery, a lithium-air battery, and the like.

A battery monitor/charger 4578 may be included in the edge computing node 4550 to track the state of charge (SoCh) of the battery 4576. The battery monitor/charger 4578 may be used to monitor other parameters of the battery 4576 to provide failure predictions, such as the state of health (SoH) and the state of function (SoF) of the battery 4576. The battery monitor/charger 4578 may include a battery monitoring integrated circuit, such as an LTC4020 or an LTC2990 from Linear Technologies, an ADT7488A from ON Semiconductor of Phoenix Arizona, or an IC from the UCD90xxx family from Texas Instruments of Dallas, TX. The battery monitor/charger 4578 may communicate the information on the battery 4576 to the processor 4552 over the interconnect 4556. The battery monitor/charger 4578 may also include an analog-to-digital (ADC) converter that enables the processor 4552 to directly monitor the voltage of the battery 4576 or the current flow from the battery 4576. The battery parameters may be used to determine actions that the edge computing node 4550 may perform, such as transmission frequency, mesh network operation, sensing frequency, and the like.

A power block 4580, or other power supply coupled to a grid, may be coupled with the battery monitor/charger 4578 to charge the battery 4576. In some examples, the power block 4580 may be replaced with a wireless power receiver to obtain the power wirelessly, for example, through a loop antenna in the edge computing node 4550. A wireless battery charging circuit, such as an LTC4020 chip from Linear Technologies of Milpitas, California, among others, may be included in the battery monitor/charger 4578. The specific charging circuits may be selected based on the size of the battery 4576, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 4558 may include instructions 4582 in the form of software, firmware, or hardware commands to implement the techniques described herein. Although such instructions 4582 are shown as code blocks included in the memory 4554 and the storage 4558, it may be understood that any of the code blocks may be replaced with hardwired circuits, for example, built into an application specific integrated circuit (ASIC).

In an example, the instructions 4582 provided via the memory 4554, the storage 4558, or the processor 4552 may be embodied as a non-transitory, machine-readable medium 4560 including code to direct the processor 4552 to perform electronic operations in the edge computing node 4550. The processor 4552 may access the non-transitory, machine-readable medium 4560 over the interconnect 4556. For instance, the non-transitory, machine-readable medium 4560 may be embodied by devices described for the storage 4558 or may include specific storage units such as optical disks, flash drives, or any number of other hardware devices. The non-transitory, machine-readable medium 4560 may include instructions to direct the processor 4552 to perform a specific sequence or flow of actions, for example, as described with respect to the flowchart(s) and block diagram(s) of operations and functionality depicted above. As used in, the terms "machine-readable medium" and "computer-readable medium" are interchangeable.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., HTTP).

A machine-readable medium may be provided by a storage device or other apparatus which is capable of hosting data in a non-transitory format. In an example, information stored or otherwise provided on a machine-readable medium may be representative of instructions, such as instructions themselves or a format from which the instructions may be derived. This format from which the instructions may be derived may include source code, encoded instructions (e.g., in compressed or encrypted form), packaged instructions (e.g., split into multiple packages), or the like. The information representative of the instructions in the machine-readable medium may be processed by processing circuitry into the instructions to implement any of the operations discussed herein. For example, deriving the instructions from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions.

In an example, the derivation of the instructions may include assembly, compilation, or interpretation of the information (e.g., by the processing circuitry) to create the instructions from some intermediate or preprocessed format provided by the machine-readable medium. The information, when provided in multiple parts, may be combined, unpacked, and modified to create the instructions. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable, etc.) at a local machine, and executed by the local machine.

Figure 46:
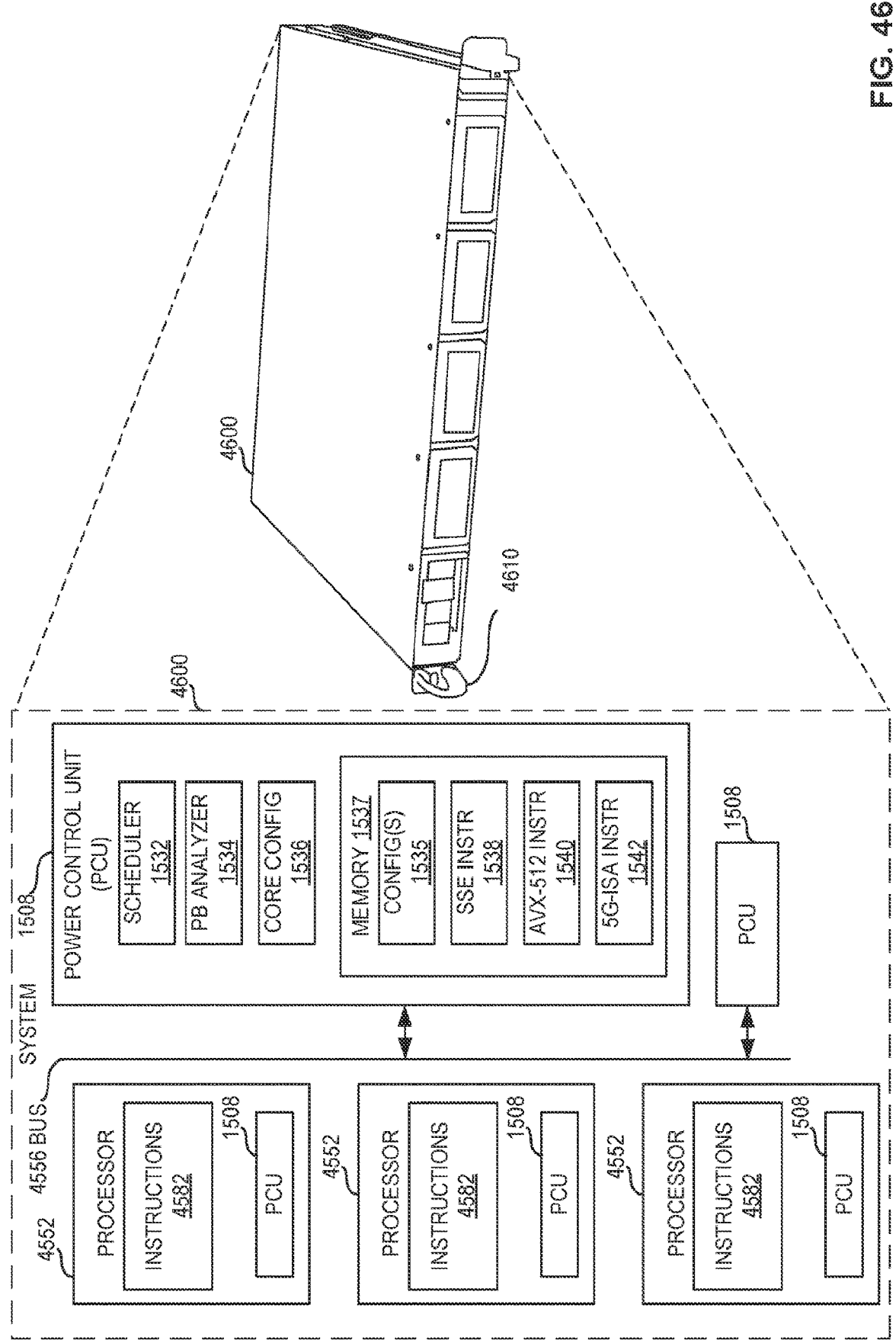
FIG. 46 is a block diagram of another example processing platform system structured to execute the example machine readable instructions of FIGS. 31-43 to implement an example workload-adjustable CPU.

FIG. 46 is an example system (e.g., a single socket system, a dual socket system, etc.) 4600 capable of executing the example machine readable instructions of FIGS. 31-43 to implement the example scheduler 1532, the example power budget analyzer 1534, the example configuration(s) 1535, the example memory 1537, the example core configurator 1536, the example SSE instructions 1538, the example AVX-512 instructions 1540, and/or the example 5G-ISA instructions 1542 of FIG. 15, and/or, more generally, the example PCU 1508 of FIG. 15. In the illustrated example of FIG. 46, the system 4600 is a processor platform (e.g., a multi-core computing system, a multi-core processor system, etc.), such as a server (e.g., a single socket server, a dual socket server, a 1U or 1S server, a 2U or 2S server, etc.). For example, the system 4600 can implement one of the DUs 122 of FIG. 1, one of the CUs 124 of FIG. 1, one of the core devices 126 of FIG. 1, etc. Alternatively, the system 4600 can be any other type of computing device or computing system. The system 4600 of the illustrated example includes an example chassis 4610, which can be coupled to and/or otherwise integrated into a cabinet (e.g., a server cabinet, a rack-mounted cabinet, etc.). Alternatively, the system 4600 may be integrated in any other location in a MEC environment.

In the illustrated example, the system 4600 includes the bus 4556 and a plurality of the processors 4552 of FIG. 45, which includes the instructions 4582 of FIG. 45, and a plurality of the PCU 1508 of FIG. 15. Alternatively, fewer or more than the processors 4552 and/or the PCU 1508 than depicted in FIG. 46 may be used.

Figure 47:
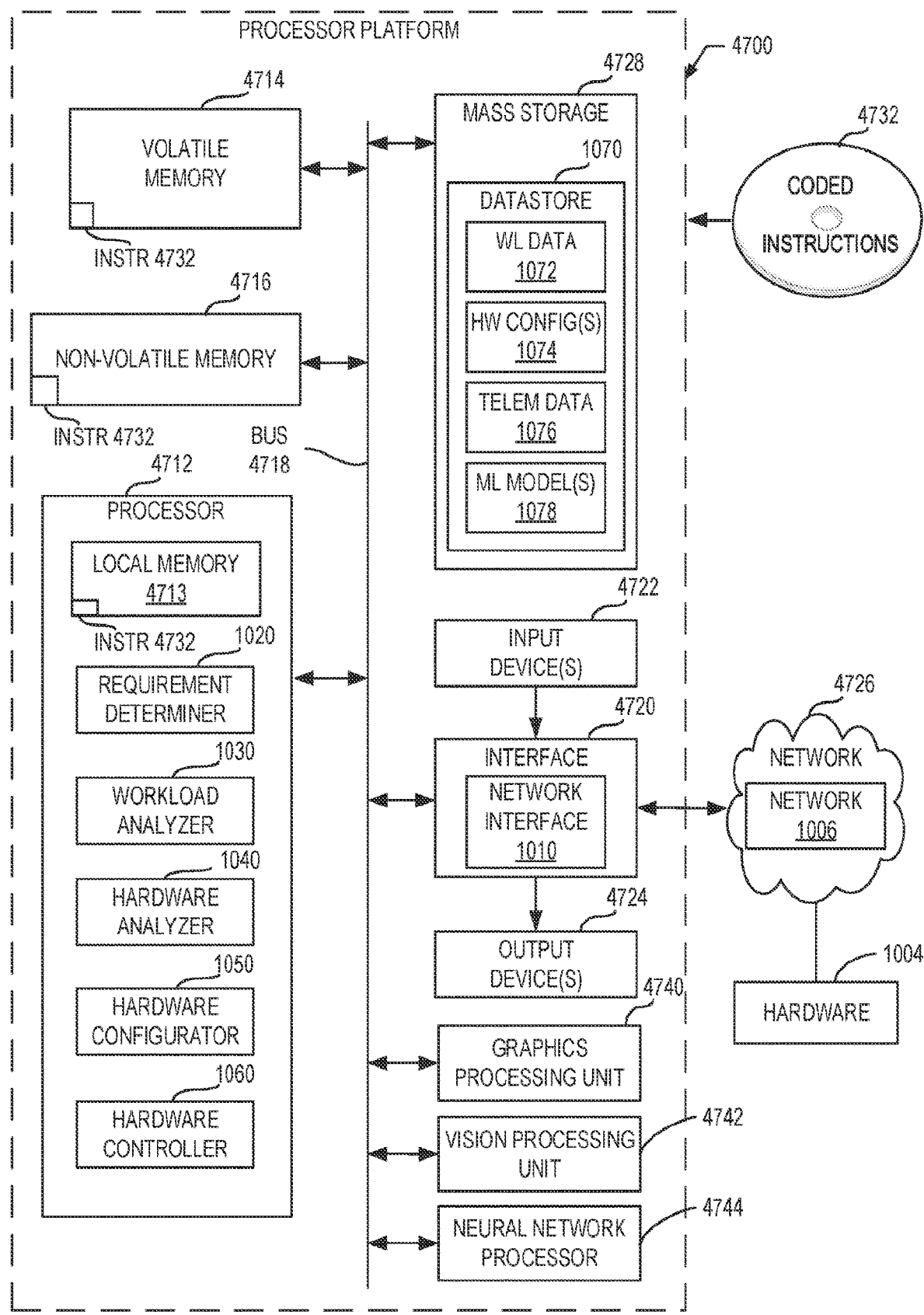
FIG. 47 is a block diagram of an example processing platform structured to execute the example machine readable instructions of FIGS. 31-43 to implement the example manufacturer enterprise system of FIGS. 10 and/or 28-30.

FIG. 47 is a block diagram of an example processor platform 4700 structured to execute the instructions of FIGS. 31-43 to implement the manufacturer enterprise system 1002 of FIG. 10 and/or the manufacturer enterprise system 2810 of FIGS. 28-30. The processor platform 4700 can be, for example, a server (e.g., a computer server, an edge server, etc.), a personal computer, a workstation, a self-learning machine (e.g., a neural network), or any other type of computing device.

The processor platform 4700 of the illustrated example includes a processor 4712. The processor 4712 of the illustrated example is hardware. For example, the processor 4712 can be implemented by one or more integrated circuits, logic circuits, microprocessors, GPUs, DSPs, or controllers from any desired family or manufacturer. The hardware processor may be a semiconductor based (e.g., silicon based) device. In this example, the processor 4712 implements the example requirement determiner 1020, the example workload analyzer 1030, the example hardware analyzer 1040, the example hardware configurator 1050, and the example hardware controller 1060 of FIG. 10.

The processor 4712 of the illustrated example includes a local memory 4713 (e.g., a cache). The processor 4712 of the illustrated example is in communication with a main memory including a volatile memory 4714 and a non-volatile memory 4716 via a bus 4718. The volatile memory 4714 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 4716 may be implemented by flash memory and/or any other desired type of memory device. Access to the main memory 4714, 4716 is controlled by a memory controller.

The processor platform 4700 of the illustrated example also includes an interface circuit 4720. The interface circuit 4720 may be implemented by any type of interface standard, such as an Ethernet interface, a USB, a Bluetooth® interface, a near field communication (NFC) interface, and/or a PCI express interface. In this example, the interface circuit 4720 implements the example network interface 1010 of FIG. 10.

In the illustrated example, one or more input devices 4722 are connected to the interface circuit 4720. The input device(s) 4722 permit(s) a user to enter data and/or commands into the processor 4712. The input device(s) can be implemented by, for example, an audio sensor, a microphone, a camera (still or video), a keyboard, a button, a mouse, a touchscreen, a track-pad, a trackball, an isopoint device, and/or a voice recognition system.

One or more output devices 4724 are also connected to the interface circuit 4720 of the illustrated example. The output devices 4724 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 4720 of the illustrated example, thus, typically includes a graphics driver card, a graphics driver chip and/or a graphics driver processor.

The interface circuit 4720 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 4726. The communication can be via, for example, an Ethernet connection, a digital subscriber line (DSL) connection, a telephone line connection, a coaxial cable system, a satellite system, a line-of-site wireless system, a cellular telephone system, etc. In this example, the network 4726 implements the example network 1006 of FIG. 10, which is in communication with the example hardware 1004 of FIG. 10.

The processor platform 4700 of the illustrated example also includes one or more mass storage devices 4728 for storing software and/or data. Examples of such mass storage devices 4728 include floppy disk drives, hard drive disks, compact disk drives, Blu-ray disk drives, redundant array of independent disks (RAID) systems, and digital versatile disk (DVD) drives. In this example, the one or more mass storage devices 4728 implements the example workload data 1072 (WL DATA), the example hardware configuration(s) 1074 (HW CONFIG(S)), the example telemetry data 1076 (TELEM DATA), the example machine-learning model(s) 1078 (ML MODEL(S), and the example datastore 1070 of FIG. 10.

The machine executable instructions 4732 of FIGS. 31-43 may be stored in the mass storage device 4728, in the volatile memory 4714, in the non-volatile memory 4716, and/or on a removable non-transitory computer readable medium such as a CD or DVD.

The processor platform 4700 of the illustrated example of FIG. 47 includes an example graphics processing unit (GPU) 4740, an example vision processing unit (VPU) 4742, and an example neural network processor 4744. In this example, the GPU 4740, the VPU 4742, and the neural network processor 4744 are in communication with different hardware of the processor platform 4700, such as the volatile memory 4714, the non-volatile memory 4716, etc., via the bus 4718. In this example, the neural network processor 4744 may be implemented by one or more integrated circuits, logic circuits, microprocessors, GPUs, DSPs, or controllers from any desired family or manufacturer that can be used to execute an AI model, such as a neural network, which may be implemented by the ML model(s) 1078. In some examples, one or more of the requirement determiner 1020, the workload analyzer 1030, the hardware analyzer 1040, the hardware configurator 1050, and/or the hardware controller 1060 can be implemented in or with at least one of the GPU 4740, the VPU 4742, or the neural network processor 4744 instead of or in addition to the processor 4712. Additionally or alternatively, the processor platform 6900 may include different type(s) of processors, such as a machine learning accelerator or processor, an artificial intelligence accelerator or processor, a DSP, a vector processor or processing unit, an electronic control unit (ECU) (e.g., an ECU that may be included in a vehicle to effectuate vehicle functions, such as driving, parking, or other general automotive activities), etc., and/or any other type of accelerator or processor.

Figure 48:
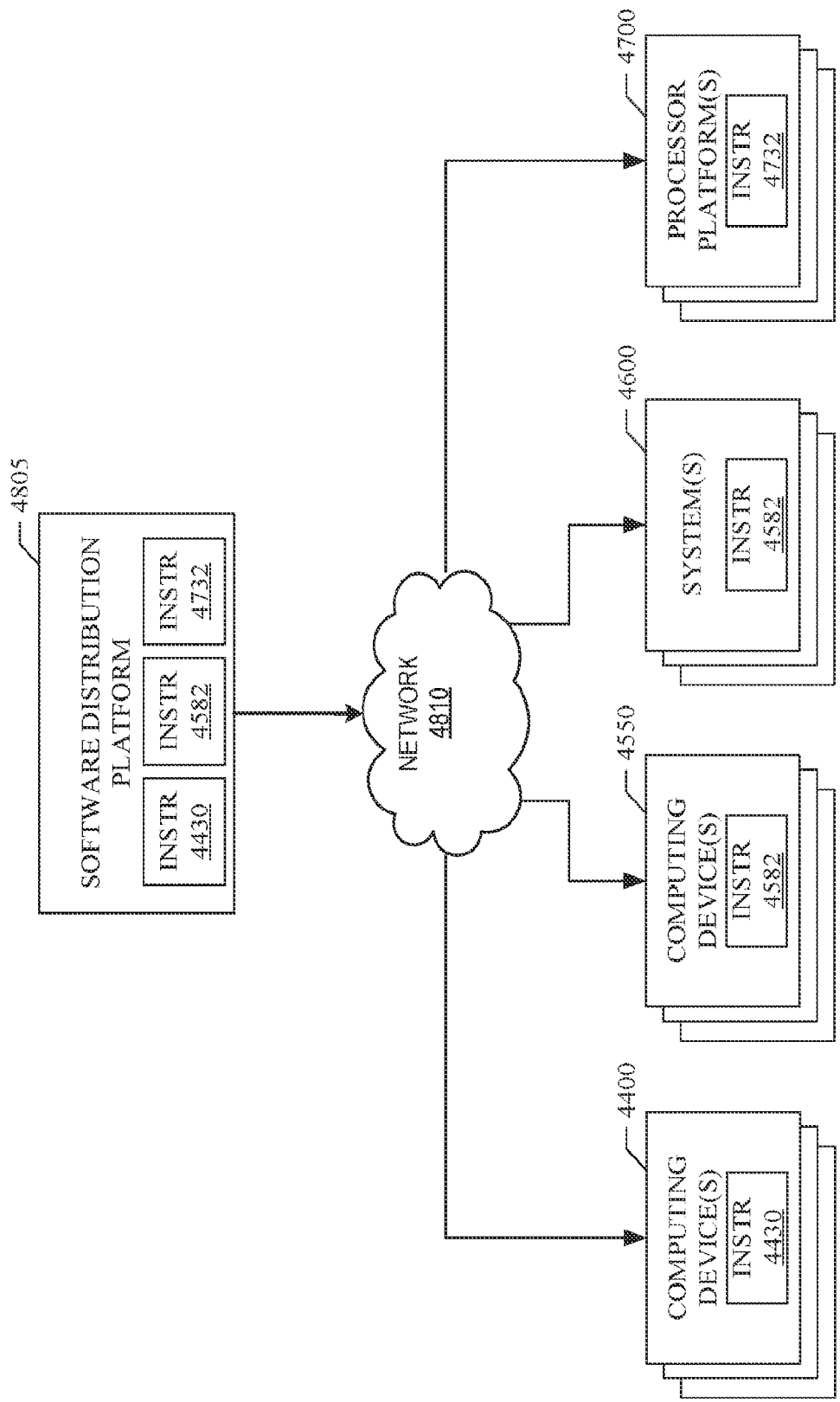
FIG. 48 is a block diagram of an example software distribution platform to distribute software (e.g., software corresponding to the example computer readable instructions of FIGS. 31-43) to client devices such as consumers (e.g., for license, sale and/or use), retailers (e.g., for sale, re-sale, license, and/or sub-license), and/or original equipment manufacturers (OEMs) (e.g., for inclusion in products to be distributed to, for example, retailers and/or to direct buy customers).

A block diagram illustrating an example software distribution platform 4805 to distribute software such as the example code 4430 of FIG. 44, the example machine readable instructions 4582 of FIG. 45, and/or the example machine readable instructions 4732 of FIG. 47 to third parties is illustrated in FIG. 48. The example software distribution platform 4805 may be implemented by any computer server, data facility, cloud service, etc., capable of storing and transmitting software to other computing devices. The third parties may be customers of the entity owning and/or operating the software distribution platform. For example, the entity that owns and/or operates the software distribution platform may be a developer, a seller, and/or a licensor of software such as the example code 4430, the example machine readable instructions 4582, and/or the example machine readable instructions 4732. The third parties may be consumers, users, retailers, OEMs, etc., who purchase and/or license the software for use and/or re-sale and/or sub-licensing. In the illustrated example, the software distribution platform 4705 includes one or more servers and one or more storage devices. The storage devices store the code 4430, the machine readable instructions 4582, and/or the machine readable instructions 4732, one or more of which may correspond to the example machine readable instructions 3100, 3200, 3300, 3400, 3500, 3600, 3700, 3800, 3900, 4000, 4100, 4200, 4300 of FIGS. 31-43, as described above. The one or more servers of the example software distribution platform 4805 are in communication with a network 4810, which may correspond to any one or more of the Internet and/or any of the example networks 104, 106, 107, 118, 1006, 4590, 4726 described above. In some examples, the one or more servers are responsive to requests to transmit the software to a requesting party as part of a commercial transaction. Payment for the delivery, sale and/or license of the software may be handled by the one or more servers of the software distribution platform and/or via a third party payment entity. The servers enable purchasers and/or licensors to download the code 4430, the machine readable instructions 4582, and/or the machine readable instructions 4732 from the software distribution platform 4805. For example, the software, which may correspond to the example machine readable instructions 3100, 3200, 3300, 3400, 3500, 3600, 3700, 3800, 3900, 4000, 4100, 4200, 4300 of FIGS. 31-43, may be downloaded to the example multiprocessor system 4400 of FIG. 44, the example computing device(s) 4550 of FIG. 45, the example system(s) 4600 of FIG. 46, and/or the example processor platform(s) 4700 of FIG. 47, which is/are to execute the code 4430, the machine readable instructions 4582, and/or the machine readable instructions 4732 to implement the example manufacturer enterprise system 1002 of FIG. 10 and/or the example manufacturer enterprise system 2810 of FIGS. 28-30, and/or the example PCU 1508 of FIG. 15. In some examples, one or more servers of the software distribution platform 4805 periodically offer, transmit, and/or force updates to the software (e.g., the example code 4430, the example machine readable instructions 4582, and/or the example machine readable instructions 4732) to ensure improvements, patches, updates, etc., are distributed and applied to the software at the end user devices.

From the foregoing, it will be appreciated that example systems, methods, apparatus, and articles of manufacture have been disclosed that optimize hardware based on a workload, such as a 5G network workload. The above-described example systems, methods, apparatus, and articles of manufacture may effectuate the support of a 5G RAN and 5G Core with the same CPU by optimizing per-core frequencies associated with AVX512-FP16 ISA signal processing ISA instructions on a subset of cores within a CPU. The above-described example systems, methods, apparatus, and articles of manufacture may facilitate the use of the same CPU for both 5G Core UPF and 5G vRAN-DU and 5G vRAN-CU network nodes. The disclosed systems, methods, apparatus, and articles of manufacture improve the efficiency of using a computing device by processing network workloads with increased performance. The disclosed systems, methods, apparatus, and articles of manufacture are accordingly directed to one or more improvement(s) in the functioning of a computer.

Example methods, apparatus, systems, and articles of manufacture to workload optimize hardware are disclosed herein. Further examples and combinations thereof include the following:

Example 1 includes an apparatus to configure processor circuitry to execute a workload, the apparatus comprising a workload analyzer to determine an application ratio associated with the workload, the application ratio based on an operating frequency to execute the workload, a hardware configurator to configure, before execution of the workload, at least one of (i) one or more cores of the processor circuitry based on the application ratio or (ii) uncore logic of the processor circuitry based on the application ratio, and a hardware controller to initiate the execution of the workload with the at least one of the one or more cores or the uncore logic.

In Example 2, the subject matter of Example 1 can optionally include that the hardware configurator is to configure the at least one of the one or more cores or the uncore logic in response to a determination that the application ratio is included in a set of application ratios of the processor circuitry.

In Example 3, the subject matter of Examples 1-2 can optionally include that the workload analyzer is to execute a machine-learning model to identify at least one of a latency threshold, a power consumption threshold, or a throughput threshold associated with the workload, during execution of the workload at the operating frequency, determine whether the at least one of the latency threshold, the power consumption threshold, or the throughput threshold is satisfied, and in response to a determination that at least one of the latency threshold, the power consumption threshold, or the throughput threshold is satisfied, store a value in the processor circuitry, the value indicative of an association between the processor circuitry and the application ratio.

In Example 4, the subject matter of Examples 1-3 can optionally include that the application ratio is a first application ratio, the operating frequency is a first operating frequency, and the workload analyzer is to in response to execution of the workload at a second operating frequency based on a second application ratio, determine whether the at least one of the latency threshold, the power consumption threshold, or the throughput threshold is satisfied, and in response to a determination that at least one of the latency threshold, the power consumption threshold, or the throughput threshold is satisfied, modify the value in the processor circuitry to be indicative of an association between the processor circuitry, the first application ratio, and the second application ratio, at least one of the first application ratio or the second application ratio disabled until enabled by a license.

In Example 5, the subject matter of Examples 1-4 can optionally include that the workload is a first workload, the application ratio is a first application ratio, the one or more cores are one or more first cores, the uncore logic is first uncore logic, and wherein the workload analyzer to determine a second application ratio associated with a second workload, the hardware configurator to configure, before execution of the second workload, at least one of (i) one or more second cores of the processor circuitry based on the second application ratio or (ii) second uncore logic of the processor circuitry based on the second application ratio, and the hardware controller to initiate the execution of the second workload with the at least one of the one or more second cores or the second uncore logic, a first portion of the first workload to be executed while a second portion of the second workload is executed.

In Example 6, the subject matter of Examples 1-5 can optionally include a requirement determiner to identify at least one of a network node location of the processor circuitry, a latency threshold associated with the workload, a power consumption threshold associated with the workload, or a throughput threshold associated with the workload, and the workload analyzer to during the execution of the workload, determine at least one of a latency of the processor circuitry, a power consumption of the processor circuitry, or a throughput of the processor circuitry, compare the at least one of the latency, the power consumption, or the throughput to a respective one of the latency threshold, the power consumption threshold, or the throughput threshold, in response to the respective one of the latency threshold, the power consumption threshold, or the throughput threshold being satisfied, adjust the application ratio, and associate the application ratio with at least one of the network node location, the latency, the power consumption, or the throughput.

In Example 7, the subject matter of Examples 1-6 can optionally include that the operating frequency is a first operating frequency, and wherein the hardware configurator to in response to execution of the workload with a first type of instruction, determine a first power consumption based on operation of the processor circuitry at the first operating frequency, the first operating frequency associated with the first type, and in response to execution of the workload with a second type of instruction, determine a second power consumption based on operation of the processor circuitry at a second operating frequency associated with the second type, and in response to the second power consumption satisfying a power consumption threshold, the workload analyzer to associate the second operating frequency with the workload.

In Example 8, the subject matter of Examples 1-7 can optionally include that the operating frequency is a first operating frequency, and wherein the hardware configurator is to in response to execution of the workload with a first type of instruction, determine a first throughput of the processor circuitry based on operation of the processor circuitry at the first operating frequency, the first operating frequency associated with the first type, and in response to execution of the workload with a second type of instruction, determine a second throughput of the processor circuitry based on operation of the processor circuitry at a second operating frequency associated with the second type, and in response to the second throughput satisfying a throughput threshold, the workload analyzer to associate the second operating frequency with the workload.

In Example 9, the subject matter of Examples 1-8 can optionally include that the workload is a first workload, and the application ratio is based on a ratio of a first value of power consumption and a second value of power consumption, the first value corresponding to the first workload, the second value corresponding to a second workload.

In Example 10, the subject matter of Examples 1-9 can optionally include that the first workload is a networking workload for network function virtualization and the second workload is a power virus workload.

In Example 11, the subject matter of Examples 1-10 can optionally include that the processor circuitry is included in a single socket hardware platform or a dual socket hardware platform, and the processor circuitry implements at least one of a core server, a centralized unit, or a distributed unit, the at least one of the centralized unit or the distributed unit to implement a virtual radio access network.

Example 12 includes an apparatus to configure processor circuitry to execute a workload, the apparatus comprising means for determining an application ratio associated with the workload, the application ratio based on an operating frequency to execute the workload, means for configuring, before execution of the workload, at least one of (i) one or more cores of the processor circuitry based on the application ratio or (ii) uncore logic of the processor circuitry based on the application ratio, and means for initiating the execution of the workload with the at least one of the one or more cores or the uncore logic.

In Example 13, the subject matter of Example 12 can optionally include that the means for configuring is to configure the at least one of the one or more cores or the uncore logic in response to a determination that the application ratio is included in a set of application ratios of the processor circuitry.

In Example 14, the subject matter of Examples 12-13 can optionally include that the means for determining is to execute a machine-learning model to identify at least one of a latency threshold, a power consumption threshold, or a throughput threshold associated with the workload, during execution of the workload at the operating frequency, determine whether the at least one of the latency threshold, the power consumption threshold, or the throughput threshold is satisfied, and in response to a determination that at least one of the latency threshold, the power consumption threshold, or the throughput threshold is satisfied, store a value in the processor circuitry, the value indicative of an association between the processor circuitry and the application ratio.

In Example 15, the subject matter of Examples 12-14 can optionally include that the application ratio is a first application ratio, the operating frequency is a first operating frequency, and the means for determining is to in response to execution of the workload at a second operating frequency based on a second application ratio, determine whether the at least one of the latency threshold, the power consumption threshold, or the throughput threshold is satisfied, and in response to a determination that at least one of the latency threshold, the power consumption threshold, or the throughput threshold is satisfied, modify the value in the processor circuitry to be indicative of an association between the processor circuitry, the first application ratio, and the second application ratio, at least one of the first application ratio or the second application ratio disabled until enabled by a license.

In Example 16, the subject matter of Examples 12-15 can optionally include that the workload is a first workload, the application ratio is a first application ratio, the one or more cores are one or more first cores, the uncore logic is first uncore logic, and wherein the means for determining is to determine a second application ratio associated with a second workload, the means for configuring is to configure, before execution of the second workload, at least one of (i) one or more second cores of the processor circuitry based on the second application ratio or (ii) second uncore logic of the processor circuitry based on the second application ratio, and the means for initiating is to initiate the execution of the second workload with the at least one of the one or more second cores or the second uncore logic, a first portion of the first workload to be executed while a second portion of the second workload is executed.

In Example 17, the subject matter of Examples 12-16 can optionally include means for identifying at least one of a network node location of the processor circuitry, a latency threshold associated with the workload, a power consumption threshold associated with the workload, or a throughput threshold associated with the workload, and the means for determining is to during the execution of the workload, determine at least one of a latency of the processor circuitry, a power consumption of the processor circuitry, or a throughput of the processor circuitry, compare the at least one of the latency, the power consumption, or the throughput to a respective one of the latency threshold, the power consumption threshold, or the throughput threshold, in response to the respective one of the latency threshold, the power consumption threshold, or the throughput threshold being satisfied, adjust the application ratio, and associate the application ratio with at least one of the network node location, the latency, the power consumption, or the throughput.

In Example 18, the subject matter of Examples 12-17 can optionally include that the operating frequency is a first operating frequency, and wherein the means for configuring is to in response to execution of the workload with a first type of instruction, determine a first power consumption based on operation of the processor circuitry at the first operating frequency, the first operating frequency associated with the first type, and in response to execution of the workload with a second type of instruction, determine a second power consumption based on operation of the processor circuitry at a second operating frequency associated with the second type, and in response to the second power consumption satisfying a power consumption threshold, the means for determining is to associate the second operating frequency with the workload.

In Example 19, the subject matter of Examples 12-18 can optionally include that the operating frequency is a first operating frequency, and wherein the means for configuring is to in response to execution of the workload with a first type of instruction, determine a first throughput of the processor circuitry based on operation of the processor circuitry at the first operating frequency, the first operating frequency associated with the first type, and in response to execution of the workload with a second type of instruction, determine a second throughput of the processor circuitry based on operation of the processor circuitry at a second operating frequency associated with the second type, and in response to the second throughput satisfying a throughput threshold, the means for determining is to associate the second operating frequency with the workload.

In Example 20, the subject matter of Examples 12-19 can optionally include that the workload is a first workload, and the application ratio is based on a ratio of a first value of power consumption and a second value of power consumption, the first value corresponding to the first workload, the second value corresponding to a second workload.

In Example 21, the subject matter of Examples 12-20 can optionally include that the first workload is a networking workload for network function virtualization and the second workload is a power virus workload.

In Example 22, the subject matter of Examples 12-21 can optionally include that the processor circuitry is included in a single socket hardware platform or a dual socket hardware platform, and the processor circuitry implements at least one of a core server, a centralized unit, or a distributed unit, the at least one of the centralized unit or the distributed unit to implement a virtual radio access network.

Example 23 includes a computer readable medium comprising instructions that, when executed, cause processor circuitry to at least determine an application ratio associated with a workload, the application ratio based on an operating frequency to execute the workload, configure, before execution of the workload, at least one of (i) one or more cores of the processor circuitry based on the application ratio or (ii) uncore logic of the processor circuitry based on the application ratio, and initiate the execution of the workload with the at least one of the one or more cores or the uncore logic.

In Example 24, the subject matter of Example 23 can optionally include that the instructions, when executed, cause the processor circuitry to configure the at least one of the one or more cores or the uncore logic in response to a determination that the application ratio is included in a set of application ratios of the processor circuitry.

In Example 25, the subject matter of Examples 23-24 can optionally include that the instructions, when executed, cause the processor circuitry to execute a machine-learning model to identify at least one of a latency threshold, a power consumption threshold, or a throughput threshold associated with the workload, during the execution of the workload at the operating frequency, determine whether the at least one of the latency threshold, the power consumption threshold, or the throughput threshold is satisfied, and in response to a determination that at least one of the latency threshold, the power consumption threshold, or the throughput threshold is satisfied, store a value in the processor circuitry, the value indicative of an association between the processor circuitry and the application ratio.

In Example 26, the subject matter of Examples 23-25 can optionally include that the application ratio is a first application ratio, the operating frequency is a first operating frequency, and the instructions, when executed, cause the processor circuitry to in response to execution of the workload at a second operating frequency based on a second application ratio, determine whether the at least one of the latency threshold, the power consumption threshold, or the throughput threshold is satisfied, and in response to a determination that at least one of the latency threshold, the power consumption threshold, or the throughput threshold is satisfied, modify the value in the processor circuitry to be indicative of an association between the processor circuitry, the first application ratio, and the second application ratio, at least one of the first application ratio or the second application ratio disabled until enabled by a license.

In Example 27, the subject matter of Examples 23-26 can optionally include that the workload is a first workload, the application ratio is a first application ratio, the one or more cores are one or more first cores, the uncore logic is first uncore logic, and the instructions, when executed, cause the processor circuitry to determine a second application ratio associated with a second workload, in response to determining the second application ratio is included in a set of application ratios, configure, before execution of the second workload, at least one of (i) one or more second cores of the processor circuitry based on the second application ratio or (ii) second uncore logic of the processor circuitry based on the second application ratio, and initiate the execution of the second workload with the at least one of the one or more second cores or the second uncore logic, a first portion of the first workload to be executed while a second portion of the second workload is executed.

In Example 28, the subject matter of Examples 23-27 can optionally include that the instructions, when executed, cause the processor circuitry to identify at least one of a network node location of the processor circuitry, a latency threshold associated with the workload, a power consumption threshold associated with the workload, or a throughput threshold associated with the workload, during execution of the workload, determine at least one of a latency of the processor circuitry, a power consumption of the processor circuitry, or a throughput of the processor circuitry, compare the at least one of the latency, the power consumption, or the throughput to a respective one of the latency threshold, the power consumption threshold, or the throughput threshold, in response to the respective one of the latency threshold, the power consumption threshold, or the throughput threshold being satisfied, adjust the application ratio, and associate the application ratio with at least one of the network node location, the latency, the power consumption, or the throughput.

In Example 29, the subject matter of Examples 23-28 can optionally include that the operating frequency is a first operating frequency, and the instructions, when executed, cause the processor circuitry to in response to execution of the workload with a first type of instruction, determine a first power consumption based on operation of the processor circuitry at the first operating frequency, the first operating frequency associated with the first type, in response to execution of the workload with a second type of instruction, determine a second power consumption based on operation of the processor circuitry at a second operating frequency associated with the second type, and in response to the second power consumption satisfying a power consumption threshold, associate the second operating frequency with the workload.

In Example 30, the subject matter of Examples 23-29 can optionally include that the operating frequency is a first operating frequency, and the instructions, when executed, cause the processor circuitry to in response to execution of the workload with a first type of instruction, determine a first throughput of the processor circuitry based on operation of the processor circuitry at the first operating frequency, the first operating frequency associated with the first type, in response to execution of the workload with a second type of instruction, determine a second throughput of the processor circuitry based on operation of the processor circuitry at a second operating frequency associated with the second type, and in response to the second throughput satisfying a throughput threshold, associate the second operating frequency with the workload.

In Example 31, the subject matter of Examples 23-30 can optionally include that the workload is a first workload, and the application ratio is based on a ratio of a first value of power consumption and a second value of power consumption, the first value corresponding to the first workload, the second value corresponding to a second workload.

In Example 32, the subject matter of Examples 23-31 can optionally include that the first workload is a networking workload for network function virtualization and the second workload is a power virus workload.

In Example 33, the subject matter of Examples 23-32 can optionally include that the processor circuitry is included in a single socket hardware platform or a dual socket hardware platform, and the instructions, when executed, cause the processor circuitry to implement at least one of a core server, a centralized unit, or a distributed unit, the at least one of the centralized unit or the distributed unit to implement a virtual radio access network.

Example 34 includes an apparatus to configure execution of a workload, the apparatus comprising at least one memory, processor circuitry to execute instructions to at least determine an application ratio associated with the workload, the application ratio based on an operating frequency to execute the workload, configure, before execution of the workload, at least one of (i) one or more cores of the processor circuitry based on the application ratio or (ii) uncore logic of the processor circuitry based on the application ratio, and execute the workload with the at least one of the one or more cores or the uncore logic.

In Example 35, the subject matter of Example 34 can optionally include that the processor circuitry is to configure the at least one of the one or more cores or the uncore logic in response to a determination that the application ratio is included in a set of application ratios of the processor circuitry.

In Example 36, the subject matter of Examples 34-35 can optionally include that processor circuitry is to execute a machine-learning model to identify at least one of a latency threshold, a power consumption threshold, or a throughput threshold associated with the workload, during execution of the workload at the operating frequency, determine whether the at least one of the latency threshold, the power consumption threshold, or the throughput threshold is satisfied, and in response to a determination that at least one of the latency threshold, the power consumption threshold, or the throughput threshold is satisfied, store a value in the processor circuitry, the value indicative of an association between the processor circuitry and the application ratio.

In Example 37, the subject matter of Examples 34-36 can optionally include that the application ratio is a first application ratio, the operating frequency is a first operating frequency, and the processor circuitry is to in response to execution of the workload at a second operating frequency based on a second application ratio, determine whether the at least one of the latency threshold, the power consumption threshold, or the throughput threshold is satisfied, and in response to a determination that at least one of the latency threshold, the power consumption threshold, or the throughput threshold is satisfied, modify the value in the processor to be indicative of an association between the processor circuitry, the first application ratio, and the second application ratio, at least one of the first application ratio or the second application ratio disabled until enabled by a license.

In Example 38, the subject matter of Examples 34-37 can optionally include that the workload is a first workload, the application ratio is a first application ratio, the one or more cores are one or more first cores, the uncore logic is first uncore logic, and the processor circuitry is to determine a second application ratio associated with a second workload, configure, before execution of the second workload, at least one of (i) one or more second cores of the processor circuitry based on the second application ratio or (ii) second uncore logic of the processor circuitry based on the second application ratio, and execute the second workload with the at least one of the one or more second cores or the second uncore logic, a first portion of the first workload to be executed while a second portion of the second workload is executed.

In Example 39, the subject matter of Examples 34-38 can optionally include that the processor circuitry is to identify at least one of a network node location of the processor, a latency threshold associated with the workload, a power consumption threshold associated with the workload, or a throughput threshold associated with the workload, during the execution of the workload, determine at least one of a latency of the processor circuitry, a power consumption of the processor circuitry, or a throughput of the processor circuitry, compare the at least one of the latency, the power consumption, or the throughput to a respective one of the latency threshold, the power consumption threshold, or the throughput threshold, in response to the respective one of the latency threshold, the power consumption threshold, or the throughput threshold being satisfied, adjust the application ratio, and associate the application ratio with at least one of the network node location, the latency, the power consumption, or the throughput.

In Example 40, the subject matter of Examples 34-39 can optionally include that the operating frequency is a first operating frequency, and the processor circuitry is to in response to execution of the workload with a first type of instruction, determine a first power consumption based on operation of the processor circuitry at the first operating frequency, the first operating frequency associated with the first type, in response to execution of the workload with a second type of instruction, determine a second power consumption based on operation of the processor circuitry at a second operating frequency associated with the second type, and in response to the second power consumption satisfying a power consumption threshold, the processor circuitry to associate the second operating frequency with the workload.

In Example 41, the subject matter of Examples 34-40 can optionally include that the operating frequency is a first operating frequency, and the processor circuitry is to in response to execution of the workload with a first type of instruction, determine a first throughput of the processor circuitry based on operation of the processor circuitry at the first operating frequency, the first operating frequency associated with the first type, in response to execution of the workload with a second type of instruction, determine a second throughput of the processor circuitry based on operation of the processor circuitry at a second operating frequency associated with the second type, and in response to the second throughput satisfying a throughput threshold, the processor circuitry to associate the second operating frequency with the workload.

In Example 42, the subject matter of Examples 34-41 can optionally include that the workload is a first workload, and the application ratio is based on a ratio of a first value of power consumption and a second value of power consumption, the first value corresponding to the first workload, the second value corresponding to a second workload.

In Example 43, the subject matter of Examples 34-42 can optionally include that the first workload is a networking workload for network function virtualization and the second workload is a power virus workload.

In Example 44, the subject matter of Examples 34-43 can optionally include that the processor circuitry is included in a single socket hardware platform or a dual socket hardware platform, and the processor circuitry implements at least one of a core server, a centralized unit, or a distributed unit, the at least one of the centralized unit or the distributed unit to implement a virtual radio access network.

Example 45 includes a method to configure processor circuitry to execute a workload, the method comprising determining an application ratio associated with a workload, the application ratio based on an operating frequency to execute the workload, configuring, before execution of the workload, at least one of (i) one or more cores of the processor circuitry based on the application ratio or (ii) uncore logic of the processor circuitry based on the application ratio, and executing the workload with the at least one of the one or more cores or the uncore logic.

In Example 46, the subject matter of Example 45 can optionally include that the configuring of the at least one of the one or more cores or the uncore logic is in response to determining that the application ratio is included in a set of application ratios of the processor circuitry.

In Example 47, the subject matter of Examples 45-46 can optionally include executing a machine-learning model to identify at least one of a latency threshold, a power consumption threshold, or a throughput threshold associated with the workload, during execution of the workload at the operating frequency, determining whether the at least one of the latency threshold, the power consumption threshold, or the throughput threshold is satisfied, and in response to determining that at least one of the latency threshold, the power consumption threshold, or the throughput threshold is satisfied, storing a value in the processor circuitry, the value indicative of an association between the processor circuitry and the application ratio.

In Example 48, the subject matter of Examples 45-47 can optionally include that the application ratio is a first application ratio, the operating frequency is a first operating frequency, and further including in response to execution of the workload at a second operating frequency based on a second application ratio, determining whether the at least one of the latency threshold, the power consumption threshold, or the throughput threshold is satisfied, and in response to determining that at least one of the latency threshold, the power consumption threshold, or the throughput threshold is satisfied, modifying the value in the processor circuitry to be indicative of an association between the processor circuitry, the first application ratio, and the second application ratio, at least one of the first application ratio or the second application ratio disabled until enabled by a license.

In Example 49, the subject matter of Examples 45-48 can optionally include that the workload is a first workload, the application ratio is a first application ratio, the one or more cores are one or more first cores, the uncore logic is first uncore logic, and further including determining a second application ratio associated with a second workload, in response to determining the second application ratio is included in a set of application ratios, configuring, before execution of the second workload, at least one of (i) one or more second cores of the processor circuitry based on the second application ratio or (ii) second uncore logic of the processor circuitry based on the second application ratio, and executing the second workload with the at least one of the one or more second cores or the second uncore logic, a first portion of the first workload to be executed while a second portion of the second workload is executed.

In Example 50, the subject matter of Examples 45-49 can optionally include identifying at least one of a network node location of the processor circuitry, a latency threshold associated with the workload, a power consumption threshold associated with the workload, or a throughput threshold associated with the workload, during execution of the workload, determining at least one of a latency of the processor circuitry, a power consumption of the processor circuitry, or a throughput of the processor circuitry, comparing the at least one of the latency, the power consumption, or the throughput to a respective one of the latency threshold, the power consumption threshold, or the throughput threshold, in response to the respective one of the latency threshold, the power consumption threshold, or the throughput threshold being satisfied, adjusting the application ratio, and associating the application ratio with at least one of the network node location, the latency, the power consumption, or the throughput.

In Example 51, the subject matter of Examples 45-50 can optionally include that the operating frequency is a first operating frequency, and further including in response to execution of the workload with a first type of instruction, determining a first power consumption based on operation of the processor circuitry at the first operating frequency, the first operating frequency associated with the first type, in response to execution of the workload with a second type of instruction, determining a second power consumption based on operation of the processor circuitry at a second operating frequency associated with the second type, and in response to the second power consumption satisfying a power consumption threshold, associating the second operating frequency with the workload.

In Example 52, the subject matter of Examples 45-51 can optionally include that the operating frequency is a first operating frequency, and further including in response to execution of the workload with a first type of instruction, determining a first throughput of the processor circuitry based on operation of the processor circuitry at the first operating frequency, the first operating frequency associated with the first type, in response to execution of the workload with a second type of instruction, determining a second throughput of the processor circuitry based on operation of the processor circuitry at a second operating frequency associated with the second type, and in response to the second throughput satisfying a throughput threshold, associating the second operating frequency with the workload.

In Example 53, the subject matter of Examples 45-52 can optionally include that the workload is a first workload, and the application ratio is based on a ratio of a first value of power consumption and a second value of power consumption, the first value corresponding to the first workload, the second value corresponding to a second workload.

In Example 54, the subject matter of Examples 45-53 can optionally include that the first workload is a networking workload for network function virtualization and the second workload is a power virus workload.

In Example 55, the subject matter of Examples 45-54 can optionally include that the processor circuitry is included in a single socket hardware platform or a dual socket hardware platform, and the processor circuitry implements at least one of a core server, a centralized unit, or a distributed unit, the at least one of the centralized unit or the distributed unit to implement a virtual radio access network.

Example 56 includes an apparatus to execute a workload, the apparatus comprising a hardware analyzer to determine whether processor circuitry supports an application ratio of the workload based on whether at least one of (i) a first operating frequency of the processor circuitry corresponds to a second operating frequency associated with the application ratio or (ii) a first thermal design profile of the processor circuitry corresponds to a second thermal design profile associated with the application ratio, a hardware configurator to configure, in response to determining the processor circuitry supports the application ratio and before execution of the workload, at least one of (i) one or more cores of the processor circuitry based on the application ratio or (ii) uncore logic of the processor circuitry based on the application ratio, and a hardware controller to initiate the execution of the workload with the at least one of the one or more cores or the uncore logic.

In Example 57, the subject matter of Example 56 can optionally include a requirement determiner to determine at least one of a latency threshold, a power consumption threshold, or a throughput threshold based on requirements associated with the execution of the workload, a workload analyzer to determine one or more workload parameters in response to the execution of the workload, and the hardware configurator to determine a configuration of the least one of (i) one or more cores of the processor circuitry based on the application ratio or (ii) uncore logic of the processor circuitry based on the one or more workload parameters, the configuration to at least one of increase performance of the processor circuitry or reduce latency of the processor circuitry.

In Example 58, the subject matter of Examples 56-57 can optionally include that the hardware analyzer is to determine one or more electrical characteristics of the processor circuitry, the one or more electrical characteristics including the first operating frequency, the first operating frequency associated with a first temperature point, and identify the processor circuitry as capable of applying a configuration based on the application ratio to the least one of (i) one or more cores of the processor circuitry based on the application ratio or (ii) uncore logic based on the one or more electrical characteristics.

In Example 59, the subject matter of Examples 56-58 can optionally include that the one or more cores includes a first core, and the hardware configurator is to store first information accessible by the processor circuitry, the first information associating a first type of machine readable instruction with the workload, and in response to identifying an instruction to be loaded by the first core is of the first type, configure the first core based on the application ratio.

In Example 60, the subject matter of Examples 56-59 can optionally include that the application ratio is a first application ratio, the workload is a first workload, the one or more cores includes a first core, and wherein the hardware analyzer is to determine that the processor circuitry supports a second application ratio of a second workload, and the hardware configurator is to store second information accessible by the processor circuitry, the second information associating a second type of machine readable instruction with the second workload, and in response to identifying the instruction to be loaded by the first core is of the second type, configure the first core based on the second application ratio.

In Example 61, the subject matter of Examples 56-60 can optionally include that the workload is a fifth-generation (5G) mobile network workload, and the hardware configurator is to, in response to the processor circuitry executing the 5G mobile network workload associated with an edge network, configure the processor circuitry to implement a virtual radio access network based on the application ratio.

In Example 62, the subject matter of Examples 56-61 can optionally include that the application ratio is a first application ratio, and wherein the hardware analyzer is to identify the processor circuitry as capable of applying a configuration based on the first application ratio or a second application ratio to the least one of (i) one or more cores of the processor circuitry based on the application ratio or (ii) uncore logic, and the hardware configurator is to configure the processor circuitry to have a first software silicon feature to control activation of the first application ratio and a second software silicon feature to control activation of the second application ratio, before deploying the processor circuitry to the edge network, activate the first software silicon feature and disabling the second software silicon feature, and after deploying the processor circuitry to the edge network, disable the first software silicon feature and enabling the second software silicon feature.

In Example 63, the subject matter of Examples 56-62 can optionally include that the workload is a fifth-generation (5G) mobile network workload, and the hardware configurator is to, in response to the processor circuitry executing the 5G mobile network workload associated with a core network, configure the processor circuitry to implement a core server based on the application ratio.

Example 64 includes an apparatus to execute a workload, the apparatus comprising means for determining whether processor circuitry supports an application ratio of the workload based on whether at least one of (i) a first operating frequency of the processor circuitry corresponds to a second operating frequency associated with the application ratio or (ii) a first thermal design profile of the processor circuitry corresponds to a second thermal design profile associated with the application ratio, means for configuring, in response to determining the processor circuitry supports the application ratio and before execution of the workload, at least one of (i) one or more cores of the processor circuitry based on the application ratio or (ii) uncore logic of the processor circuitry based on the application ratio, and means for initiating the execution of the workload with the at least one of the one or more cores or the uncore logic.

In Example 65, the subject matter of Example 64 can optionally include that the means for determining is first means for determining, and further including means for identifying at least one of a latency threshold, a power consumption threshold, or a throughput threshold based on requirements associated with the execution of the workload, second means for determining one or more workload parameters in response to the execution of the workload, and the means for configuring is to determine a configuration of the least one of (i) one or more cores of the processor circuitry based on the application ratio or (ii) uncore logic of the processor circuitry based on the one or more workload parameters, the configuration to at least one of increase performance of the processor circuitry or reduce latency of the processor circuitry.

In Example 66, the subject matter of Examples 64-65 can optionally include that the means for determining is to determine one or more electrical characteristics of the processor circuitry, the one or more electrical characteristics including the first operating frequency, the first operating frequency associated with a first temperature point, and identify the processor circuitry as capable of applying a configuration based on the application ratio to the least one of (i) one or more cores of the processor circuitry based on the application ratio or (ii) uncore logic based on the one or more electrical characteristics.

In Example 67, the subject matter of Examples 64-66 can optionally include that the one or more cores includes a first core, and the means for configuring is to store first information accessible by the processor circuitry, the first information associating a first type of machine readable instruction with the workload, and in response to identifying an instruction to be loaded by the first core is of the first type, configure the first core based on the application ratio.

In Example 68, the subject matter of Examples 64-67 can optionally include that the application ratio is a first application ratio, the workload is a first workload, the one or more cores includes a first core, and wherein the means for determining is to determine that the processor circuitry supports a second application ratio of a second workload, and the means for configuring is to store second information accessible by the processor circuitry, the second information associating a second type of machine readable instruction with the second workload, and in response to identifying the instruction to be loaded by the first core is of the second type, configure the first core based on the second application ratio.

In Example 69, the subject matter of Examples 64-68 can optionally include that the workload is a fifth-generation (5G) mobile network workload, and the means for configuring is to, in response to the processor circuitry executing the 5G mobile network workload associated with an edge network, configure the processor circuitry to implement a virtual radio access network based on the application ratio.

In Example 70, the subject matter of Examples 64-69 can optionally include that the application ratio is a first application ratio, and wherein the means for determining is to identify the processor circuitry as capable of applying a configuration based on the first application ratio or a second application ratio to the least one of (i) one or more cores of the processor circuitry based on the application ratio or (ii) uncore logic, and the means for configuring is to configure the processor circuitry to have a first software silicon feature to control activation of the first application ratio and a second software silicon feature to control activation of the second application ratio, before deploying the processor circuitry to the edge network, activate the first software silicon feature and disabling the second software silicon feature, and after deploying the processor circuitry to the edge network, disable the first software silicon feature and enabling the second software silicon feature.

In Example 71, the subject matter of Examples 64-70 can optionally include that the workload is a fifth-generation (5G) mobile network workload, and the means for configuring is to, in response to the processor circuitry executing the 5G mobile network workload associated with a core network, configure the processor circuitry to implement a core server based on the application ratio.

Example 72 includes a computer readable medium comprising instructions that, when executed, cause processor circuitry to at least determine whether the processor circuitry supports an application ratio of a workload based on whether at least one of (i) a first operating frequency of the processor circuitry corresponds to a second operating frequency associated with the application ratio or (ii) a first thermal design profile of the processor circuitry corresponds to a second thermal design profile associated with the application ratio, configure, in response to a determination that the processor circuitry supports the application ratio and before execution of the workload, at least one of (i) one or more cores of the processor circuitry based on the application ratio or (ii) uncore logic of the processor circuitry based on the application ratio, and initiate the execution of the workload with the at least one of the one or more cores or the uncore logic.

In Example 73, the subject matter of Example 72 can optionally include that the instructions, when executed, cause the processor circuitry to determine at least one of a latency threshold, a power consumption threshold, or a throughput threshold based on requirements associated with the execution of the workload, determine one or more workload parameters in response to the execution of the workload, and determine a configuration of the least one of (i) one or more cores of the processor circuitry based on the application ratio or (ii) uncore logic of the processor circuitry based on the one or more workload parameters, the configuration to at least one of increase performance of the processor circuitry or reduce latency of the processor circuitry.

In Example 74, the subject matter of Examples 72-73 can optionally include that the instructions, when executed, cause the processor circuitry to determine one or more electrical characteristics of the processor circuitry, the one or more electrical characteristics including the first operating frequency, the first operating frequency associated with a first temperature point, and identify the processor circuitry as capable of applying a configuration based on the application ratio to the least one of (i) one or more cores of the processor circuitry based on the application ratio or (ii) uncore logic based on the one or more electrical characteristics.

In Example 75, the subject matter of Examples 72-74 can optionally include that the one or more cores includes a first core, and the instructions, when executed, cause the processor circuitry to store first information accessibly by the processor circuitry, the first information associating a first type of machine readable instruction with the workload, and in response to identifying an instruction to be loaded by the first core is of the first type, configure the first core based on the application ratio.

In Example 76, the subject matter of Examples 72-75 can optionally include that the application ratio is a first application ratio, the workload is a first workload, the one or more cores includes a first core, and the instructions, when executed, cause the processor circuitry to determine that the processor circuitry supports a second application ratio of a second workload, store second information accessible by the processor circuitry, the second information associating a second type of machine readable instruction with the second workload, and in response to identifying the instruction to be loaded by the first core is of the second type, configure the first core based on the second application ratio.

In Example 77, the subject matter of Examples 72-76 can optionally include that the workload is a fifth-generation (5G) mobile network workload, and the instructions, when executed, cause the processor circuitry to, in response to the processor circuitry executing the 5G mobile network workload associated with an edge network, configure the processor circuitry to implement a virtual radio access network based on the application ratio.

In Example 78, the subject matter of Examples 72-77 can optionally include that the application ratio is a first application ratio, and the instructions, when executed, cause the processor circuitry to identify the processor circuitry as capable of applying a configuration based on the first application ratio or a second application ratio to the least one of (i) one or more cores of the processor circuitry based on the application ratio or (ii) uncore logic, configure the processor circuitry to have a first software silicon feature to control activation of the first application ratio and a second software silicon feature to control activation of the second application ratio, before deployment of the processor circuitry to the edge network, activate the first software silicon feature and disabling the second software silicon feature, and after deployment of the processor circuitry to the edge network, disable the first software silicon feature and enabling the second software silicon feature.

In Example 79, the subject matter of Examples 72-78 can optionally include that the workload is a fifth-generation (5G) mobile network workload, and the instructions, when executed, cause the processor circuitry to, in response to the processor circuitry executing the 5G mobile network workload associated with a core network, configure the processor circuitry to implement a core server based on the application ratio.

Example 80 includes an apparatus to execute a workload, the apparatus comprising at least one memory, and processor circuitry to execute instructions to at least determine whether the processor circuitry supports an application ratio of the workload based on whether at least one of (i) a first operating frequency of the processor circuitry corresponds to a second operating frequency associated with the application ratio or (ii) a first thermal design profile of the processor circuitry corresponds to a second thermal design profile associated with the application ratio, configure, in response to a determination that the processor circuitry supports the application ratio and before execution of the workload, at least one of (i) one or more cores of the processor circuitry based on the application ratio or (ii) uncore logic of the processor circuitry based on the application ratio, and initiate the execution of the workload with the at least one of the one or more cores or the uncore logic.

In Example 81, the subject matter of Example 80 can optionally include that the processor circuitry is to determine at least one of a latency threshold, a power consumption threshold, or a throughput threshold based on requirements associated with the execution of the workload, determine one or more workload parameters in response to the execution of the workload, and determine a configuration of the least one of (i) one or more cores of the processor circuitry based on the application ratio or (ii) uncore logic of the processor circuitry based on the one or more workload parameters, the configuration to at least one of increase performance of the processor circuitry or reduce latency of the processor circuitry.

In Example 82, the subject matter of Examples 80-81 can optionally include that the processor circuitry is to determine one or more electrical characteristics of the processor circuitry, the one or more electrical characteristics including the first operating frequency, the first operating frequency associated with a first temperature point, and identify the processor circuitry as capable of applying a configuration based on the application ratio to the least one of (i) one or more cores of the processor circuitry based on the application ratio or (ii) uncore logic based on the one or more electrical characteristics.

In Example 83, the subject matter of Examples 80-82 can optionally include that the one or more cores includes a first core, and the processor circuitry is to store first information accessibly by the processor circuitry, the first information associating a first type of machine readable instruction with the workload, and in response to identifying an instruction to be loaded by the first core is of the first type, configure the first core based on the application ratio.

In Example 84, the subject matter of Examples 80-83 can optionally include that the application ratio is a first application ratio, the workload is a first workload, the one or more cores includes a first core, and the processor circuitry is to determine that the processor circuitry supports a second application ratio of a second workload, store second information accessible by the processor circuitry, the second information associating a second type of machine readable instruction with the second workload, and in response to identifying the instruction to be loaded by the first core is of the second type, configure the first core based on the second application ratio.

In Example 85, the subject matter of Examples 80-84 can optionally include that the workload is a fifth-generation (5G) mobile network workload, and the processor circuitry is to, in response to the processor circuitry executing the 5G mobile network workload associated with an edge network, configure the processor circuitry to implement a virtual radio access network based on the application ratio.

In Example 86, the subject matter of Examples 80-85 can optionally include that the application ratio is a first application ratio, and the processor circuitry is to identify the processor circuitry as capable of applying a configuration based on the first application ratio or a second application ratio to the least one of (i) one or more cores of the processor circuitry based on the application ratio or (ii) uncore logic, configure the processor circuitry to have a first software silicon feature to control activation of the first application ratio and a second software silicon feature to control activation of the second application ratio, before deployment of the processor circuitry to the edge network, activate the first software silicon feature and disabling the second software silicon feature, and after deployment of the processor circuitry to the edge network, disable the first software silicon feature and enabling the second software silicon feature.

In Example 87, the subject matter of Examples 80-86 can optionally include that the workload is a fifth-generation (5G) mobile network workload, and the processor circuitry is to, in response to the processor circuitry executing the 5G mobile network workload associated with a core network, configure the processor circuitry to implement a core server based on the application ratio.

Example 88 includes a method to execute a workload, the method comprising determining whether processor circuitry supports an application ratio of the workload based on whether at least one of (i) a first operating frequency of the processor circuitry corresponds to a second operating frequency associated with the application ratio or (ii) a first thermal design profile of the processor circuitry corresponds to a second thermal design profile associated with the application ratio, configuring, in response to determining the processor circuitry supports the application ratio and before execution of the workload, at least one of (i) one or more cores of the processor circuitry based on the application ratio or (ii) uncore logic of the processor circuitry based on the application ratio, and initiating the execution of the workload with the at least one of the one or more cores or the uncore logic.

In Example 89, the subject matter of Example 88 can optionally include determining at least one of a latency threshold, a power consumption threshold, or a throughput threshold based on requirements associated with the execution of the workload, determining one or more workload parameters in response to the execution of the workload, and determining a configuration of the least one of (i) one or more cores of the processor circuitry based on the application ratio or (ii) uncore logic of the processor circuitry based on the one or more workload parameters, the configuration to at least one of increase performance of the processor circuitry or reduce latency of the processor circuitry.

In Example 90, the subject matter of Examples 88-89 can optionally include fabricating the processor circuitry, determining one or more electrical characteristics of the processor circuitry, the one or more electrical characteristics including the first operating frequency, the first operating frequency associated with a first temperature point, and identifying the processor circuitry as capable of applying a configuration based on the application ratio to the least one of (i) one or more cores of the processor circuitry based on the application ratio or (ii) uncore logic based on the one or more electrical characteristics.

In Example 91, the subject matter of Examples 88-90 can optionally include that the one or more cores includes a first core, and further including storing first information accessibly by the processor circuitry, the first information associating a first type of machine readable instruction with the workload, and in response to identifying an instruction to be loaded by the first core is of the first type, configuring the first core based on the application ratio.

In Example 92, the subject matter of Examples 88-91 can optionally include that the application ratio is a first application ratio, the workload is a first workload, the one or more cores includes a first core, and further including determining that the processor circuitry supports a second application ratio of a second workload, storing second information accessibly by the processor circuitry, the second information associating a second type of machine readable instruction with the second workload, and in response to identifying the instruction to be loaded by the first core is of the second type, configuring the first core based on the second application ratio.

In Example 93, the subject matter of Examples 88-92 can optionally include that the workload is a fifth-generation (5G) mobile network workload, and further including deploying the processor circuitry to an edge network, and in response to the processor circuitry executing the 5G mobile network workload associated with the edge network, configuring the processor circuitry to implement a virtual radio access network based on the application ratio.

In Example 94, the subject matter of Examples 88-93 can optionally include that the application ratio is a first application ratio, and further including identifying the processor circuitry as capable of applying a configuration based on the first application ratio or a second application ratio to the least one of (i) one or more cores of the processor circuitry based on the application ratio or (ii) uncore logic, configuring the processor circuitry to have a first software silicon feature to control activation of the first application ratio and a second software silicon feature to control activation of the second application ratio, before deploying the processor circuitry to the edge network, activating the first software silicon feature and disabling the second software silicon feature, and after deploying the processor circuitry to the edge network, disabling the first software silicon feature and enabling the second software silicon feature.

In Example 95, the subject matter of Examples 88-94 can optionally include that the workload is a fifth-generation (5G) mobile network workload, and further including deploying the processor circuitry to a core network, and in response to the processor circuitry executing the 5G mobile network workload associated with the core network, configuring the processor circuitry to implement a core server based on the application ratio.

Example 96 is a computer-readable medium comprising instructions to perform any of Examples 45-55.

Example 97 is an apparatus comprising processor circuitry to perform any of Examples 45-55.

Example 98 is a distributed unit comprising processor circuitry to perform any of Examples 45-55.

Example 99 is a centralized unit comprising processor circuitry to perform any of Examples 45-55.

Example 100 is an edge server comprising processor circuitry to perform any of Examples 45-55.

Example 101 is a core server comprising processor circuitry to perform any of Examples 45-55.

Example 102 is an apparatus comprising a graphics processing unit to perform any of Examples 45-55.

Example 103 is an apparatus comprising a vision processing unit to perform any of Examples 45-55.

Example 104 is an apparatus comprising a neural network processor to perform any of Examples 45-55.

Example 105 is an apparatus comprising a general purpose processor to perform any of Examples 45-55.

Example 106 is a computer-readable medium comprising instructions to perform any of Examples 88-95.

Example 107 is an apparatus comprising processor circuitry to perform any of Examples 88-95.

Example 108 is a distributed unit comprising processor circuitry to perform any of Examples 88-95.

Example 109 is a centralized unit comprising processor circuitry to perform any of Examples 88-95.

Example 110 is an edge server comprising processor circuitry to perform any of Examples 88-95.

Example 111 is a core server comprising processor circuitry to perform any of Examples 88-95.

Example 112 is an apparatus comprising a graphics processing unit to perform any of Examples 88-95.

Example 113 is an apparatus comprising a vision processing unit to perform any of Examples 88-95.

Example 114 is an apparatus comprising a neural network processor to perform any of Examples 88-95.

Example 115 is an apparatus comprising a general purpose processor to perform any of Examples 88-95.

Example 116 includes a central processing unit (CPU), comprising a plurality of cores and a power control unit coupled to the plurality of cores, the power control unit configured to modify an operation of the plurality of cores on a per-core basis, based on an application ratio, to optimize performance for one or more workloads, the application ratio based on at least one of a network node location, latency requirements, power requirements, or throughput requirements, in accordance with the techniques discussed herein.

In Example 117, the subject matter of Example 116 can optionally include that the modification of the operation is based on a type of instruction to be loaded by the plurality of cores, the type of instruction being a 256-bit Streaming Single Instruction, Multiple Data (SIMD) Extension (SSE) instruction, an Advanced Vector Extension 512-bit instruction (AVX-512), or a fifth generation (5G) Instruction Set Architecture (ISA) instruction.

In Example 118, the subject matter of Examples 116-117 can optionally include that the 5G ISA instruction is a complex number arithmetic operation or a floating point operation.

In Example 119, the subject matter of Examples 116-118 can optionally include that the application ratio is modified to a value less than 1.0.

In Example 120, the subject matter of Examples 116-119 can optionally include that the power and frequency control unit is further configured to modify the operation of uncore logic within the CPU, based on the application ratio, to optimize performance for the one or more workloads to at least one of increase throughput or decrease latency.

In Example 121, the subject matter of Examples 116-120 can optionally include that the one or more workloads relate to wired or wireless networking workloads for network function virtualization, in accordance with types of the networking workloads discussed herein.

In Example 122, the subject matter of Examples 116-121 can optionally include a software defined silicon feature to control activation and use of the power control unit with the optimized performance for the one or more workloads, within a soft stock keeping unit (SKU) product.

In Example 123, the subject matter of Examples 116-122 can optionally include that the power control unit is provided with settings at time of manufacture, based on the application ratio, to optimize performance for one or more workloads, within a hard stock keeping unit (SKU) product.

Example 124 includes a method of using a software defined silicon feature to control activation and use of a feature of the CPU of Examples 116-123, to configure the power control unit to operate with the optimized performance for the one or more workloads.

Example 125 includes a method of operating the CPU of Examples 116-123, the method of operating the CPU comprising operations to optimize frequency and power usage for execution of the one or more workloads.

Example 126 includes a method of manufacturing the CPU of Examples 116-123, the method of manufacturing comprising configurations to establish the values for the power and frequency control unit based on an estimated application ratio for the one or more workloads.

Example 127 includes a method of testing and validating performance of the CPU of Examples 116-123, the testing and validating comprising configurations to verify operation of respective cores and other CPU ingredients to implement operational values from the power and frequency control unit, based on the estimated application ratio for the one or more workloads.

Example 128 includes an edge server, comprising a single socket hardware platform, configured to operate the CPU of Examples 116-123.

Example 129 includes a core server, comprising a dual socket hardware platform, configured to operate the CPU of Examples 116-123.

Example 130 includes a distributed unit, comprising a single socket hardware platform or a dual socket hardware platform, including the CPU of Examples 116-123.

Example 131 includes the distributed unit of example 130, wherein the single socket hardware platform or the dual socket hardware platform implements a virtual radio access network.

Example 132 includes a centralized unit, comprising a single socket hardware platform or a dual socket hardware platform, including the CPU of Examples 116-123.

Example 133 includes the centralized unit of example 132, wherein the single socket hardware platform or the dual socket hardware platform implements a virtual radio access network.

Example 134 includes an apparatus comprising decoder circuitry to decode a single instruction, the single instruction to include a field for an identifier of a first source operand, a field for an identifier of a second source operand, a field for an identifier of a destination operand, and a field for an opcode, the opcode to indicate execution circuitry is to execute a fifth-generation (5G) workload, and execution circuitry to execute the decoded instruction according to the opcode to execute the 5G workload.

In Example 135, the subject matter of Example 134 can optionally include that the decoder circuitry is to add the identified first source operand to the identified second source operand and store a result of the addition into the identified destination operand.

In Example 136, the subject matter of Examples 134-135 can optionally include that the field for the identifier of the first source operand is to identify a vector register.

In Example 137, the subject matter of Examples 134-136 can optionally include that the field for the identifier of the first source operand is to identify a memory location.

In Example 138, the subject matter of Examples 134-137 can optionally include that the instruction is an Advanced Vector Extensions (AVX) 512-bit instruction or a 5G-ISA instruction.

Example 139 includes a semiconductor device comprising circuitry configurable to provide one or more features, a license processor to activate or deactivate at least one of the one or more features based on a license received via a network from a first remote enterprise system, and an analytics engine to report telemetry data associated with operation of the semiconductor device to at least one of the first remote enterprise system or a second remote enterprise system, the analytics engine to report the telemetry data in response to activation or deactivation of the at least one of the one or more features based on license.

In Example 140, the subject matter of Example 139 can optionally include that the license processor is to execute in a trusted execution environment (TEE) of the semiconductor device.

In Example 141, the subject matter of Examples 139-140 can optionally include that the one or more features includes a first configurable operating frequency of processor cores and a second configurable operating frequency of uncore logic, the semiconductor device is initialized to have a first number of the processor cores active with the first configurable operating frequency and remaining ones of the processor cores active with a third configurable operating frequency.

In Example 142, the subject matter of Examples 139-141 can optionally include that the license is a first license, and the license processor is to activate, based on a second license received via the network from the first remote enterprise system, a fourth configurable operating frequency of the processor cores and a fifth configurable operating frequency of the uncore logic.

In Example 143, the subject matter of Examples 139-142 can optionally include that the one or more features includes a configurable clock rate, the semiconductor device is initialized to activate a first clock rate, and the license processor is to activate, based on the license, a second clock rate different from the first clock rate.

In Example 144, the subject matter of Examples 139-143 can optionally include that the analytics engine is to report a certificate to the at least one of the first remote enterprise system or the second remote enterprise system when the activation or the deactivation of the at least one of the one or more features is a success, the certificate to include at least some of the telemetry data.

In Example 145, the subject matter of Examples 139-144 can optionally include that the certificate is a first certificate, the at least some of the telemetry data is first telemetry data associated with a first time, and the analytics engine is to report a second certificate to the at least one of the first remote enterprise system or the second remote enterprise system in response to a request, the second certificate to include second telemetry data associated with a second time after the first time.

In Example 146, the subject matter of Examples 139-145 can optionally include that the license processor is to report feature support verification information via the network to the second remote enterprise system in response to a query from the second remote enterprise system to verify that the semiconductor device supports the at least one of the one or more features.

In Example 147, the subject matter of Examples 139-146 can optionally include that the query is to be received before the license is received.

Example 148 is an apparatus comprising an artificial intelligence processor to perform any of Examples 45-55.

Example 149 is an apparatus comprising a machine learning processor to perform any of Examples 45-55.

Example 150 is an apparatus comprising a vector processor to perform any of Examples 45-55.

Example 151 is an apparatus comprising an electronic control unit to perform any of Examples 45-55.

Example 152 is an apparatus comprising an artificial intelligence processor to perform any of Examples 88-95.

Example 153 is an apparatus comprising a machine learning processor to perform any of Examples 88-95.

Example 154 is an apparatus comprising a vector processor to perform any of Examples 88-95.

Example 155 is an apparatus comprising an electronic control unit to perform any of Examples 88-95.

Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

The following claims are hereby incorporated into this Detailed Description by this reference, with each claim standing on its own as a separate embodiment of the present disclosure.

What is claimed is:

1. A computer readable medium comprising instructions to cause processor circuitry to at least:
   determine an application ratio associated with a workload, the application ratio based on an operating frequency to execute the workload;
   configure, before execution of the workload, at least one of (i) one or more cores of the processor circuitry based on the application ratio or (ii) uncore logic of the processor circuitry based on the application ratio;
   initiate the execution of the workload with the at least one of the one or more cores or the uncore logic;
   execute a machine-learning model to identify at least one of a latency threshold, a power consumption threshold, or a throughput threshold associated with the workload;
   during the execution of the workload at the operating frequency, determine whether the at least one of the latency threshold, the power consumption threshold, or the throughput threshold is satisfied; and
   after a determination that the at least one of the latency threshold, the power consumption threshold, or the throughput threshold is satisfied, store a value in the processor circuitry, the value indicative of an association between the processor circuitry and the application ratio.

2. The computer readable medium of claim 1, wherein the instructions are to cause the processor circuitry to configure the at least one of the one or more cores or the uncore logic after a determination that the application ratio is included in a set of application ratios of the processor circuitry.

3. The computer readable medium of claim 1, wherein the association is a first association, the application ratio is a first application ratio, the operating frequency is a first operating frequency, and the instructions are to cause the processor circuitry to:
   after execution of the workload at a second operating frequency based on a second application ratio, determine whether the at least one of the latency threshold, the power consumption threshold, or the throughput threshold is satisfied; and
   after a determination that the at least one of the latency threshold, the power consumption threshold, or the throughput threshold is satisfied based on the second application ratio, modify the value in the processor circuitry to be indicative of a second association between (i) the processor circuitry, (ii) the first application ratio, and (iii) the second application ratio, at least one of the first application ratio or the second application ratio to be disabled until enabled by a license.

4. The computer readable medium of claim 1, wherein the workload is a first workload, the application ratio is a first application ratio, the one or more cores are one or more first cores, the uncore logic is first uncore logic, and the instructions are to cause the processor circuitry to:
   determine a second application ratio associated with a second workload;
   after determining the second application ratio is included in a set of application ratios, configure, before execution of the second workload, at least one of (i) one or more second cores of the processor circuitry based on the second application ratio or (ii) second uncore logic of the processor circuitry based on the second application ratio; and
   initiate the execution of the second workload with the at least one of the one or more second cores or the second uncore logic, at least a first portion of the first workload to be executed while at least a second portion of the second workload is executed.

5. The computer readable medium of claim 1, wherein the instructions are to cause the processor circuitry to:
   identify a network node location of the processor circuitry;
   during the execution of the workload, determine at least one of a latency of the processor circuitry, a power consumption of the processor circuitry, or a throughput of the processor circuitry;
   after the determination that the at least one of the latency threshold, the power consumption threshold, or the throughput threshold is satisfied, adjust the application ratio; and
   associate the application ratio with at least one of the network node location, the latency, the power consumption, or the throughput.

6. The computer readable medium of claim 1, wherein the operating frequency is a first operating frequency, and the instructions are to cause the processor circuitry to:
  after the execution of the workload with a first type of instruction, determine a first power consumption based on operation of the processor circuitry at the first operating frequency, the first operating frequency associated with the first type of instruction;
  after execution of the workload with a second type of instruction, determine a second power consumption based on operation of the processor circuitry at a second operating frequency associated with the second type of instruction; and
  after a determination that the second power consumption satisfies the power consumption threshold, associate the second operating frequency with the workload.

7. The computer readable medium of claim 1, wherein the operating frequency is a first operating frequency, and the instructions are to cause the processor circuitry to:
  after the execution of the workload with a first type of instruction, determine a first throughput of the processor circuitry based on operation of the processor circuitry at the first operating frequency, the first operating frequency associated with the first type of instruction;
  after execution of the workload with a second type of instruction, determine a second throughput of the processor circuitry based on operation of the processor circuitry at a second operating frequency associated with the second type of instruction; and
  after a determination that the second throughput satisfies the throughput threshold, associate the second operating frequency with the workload.

8. An apparatus to configure execution of a workload, the apparatus comprising:
  at least one memory;
  instructions; and
  processor circuitry to execute the instructions to at least:
    determine an application ratio associated with the workload, the application ratio based on an operating frequency to execute the workload;
    configure, before the execution of the workload, at least one of (i) one or more cores of the processor circuitry based on the application ratio or (ii) uncore logic circuitry of the processor circuitry based on the application ratio;
    execute the workload with the at least one of the one or more cores or the uncore logic circuitry;
    execute a machine-learning model to identify at least one of a latency threshold, a power consumption threshold, or a throughput threshold associated with the workload;
    during the execution of the workload at the operating frequency, determine whether the at least one of the latency threshold, the power consumption threshold, or the throughput threshold is satisfied; and
    after a determination that the at least one of the latency threshold, the power consumption threshold, or the throughput threshold is satisfied, store a value in the processor circuitry, the value indicative of an association between the processor circuitry and the application ratio.

9. The apparatus of claim 8, wherein the association is a first association, the application ratio is a first application ratio, the operating frequency is a first operating frequency, and the processor circuitry is to:
  after execution of the workload at a second operating frequency based on a second application ratio, determine whether the at least one of the latency threshold, the power consumption threshold, or the throughput threshold is satisfied; and
  after a determination that at least one of the latency threshold, the power consumption threshold, or the throughput threshold is satisfied based on the second application ratio, modify the value in the processor circuitry to be indicative of a second association between the (i) processor circuitry, (ii) the first application ratio, and iii) the second application ratio, at least one of the first application ratio or the second application ratio to be disabled until enabled by a license.

10. The apparatus of claim 8, wherein the operating frequency is a first operating frequency, and the processor circuitry is to:
  after the execution of the workload with a first type of instruction, determine a first power consumption based on operation of the processor circuitry at the first operating frequency, the first operating frequency associated with the first type of instruction;
  after execution of the workload with a second type of instruction, determine a second power consumption based on operation of the processor circuitry at a second operating frequency associated with the second type of instruction; and
  after a determination that the second power consumption satisfies the power consumption threshold, associate the second operating frequency with the workload.

11. The apparatus of claim 8, wherein the operating frequency is a first operating frequency, and the processor circuitry is to:
  after the execution of the workload with a first type of instruction, determine a first throughput of the processor circuitry based on operation of the processor circuitry at the first operating frequency, the first operating frequency associated with the first type of instruction;
  after execution of the workload with a second type of instruction, determine a second throughput of the processor circuitry based on operation of the processor circuitry at a second operating frequency associated with the second type of instruction; and
  after a determination that the second throughput satisfies the throughput threshold, the processor circuitry to associate the second operating frequency with the workload.

12. The apparatus of claim 8, wherein the workload is a first workload, and the application ratio is based on a ratio of a first value of power consumption and a second value of power consumption, the first value corresponding to the first workload, the second value corresponding to a second workload.

13. The apparatus of claim 12, wherein the first workload is a networking workload for network function virtualization and the second workload is a power virus workload.

14. The apparatus of claim 8, wherein the processor circuitry is included in a single socket hardware platform or a dual socket hardware platform, and the processor circuitry implements at least one of a core server, a centralized unit, or a distributed unit, the at least one of the centralized unit or the distributed unit to implement a virtual radio access network.

15. A computer readable medium comprising instructions to cause processor circuitry to at least:
  determine whether the processor circuitry supports an application ratio of a workload based on whether at least one of (i) a first operating frequency of the processor circuitry corresponds to a second operating frequency associated with the application ratio or (ii) a first thermal design profile of the processor circuitry corresponds to a second thermal design profile associated with the application ratio;

configure, after a determination that the processor circuitry supports the application ratio and before execution of the workload, at least one of (i) one or more first cores of the processor circuitry based on the application ratio or (ii) first uncore logic of the processor circuitry based on the application ratio;

initiate the execution of the workload with the at least one of the one or more first cores or the first uncore logic;

determine at least one of a latency threshold, a power consumption threshold, or a throughput threshold based on requirements associated with the execution of the workload;

determine one or more workload parameters based on the execution of the workload; and determine a configuration of at least one of (i) one or more second cores of the processor circuitry based on the application ratio or (ii) second uncore logic of the processor circuitry based on the one or more workload parameters, the configuration to at least one of improve performance or reduce latency of the processor circuitry.

16. The computer readable medium of claim 15, wherein the configuration is a first configuration, and the instructions are to cause the processor circuitry to:

determine one or more electrical characteristics of the processor circuitry, the one or more electrical characteristics including the first operating frequency, the first operating frequency associated with a first temperature point; and identify the processor circuitry is capable of applying a second configuration based on the application ratio and the one or more electrical characteristics to the at least one of (i) the one or more second cores of the processor circuitry or (ii) the second uncore logic.

17. The computer readable medium of claim 15, wherein the one or more first cores includes a first core, and the instructions are to cause the processor circuitry to:

store first information accessible by the processor circuitry, the first information to associate a first type of machine readable instruction with the workload; and after identifying an instruction to be loaded by the first core is of the first type, configure the first core based on the application ratio.

18. An apparatus to execute workloads, the apparatus comprising:

at least one memory;
instructions; and
processor circuitry to execute instructions to at least:
determine whether the processor circuitry supports a first application ratio of a first workload based on whether at least one of (i) a first operating frequency of the processor circuitry corresponds to a second operating frequency associated with the first application ratio or (ii) a first thermal design profile of the processor circuitry corresponds to a second thermal design profile associated with the first application ratio;

configure, to after a determination that the processor circuitry supports the first application ratio and before execution of the first workload, at least one of (i) one or more cores of the processor circuitry based on the first application ratio or (ii) uncore logic circuitry of the processor circuitry based on the first application ratio;

initiate the execution of the first workload with the at least one of the one or more cores or the uncore logic circuitry;

determine that the processor circuitry supports a second application ratio of a second workload;

store second information accessible by the processor circuitry, the second information to associate a second type of machine readable instruction with the second workload; and after identifying an instruction to be loaded by a first core of the one or more cores is of the second type, configure the first core based on the second application ratio.

19. The apparatus of claim 18, wherein the first workload is a fifth-generation (5G) mobile network workload, and the processor circuitry is to implement a virtual radio access network based on the first application ratio.

20. The apparatus of claim 19, wherein the one or more cores are one or more first cores, the uncore logic circuitry is first uncore logic circuitry, and the processor circuitry is to:

identify the processor circuitry as capable of applying a configuration based on the first application ratio or the second application ratio to at least one of (i) one or more second cores of the processor circuitry or (ii) second uncore logic circuitry;

configure the processor circuitry to have a first software silicon feature to control activation of the first application ratio and a second software silicon feature to control activation of the second application ratio;

before deployment of the processor circuitry, activate the first software silicon feature and disable the second software silicon feature; and after deployment of the processor circuitry, disable the first software silicon feature and enable the second software silicon feature.

21. The apparatus of claim 18, wherein the first workload is a fifth-generation (5G) mobile network workload, and the processor circuitry is to implement a core server based on the first application ratio.

* * * * *